(12) United States Patent
Singer

(10) Patent No.: US 12,316,272 B2
(45) Date of Patent: May 27, 2025

(54) SOLAR PANEL PILLAR

(71) Applicant: Nicholas J. Singer, Irvine, CA (US)

(72) Inventor: Nicholas J. Singer, Irvine, CA (US)

( * ) Notice: Subject to any disclaimer, the term of this patent is extended or adjusted under 35 U.S.C. 154(b) by 0 days.

(21) Appl. No.: 18/821,212

(22) Filed: Aug. 30, 2024

(65) Prior Publication Data
US 2024/0421760 A1 Dec. 19, 2024

Related U.S. Application Data

(63) Continuation-in-part of application No. 18/733,559, filed on Jun. 4, 2024, and a continuation-in-part of application No. 18/437,246, filed on Feb. 9, 2024, said application No. 18/733,559 is a continuation of application No. 18/403,565, filed on Jan. 3, 2024, now Pat. No. 12,047,035, said application No. 18/437,246 is a continuation of application No. 18/214,366, filed on Jun. 26, 2023, now Pat. No. 11,999,266, said application No. 18/403,565 is a continuation-in-part of application No. 18/214,366, filed on Jun. 26, 2023, now Pat. No. 11,999,266.

(60) Provisional application No. 63/664,615, filed on Jun. 26, 2024, provisional application No. 63/656,539, filed on Jun. 5, 2024, provisional application No. 63/594,312, filed on Oct. 30, 2023, provisional application No. 63/496,698, filed on Apr. 18, 2023, provisional application No. 63/495,043, filed on Apr. 7, 2023.

(51) Int. Cl.
*F24S 30/45* (2018.01)
*H02S 30/20* (2014.01)
*H02S 40/22* (2014.01)

(52) U.S. Cl.
CPC ............. *H02S 30/20* (2014.12); *H02S 40/22* (2014.12)

(58) Field of Classification Search
CPC ................................ H02S 30/20; H02S 40/22
USPC .......................... 136/245; 126/576, 578, 605
See application file for complete search history.

(56) References Cited

U.S. PATENT DOCUMENTS

| | | | |
|---|---|---|---|
| 3,427,200 A | 2/1969 | Lapin | |
| 4,028,893 A * | 6/1977 | Shaw | F03B 17/02 60/649 |
| 5,520,747 A | 5/1996 | Marks | |

(Continued)

FOREIGN PATENT DOCUMENTS

DE 102007014244 A1 9/2008

OTHER PUBLICATIONS

Does covering a car with solar panels make sense?, https://youtube.com/shorts/8hQnH55IMg8?feature=share.

*Primary Examiner* — Avinash A Savani
(74) *Attorney, Agent, or Firm* — DANE IP Law PC

(57) ABSTRACT

Pillars and towers with solar panels mounted thereto allow for more solar panels to be located within a 2 dimensional footprint by using the vertical three dimensional space above the 2 dimensional footprint. The pillars and towers may be secured to the ground. Solar panels may attached to the pillars and towards vertically on top of each other and extend out horizontally. The solar panels may be arranged in to different configurations (e.g., zig-zag) to further increase solar harvesting within the two dimensional footprint and three dimensional space. The solar panel pillars may also have a plurality of solar panel columns that surround the pole that they are mounted thereto to increase solar energy harvesting potential.

13 Claims, 67 Drawing Sheets

(56) References Cited

U.S. PATENT DOCUMENTS

| | | | |
|---|---|---|---|
| 6,177,627 B1 | 1/2001 | Murphy | |
| 7,884,308 B1* | 2/2011 | Mejia | F24S 50/20 |
| | | | 136/246 |
| 8,288,884 B1* | 10/2012 | Malcolm | F03D 9/25 |
| | | | 290/55 |
| 8,440,950 B1 | 5/2013 | Reischmann | |
| 8,487,180 B1 | 7/2013 | Fraas | |
| 9,239,444 B2* | 1/2016 | Gurley | G02B 7/183 |
| 11,337,379 B2 | 5/2022 | James | |
| 11,658,608 B2* | 5/2023 | Allen | H02S 30/20 |
| | | | 136/245 |
| 2003/0094315 A1 | 5/2003 | White | |
| 2004/0216929 A1 | 11/2004 | White | |
| 2007/0107768 A1 | 5/2007 | Romana | |
| 2008/0196758 A1* | 8/2008 | McGuire | H02S 10/40 |
| | | | 290/55 |
| 2010/0156339 A1 | 6/2010 | Hoffman | |
| 2011/0041834 A1* | 2/2011 | Liao | F24S 30/452 |
| | | | 126/605 |
| 2011/0179791 A1 | 7/2011 | Butler | |
| 2011/0297206 A1* | 12/2011 | Devine | F03G 6/067 |
| | | | 136/246 |
| 2012/0111318 A1* | 5/2012 | Park | H02S 30/20 |
| | | | 126/605 |
| 2014/0116495 A1 | 5/2014 | Kim | |
| 2015/0207454 A1 | 7/2015 | Huling, III | |
| 2015/0326175 A1 | 11/2015 | Austin | |
| 2015/0330369 A1 | 11/2015 | Martin-Lopez | |
| 2016/0020727 A1 | 1/2016 | Cheung | |
| 2016/0197577 A1 | 7/2016 | Pisharodi | |
| 2017/0093329 A1 | 3/2017 | Jensen | |
| 2018/0170191 A1 | 6/2018 | Xing | |
| 2018/0266140 A1* | 9/2018 | Farr | E04B 2/58 |
| 2019/0140475 A1 | 5/2019 | Chan | |
| 2020/0358392 A1* | 11/2020 | Kiefer, III | H02S 40/38 |
| 2021/0075365 A1 | 3/2021 | Clapp | |
| 2022/0069767 A1 | 3/2022 | Graner | |
| 2022/0255499 A1* | 8/2022 | Allen | H02S 20/32 |

* cited by examiner

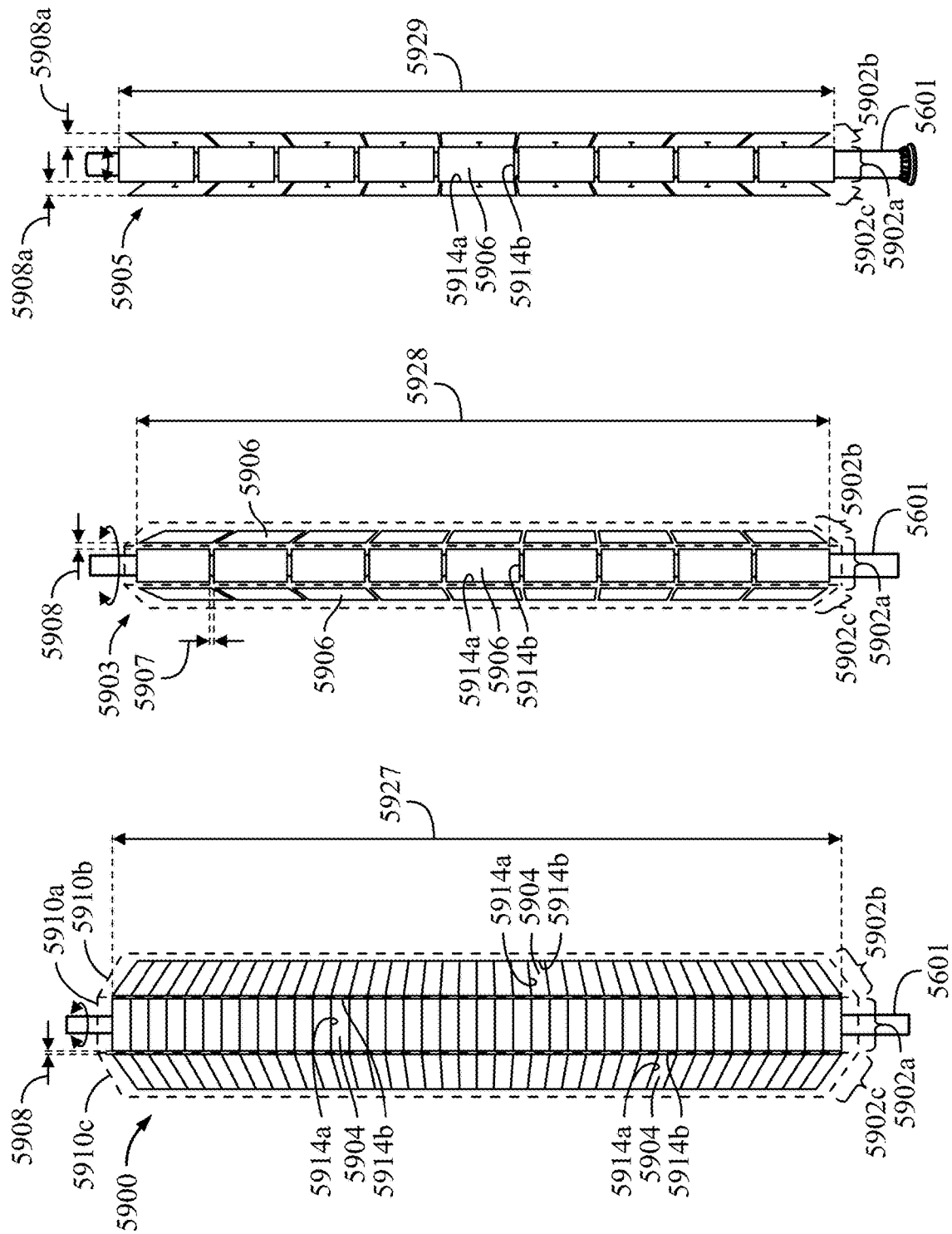

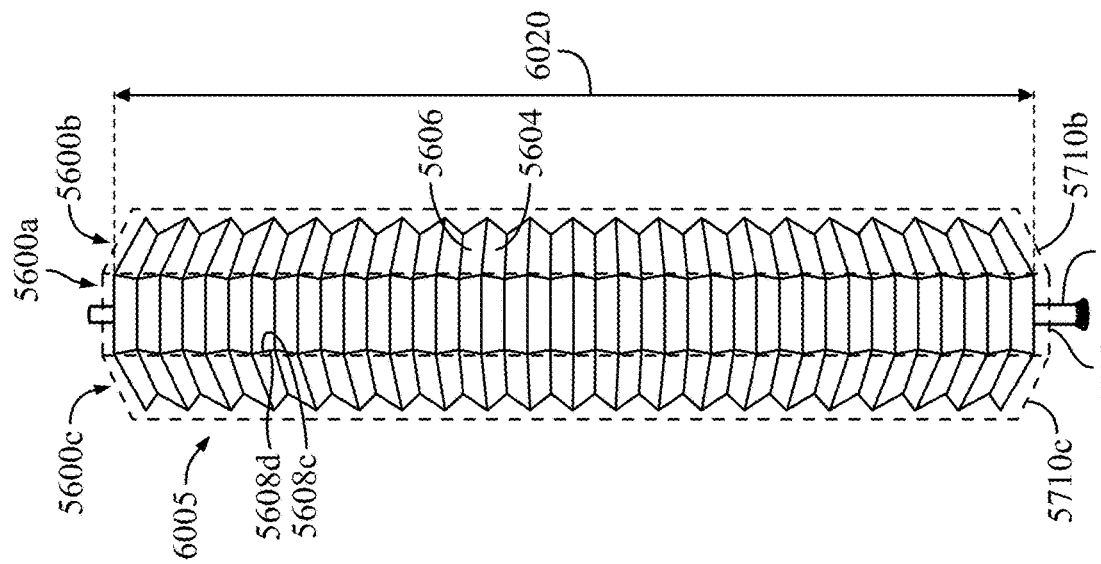
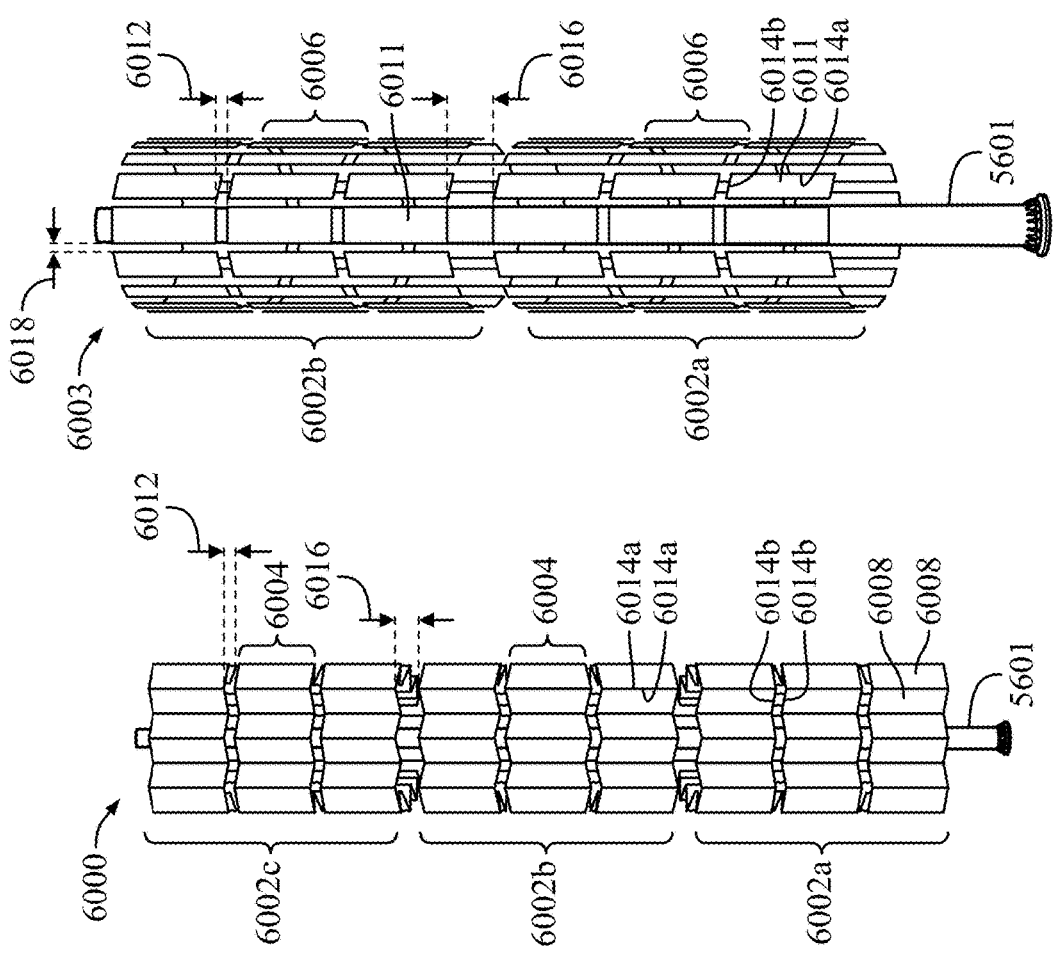

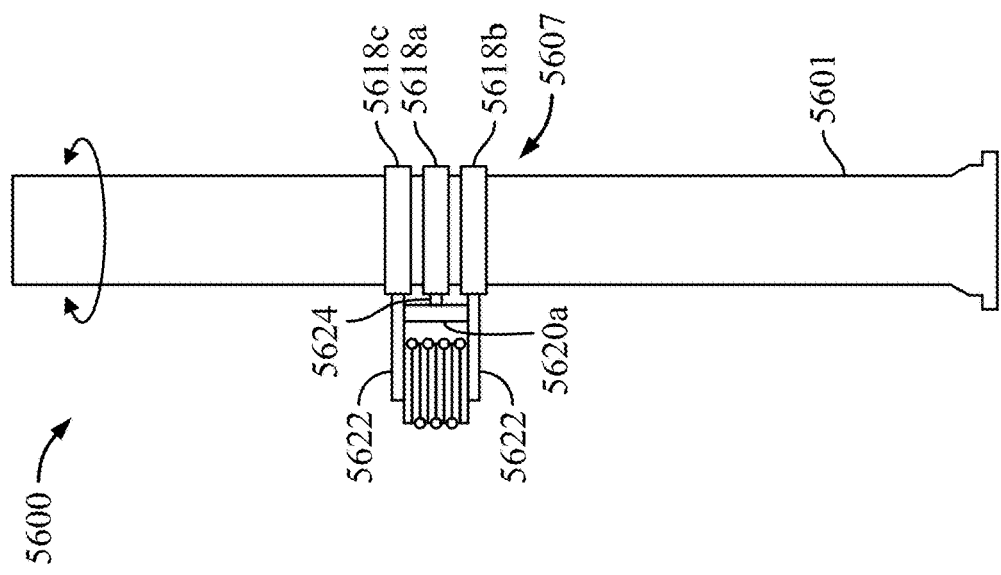
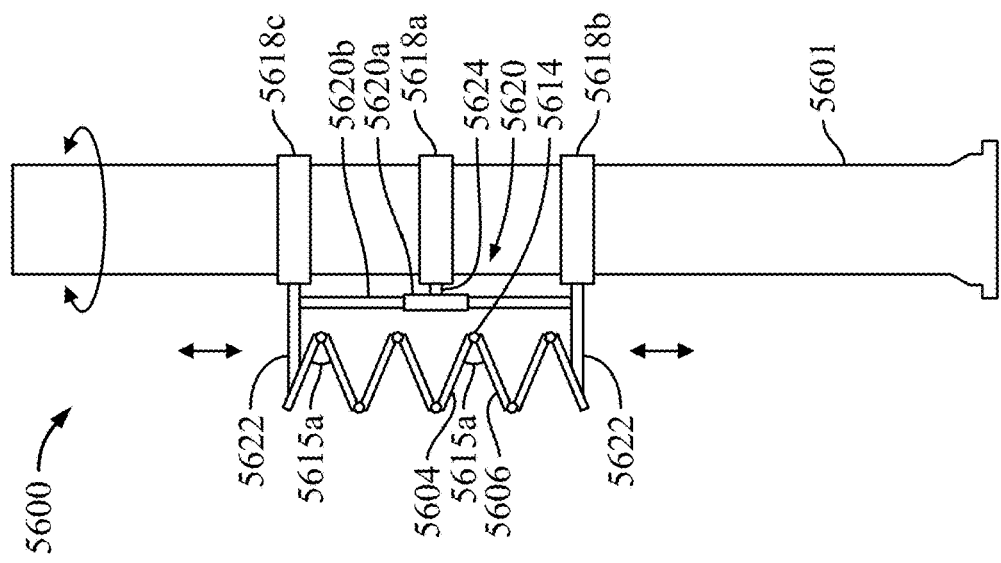
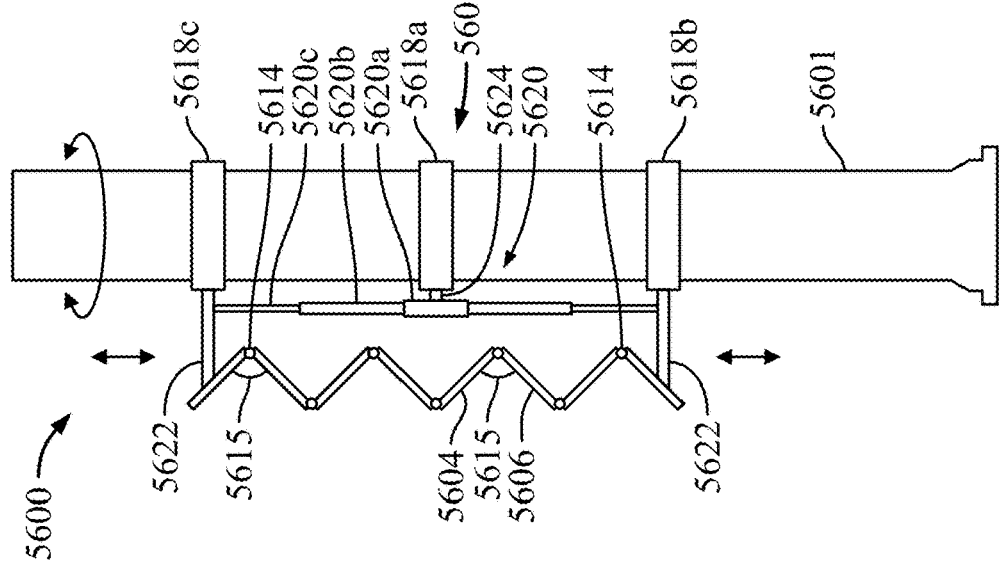

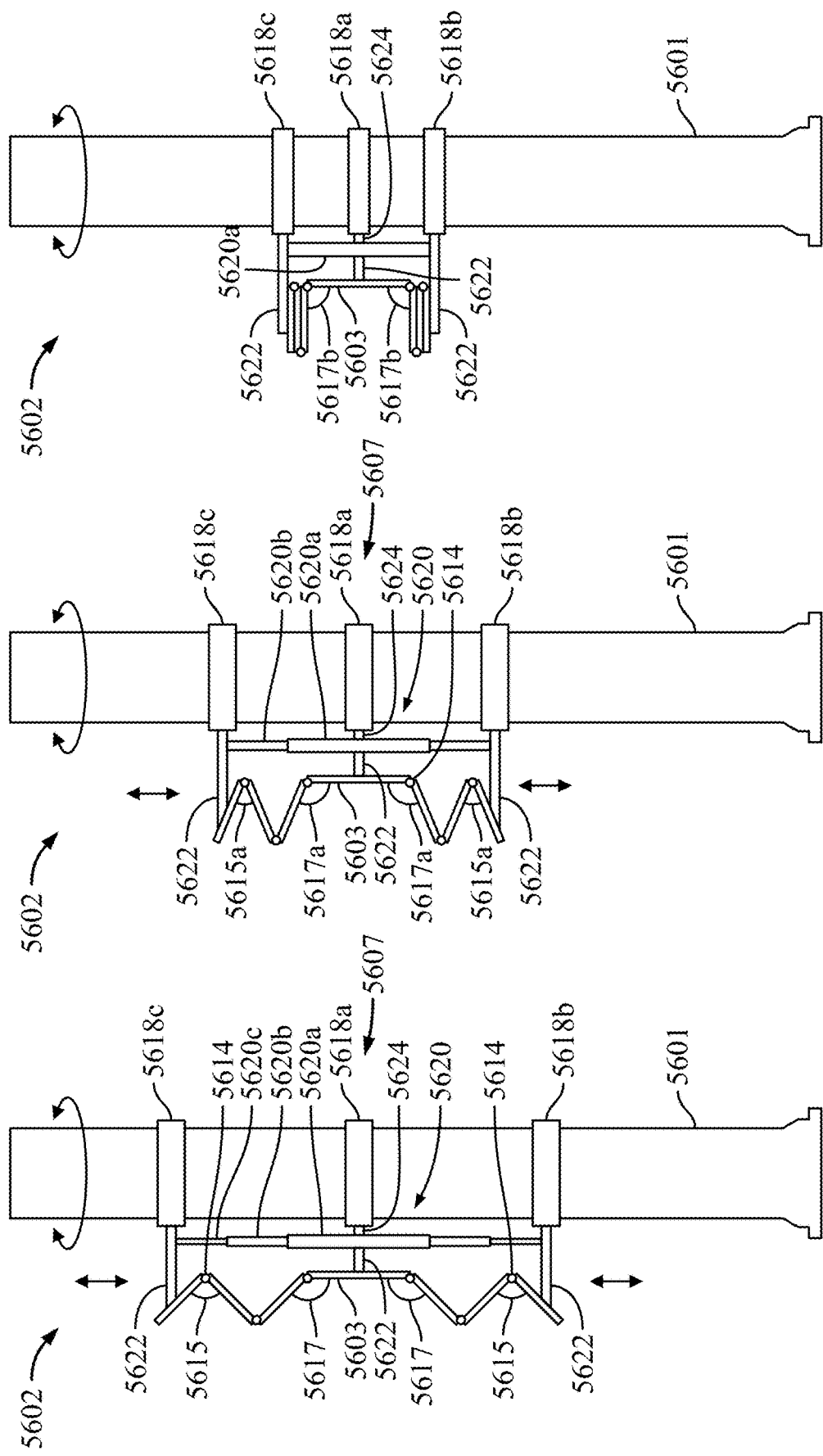

SOLAR PANEL PILLAR

CROSS-REFERENCE TO RELATED APPLICATIONS

This application claims priority to Prov. Pat. App. Ser. No. 63/664,615, filed on 2024 Jun. 26, and Prov. Pat. App. Ser. No. 63/656,539, filed on 2024 Jun. 5, and this application is a continuation-in-part application of U.S. patent application Ser. No. 18/733,559, filed on 2024 Jun. 4, which is a continuation application of U.S. patent application Ser. No. 18/403,565, filed on 2024 Jan. 3, now U.S. Pat. No. 12,047,035, which claims priority to U.S. Prov. Pat. App. Ser. No. 63/594,312, filed on 2023 Oct. 30 and is a continuation-in-part application of U.S. patent application Ser. No. 18/214,366, filed on 2023 Jun. 26, now U.S. Pat. No. 11,999,266, which claims priority to Prov. Pat. App. Ser. No. 63/495,043, filed on 2023 Apr. 7 and Prov. Pat. App. Ser. No. 63/496,698, filed on 2023 Apr. 18, and this application is a continuation-in-part application of U.S. patent application Ser. No. 18/437,246, filed on 2024 Feb. 9, which is a continuation application of U.S. patent application Ser. No. 18/214,366, filed on 2023 Jun. 26 and claims priority to Prov. Pat. App. Ser. No. 63/496,698, filed on 2023 Apr. 18 and Prov. Pat. App. Ser. No. 63/495,043, filed on 2023 Apr. 7, the entire contents of which are expressly incorporated herein by reference.

STATEMENT RE: FEDERALLY SPONSORED RESEARCH/DEVELOPMENT

Not Applicable

BACKGROUND

The various aspects and embodiments described herein relate to a solar platform and a method of using thereof.

Solar panels are used to harvest solar energy and convert such energy into electricity. Solar panels may be utilized to provide electricity to various electrical and electromechanical devices, some of such devices may have rechargeable batteries to store the electricity.

Accordingly, there is a need in the art for an improved device, system, and method for utilizing solar panels to power electrical and electromechanical devices.

BRIEF SUMMARY

The various embodiments and aspects disclosed herein address the needs discussed above, discussed below and those that are known in the art.

A solar panel tower having a plurality of rotator panels and flipper solar panels is disclosed. The solar panel tower may have a frame body that extends upwards by more than dozens of feet and have solar panels on the outside of the frame body. Such solar panels on the frame body (i.e., flipper solar panels) may pivot and rotate throughout the day to orientate their active solar surfaces at an optimum direction relative to the sun. The solar panel tower may also have solar panels extending from the frame body (i.e., rotator solar panels). Such extending solar panels may also pivot and rotate throughout the day to follow the direction of the sun for optimizing solar energy harvesting. In some examples, an electric transmission tower may be converted into the solar panel tower. Furthermore, a solar panel pillar is also disclosed that may have rotator solar panels and flipper solar panels. The solar panel pillar may be a smaller and compact version of the solar panel tower and have solar panels pivotably attached to a mounting pole instead of a frame body that extends upwards by dozens of feet. The mounting pole may also rotate about its center axis to orient the solar panels at optimum position relative to the sun throughout the year.

Moreover, solar panel pillars with active solar surfaces extending vertically upwards, rather than horizontally, are disclosed. The solar panel pillars may utilize the vertical spacing that conventional solar panels do not use above them by extending upwards for more than a dozen or more feet upwards, in some examples. The solar panel pillars may also have three-dimensional active solar surfaces in zigzag shapes to pack more solar energy harvesting potential per unit volume. The angle between the solar panels making up the zigzag shape may be changed, adjusted, and even flattened to have planar active solar surfaces. The solar panel pillars may also have a plurality of solar panel columns that surround the pole that they are mounted thereto to increase solar energy harvesting potential.

Additionally, a solar platform having a plurality of solar panels is disclosed. The solar platform is mainly designed to harvest solar energy for storage and the powering of electrical and electromechanical devices. The solar platform may have a plurality of base solar panels and pivotable solar panels where the solar panels, specifically the pivotable solar panels, are pivotable in different orientations. The pivoting of the pivotable solar panels may be done manually or automated using a motorized electromechanical mechanism. Such pivoting may be necessary to orientate the solar panels in optimum positions relative to the sun to receive sufficient or maximum amount of solar energy. The pivotable solar panels may be bifacial and may have different structural dimensions than the base solar panels. The solar platform may also include a center panel in between the pivotable solar panels that is also pivotable similar to the pivotable solar panels. The solar platform may be attached or integrated with a top surface of a vehicle or an add-on vehicle component, such as a cap or a tonneau cover. As such, the solar platform on the vehicle may be designed to power the electrical components of the vehicle or electrical components that are connected to the vehicle. If the vehicle is electrical or hybrid, the solar platform on the vehicle may also recharge the batteries of the vehicle.

Ultimately, the solar platforms described herein may be incorporated with different types of electric, hybrid, or regular internal combustion engine vehicles. Such vehicles may include trucks, vans, minivans, SUVs, semitrucks, buses, recreational vehicles, motorhomes, trailers, station wagons, hatchbacks, crossovers, sedans, coupes, compact automobiles, and other types of vehicles and automobiles. The solar platforms described herein may also be incorporated with buildings, such as parking structures, homes, office buildings, stadiums, and other types of building structures. The solar platforms described herein may also simply be on a frame and placed on the ground.

More particularly, a solar platform is disclosed. The solar platform may have a frame structure having two longitudinal sides and two lateral sides, a base solar panel laid flat on the frame structure and having an active side with a first plurality of solar cells facing in an upwards direction, and a pivotable solar panel hinged and attached at a central area of the frame structure and the pivotable solar panel configured to be pivotable at least up to 10 degrees relative to the frame structure, the pivotable solar panel having an active side with a second plurality of solar cells facing away from the base solar panel.

In some embodiments, the base solar panel has a first width and the pivotable solar panel has a second width, the first width being greater than the second width.

In some embodiments, the pivotable solar panel has a second active side with a third plurality of solar cells facing the base solar panel.

In some embodiments, the solar platform may further comprise additional solar panels pivotably hinged and attached to the center area of the frame structure, and the additional solar panels having solar cells on both sides thereof.

In some embodiments, the pivotable solar panel and the additional solar panels are equidistantly spaced apart from each other and to the base solar panel.

In some embodiments, the pivotable solar panel is traversable using an automated motorized mechanism.

In some embodiments, the solar platform is attachable to a house roof or a parking structure roof.

In some embodiments, the solar platform is attachable to an RV roof, a car roof, or a cap of a truck.

In some embodiments, the solar platform may further comprise a receiver, a motor in communication with receiver, the motor connected to the pivotable solar panels for rotating the pivotable solar panels, wherein the receiver is operative to receive a command signal to operate the motor and to pivot the pivotable solar panels.

In some embodiments, the solar platform may further comprise an application downloadable onto a smartphone of a user, wherein the application is in communication with the electrical system of the solar platform to control the electrical system of the solar platform, sensors are attached to the solar platform for measuring current flow, mapping current flow from each of the solar panels, current generated versus measured light intensity from a light sensor, percent battery charged, and percent battery remaining, connecting the application and the sensors in communication for receiving data from the sensors and displaying the measured data on a screen of the smartphone.

In some embodiments, the solar platform may further comprise a light sensor for measuring light intensity imposed on the solar panel, the light sensor providing light intensity data to a processor of the solar platform, a position sensor for determining an angular position of the panels and direction, the position sensor providing position data to the processor of the solar platform, the processor being operative to receive the light intensity data, the position data and the current generated from each panel data and send a signal to the motor to change a position of the solar panel incrementally and determine an optimal position of the solar platform.

In some embodiments, the solar platform may further comprise a forward sensor operative to senses a physical object at a height of the solar platform, the forward sensor in communication with a processor, the processor configured to send a signal to the motor to traverse the panels downward when the forward sensor senses an object at a height of solar panels that have been pivoted upward.

In some embodiments, the solar platform may further comprise a lock in communication with a transmitter, the lock having an all systems okay position indicative that the solar platform is operational and a system error position indicative that the solar platform is not operational, the all systems okay position and the system error position defining a system status, the lock configured to send a signal to the transmitter and the transmitter operative to send the signal to an application loaded on a smartphone for displaying the system status on the smartphone of the user.

Furthermore, a solar platform that is integrated with a structure of a vehicle is disclosed. The vehicle with an integrated structural solar platform may comprise a vehicle having an outer body which defines an outer surface, a base solar panel having a first plurality of solar cells defining an upper surface, the upper surface of the base solar panel and the outer surface of the outer body being coextensive to make up a portion of the body of the vehicle, the base solar panel having an active side with the first plurality of solar cells facing outwards, and a pivotable solar panel pivotably hinged and attached at a central area of the base solar panel and the pivotable solar panel configured to be pivotable up to 10 degrees relative to the base solar panel, the pivotable solar panel having an active side with a second plurality of solar cells facing away from the base solar panel.

In some embodiments, the base solar panel has a first width and the pivotable solar panel has a second width, the first width being greater than the second width.

In some embodiments, the integrated solar platform may further comprise additional solar panels pivotably hinged and attached to the central area of the base solar panel, and the additional solar panels having solar cells on both sides thereof.

In some embodiments, the pivotable solar panel is traversable using an automated motorized mechanism.

In some embodiments, the automated motorized mechanism is configured to be connected to a computing device of the vehicle.

In some embodiments, the automated motorized mechanism is configured to pivot the pivotable solar panels to a desired position while the vehicle is in motion.

In some embodiments, each of the additional pivotable solar panels have a second active side with a third plurality of solar cells facing the base solar panel.

In some embodiments, the additional pivotable solar panels are configured to be spaced apart from the base solar panel by at least 30 degrees.

In some embodiments, the additional solar panels and the base solar panel are configured to be equidistantly spaced apart from each other.

Additionally, a cap of a truck with an integrated solar platform is disclosed. The cap may have a cap body with side frames, a rear cap portion with a cap door, and a roof an outer surface with the integrated solar platform, the integrated solar platform having a base solar panel having a first plurality of solar cells defining an upper surface, the upper surface of the base solar panel and the outer surface of the roof being coextensive to make up a portion of the roof of the cap body, the base solar panel having an active side with the first plurality of solar cells facing outwards away from an interior of the cap body, and a pivotable solar panel pivotably hinged and attached at a central area of the base solar panel and the pivotable solar panel configured to be pivotable up to 10 degrees relative to the base solar panel, the pivotable solar panel having an active side with a second plurality of solar cells facing away from the base solar panel.

In some embodiments, the base solar panel has a first width and the pivotable solar panel each has a second width, the first width being greater than the second width.

In some embodiments, the cape may further comprise additional solar panels pivotably hinged and attached to the central area of the base solar panel, and the additional solar panels having solar cells on both sides thereof.

Moreover, a solar panel tower is disclosed that may have a frame body extending upwards and having a front side, a back side, a right side, and a left side, a plurality of proximal solar panels including a first proximal solar panel having a first proximal solar surface and a second proximal solar panel having a second proximal solar surface, the first proximal solar panel pivotably connected to the front side of the frame body, the second proximal solar panel pivotably connected to the back side of the frame body, and a plurality of extending solar panels including a first extending solar panel having a first extending solar surface and a second extending solar panel having a second extending solar surface, the first extending solar panel pivotably connected and extending from the right side of the frame body, the second extending solar panel pivotably connected and extending from the left side of the frame body, wherein the first and second proximal solar panels are configured to incline upwards by up to 90-degrees to have the first and second proximal solar surfaces facing sunshine, wherein the first and second extending solar panels are configured to rotate by up to 180-degrees to have the first and second extending solar surfaces facing sunshine.

In some embodiments, the frame body extends upwards by at least 24 feet.

In some embodiments, the frame body is an electric transmission tower.

In some embodiments, the first and second extending solar panels automatically orient to face sunshine at an optimum angle for receiving maximum solar irradiation.

In some embodiments, the first extending solar panel is pivotably connected to the right side of the frame body by a first extension pole, and the second extending solar panel is pivotably connected to the left side of the frame body by a second extension pole. The solar panel tower of claim 5, wherein the first and second extension poles are directly connected to each other.

In some embodiments, a third extending solar panel is adjacent to the first extending solar panel, the third extending solar panel pivotably connected and extending from the right side of the frame body, and a fourth extending solar panel is adjacent to the second extending solar panel, the fourth extending solar panel pivotably connected and extending from the left side of the frame body.

Furthermore, a solar panel pillar is disclosed that may have a first pair of solar panels having a first solar panel and a second solar panel pivotably coupled together at a first lower vertex of the first pair of solar panels, the first solar panel having a first longitudinal side and a second longitudinal side that are horizontal and a first lateral side and a second lateral side that incline downward from the first longitudinal side to the second longitudinal side of the first solar panel, the second solar panel having a first longitudinal side and a second longitudinal side that are horizontal and a first lateral side and a second lateral side that incline downward from the first longitudinal side to the second longitudinal side of the second solar panel and towards the second longitudinal side of the first solar panel, the first lower vertex being defined by the second longitudinal side of the first solar panel being pivotably coupled with the second longitudinal side of the second solar panel, the first lower vertex being between a first angle defined by the first solar panel and the second solar panel inclining downwards towards each other, a second pair of solar panels having a third solar panel and a fourth solar panel pivotably coupled together at a second lower vertex of the second pair of solar panels, the third solar panel being pivotably coupled to the second solar panel of the first pair of solar panels to form a first upper vertex, the third solar panel having a first longitudinal side and a second longitudinal side that are horizontal and a first lateral side and a second lateral side that incline downward from the first longitudinal side to the second longitudinal side of the third solar panel, the first longitudinal side of the third solar panel being pivotably coupled to the first longitudinal side of the second solar panel of the first pair of solar panels to form the first upper vertex, the fourth solar panel having a first longitudinal side and a second longitudinal side that are horizontal and a first lateral side and a second lateral side that incline downward from the first longitudinal side to the second longitudinal side of the fourth solar panel and towards the second longitudinal side of the third solar panel, and the second lower vertex being defined by the second longitudinal side of the third solar panel being pivotably coupled with the second longitudinal side of the fourth solar panel, the second lower vertex being between a second angle defined by the third solar panel and the fourth solar panel inclining downwards towards each other, wherein the first angle defined by the first solar panel and the second solar panel and the second angle defined by the third solar panel and the fourth solar panel are adjustable to increase and decrease in value.

In some embodiments, the first angle and the second angle are configured to increase in value up to 180-degrees. In some embodiments, the first angle and the second angle are configured to decrease in value down to 0-degrees.

In some embodiments, the first and second pairs of solar panels are configured to be attached to a mounting pole. In some embodiments, the first and second pairs of solar panels are rotatable around the mounting pole. In some embodiments, the mounting pole is configured to rotate about an axis along a length of the mounting pole.

In some embodiments, the first and second pairs of solar panels are configured to be completely flattened.

Additionally, a solar panel pillar is disclosed that may have a mounting pole vertically attachable to a flat surface, a center solar panel column attached to the mounting pole and having a left side and a right side, the center solar panel also having a first plurality of solar panels on top of each other, a right-side solar panel column proximate to the right side of the center solar panel column, the right-side solar panel column having a second plurality of solar panels on top of each other and pivoting towards the mounting pole from the right side of the center solar panel column, and a left-side solar panel column proximate to the left side of the center solar panel column, the left-side solar panel column having a third plurality of solar panels on top of each other and pivoting towards the mounting pole from the left side of the center solar panel column, wherein the center solar panel column, the right-side solar panel column, and the left-side solar panel column from a semi-hexagon shape around the mounting pole.

In some embodiments, the center solar panel column has a first height measured from an upper edge of an upper solar panel of the first plurality of solar panels to a lower edge of a lower solar panel of the first plurality of solar panels. In some embodiments, the first height is between 30 to 80 feet long. In some embodiments, the right-side solar panel column has a second height equaling the first height and the left-side solar panel column has a third height equaling the first height.

In some embodiments, the center solar panel column has an additional plurality of solar panels adjacent to the first plurality of solar panels.

In some embodiments, the first, second, and third plurality of solar panels each have solar panels with horizontal longitudinal sides.

In some embodiments, there exists a first horizontal spacing between the center solar panel column and the right-side solar panel column and also a second horizontal spacing between the center solar panel column and the left solar panel column.

BRIEF DESCRIPTION OF THE DRAWINGS

These and other features and advantages of the various embodiments disclosed herein will be better understood with respect to the following description and drawings, in which like numbers refer to like parts throughout, and in which:

FIGS. 61A-C show different examples of solar panel pillars;

FIGS. 62A-C show different examples of solar panel pillars;

FIGS. 69A-E show an orientation adjustment mechanism that may be used with one or more examples of the solar pillars;

FIGS. 70A-E show the orientation adjustment mechanism used with another examples of solar pillar.

DETAILED DESCRIPTION

With reference to FIGS. 55A-D, a solar panel tower 6600 having a plurality of rotator solar panels 6602*a-b* and flipper solar panels 6605 is disclosed. The solar panel tower 6600 may have a frame body 6604 that extends upwards by more than dozens of feet and have solar panels on the outside of the frame body. Such solar panels on the frame body (i.e., flipper solar panels 6605) may pivot and rotate about an axis of rotations 6610*a*. As such, the flipper solar panels 6606 may rotate throughout the day to orientate their active solar surfaces at an optimum direction relative to the sun. The solar panel tower may also have solar panels extending from the frame body 6604 (i.e., rotator solar panels 6602*a-b*). Such extending solar panels may also pivot and rotate about another axis of rotation 6610. As such, the extending solar panels 6606 may rotate throughout the day to follow the direction that the sun moves for optimizing solar harvesting. In some examples, an electric transmission tower (see FIG. 55D) may be converted into the solar panel tower. Moreover, a solar panel pillar 7100 is also disclosed in FIGS. 56A-D that may have rotator solar panels 7102*a-b* and flipper solar panels 7106*a-b*. The solar panel pillar 7100 may be a smaller and compact version of the solar panel tower 6600 and have solar panels pivotably attached to a mounting pole 5601 instead of a frame body that extends upwards by dozens of feet. The mounting pole 5601 may also rotate about its center axis to orient the solar panels at optimum position relative to the sun throughout the year.

Figure 57:
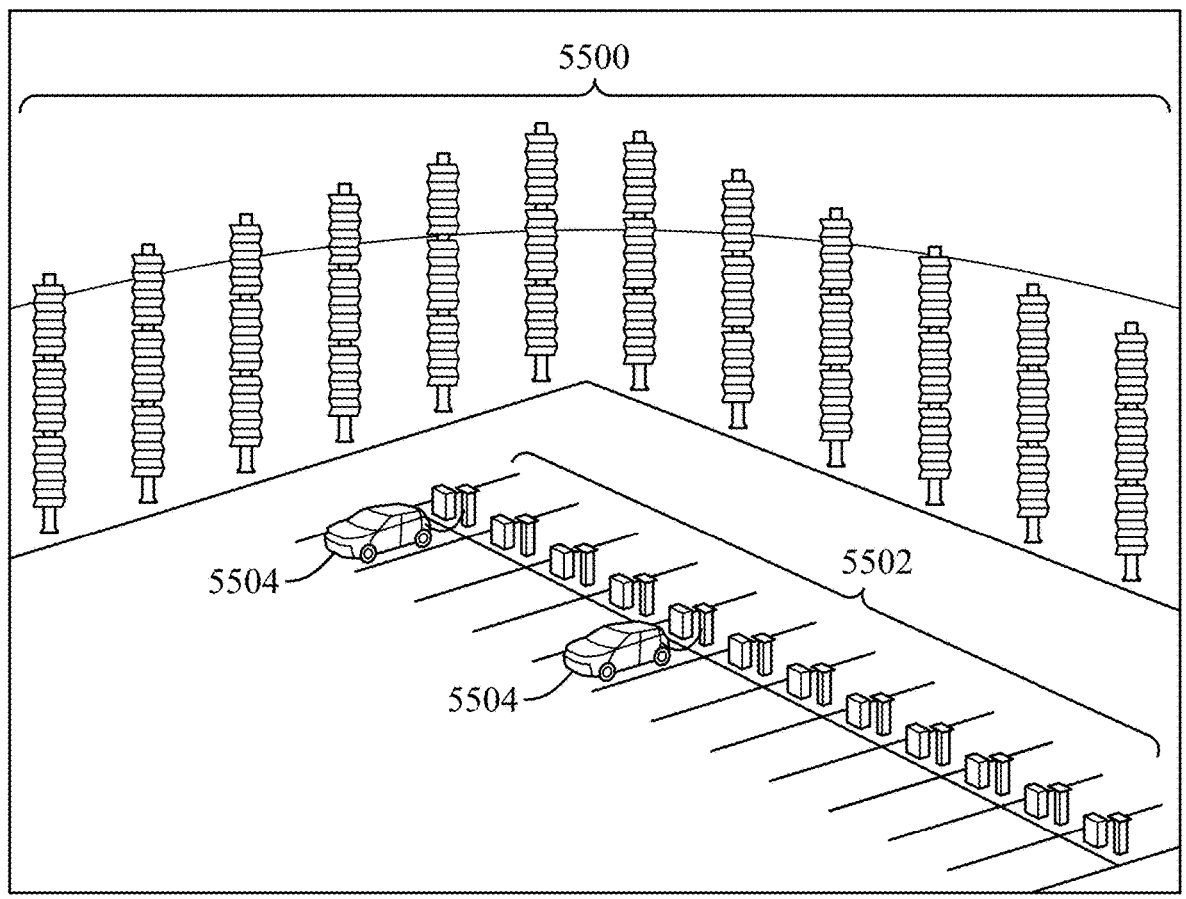
FIG. 57 shows an example of a system of solar panel pillars out in an open environment.
Figure 58B:
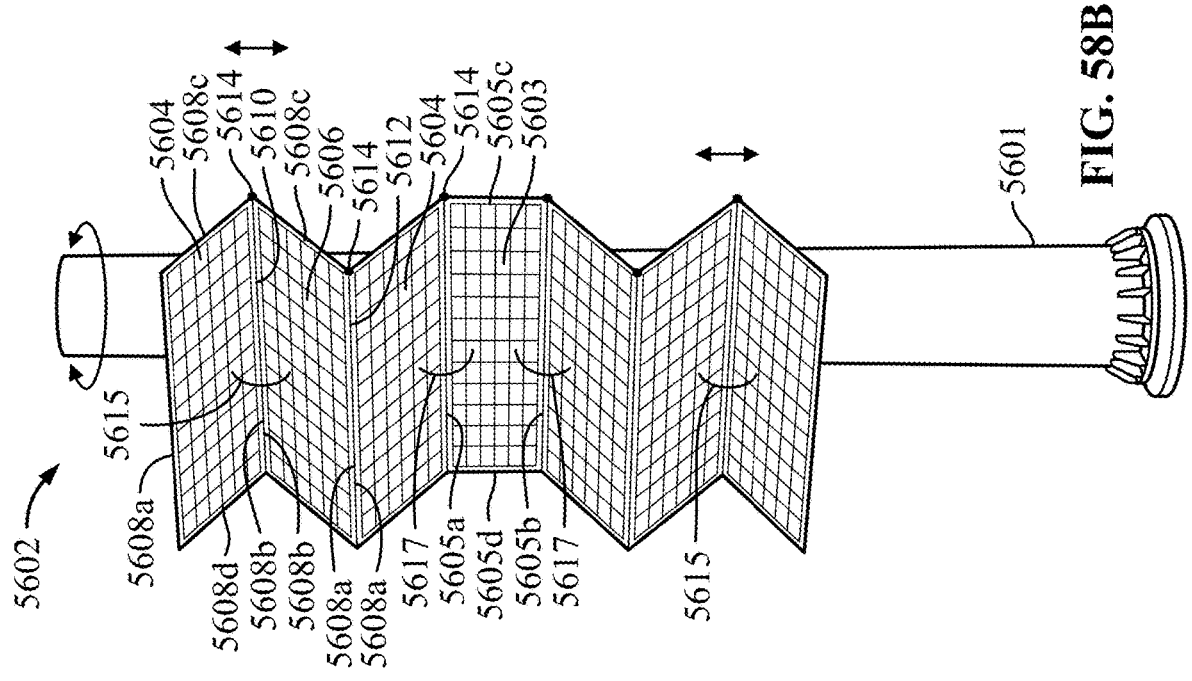
FIG. 58B shows another example of a solar pillar.
Figure 58A:
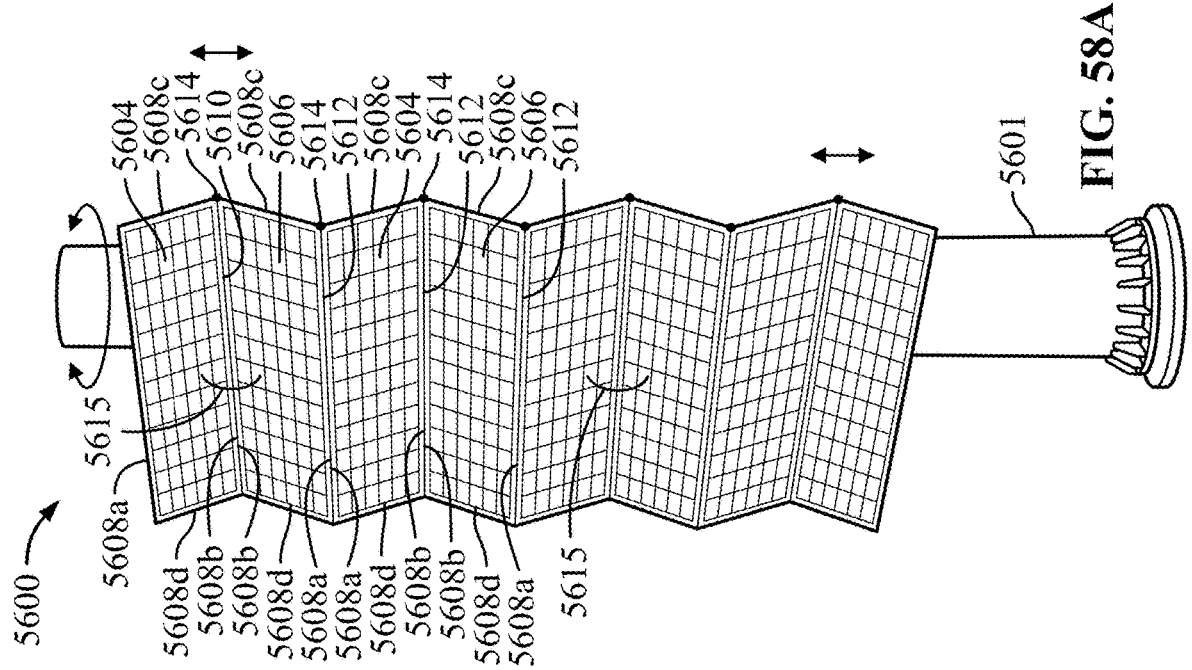
FIG. 58A shows one example of a solar pillar.
Figure 60A:
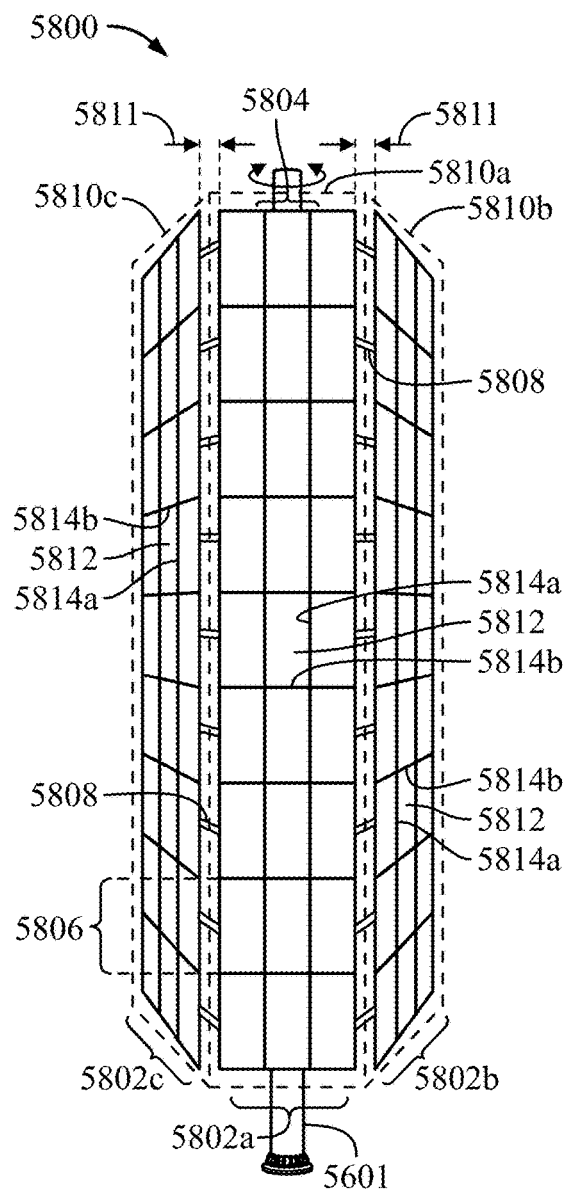
FIGS. 60A-B show another example of a solar panel pillar.
Figure 60B:
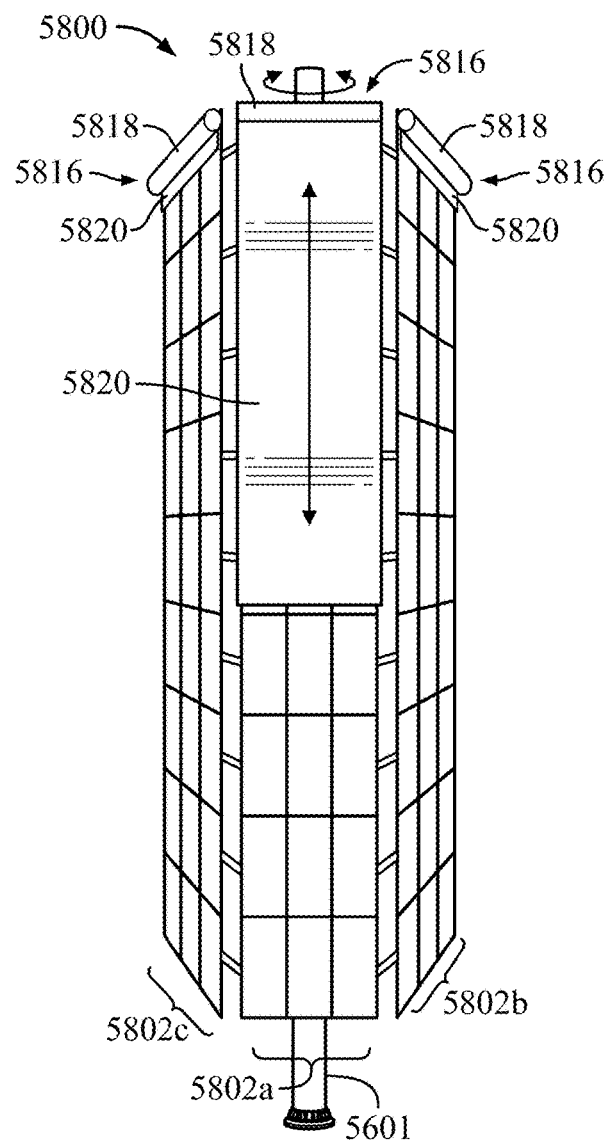
Figure 60C:
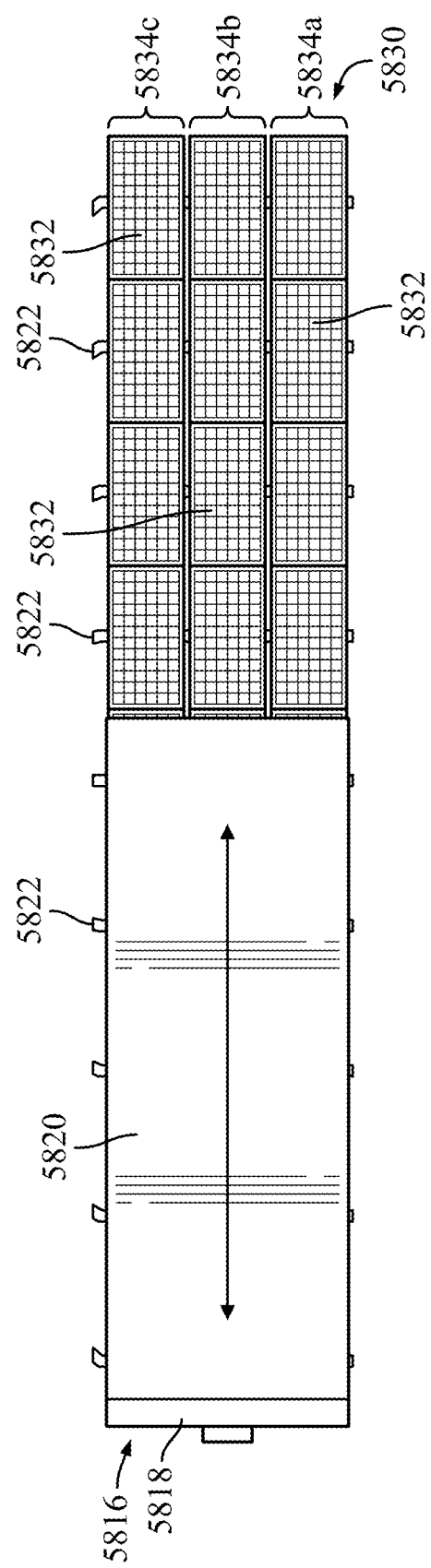
FIG. 60C shows a roller cover expanding over solar panels for protection.

Furthermore, solar panel pillars with active solar surfaces extending vertically upwards, rather than horizontally, are disclosed. As shown in FIG. 57, the system 5500 of solar panel pillars may utilize the vertical spacing that conventional solar panels do not use above them by extending upwards for more than a dozen feet upwards, in some examples. As shown in FIGS. 58A-B, the solar panel pillars 5600, 5602 may also have three-dimensional active solar surfaces in zigzag shapes to pack more solar energy harvesting potential per unit volume. The angle 5615 between the solar panels 5604, 5606 making up the zigzag shape may be changed, adjusted, and even flattened to have planar active solar surfaces. As shown in FIGS. 60A-C, the solar panel pillars may also have a plurality of solar panel columns that surround the pole 5601 that they are mounted thereto to increase solar energy harvesting potential.

Figure 1:
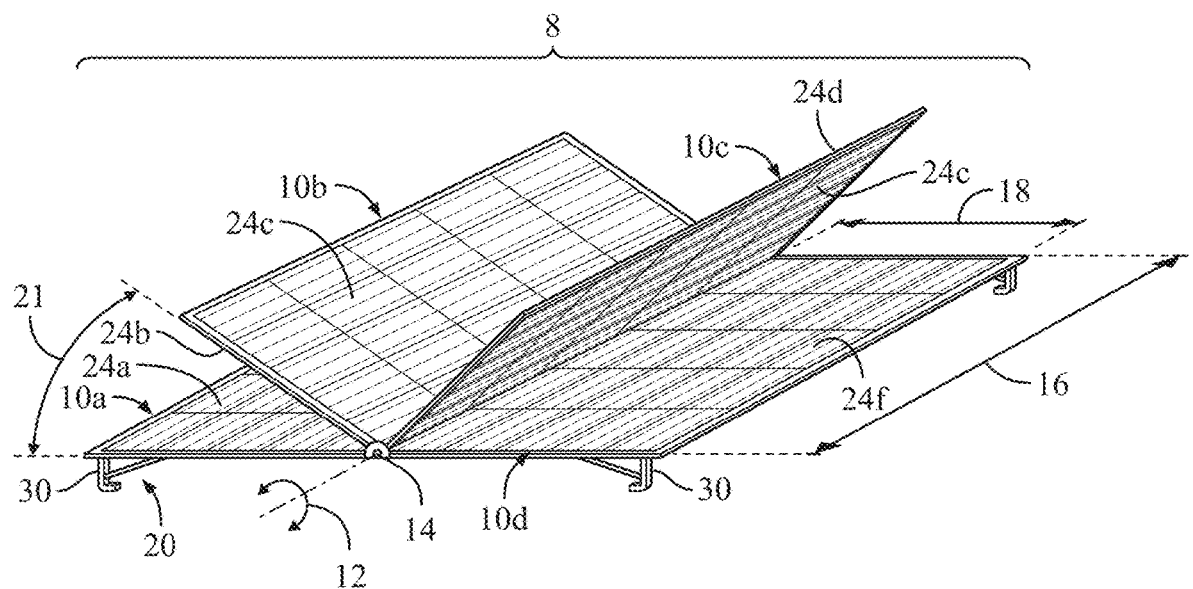
FIG. 1 shows a perspective view of a first embodiment of a solar platform in a deployed position.
Figure 2:
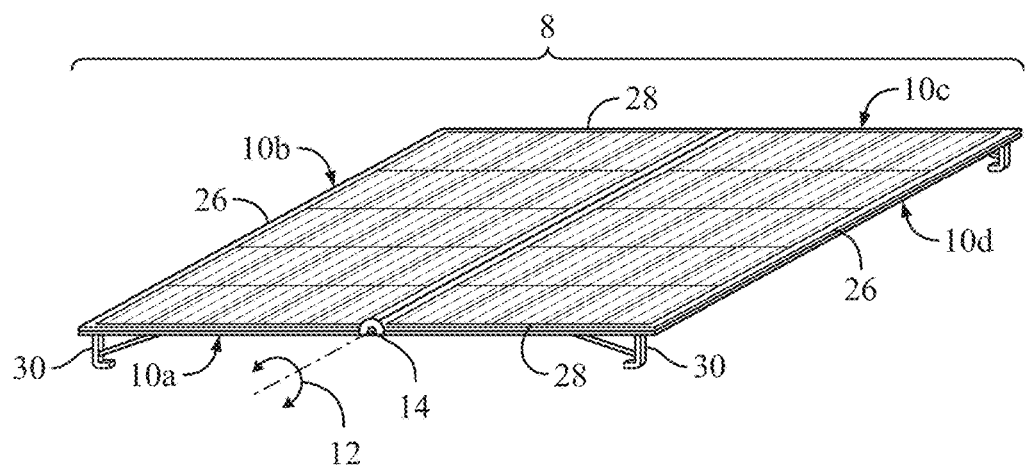
FIG. 2 shows a perspective view of the first embodiment of the solar platform in a folded position.
Figure 3:
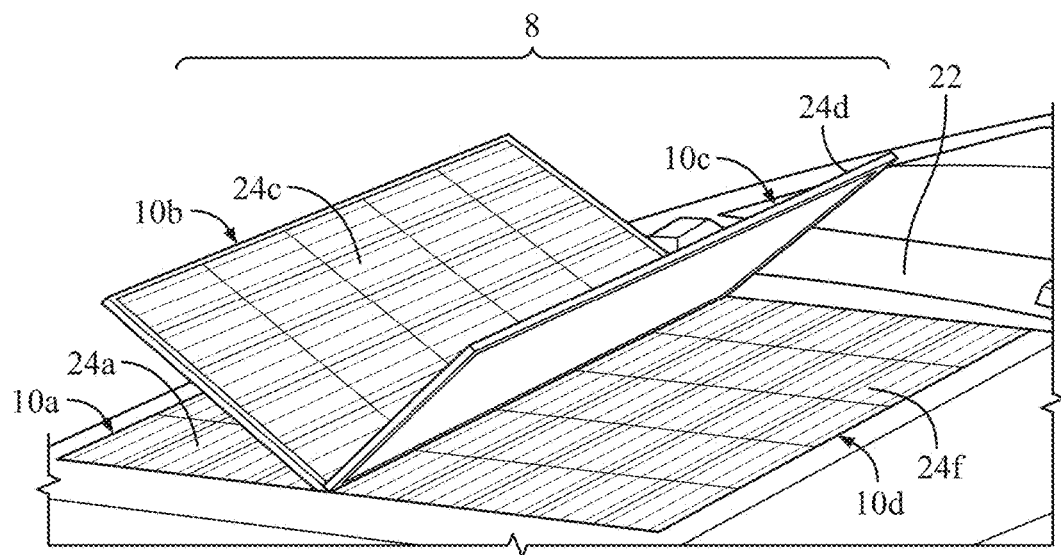
FIG. 3 shows a perspective view of the first embodiment of the solar platform having four active sides on an automobile and in a deployed position.
Figure 4:
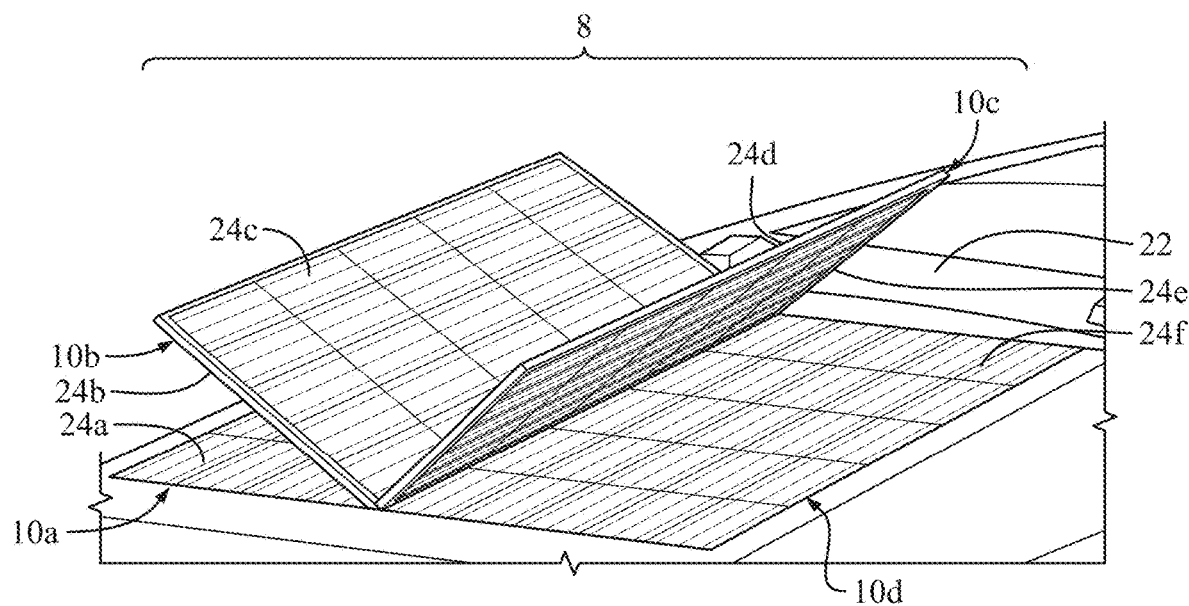
FIG. 4 shows a perspective view of the first embodiment of the solar platform having six active sides on an automobile and in a deployed position.
Figure 5:
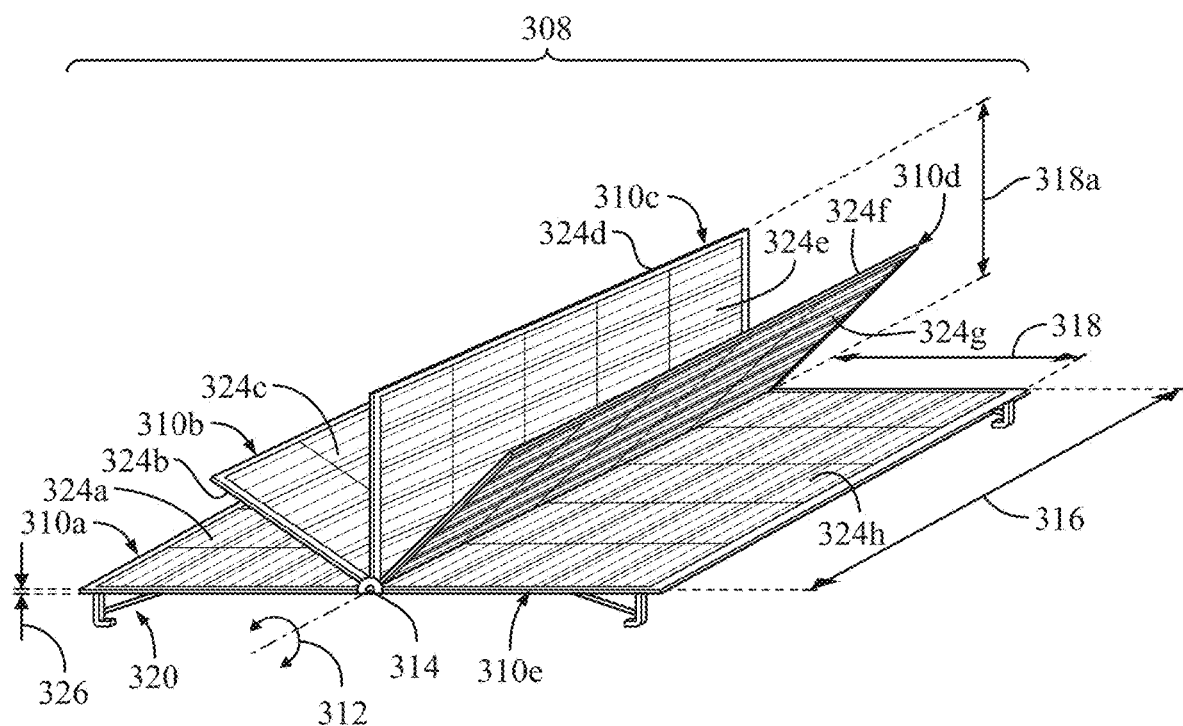
FIG. 5 shows a perspective view of a second embodiment of the solar platform in a deployed position.
Figure 6:
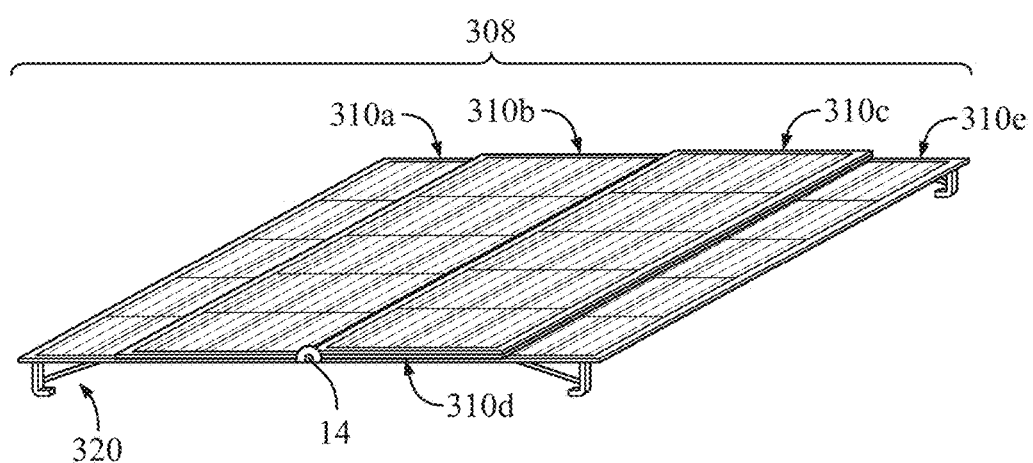
FIG. 6 shows a perspective view of the second embodiment of the solar platform in a folded position.
Figure 7:
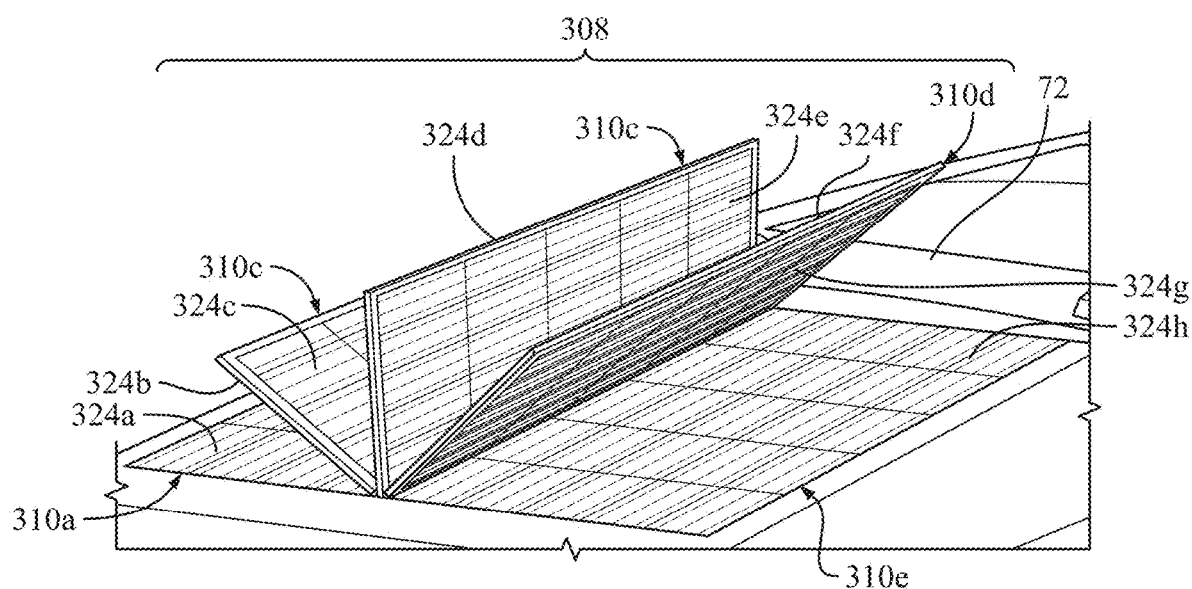
FIG. 7 shows a perspective view of the second embodiment of the solar platform on an automobile and in a deployed position.

A solar platform 8 having a plurality of solar panels is disclosed. As shown in FIG. 1, the solar platform 8 may be on a frame 20 and have two base solar panels 10*a,d* and two pivotable solar panels 10*b, c*. The base solar panels 10*a, d* may lay flat on the frame 20 and the pivotable solar panels 10*b, c* may be pivotable about a pivot axis 12 in the middle of the frame 20. As such, the pivotable solar panels 10*b, c* may change angular orientation relative to the base solar panels 10*a, d* and be positioned in optimum positions to receive solar radiation and energy. The pivotable solar panels 10*b, c* may be bifacial and have active sides 24*b-e* on a front and back surface of the panels. When not in use, the solar platform may be in a folded position, as shown in FIG. 2. As shown in FIGS. 3-4, the solar platform 8 may be attached or integrated with a vehicle top surface 22 instead of being attached to a frame 20. As shown in FIG. 5, the solar platform 308 may have a center solar panel 310*c* in addition to the pivotable solar panels 310*b, d*, and the center solar panel 310*c* may be bifacial. The width 318*a* of the pivotable and center solar panels 310*b-d* may be shorter than the width 318 of the base solar panels 310*a, e* such that portions of the base solar panels 310*a,e* are exposed when the solar platform 308 is in a folded position, as shown in FIG. 6. As shown in FIG. 7, the solar platform 308 having the additional center solar panel 310*c* may be attached or integrated with a vehicle top surface 72 instead of being attached to a frame 20. As shown in FIGS. 8-18, the different embodiments of the solar platform 8, 308 may be attached to different kinds of trucks 802 and may be part of caps 810 attached to the panels of a truck bed. As shown in FIGS. 19-24, an embodiment of a solar platform 1908 may be integrated with a tonneau cover 1911 of a truck 1902. As shown in FIGS. 25-28, the different embodiments and examples of solar platforms may be incorporated with recreational vehicles and also building structures, such as a house or a parking structures.

Figure 36:
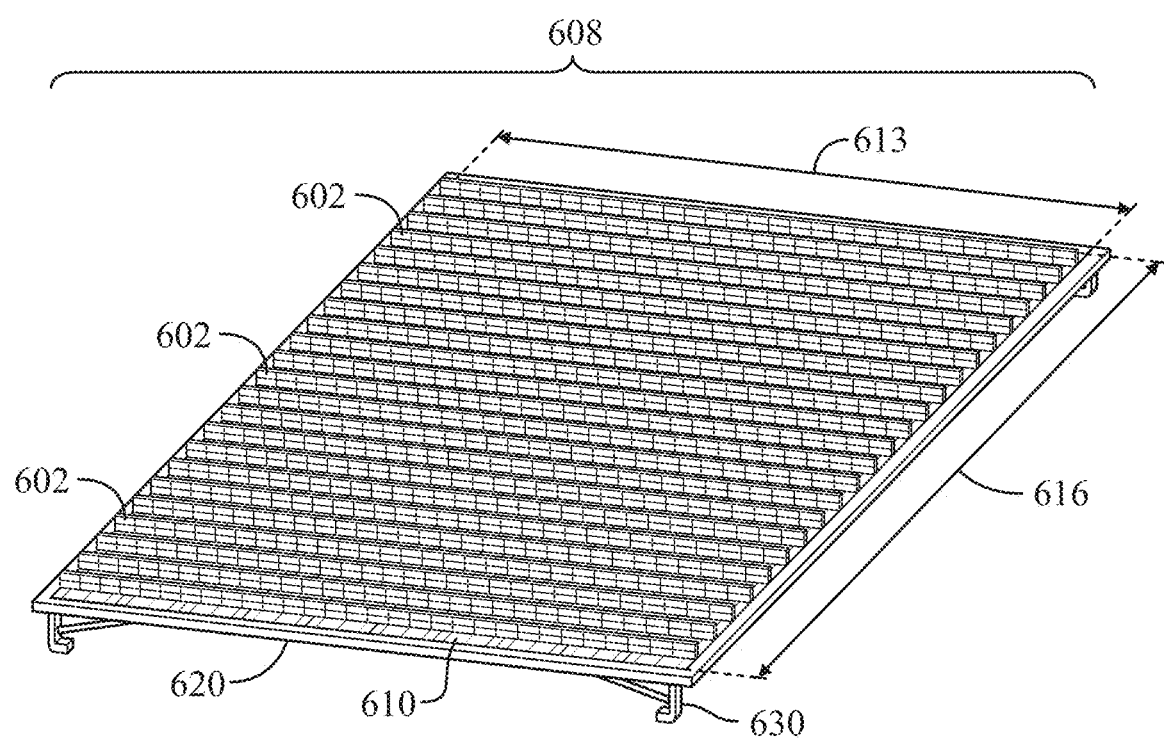
FIG. 36 shows a perspective view of a sixth embodiment of the solar platform.
Figure 37A:
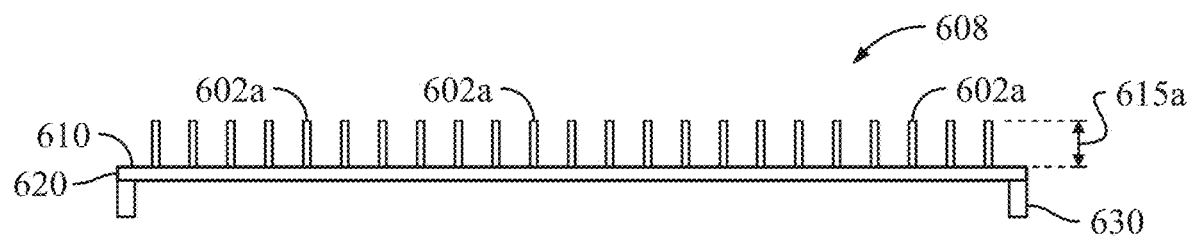
FIGS. 37A-C show side views of the sixth embodiment of the solar platform with the riser solar panels having different heights.
Figure 37B:
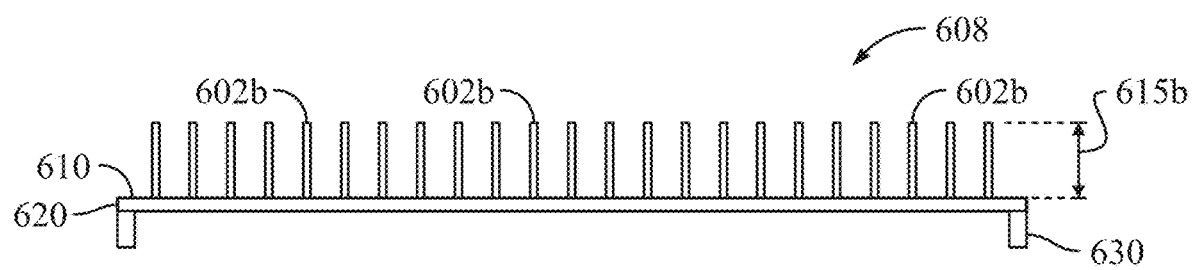
Figure 37C:
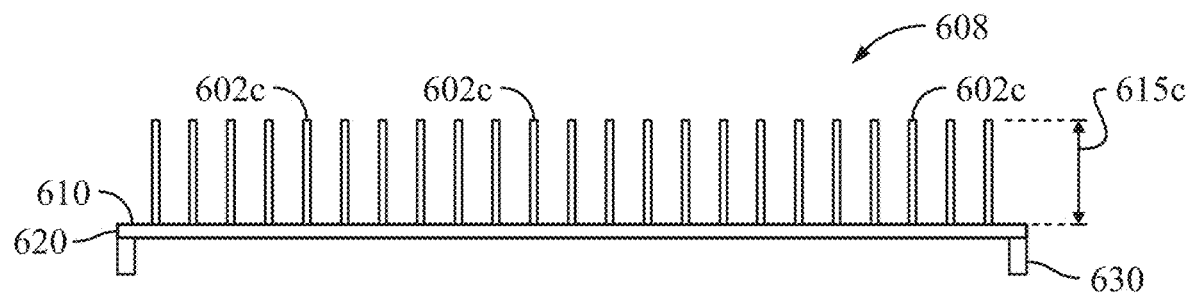
Figure 37D:
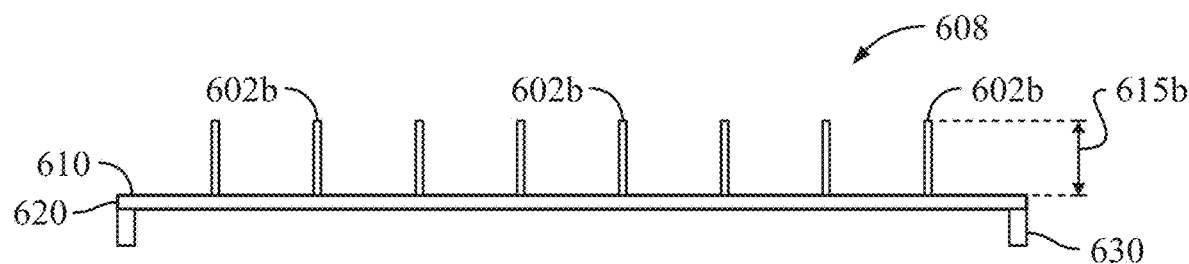
FIGS. 37D-E show side views of the sixth embodiment of the solar platform with the riser solar panels spaced apart with their heights taken into consideration.
Figure 37E:
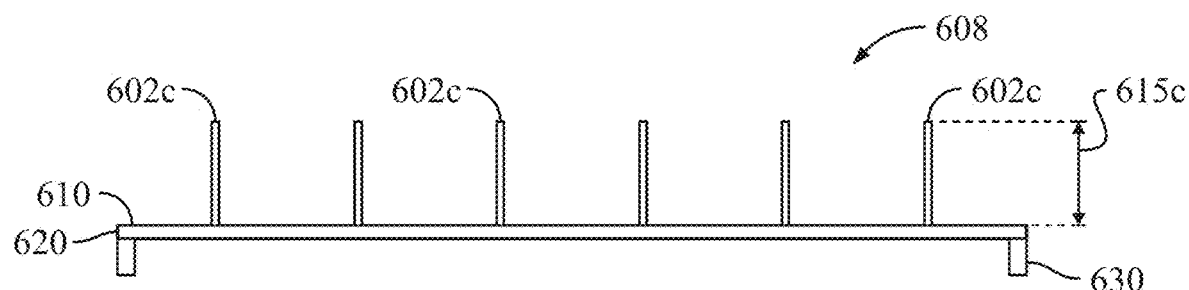
Figure 37F:
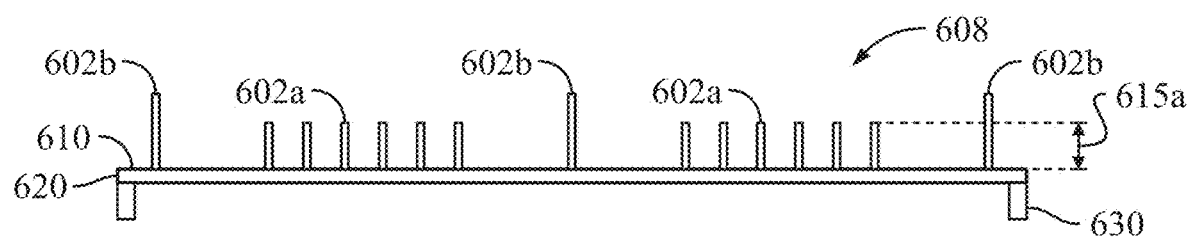
FIG. 37F shows a side view of the sixth embodiment of the solar platform utilizing riser solar panels with different heights.
Figure 38A:
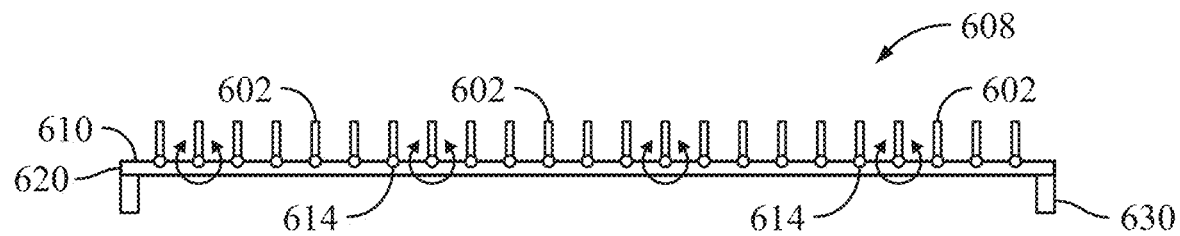
FIGS. 38A-C show side views of the sixth embodiment of the solar platform with the riser solar panels being pivotable.
Figure 38B:
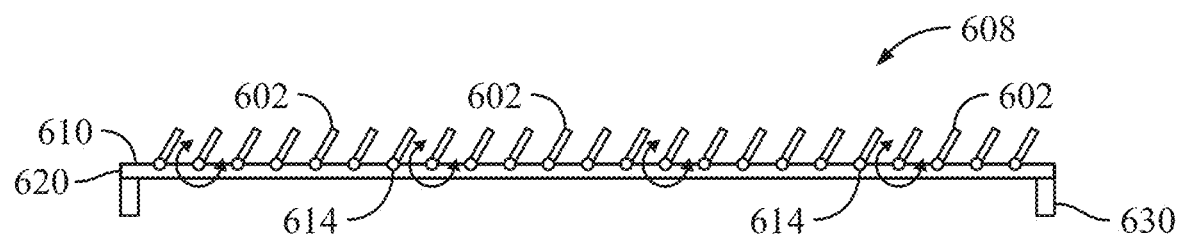
Figure 38C:
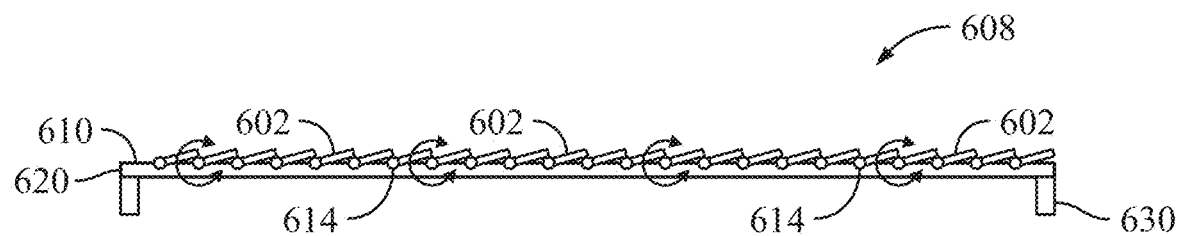
Figure 39A:
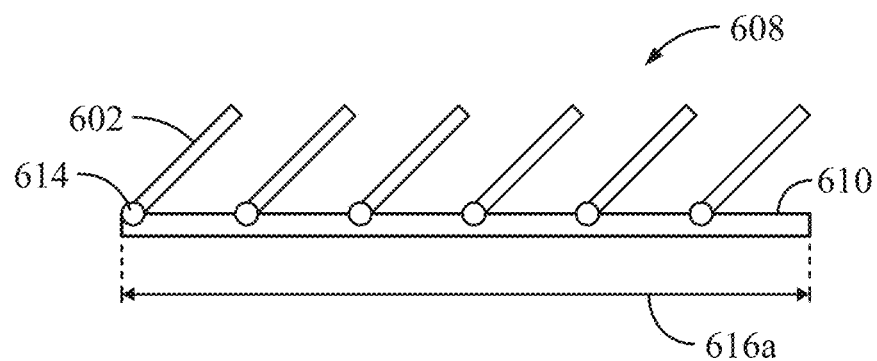
FIGS. 39A-B show a miniature version of the sixth embodiment of the solar platform.
Figure 39B:
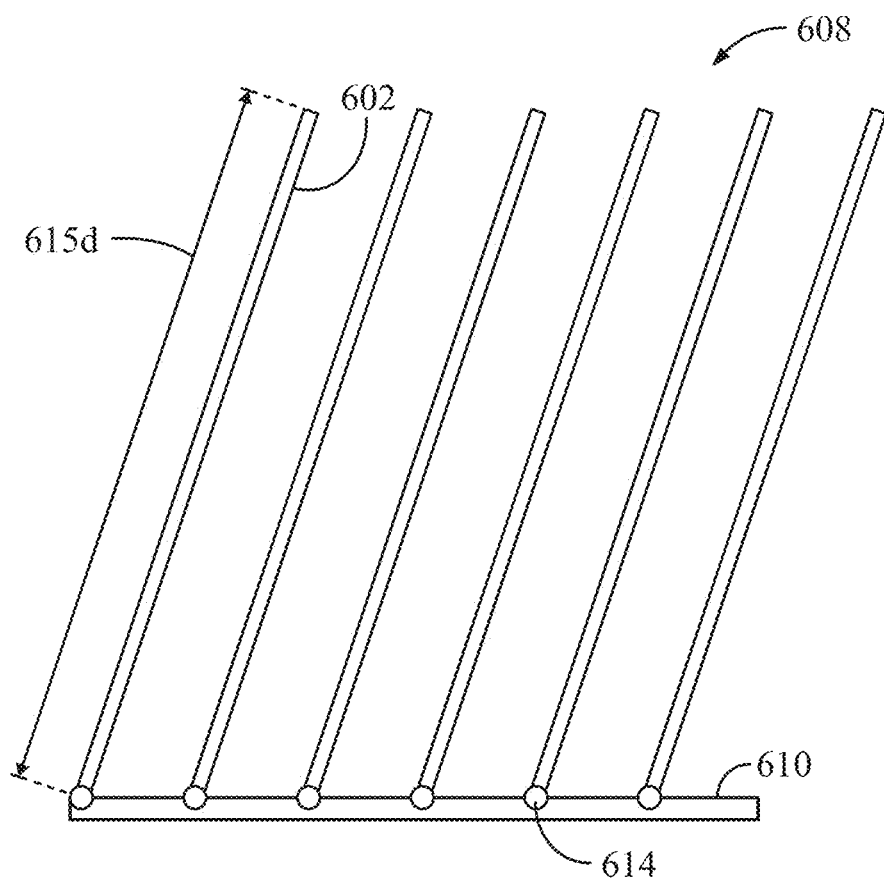

Additionally, a sixth embodiment of a solar platform 608 having a plurality of riser solar panels 602 is shown in FIG. 36. The sixth embodiment of the solar platform 608 may have a base solar panel 610 that has a plurality of riser solar panels 602 projecting upwards from the base solar panel 610 in a 90-degrees direction. As shown in FIGS. 37A-C, the riser solar panels 602*a-c* may come in different heights 615*a-c*. As shown in FIGS. 37D-E the riser solar panels 602*b-c* may be spaced apart from each other with their height 615*b-c* taken into consideration. As shown in FIG. 37F, riser solar panels 602*a-b* having different heights may be used in combination on the solar platform 608. As shown in FIGS. 38A-C, the riser solar panels 602 of the solar platform 608 may be pivotable with respect to the base solar panel 610 about a rotation axis extending across the base solar panel 610. FIGS. 39A-B show a miniature version of the solar platform 608 having a small length 616*a*. FIGS. 40-44 show the solar platform 608 attached and integrated with different vehicle components and building structures. Furthermore, FIG. 45 shows a new embodiment of a solar panel that has a plurality of embossed solar cell beams 702 that are each shaped as a triangular prism. As shown in FIG. 45, the top of the triangular prism structure of each embossed solar cell beam 702 may have a flat lateral portion with an additional active solar surface. The three-dimensional structure of the embossed solar panel 708 helps harvest solar energy per cubic meter rather than the conventional per meter square. FIGS. 46A-B and 47A-B show other example of embossed solar panel 708. FIGS. 48-52 show an embodiment and different examples of a stacker solar platform 908. FIGS. 53-54 also show other examples of stacked rows 904 of stacker solar platform 908 and embossed 708 and debossed 701 solar platforms.

Any of the embodiments and examples of the solar platform disclosed herein may be incorporated with different types of electric, hybrid, or regular internal combustion engine vehicles. Such vehicles may include trucks, vans, minivans, SUVs, semitrucks, buses, recreational vehicles, motorhomes, trailers, station wagons, hatchbacks, crossovers, sedans, coupes, compact automobiles, and other types of vehicles and automobiles. The solar platforms described herein may also be incorporated with buildings, such as parking structures, homes, office buildings, stadiums, and other types of building structures. The solar platforms described herein may also simply be on a frame and placed on the ground. Specifically with the incorporation of the solar platform with the vehicle, the solar platform may be attached or integrated with the roof of a vehicle or the top of a cap (e.g., a camper shell) or the tonneau cover of a truck, to name a few examples. The solar platform may be connected to the electrical components and a battery of the vehicle. For example, the solar platform may be used to charge the battery of an electric vehicle, a deep cycle battery, or charge and power other electronic devices. The solar platform may also be connected to a computing system of the vehicle to receive commands to deploy, fold, and operate some or all of the solar panels using an automated motorized mechanism. Alternatively, solar platform may have its own computing system that operates the solar panels.

Since the solar platforms described herein have pivotable solar panels stacked in the same region as the base solar panels, and some of the solar panels may be bifacial, the energy conversion density per unit area may increase. This may be because there are multiple solar panels occupying the same spatial area when compared to an ordinary flat solar panel. The clustering of multiple solar panels at different angles in the same spatial area may help the production of electric energy from solar energy by the solar platform. The pivotable solar panels may also be pivoted in such spatial area to receive sunlight at incident solar radiation angle that may change at different times of day.

By way of example and not limitation, the solar panels described herein may be solar photovoltaic panels, where each solar panel may have a plurality of solar cells ranging between 20 to 120 solar cells. By way of example and not limitation, the solar panels described herein may be monocrystalline, polycrystalline, or thin-film solar panels. By way of example and not limitation, the base solar panels 10*a,d* shown in FIG. 1, for example, could be monocrystalline or polycrystalline and the pivotable solar panels 10*b,c* may be thin-film solar panels. However, any other combination of the type of solar panels may be used with the solar platform, or all of the solar panels may be the same type. The solar panels of the solar platform may be monofacial, having one active side, or bifacial, having two active sides. The solar panels of the solar platform may also be transparent solar panels, either fully transparent or semi-transparent. By way of example and not limitation, each solar panel may generate between 0.1 to 0.5 kWh energy depending on the location, the weather, the time of day and year, and the type of solar panel. Alternatively, each solar platform may supply from 1 kilowatt to 12 kilowatts depending on the location, the weather, the time of day and year, and the type and number of solar panels.

Referring specifically now to FIGS. 1-2, a perspective view of a first embodiment of a solar platform 8 in a deployed and folded positions is shown. By way of example and not limitation, the solar platform 8 may have four solar panels 10*a-d* on a frame 20, which some or all of the panels may be rotatable about a pivot axis 12 running along the center of the frame 20. As shown in FIG. 1, the pivotable solar panels 10*b, c* may be angularly separated from the base solar panels 10*a, d* in the deployed position. As shown in FIG. 2, the pivotable solar panels 10*b, c* may be stacked on top of the base solar panels 10*a, d* in the folded position.

By way of example and not limitation, the solar panels 10*a-d* may be mounted on the frame 20. As shown in FIG. 2, the frame 20 may be rectangular and have two longitudinal portions 26 and two lateral portions 28 defining the frame body. In the middle of the lateral portions 28, there may be a hinge mechanism 14 that allows the solar panels to pivot about a pivot axis 12 along the lateral portions 28. By way of example and not limitation, the hinge mechanism 14 may be one or more hinges. By way of example and not limitation, the hinge mechanism 14 may or may not be part of the frame 20. As a part of the frame 20, the hinge mechanism may run along the panel length 16 (see FIG. 1) of the center of the frame 20. Alternatively, the hinge mechanism 14 may not be part of the frame 20 and may only bind the solar panels 10*a-d* together. Consequently, the pivot axis 12 may run along the panel length 16 of the frame 20 at the center of the lateral portions 28 (see FIG. 2). By way of example and not limitation, each of the lateral portion 28 may be made of two parts that are joined together at the hinge mechanism 14. By way of example and not limitation, there may exist a third longitudinal portion in the middle of the lateral portions 28 where the hinge mechanism 14 would be located. By way of example and not limitation, the base solar panels 10*a, d* may be fixedly mounted to the frame on all sides of the panels. By way of example and not limitation, the pivotable solar panels 10*b, c* may be pivotably mounted to the frame 20 at the hinge mechanism 14. By way of example and not limitation, the hinge mechanism 14 may fix the pivotable solar panels 10*b, c* in place after they are pivoted to a preferred orientation. It is also contemplated the base panels 10a, d may be pivotably mounted to the frame 20 rather than being fixedly mounted. The frame 20 may be set up on the ground, a building structure (e.g., home, office building, or parking structure), or be attached to a surface of a vehicle, such as the roof or a top surface of a cap of a vehicle. The frame 20 may have a plurality of mounting mechanisms 30, which may be legs to stand on a structure or be an interlocking device to be attached to a top surface of a vehicle, such as the roof of a vehicle or the top surface of the cap.

When the solar platform 8 is in a deployed position, the base solar panels 10a, d may lay flat on the frame 20 while pivotable solar panels 10b, c may be elevated at an incline from the base solar panels 10a, d, and the frame 20, about the pivot axis 12. The active sides 24a, f of the base solar panels 10a, d having the photovoltaic solar cells may be facing upwards in the direction of the pivotable solar panels 10b, c. By way of example and not limitation, the base solar panels 10a, d may be one solar panel, instead of two, and the pivotable solar panels 10b, c may be hinged on top of the one base solar panel.

The pivotable solar panels 10b, c may each be pivotable up to 180 degrees at the pivot axis 12 and relative to lateral portions 28 of the frame 20 (see FIG. 2) and the base solar panels 10a, d. By way of example and not limitation, The pivotable solar panels 10b,c may each be pivoted by 15, 30, 45, or 60 degrees about the pivot axis 12 and relative to the base solar panels 10a, d. By way of example and not limitation, the pivotable solar panels 10b, c may be inclined such that they form a V-shape relative to each other. By way of example and not limitation, the angular displacement 21 of the first pivotable solar panel 10b from the first base solar panel 10a and the second pivotable solar panel 10c from second base solar panel 10d may be between 10 to 90 degrees. Preferably, the angular displacement 21 therebetween may be 45 degrees. As shown in FIG. 1, the angular displacement 21 between each pair of base and pivotable solar panels 10a-d may be the same, but it is also contemplated that each pair of panels to have different angular displacement 21 from each other. For example the first pivotable solar panel 10a may be separated from the first base solar panel 10b by 30 to 45 degrees while the second pivotable solar panel 10c may be separated from the second base solar panel 10d by 45 to 60 degrees. It is contemplated that the base solar panels 10a, d may be pivotable the same as the pivotable solar panels 10b, c.

It is also contemplated the base panels 10a, d may be pivotably mounted to the frame 20 rather than being fixedly mounted. By way of example and not limitation, the base solar panels 10a, d may also pivot about the pivot axis 12 by the hinge mechanism 14. Each base solar panel 10a, d may be configured to pivot relative to the frame 20, which is orientated horizontally, about the pivot axis 12 between 10 to 180 degrees. As such, all of the solar panels 10a-d may be sandwiched together and be folded on top of each other.

Each of the solar panels 10a-d may have one or more photovoltaic active sides 24a-f for receiving/capturing solar energy and converting such energy to electricity. More particularly, the solar panels may each have active sides 24a, c, d, f on a front side of the panels. By way of example and not limitation, the first embodiment of the solar platform 8 may have four active sides 24a, c, d, f on the front side of the four solar panels 10a-d, the active sides having a plurality of photovoltaic solar cells. In another example, the pivotable solar panels 10b, c that are designed to be at an incline may be bifacial solar panels and capture solar energy on both the front and back side of the panels. The pivotable solar panels 10b, c may have such function by being a manufactured bifacial solar panel or by combining two one-sided solar panels as one to receive light from the front and back of the pivotable solar panels 10b, c. Consequently, the solar platform 8 may have six active sides 24a-f, with the additional active sides being on the back sides of the pivotable solar panels 10b, c. In another example, the pivotable solar panels 10b, c may be transparent solar panels, either fully transparent or semi-transparent solar panels.

The pivoting of the pivotable solar panels 10b, c in the preferred incline position may be done manually or automatically. By way of example and not limitation, a user may manually actuate the hinge mechanism 14 and orientate the pivotable solar panels 10b,c in desired positions. By way of example and not limitation, the hinge mechanism 14 may be a motorized electromechanical mechanism and be connected to a computing system that adjusts and orientates the solar panels based on different factor inputs. By way of example and not limitation, the motorized electromechanical mechanism and the computing system may be remote controlled. By way of example and not limitation, the computing system may be part of the solar platform or part of the vehicle, if mounted or integrated with a vehicle. By way of example and not limitation, the computing system may actuate the hinge mechanism 14 to orientate one or more of the solar panels 10a-d based on the time of year (i.e., the current month or season), the time of the day, the real-time weather pattern, and the location of the solar platform 8 so that the solar panels 10a-d may be positioned at optimum light receiving orientations. By way of example and not limitation, the computing system may consequently actuate the hinge mechanism 14 to orientate the solar panels 10a-d, particularly the pivotable solar panels 10b, c, at different angles throughout the day such that the solar panels are at optimum angles relative to the radiation of the sun. By way of example and not limitation, the pivotable solar panels 10b, c may each be orientated at a first angle having a first angular displacement 21 relative to the base solar panels 10a, d in the morning, and the pivotable solar panels 10b, c may each be orientated to a second angle having a second angular displacement relative to the base solar panels 10a, d in the afternoon, the first angular displacement being different than the second angular displacement.

Since the solar platform 8 has pivotable solar panels 10b, c stacked in the same region as the base solar panels 10a, d, and the pivotable solar panels 10b, c may be bifacial or transparent, the energy conversion density per unit area may increase. This may be because there are multiple solar panels occupying the same spatial area when compared to an ordinary flat solar panel. The clustering of multiple solar panels at different angles in the same spatial area may help the production of electric energy from solar energy by the solar platform 8. The pivotable solar panels 10b, c may also be pivoted in such spatial area to receive sunlight at incident solar radiation angle that may change at different times of day.

As shown in FIG. 2, the first pivotable solar panel 10b may be folded on top of first base solar panel 10a and the second pivotable solar panel 10c may be folded on top of the second base solar panel 10d to create the folded configuration. In the folded position, solar panels 10a-d may lie flat on each other and onto the frame 20. As shown in FIG. 2, the pivotable solar panels 10b, c may fully cover the base solar panels 10a, d in the folded position. This may be because the four solar panels 10a-d may have the same panel length 16 and panel width 18. By way of example and not limitation, the panel length 16 may be between two to nine feet and the panel width may be between one to seven feet. By way of example and not limitation, each solar panel 10*a-d* of the solar platform 8 may have sizes from 4×4 feet to 6×6 feet. The solar panels 10*a-d* may also have different dimensions, as described elsewhere herein.

The folding may be done using the hinge mechanism 14 to rotate pivotable solar panels 10*b, c* about the pivot axis 12. By way of example and not limitation, the folding may be manual or automated using a motorized electromechanical mechanism, as described elsewhere herein. If the hinge mechanism 14 is motorized, such mechanism may be connected to a computing system to receive input to fold the solar panels and also be remote controlled. It is also contemplated that all the solar panels 10*a-d* may be folded on top of each other about the pivot axis 12 such that the pivotable solar panels 10*b-c* are sandwiched between the base solar panels 10*a, d*. The frame 20 may also be folded in half about the pivot axis 12.

Referring now FIGS. 3-4, the first embodiment of the solar platform 8 on an automobile and in a deployed position are shown. FIG. 3 shows a solar platform 8 on the automobile with four active sides 24*a, c, d, f*. The solar platform 8 of the first embodiment (shown in FIGS. 1-2) may be attached or integrated as a part of a top surface 22 of an automobile instead of being mounted to the frame 20, shown in FIG. 1. The solar platform 8 may be the same as what has been described with respect to FIGS. 1-2. The solar platform 8 may be attached or integrated with a roof of an automobile, a cap (e.g., a camper shell), tonneau cover, and other vehicle components. By way of example and not limitation, the base and pivotable solar panels 10*a-d* may each have one active side 24*a, c, d, f* for receiving solar energy on the top surface of each panel facing upwards and outwards. As such, the solar platform 8 may have a total of four active sides. By way of example and not limitation, the solar platform 8 attached or integrated with the top surface 22 of an automobile may be deployed in the active position or folded while the vehicle is at a stop or in motion. The deploying of the solar panels 10*a-d* may be based on logic computed by a computing system to provide optimum orientation of the panels, as described elsewhere herein. By way of example and not limitation, the computing system may be part of the vehicle or may be part of the solar platform 8.

Referring specifically now to FIG. 4, the solar platform 8 attached or integrated with the vehicle top surface 22 is shown as having six active sides 24*a-f*. By way of example and not limitation, the solar platform 8 shown in FIG. 4 may be identical to FIG. 3, except that the pivotable solar panels 10*b-c* may be bifacial and have active sides 24*b, c* and 24 *d, e* on both sides of such panels, or the pivotable solar panels 10*b-c* may be transparent solar panels as described elsewhere herein. As such, the example shown in FIG. 4 may have six active sides 24*a-f* for receiving solar energy. The solar panels 10*a-d* may be deployed in the desired positions (i.e., angular positions), as described elsewhere herein. Such deploying and folding may be done while the vehicle is in motion or at a stop, as described elsewhere herein.

The solar platforms 8 described with reference to FIGS. 3-4 may be incorporated with different types of electric, hybrid, or regular internal combustion engine vehicles. Such vehicles may include trucks, vans, minivans, SUVs, semitrucks, buses, recreational vehicles, motorhomes, trailers, station wagons, hatchbacks, crossovers, sedans, coupes, compact automobiles, and other types of vehicles and automobiles. The solar platforms described with reference to FIGS. 3-4 may also be incorporated with buildings, such as parking structures, homes, office buildings, stadiums, and other types of building structures.

Referring now to FIGS. 5-6 perspective views of a second embodiment of the solar platform 308 in a deployed and folded position are shown. In the second embodiment, the solar platform 8 may have a center solar panel 310*c* in addition to the base solar panels 310*a, e* and the pivotable solar panels 310*b, d*, which may be traversed or pivoted to a vertical position in the deployed position. In the second embodiment of the solar platform 308, multiple solar panels 310*a-e* may be stacked upon each other, but the pivotable solar panels 310*b, d* and the center solar panel 310*c* may have different structural dimensions than the base solar panels 310*a, c*. As such, portions of the base solar panels 310*a, e* may be exposed in the folded position and as shown in FIG. 6. In an alternate embodiment, the pivotable solar panels 310*b, d* may be omitted and only the center solar panel 310*c* along the base solar panels 310*a, e* may exist, and the center solar panel 310*c* may be pivotable by the hinge mechanism 314 about the pivot axis 312. In the same alternate embodiment, the center solar panel 310*c* may be positioned in an orthogonal position so as to form an L shape with the base solar panels 310*a, c*. The frames 320 and hinge mechanism 314, shown in FIGS. 5-6, may be similar to what has been described elsewhere herein.

As shown in FIG. 5, the solar panels 310*b-d* may be traversed to a deployed position. The pivotable and base solar panels 310*a, b, d, e* may have the same features and orientations as explained elsewhere herein. By way of example and not limitation, the pivotable and center solar panels 310*b, c, d* may pivot about pivot axis 312 via the hinge mechanism 314. By way of example and not limitation, the center solar panel 310*c* may have a longitudinal side attached to the hinge mechanism 314 and be pivotable up to 180 degrees about the pivot axis 312 relative the lateral frame portions. The center solar panel 310*c* may be pivoted to an optimum orientation to receive solar radiation and energy. In the deployed position, the pivotable and center solar panels 310*b-d* may be positioned so as to be angularly equidistant from each other and the base solar panels 310*a, c*. In this regard, and by way of example and not limitation, the angular displacement of first pivotable solar panel 310*b* from first base solar panel 310*a*, the center solar panel 310*c* from first pivotable solar panel 310*b*, the second pivotable solar panel 310*d* from the center solar panel 310*c*, and the second base solar panel 310*e* from the second pivotable solar panel 310*d* may be 45 degrees. Alternatively, the angular distance between each solar panel 310*a-e* may not need to be equidistant. It is also contemplated that the base solar panels 310*a, e* may be pivotable by the hinge mechanism 314 about the pivot axis 312, each being configured to rotate between 10 to 180 degrees relative to the horizontal frame 320. The deploying, folding, and operation of the solar panels 310*a-e* may be automated or be manual, as explained elsewhere herein. The automated deploying, folding, and operation of the solar panels 310*a-e* may be done by a computing system and be remote controlled, as explained elsewhere herein.

The base solar panels 310*a, e* may have one active side 324*a, h* and the pivotable solar panels 310*b, d* may have one or two active sides 324*b, c, f, g* or be transparent, as explained elsewhere herein. Similarly, the center solar panel 310*c* may have one or two active sides 324*d, e* by being a monofacial or a bifacial solar panel that may capture solar energy on both the front and back side of the center panel. By way of example and not limitation, the center solar panel 310c may have the two active sides 324d, e by using a manufactured bifacial solar panel or combining two one-sided solar panels as one to receive light from the front and back of the center panel. In another example, the center solar panel 310c may be a transparent solar panel, either fully transparent or semi-transparent.

By way of example and not limitation, the two base solar panels 310a, e may be of equal size in terms of panel length 316, panel width 318, and panel depth 326. By way of example and not limitation, the pivotable and center solar panels 310b, c, d may have the same length as the base solar panels 310a, c. By way of example and not limitation, the pivotable and center panels 310b, c, d may have a second panel width 318a that is shorter than the panel width 318 of the base solar panels 310a, c. By way of example and not limitation, the panel length 316 may be two to nine feet, the panel width 318 may be three to six feet, and the second panel width 318a may be two to four feet. By way of example and not limitation, the pivotable and center solar panels 310b, c, d may have a different panel length in substitution or in addition to different panel widths relative to the base solar panels 310a, c.

Since the solar platform 308 has pivotable and center solar panels 310b-d stacked in the same region as the base solar panels 310a, e, and some of the solar panels may be bifacial or transparent, the energy conversion density per unit area may increase. This may be because there are multiple solar panels occupying the same spatial area when compared to an ordinary flat solar panel. The clustering of multiple solar panels at different angles in the same spatial area may help the production of electric energy from solar energy by the solar platform 308. The pivotable and center solar panels 310b-d may also be pivoted in such spatial area to receive sunlight at incident solar radiation angle that may change at different times of day.

As shown in FIG. 6, the solar panels 310b-d may be traversed to a folded configuration. In the folded configuration, and by way of example and not limitation, the first pivotable solar panel 310b may be laid flat on the first base solar panel 310a. Also, the second pivotable solar panel 310d may be laid flat on the second base solar panel 310c. By way of example and not limitation, the center solar panel 310c may be pivoted and laid flat on either the first or second pivotable solar panel 310b, d. Since the pivotable and the center solar panels 310b-d may have second panel widths 318a shorter than the panel widths 318 of the base solar panels 310a, e, portions of the base solar panels 310a, e may be exposed in the folded position. Such exposed portions may be part of the active sides 324a, h (see FIG. 5) of the base solar panels 310a, c. By way of example and not limitation, all of the pivotable and center solar panels 310b-d may be stacked on top of one base solar panel 310a, c. All the solar panels 310a-e may be stacked on top of each other in the folded position, where the base solar panels 310a, e would be the top and bottom panels in the folded orientation.

Referring now to FIG. 7, the second embodiment of the solar platform 308 (shown in FIG. 5-6) may be attached or integrated as a part of a top surface 72 of an automobile instead of being mounted to the frame 20. By way of example and not limitation, the solar platform 308 may be attached or integrated with a roof of an automobile, a cap, tonneau cover, or other vehicle structural components. The structural features and functions of the solar platform 308 may be the same as what has been described with respect to FIGS. 5-6 and described elsewhere herein. By way of example and not limitation, the solar panels 310a-e may each have one active side 324a, c, e, f, h for receiving solar energy on the top surface of each panel. By way of example and not limitation, the pivotable and center solar panels 310b-d may each have one to two active sides 324b-g for receiving solar energy on the front and back surfaces of each panel. Consequently, the solar platform 308 may have a total of five to eight active sides 324a-h for receiving solar energy. By way of example and not limitation, the solar platform 308 attached or integrated with the top surface 72 of the automobile may be deployed in the active position or folded while the vehicle is at a stop or in motion. By way of exampled and not limitation, the deploying and folding of the solar platform 308 may be executed based on logic computed by a computing system to provide best optimum orientations of the solar panels 310a-e, as described elsewhere herein. By way of example and not limitation, the computing system may be integral with the automobile or be part of the solar platform 308.

The solar platform 308 described with reference to FIG. 7 may be incorporated with different types of electric, hybrid, or regular internal combustion engine vehicles. Such vehicles may include trucks, vans, minivans, SUVs, semitrucks, buses, recreational vehicles, motorhomes, trailers, station wagons, hatchbacks, crossovers, sedans, coupes, compact automobiles, and other types of vehicles and automobiles. The solar platforms described with reference to FIG. 7 may also be incorporated with buildings, such as parking structures, homes, office buildings, stadiums, and other types of building structures.

With reference to FIGS. 8-18, the solar platform 8, 308 may refer to any of the embodiments and examples of the solar platforms discussed elsewhere herein. Moreover, the various embodiments and examples of the solar platform 8, 308 have been illustrated in terms of a cap for a truck in FIGS. 8-18. However, the solar platform 8, 308 described with reference to FIGS. 8-18 may be incorporated with different types of electric, hybrid, or regular internal combustion engine vehicles. Such vehicles may include trucks, vans, minivans, SUVs, semitrucks, buses, recreational vehicles, motorhomes, trailers, station wagons, hatchbacks, crossovers, sedans, coupes, compact automobiles, and other types of vehicles and automobiles. The solar platforms described herein may also be incorporated with buildings, such as parking structures, homes, office buildings, stadiums, and other types of building structures. More particularly, the various embodiments and examples of the solar platform 8, 308 may be integrated into a roof of the SUV, van, motor home, truck, semitruck, or any two to four door vehicle such that the solar platform 8, 308 becomes the roof or part of the roof. Additionally, the solar platform 8, 308 may make up a tonneau cover of a truck. Alternatively, the solar platform 8, 308 may be mounted to a frame which is attached to the roof of the SUV, van, motor home, semi truck, or any two to four door vehicle. The solar panels may be traversed between folded and deployed position while the vehicle, which the solar platform 8, 308 is attached or integrated, is in motion using an automated motorized mechanism, described elsewhere herein. The solar panels may be deployed in different orientations that create optimum contact between the active sides of the solar panels and the solar rays, which such optimization may be done by a computing device of the vehicle or the solar platform 8, 308 by taking into account different factors, such as the location, real-time weather pattern, and the time of day and year, as described elsewhere herein. Each solar panel may generate between 0.1 to 0.5 kWh of energy depending on the aforementioned factors. Each solar platform 8, 308 may supply from 1 kilowatt to 12 kilowatts to the vehicle depending on the type and number of panels and the location, real-time weather pattern, and the time of day and year. Different vehicles may have between 1 to 6 solar panels and possibly more if needed.

Figure 8:
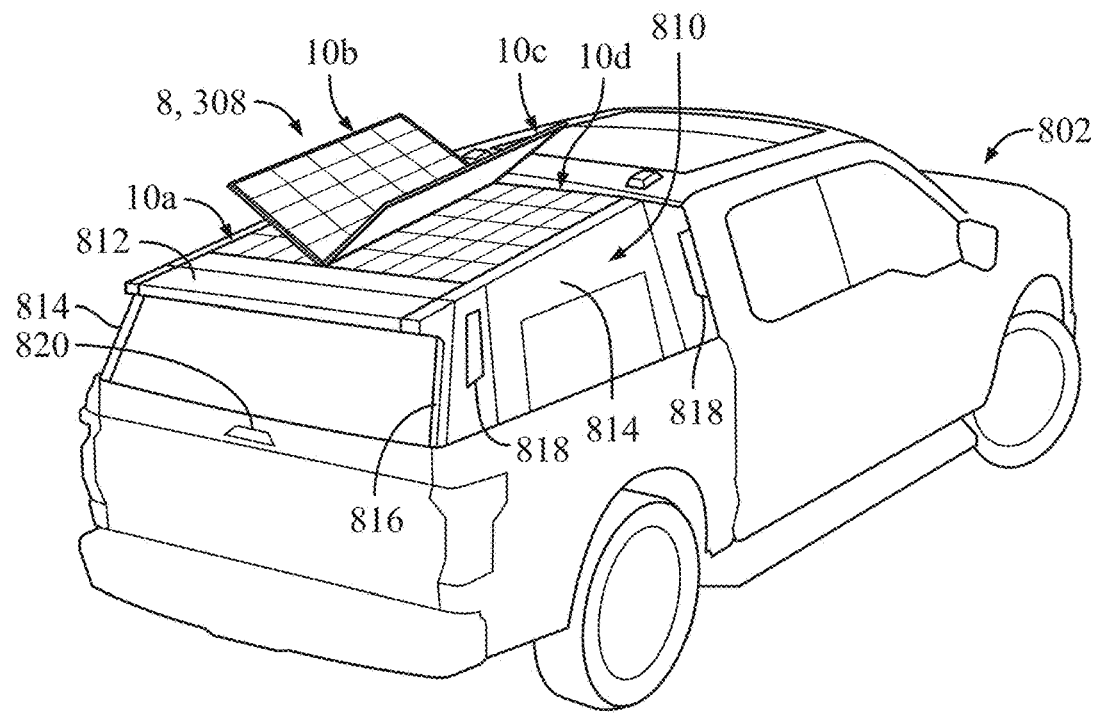
FIG. 8 shows a first rear perspective view of a truck having a cap with a solar platform.
Figure 9:
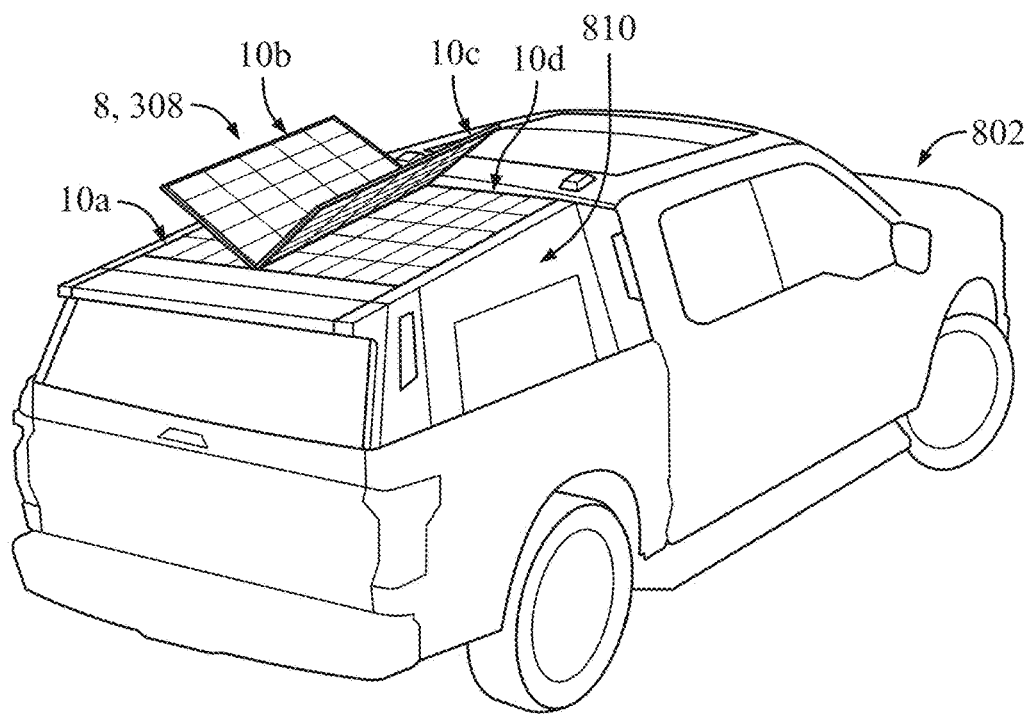
FIG. 9 shows a second rear perspective view of a truck having a cap with a solar platform.

Referring specifically now to FIGS. 8-9, rear perspective views of a truck 802 having a cap 810 with a solar platform 8, 308 is shown. The solar platform 8, 308 may be integrated into a cap 810 (e.g., cab height camper shell, above cab height camper shell, tonneau cover) of a truck 802. The cap 810 may have a frame body with a cap roof 812 between side frames 814 and a rear cap portion 816. By way of example and not limitation, the cap 810 may have a rectangular shape or, in the case of a TESLA CYBERTRUCK, may have a trapezoidal shape. By way of example and not limitation, the side frames 814 may have ventilation openings 818 and one or more windows. By way of example and not limitation, the rear cap portion 816 may have one or more windows and a cap door 820 that may be opened and closed to access inside the cap 810 and the truck bed.

The solar platform 8, 308 may be integrated with the cap roof 812 instead of being mounted on top of the cap roof 812. As such, the solar panels 10a-d, specifically the base solar panels 10a, d, may form part of the enclosure of the cap 810, specifically part of or the entire cap roof 812. FIGS. 8 and 9 show different examples of the first embodiment of the solar platform 8 with different active sides. However, the other embodiments and examples of the solar platform, described elsewhere herein, may be integrated with the cap roof 812 instead. The integrated solar platform 8, 308 may be deployed and folded while the truck 802 is at a stop or in motion using the mechanisms described elsewhere herein. Although the pivotable solar panels 10b, c are shown as pivoting about an axis running along the length of the cap 810 and the truck bed, the orientation of the solar platform 8, 308 may be shifted by 90-degrees where the pivotable solar panels 10b, c pivot along an axis extending along the width of the cap 810 and the truck bed.

Figure 10:
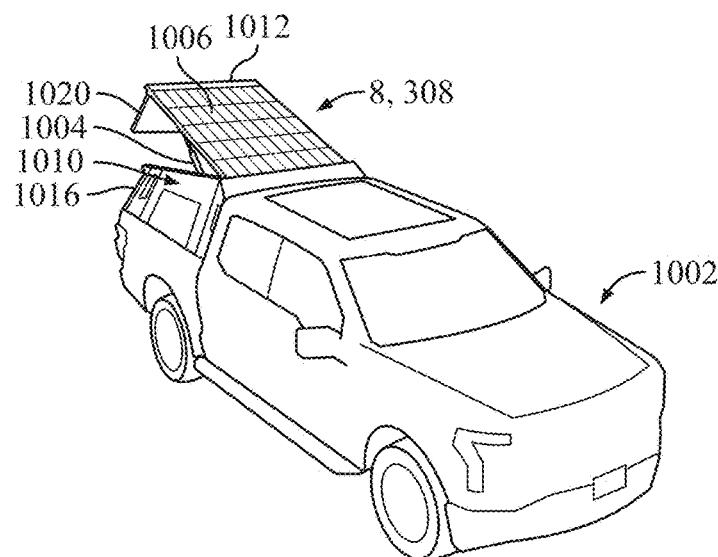
FIG. 10 shows a front perspective view of a truck having a cap with a solar platform.
Figure 11:
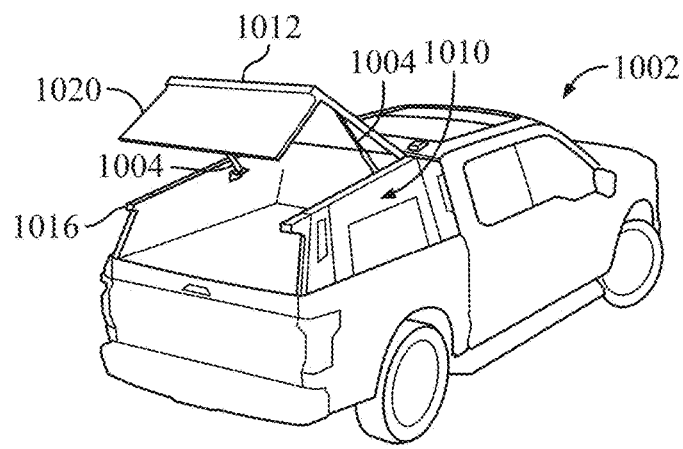
FIG. 11 shows a third rear perspective view of a truck having a cap with a solar platform.
Figure 12:
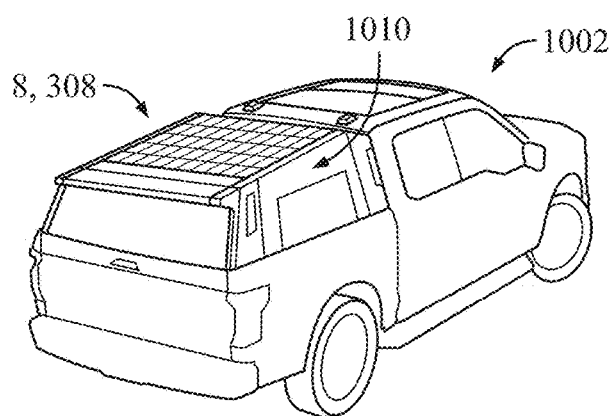
FIG. 12 shows a fourth rear perspective view of a truck having a cap with a solar platform.

Referring specifically now to FIGS. 10-12, a solar platform 8, 308 having only one flat panel 1006 is shown being integrated into another example of a cap 1010 of the truck 1002. By way of example and not limitation, the one flat solar panel 1006 may be integrated and make up the majority or all of the cap roof 1012. Alternatively, the flat solar panel 1006 may be mounted to the cap roof 1012. By way of example and not limitation, the cap door 1020 of the rear cap portion 1016 along with the cap roof 1012, which has the solar platform 8, 308 integrated therewith, may all lift up in an open position. By way of example and not limitation, the open position may be accomplished by the usage of one or more struts 1004 that lift up the cap door 1020 and the cap roof 1012. By way of example and not limitation, the struts 1004 may be in the form of a gas spring strut. Although FIGS. 10-12 show one flat solar panel 1006, it is also contemplated that the one flat solar panel 1006 may be a plurality of solar panels, such as the other embodiments of solar platforms 8, 308 shown in the other figures and have the features and functions thereof.

Figure 13:
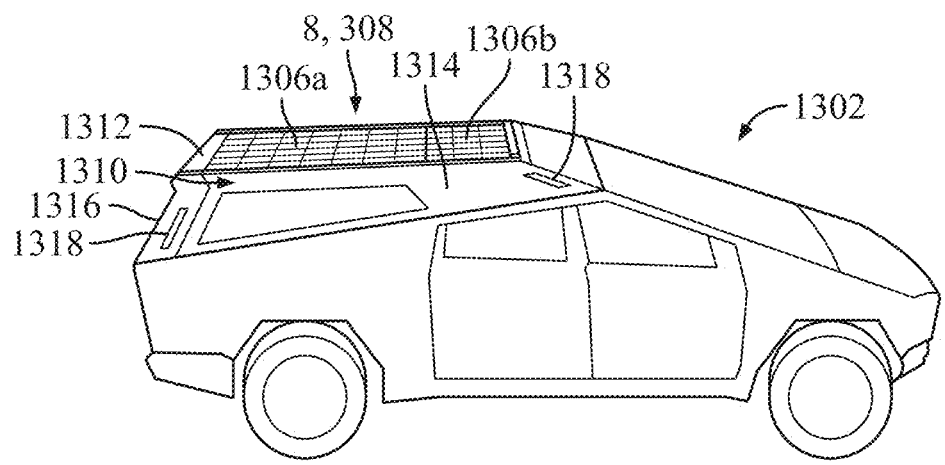
FIG. 13 shows a first side view of a TESLA CYBERTRUCK having a cap with a solar platform.
Figure 14:
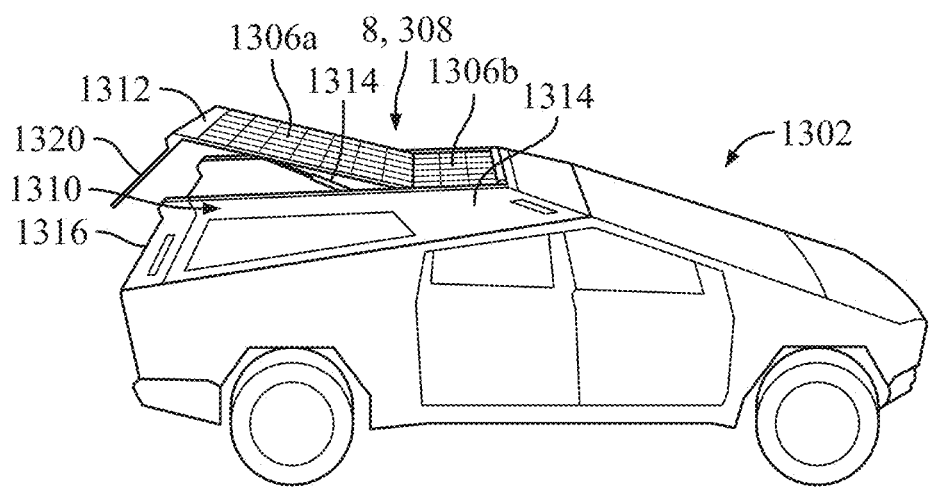
FIG. 14 shows a second side view of a TESLA CYBERTRUCK having a cap with a solar platform.
Figure 15:
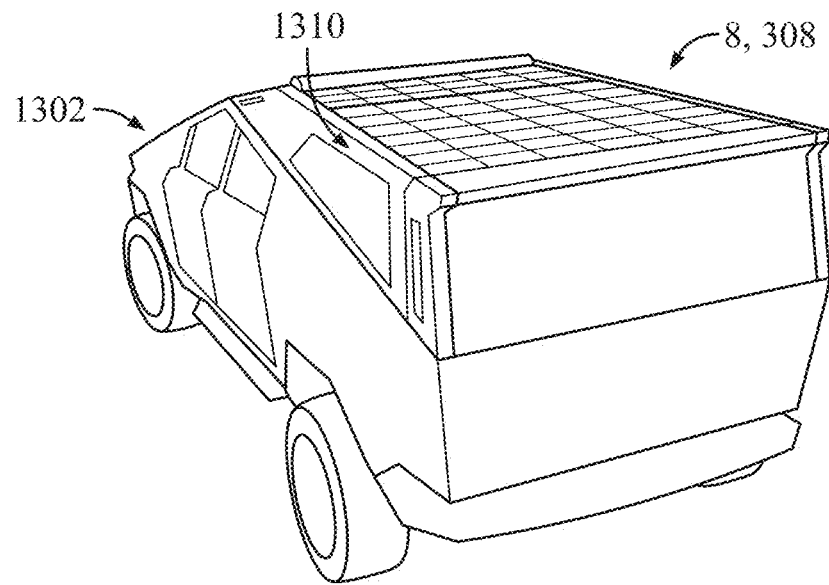
FIG. 15 shows a first rear perspective view of a TESLA CYBERTRUCK having a cap with a solar platform.
Figure 16:
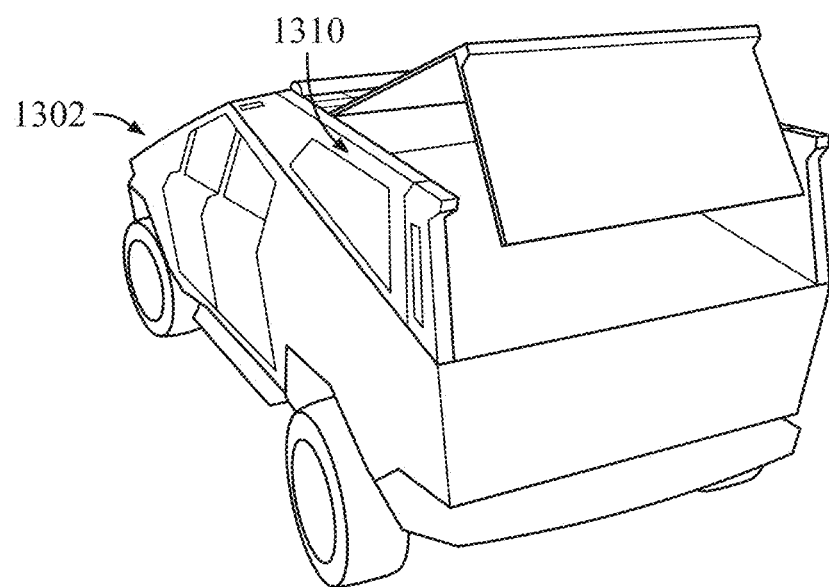
FIG. 16 shows a second rear perspective view of a TESLA CYBERTRUCK having a cap with a solar platform.
Figure 17:
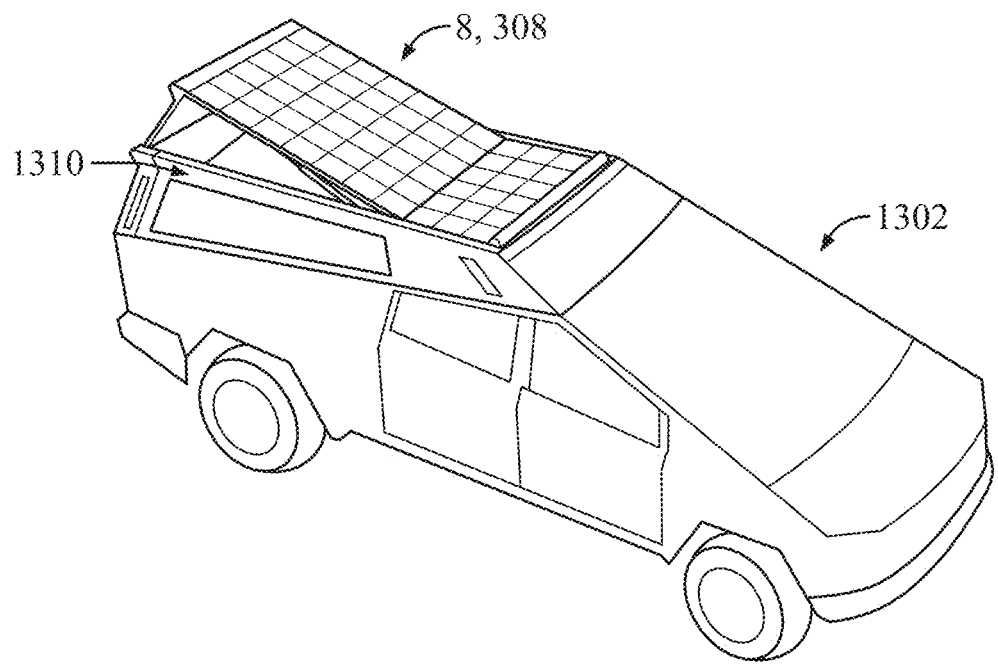
FIG. 17 shows a first perspective view of a TESLA CYBERTRUCK having a cap with a solar platform.
Figure 18:
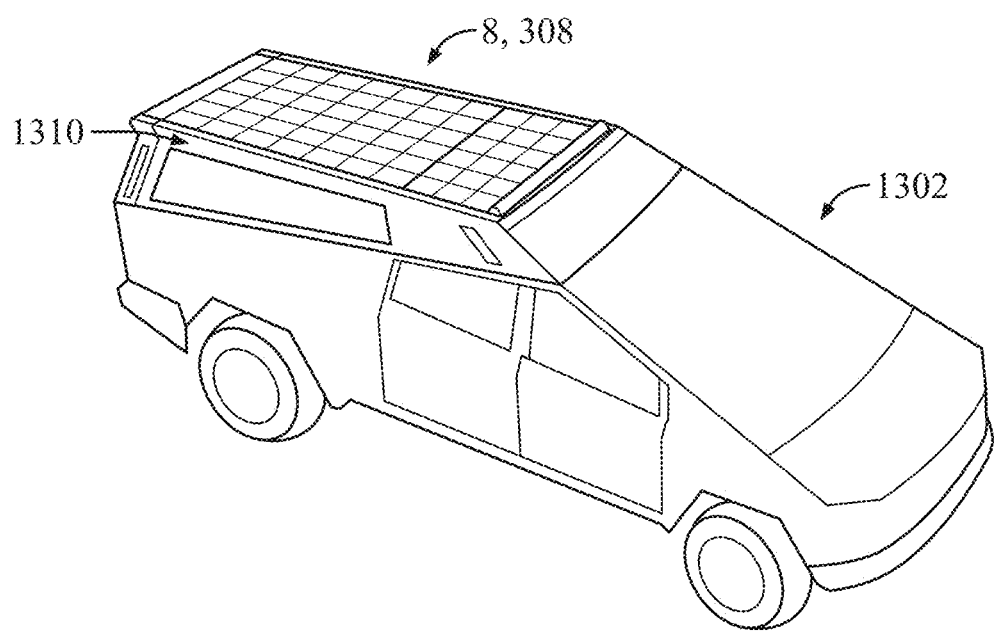
FIG. 18 shows a second perspective view of a TESLA CYBERTRUCK having a cap with a solar platform.

Referring specifically now to FIGS. 13-14, a solar platform 8, 308 having flat panels 1306a, b being integrated into a cap roof 1312 of a TESLA CYBERTRUCK 1302 is shown. As shown in FIG. 14, and by way of example and not limitation, a first flat solar panel 1306a may lift up with the cap door 1320 in an open position while the second flat solar panel 1306b may remain horizontal. The flat panels 1306a,b may form the enclosure of the cap 1310, specifically part of or the whole cap roof 1312. Alternatively, the flat solar panels 1306a, b may be mounted to the cap 1310.

The cap 1310 of the TESLA CYBERTRUCK 1302 may have a frame body with a cap roof 1312 between the side frames 1314 and the rear cap portion 1316 of the frame body. Since the cap 1310 is designed to be installed on top of a TESLA CYBERTRUCK 1302 truck bed, the side frames 1314 may have lower edges that incline downwards towards the rear cap portion 1316 to align with the inclined side panels of the TESLA CYBERTRUCK 1302 truck bed.

Consequently, the cap 1310 frame body may be trapezoidal shaped. By way of example and not limitation, the side frames 1314 may have ventilation openings 1318 and one or more windows. By way of example and not limitation, the rear cap portion 1316 may have one or more windows and a cap door 1320 that may be opened and closed to access inside of the cap 1310 and the truck bed.

By way of example and not limitation, the first and second flat solar panels 1306a, b may be positioned adjacent to each other and extend along the majority of the longitudinal length of the cap roof 1312, and possibly the whole length. By way of example and not limitation, the first flat solar panel 1306a may be two to four times the length of the second flat solar panel 1306b but have the same width. By way of example and not limitation, the cap door 1320 of the rear cap portion 1316 along with the first flat solar panel 1306a integrated with the cap roof 1312 may lift up while the second flat solar panel 1306b remains horizontal, as shown in FIG. 14. By way of example and not limitation, the open lifted position may be accomplished by the usage of one or more struts 1304, as describe elsewhere herein. Although FIGS. 13-14 illustrate the usage of flat solar panels 1306a, b, it is also contemplated that such solar panels, specifically the first flat solar panel 1306a, may be replaced by the plurality of solar panels of the other embodiments of the solar platforms 8, 308 described elsewhere herein. The first and second embodiments of the solar platforms 8, 308, and other embodiments and examples, may be integrated into the cap 1310 of the TESLA CYBERTRUCK 1302. Additionally, FIGS. 15-18 show the CYBERTRUCK 1302 having the cap 1310 in different views, angles, and orientations.

Figure 19A:
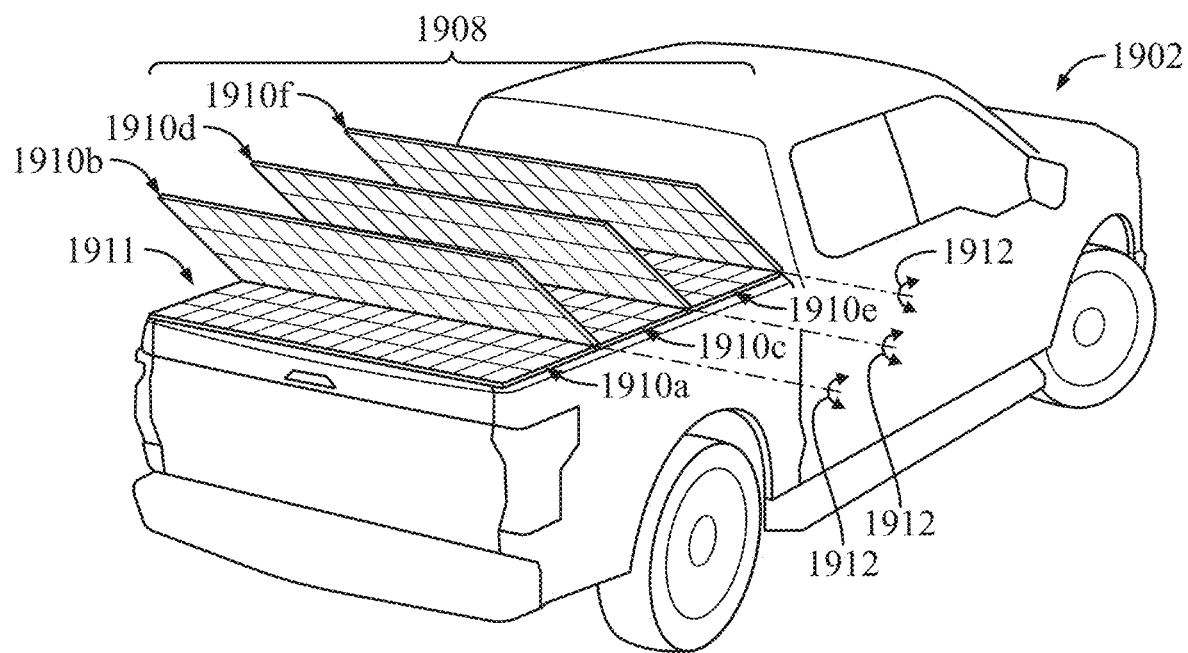
FIGS. 19A-B show first rear perspective views of different trucks having tonneau covers with a third embodiment of a solar platform in a deployed position.
Figure 19B:
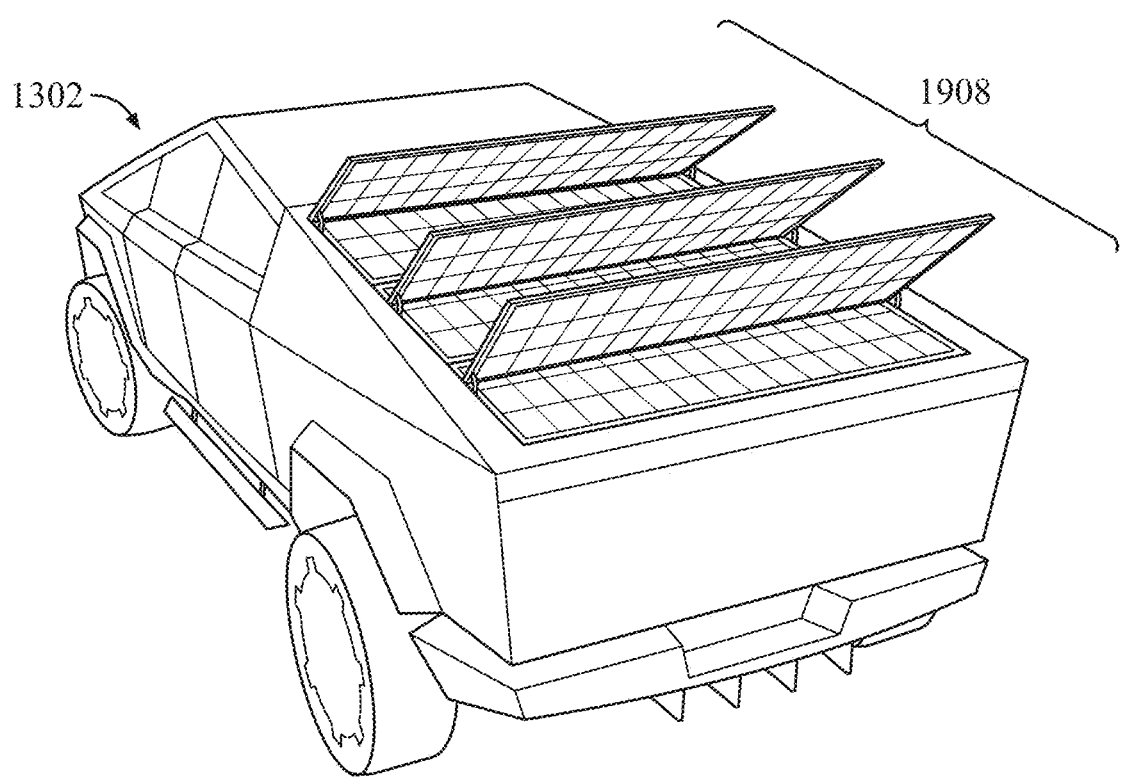
Figure 20A:
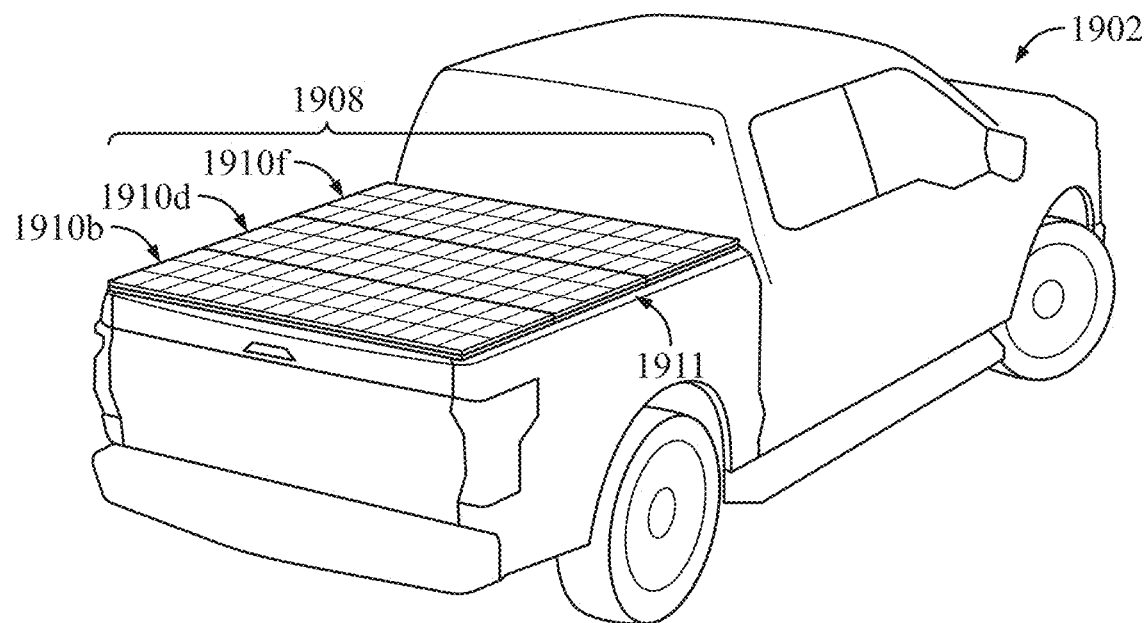
FIGS. 20A-B show second rear perspective views of different trucks having tonneau covers with the third embodiment of the solar platform in a folded position.
Figure 20B:
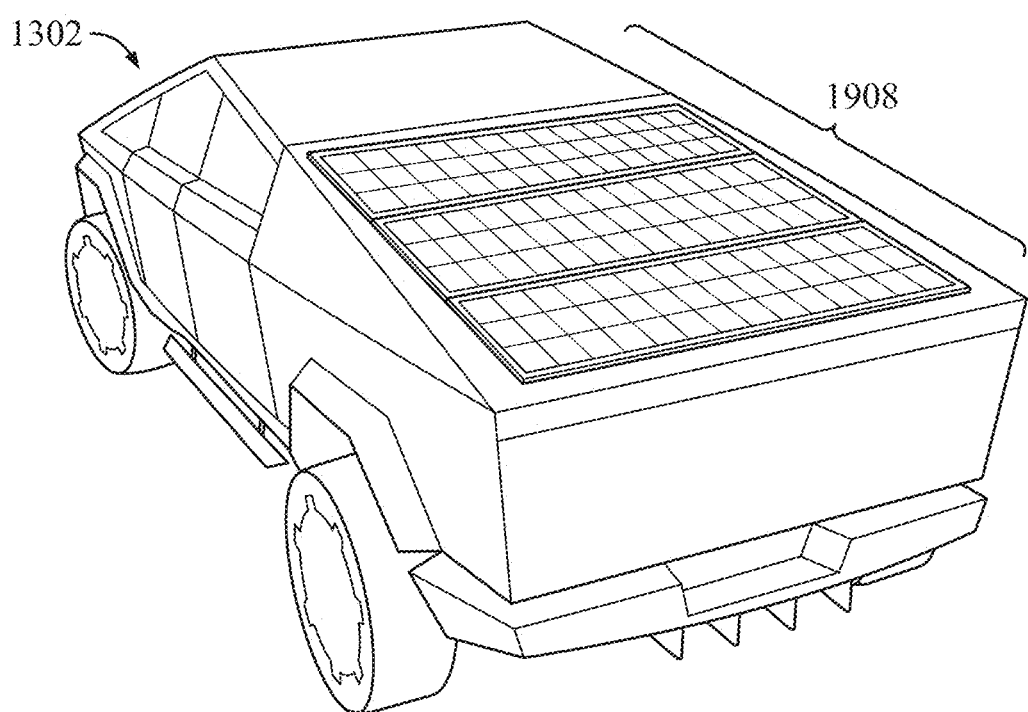

Referring now to FIGS. 19A and 20A, a third embodiment of the solar platform 1908 that may be mounted to a tonneau cover 1911 or may be integrated to form the structural panels of the tonneau cover 1911 is shown. As shown in FIG. 19A, the solar platform 1908 may have a plurality of pivotable solar panels 1910b, d, f that are designed to be deployed at an angle relative to a plurality of base solar panels 1910a, c, e. As shown in FIG. 20A, the pivotable solar panels 1910b, d, f may each also be folded on top of the base solar panels 1910a, c, e. By way of example and not limitation, the pivotable solar panels 1910b, d, f may alternate with the base solar panels 1910a, c, e along the length of the tonneau cover 1922. By way of example and not limitation, the tonneau cover 1911 may have three to five base solar panels 1910a, c, e and three to five pivotable solar panels 1910b, d, f mounted or integrated to the tonneau cover 1911. The first pivotable solar panel 1910b may be between the first and second base solar panels 1910a, c, the second pivotable solar panel 1910d may be between the second and third base solar panels 1910c, e, and the third pivotable solar panel 1910f may be between the third base solar panel 1910e and the end of the truck bed. The base solar panels 1910a, c, e may lie flat on the horizontal surface of the tonneau cover 1911 and the pivotable solar panels 1910b, d, f may each pivot about a pivot axis 1912 extending along the width of the truck 1902 from one side panel to the other side panel of the truck bed. FIGS. 19B and 20B show the third embodiment of the solar platform 1908 used with a TESLA CYBERTRUCK.

Referring back to FIG. 19A, and by way of example and not limitation, the orientation of the solar platform 1908 may be shifted by 90-degrees where the pivotable solar panels 1910b, d, f rotate along an axis extending along the length of the truck bed rather than the width of the truck bed. It is contemplated that the solar platform 1908 may be shifted by 180-degrees also. By way of example and not limitation, the pivotable solar panels 1910b, d, f may each rotate about their corresponding pivot axis 1912 between 0 to 90 degrees relative to the base solar panels 1910a, c, c, preferably between 30 to 60 degrees. In a preferred example, each pivotable solar panel 1910b, d, f may be pivoted in a deployed position at a 45 degree angle.

Since the solar platform 1908 has pivotable solar panels 1910b, d, f stacked in the same region as the base solar panels 1910a, c, e the pivotable solar panels 1910b, d, f may be bifacial or transparent, the energy conversion density per unit area may increase. This may be because there are multiple solar panels occupying the same spatial area when compared to an ordinary flat solar panel. The clustering of multiple solar panels at different angles in the same spatial area may help the production of electric energy from solar energy by the solar platform 1908. The pivotable solar panels 1910b, d, f may also be pivoted in such spatial area to receive sunlight at incident solar radiation angle that may change at different times of day.

The pivotable solar panels 1910b, d, f may be manually deployed and folded, as described elsewhere herein. By way of example and not limitation, the pivotable solar panels 1910b, d, f may be spring biased to the deployed position shown in FIG. 19A. The pivotable solar panels 1910b, d, f may be pushed down by hand and locked in place with a fastening mechanism that is traversed automatically as soon as the panels are pushed down to the stored position as shown in FIG. 20A. Alternatively, the pivotable solar panels 1910b, d, f may be deployed and folded using an automated motorized mechanism, as described elsewhere herein. By way of example and not limitation, the automated motorized mechanism may be connected to a computing system and actuated based on a set of factors, as described elsewhere herein. By way of example and not limitation, the computing system may be integrated with the vehicle or be part of the solar platform.

Figure 21:
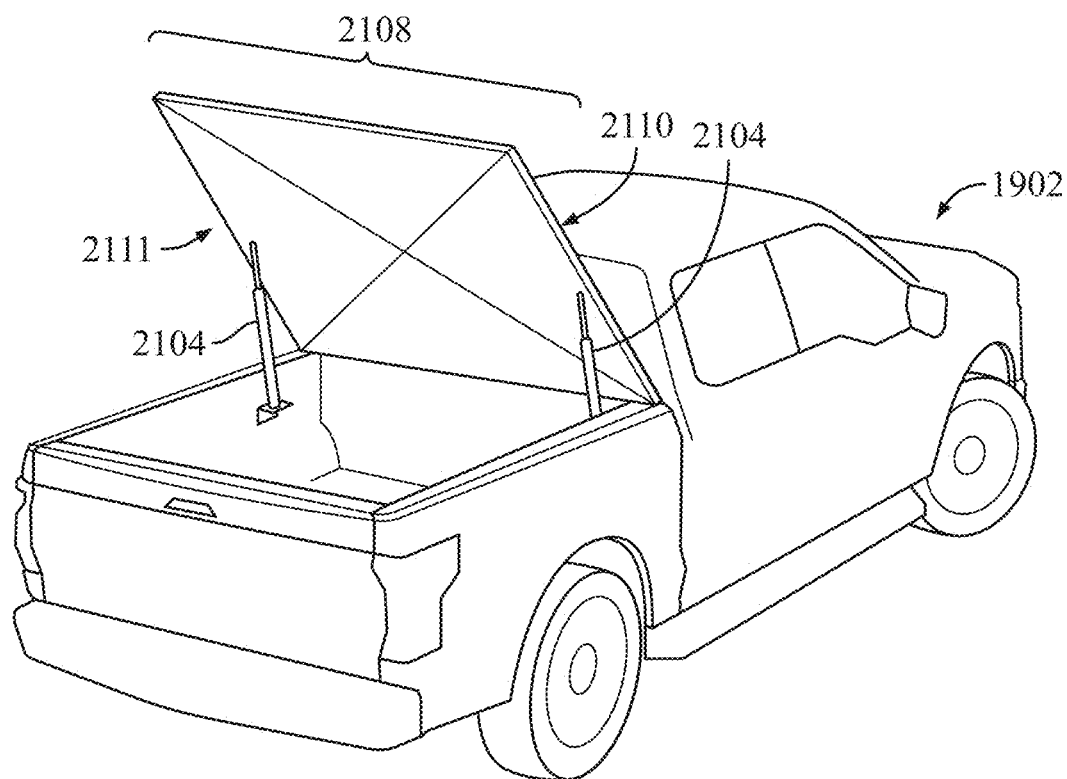
FIG. 21 shows a third rear perspective view of a truck having a tonneau cover with a solar platform in an open position.
Figure 22:
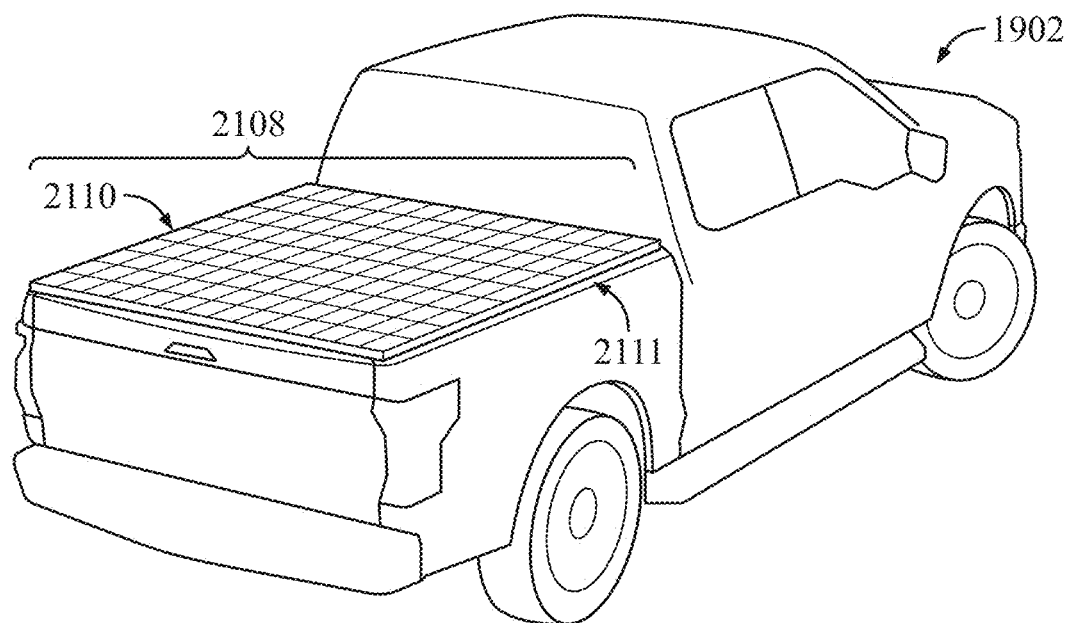
FIG. 22 shows a fourth rear perspective view of a truck having a tonneau cover with a solar platform in a closed position.
Figure 23:
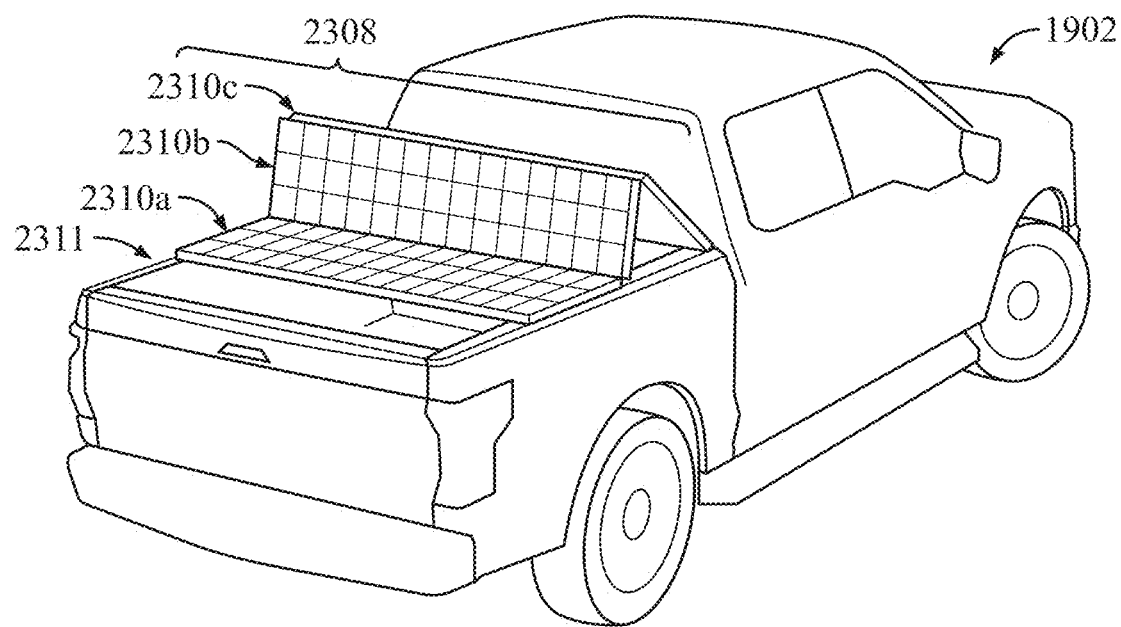
FIG. 23 shows a fifth rear perspective view of a truck having a tonneau cover with a solar platform in a semi retracted position.
Figure 24:
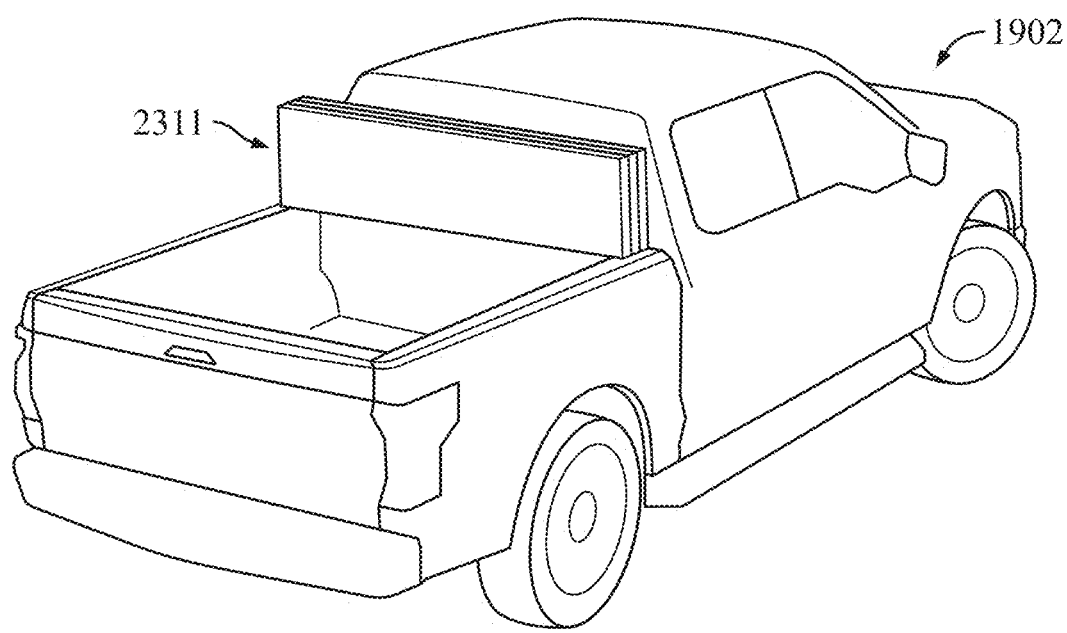
FIG. 24 shows a sixth rear perspective view of a truck having a tonneau cover with a solar platform in a retracted position.

By way of example and not limitation, the inside of the truck bed may be accessed by raising the tonneau cover 1911 having the solar platform 1908 using one or more struts 1204 similar to what is shown in FIG. 21. The struts 1204 may have the same features as described elsewhere herein. Alternatively, the tonneau cover 1911 having the solar platform 1908 may be a tri-fold tonneau cover that may be folded similar to what is seen in FIGS. 23-24. By way of example and not limitation, each pair of base and pivotable solar panels 1910a-f (see FIG. 19A) may form one foldable part of the tri-fold tonneau cover.

The base solar panels 1910a, c, e may each have active sides extending outwards away from the truck bed with a plurality of solar cells to receive solar energy and radiation. Each of the pivotable solar panels 1910b, d, f may be monofacial, having one active side, or bifacial, having two active sides with a plurality of solar cells. By way of example and not limitation, the pivotable solar panels 1910b, d, f may each have an active side on the top surface of the panels that face opposite from the base solar panels 1910a, c, e when in a folded position (see FIG. 20A). The pivotable solar panels 1910b, d, f may each have an additional active side on the bottom surface of the panels that face the base solar panels 1910a, c, e when in a folded position. In another example, the pivotable solar panels 1910b, d, f may be transparent solar panels, either fully transparent or semi-transparent solar panels.

Referring now to FIG. 21, the solar platform 2108 may be one flat solar panel 2110 mounted to a tonneau cover 2111 or may be integrated to form the structural panels of the tonneau cover 2111. The one flat solar panel 2110 may serve as an enclosure covering the truck bed while also receiving solar energy and generating electricity. Alternatively, the one flat solar panel may be a plurality of flat solar panels 2110a-c that may be mounted to a tonneau cover 2111 or may be integrated to form the structural panels of the tonneau cover 2111. By way of example and not limitation, three to nine flat solar panels having an active side facing outwards and extending across the width of the truck bed may be implemented. By way of example and not limitation, and as shown in FIG. 21, the tonneau cover 2111 having the integrated solar platform 2108 may be lifted to an open position using one or more struts 2104 to access the inside of the truck bed. The struts 2104 may have the same features described elsewhere herein.

Referring now to FIGS. 23-24 the solar platform 2308 may be integrated to form the structural panels of a tri-fold tonneau cover. Each flat solar panel 2310a-c may extend across the width of the truck bed and form one foldable part of the tri-fold tonneau cover. FIG. 23 shows the tonneau cover 2311 as it is traversed between the deployed position and the retracted configuration shown in FIG. 24.

The solar platform described with reference to FIGS. 19-24, specifically FIGS. 19A-B, may be incorporated with different types of electric, hybrid, or regular internal combustion engine vehicles. Such vehicles may include trucks, vans, minivans, SUVs, semitrucks, buses, recreational vehicles, motorhomes, trailers, station wagons, hatchbacks, crossovers, sedans, coupes, compact automobiles, and other types of vehicles and automobiles. The solar platforms described with respect to FIGS. 19-24, specifically FIGS. 19A-B, may also be incorporated with buildings, such as parking structures, homes, office buildings, stadiums, and other types of building structures.

Figure 25:
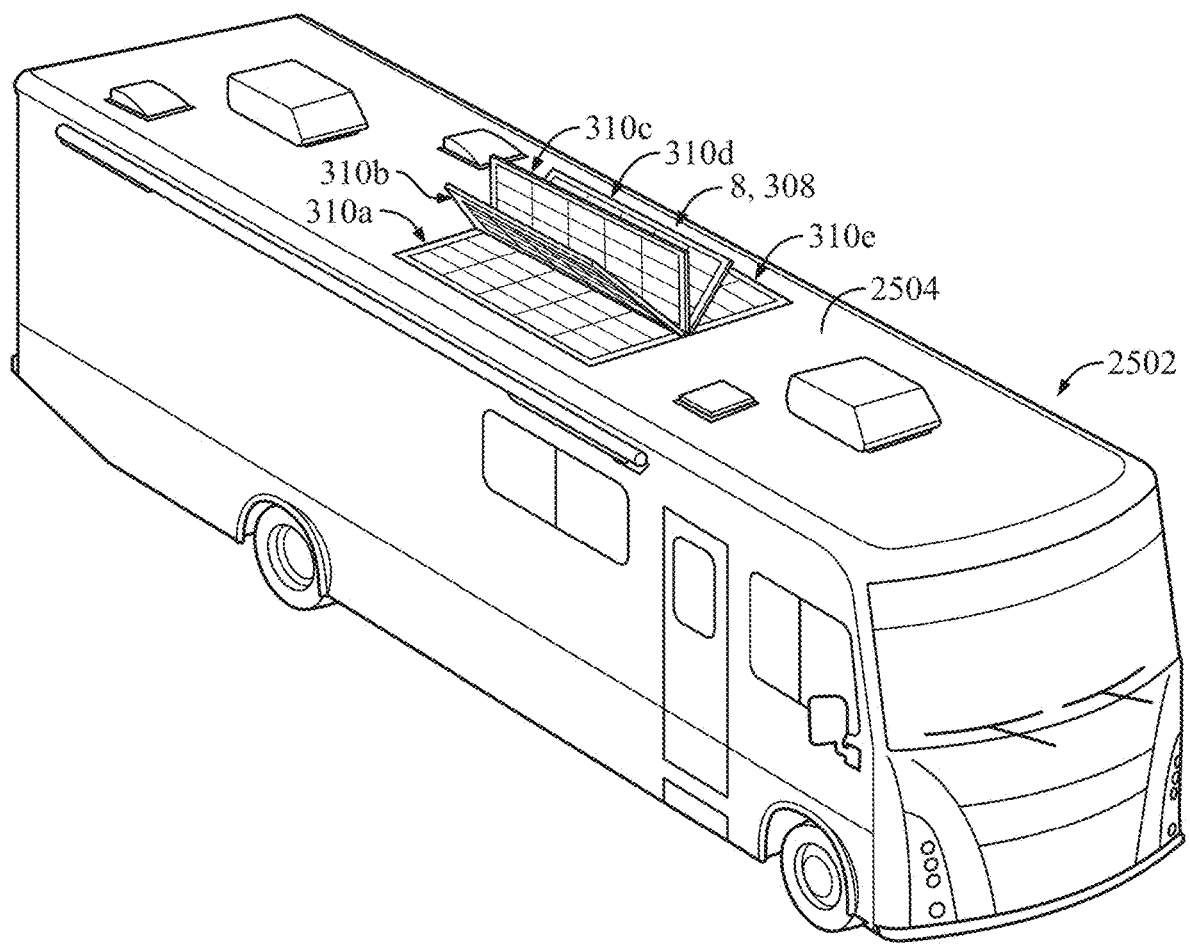
FIG. 25 shows a perspective view of a recreational vehicle with a solar platform.
Figure 26:
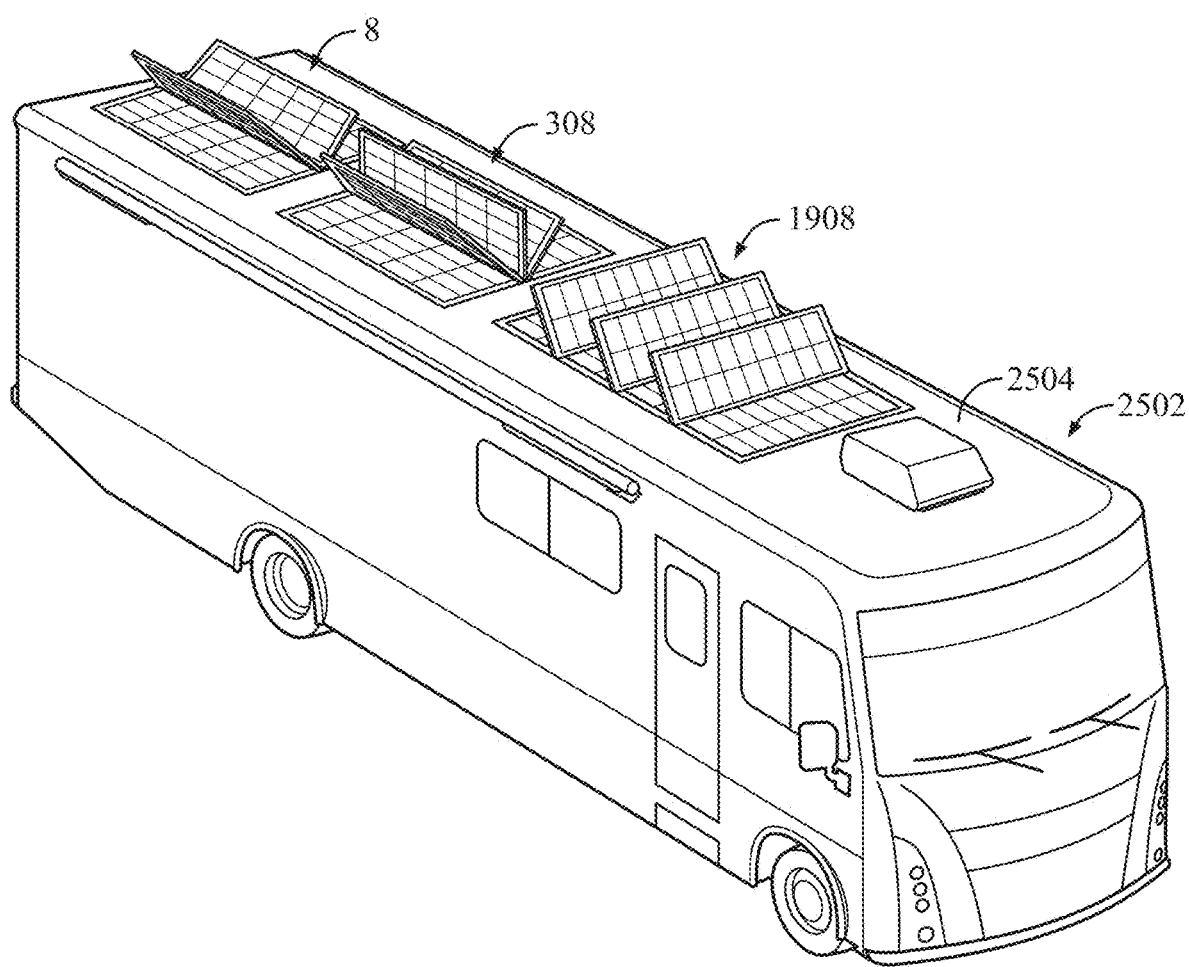
FIG. 26 shows a second perspective view of a recreational vehicle with multiple solar platforms.

Referring now to FIG. 25, a perspective view of a recreational vehicle 2502 with a solar platform 8, 308 is shown. By way of example and not limitation, the recreational vehicle 2502 may be a motorhome, which such motorhome may be manufactured by companies such as WINNEBAGO. By way of example and not limitation, the solar platform 8, 308 may be integrated or attached to the roof 2504 of the recreational vehicle 2502. The solar platform 8, 308 may be any of the embodiments and examples described elsewhere herein. With reference to FIG. 26, multiple solar platforms 8, 308, 1908 may be attached or integrated with the roof 2504 of the recreational vehicle 2502. Consequently, more electrical energy may be generated for the recreational vehicle.

Figure 27:
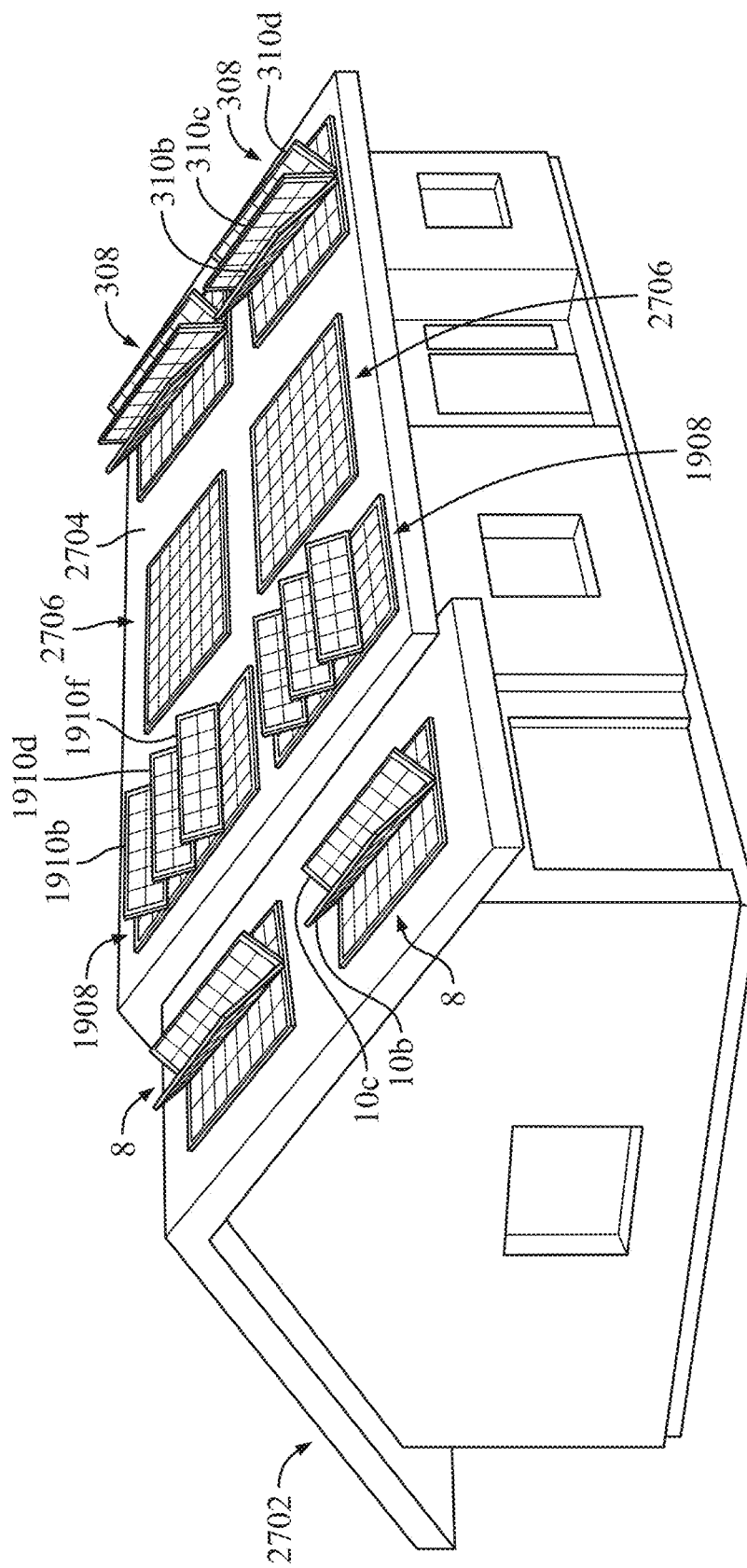
FIG. 27 shows a perspective view of a house with multiple solar platforms.
Figure 28:
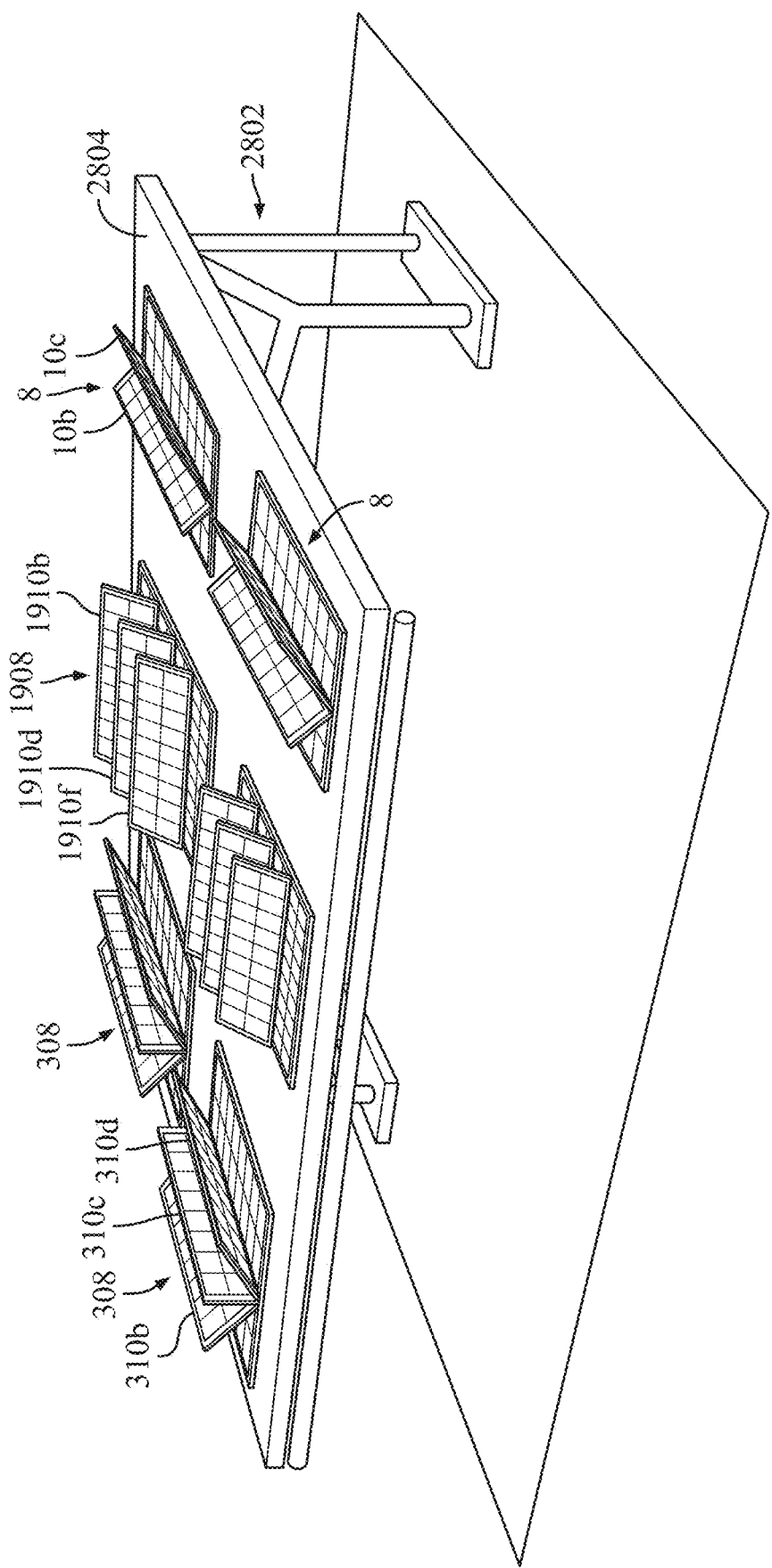
FIG. 28 shows a perspective view of a parking structure with multiple solar platforms.

With reference to FIGS. 26 and 27, one or more embodiments and examples of solar platforms 8, 308, 1908 described elsewhere herein may be attached or integrated with a roof 2704 of a house 2702 or a roof 2904 of a parking structure 2802. The different embodiments of the solar platforms 8, 308, 1908 may be orientated differently on the roofs 2704, 2904 such that the pivotable solar panels may be actuated in different angular orientations to face the sun at optimum angles throughout the day. By way of example and not limitation, the actuation of the pivotable solar panels to different angles may be motorized and be done with a remote control. By way of example and not limitation, a computing system may change the angular orientation of the solar panels, particularly the pivotable solar panels, based on the time of year (i.e., the current month or season), the time of the day, the real-time weather pattern, and the location of the solar platform 8, 308, 1908 so that the solar panels may be positioned at optimum light receiving orientations. By way of example and not limitation, the computing system may pivot the solar panels at different angles throughout the day such that the solar panels are at optimum angles relative to the radiation of the sun. By way of example and not limitation, the computing system may also be designed to calibrate for the optimum angles of the pivotable solar panels throughout the day. The computing system may test different angle orientations of the pivotable solar panels at a certain time of day to determine which angle would provide optimum angle for the incident solar radiation and maximizing electricity generation at such time of day. When the computing system determines the optimum angle through the calibration, the solar panels may be orientated to such angle in the next day and the short-term future. As shown in FIG. 27, conventional flat solar panels 2706 may be used in conjunction with the solar platforms 8, 308, 1908.

The remote control discussed herein may be a separate and detachable hand held remote control. The remote control may have a transmitter for transmitting a signal to a receiver which controls a motor for pivoting the panels. The remote control may also have a receiver for receiving data from sensors attached to the solar platform to display data sensed by the sensors on the solar platform. Alternatively, the remote control may be a push button or touch button on a touch screen. The touch screen may be within a cab of the vehicle on which the solar platform is mounted. As a further alternative, the remote control may be provided in a form of a software downloadable mobile application. In this manner, the user can control the solar platform with their mobile phone.

The solar platform may have sensors mounted thereon. The sensors may feed sensed data into a processor for pivoting the solar panels. By way of example and not limitation, the sensor may be a light sensor attached to an active side of the solar panel. The active side of the solar panel may be a side of the solar panel on which solar cells are located for receiving the sunlight. The light sensor collects data as to the amount of light being shined upon the active side of the solar panel. Each of the light sensors sends light intensity data to a processor. The processor calculates the amount of estimated collected light on each of active sides of the solar panels. The processor can send a signal to a motor which pivots the solar panels pivotably attached to the base solar panel. The pivotable solar panels may be incrementally pivoted (e.g., 0.25 degree to 5 degree increments within its pivot range) to determine which pivot angle of the pivotable solar panels generates the most electricity or greatest electricity. The base solar panel may have a light sensor for detecting the amount of sunlight it receives. The light sensor feeds the its sensed data into the processor along with the pivot angle. Based on this data, the processor determines the optimal angle of the of the panels for generating electricity and the solar panels are pivoted to that pivot angle. The pivoting can be performed manually by hand with a hand crank or the solar panels may be motorized and the processor may send a signal to the motors to pivot the solar panels to the optimal pivot angle.

The vehicle on which the solar platform is mounted may have a forward facing sensor to detect overhead obstacles while the vehicle is moving forward. When the forward facing sensor detects an overhead obstacles that might hit and break the solar panel(s), the forward sensing sensor may send a signal to the processor. The processor may send a signal to the motor to pivot the solar panels downward to lower an overall height of the solar panels to avoid hitting the overhead obstacle.

The solar platform may have an anti theft sensor. For example, if electricity is not being generated, the processor of the solar platform may send a signal to the software application on the user's smartphone to indicate that there might be a theft occurring.

The processor of the solar platform and the application on the user's smartphone can be synced to each other. In this way, the application on the user's smartphone can manage all electrical controls of the solar platform including but not limited to current flow, current generated from each of the solar platforms, current generated compared to light intensity sensed by the light sensor, battery charge levels (e.g., percent charged, percent remaining).

Figure 35:
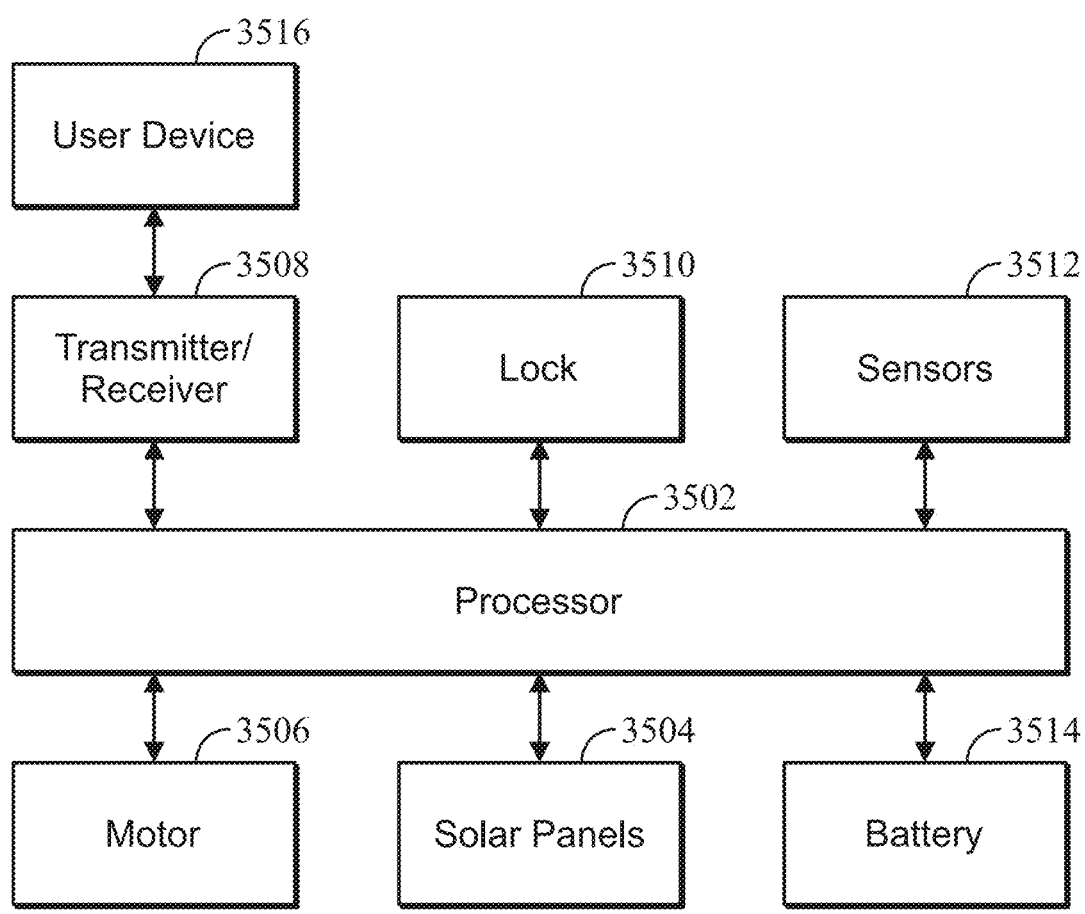
FIG. 35 a block diagram of some of the electrical and mechanical components of the solar platform and their relation is shown.

With respect to the aforementioned features of the solar platform, and referring now to FIG. 35, a block diagram of some of the the electrical and mechanical components of the solar platform and their relation is shown. FIG. 35 is mainly concerned with the electrical relations of the components of the solar platform and may not necessarily represent how the components are mechanically related. As shown in FIG. 35, a user device 3516, which may be separate and external from the solar platform, may be in communication with a transmitter and receiver 3508 of the solar platform. By way of example and not limitation, the user device 3516 may be a mobile device, such as a smartphone. By way of example and not limitation, the user device 3516 may be the remote described elsewhere herein. By way of example and not limitation, the user device 3516 may be a user interface on a dashboard of a vehicle. By way of example and not limitation, the user device 3516 may be connected to the transmitter and receiver 3508 of the solar platform via Bluetooth technology, WI-FI, or be hardwired to the transmitter and receiver 3508 of the solar platform. By way of example and not limitation, an application may be downloaded onto the user device 3516, which may be a smartphone, and the application may be in communication with the solar platform to control the electrical and mechanical components of the platform. For example, the solar platform may have a plurality of sensors 3512 that measure different variables pertaining to the operation of the platform. The processor 3502 of the solar platform may relay such measurements done by the sensors 3512 to the user device 3516 via the usage of the downloaded application on user device. The user may then use the application to send different commands in a form of signals to the solar platform to operate and actuate different components of said platform.

By way of example and not limitation, the user device 3516 may have a transmitter and receiver component to communicate with the transmitter and receiver 3508 of the solar platform and send command signals to the platform. The command signal sent by the user device 3516 to the receiver 3508 may be relayed to the processor 3502 to execute the actuation of the motor 3506 that is mechanically coupled to the solar panels 3504, specifically the pivotable and center solar panels, to rotate such panels at desired angular orientations, such as a deployed or folded orientation. By way of example and not limitation, the command signal sent to the motor 3506 may cause the motor to pivot each of the pivotable solar panels between 10 to 90 degrees relative to the base solar panels, preferably 15, 30, 45, or 60 degrees. Alternatively, the motor 3506 of the solar platform may be actuated automatically based on time and weather patterns, as described elsewhere herein, instead of receiving a command signal from a user device.

The solar platform may have different sensors 3512 incorporated therewith. By way of example and not limitation, there may exist sensors 3512 attached to the solar platform for measuring current flow, mapping current flow from each of the solar panels, and current generated versus measured light intensity from a light sensor. Each solar panel 3504 of the solar platform may have a current sensor that measures the current generated by that specific solar panel, and such information from each solar panel may be provided and displayed to the user via the downloaded application on the user device 3516. As described elsewhere herein, the user device 3516 may be in communication with the processor 3502 and sensors 3512 via the transmitter and receiver 3508 of the solar platform.

By way of example and not limitation, the solar platform may have one or more light sensors that relay to the processor 3502 the intensity of light at a certain time of day that radiates on the solar panels 3504 of the solar platform. By way of example and not limitation, the processor 3502 may then use the light intensity data and the generated electric current data taken at particular times of day and map out the relation and efficiency of the generated electric current versus light intensity. Such information from electric current and light sensors may also be relayed to the user via the downloaded application on the user device 3516. By way of example and not limitation, the light sensors may track the real-time light intensity projected on the solar panels 3504 of the solar platform and such real-time data may be relayed to the user device 3516. If the solar platform is incorporated with a vehicle, as described elsewhere herein, the user may use the real-time light intensity data to move the vehicle to a different location that has better solar lighting, in addition to changing the orientation of the pivotable and central solar panels. If one or more rechargeable batteries 3514 are connected to the solar platform for recharging, such as the rechargeable batteries of an electric or hybrid vehicle, then one or more sensors may be incorporated with such batteries 3514 for the processor 3502 to determine percent battery charged and percent battery remaining. Such sensors incorporated with the batteries 3514 may be current sensors. The information about the rechargeable batteries 3514 may also be relayed from the solar platform, or directly from the rechargeable batteries, and displayed to the user via the downloaded application on the display of the user device 3516.

By way of example and not limitation, the sensors 3512 may include position sensors incorporated with the solar panels 3504 of the solar platform, specifically the pivotable and center solar panels. The position sensors may determine the angular position of each of the pivotable and center panels, and the position sensors may provide such position data to the processor 3502 of the solar platform. By way of example and not limitation, the angular position of the solar panels 3504 measured by the position sensors may also be relayed and displayed to the user via the downloaded application on the user device 3516.

By way of example and not limitation, the processor 3502 may use the data from one or more of the sensors 3512 to send a signal to the motor 3506 coupled to the solar panels 3504 and change the angular positions of the solar panels, specifically the pivotable and center solar panels. By way of example and not limitation, the processor 3502 may receive the light intensity data from the light sensors, the position data from the position sensors, and the current generated from each panel 3504 from the current sensors and send a signal to the motor 3506 to change positions, specifically angular positions, of the solar panels 3504 incrementally and determine an optimal position of the solar panels of the solar platform. By way of example and not limitation, the user may use the user device 3516 to transmit to the processor 3502 of the solar platform to actuate the motor 3506 and place the solar panels 3504 in optimal positions relative to the irradiation of the sun.

The sensors 3512 may also include sensors designed for safety and security of operating the solar platform. By way of example and not limitation, a forward sensor operative to sense a physical object at a height of the solar platform, or near the vicinity of the solar platform, may be incorporated. The forward sensor may be in communication with the processor 3502 that may be configured to send a signal to the motor 3506 to traverse the solar panels 3504 (i.e., pivotable and center solar panels) downwards, and in a folded position, when the forward sensor senses an object at a height or near the vicinity of solar panels 3504 that were originally deployed. If the solar platform is integrated with a structure of a vehicle, as described elsewhere herein, the forward sensor may be used to fold the solar panels 3504 and prevent the solar platform from colliding with an object, such as the ceiling of a tunnel or a bridge, when the vehicle is in motion and the solar platform is originally deployed.

By way of example and not limitation, the solar platform may have one or more locks 3510 that may unlock to allow the solar panels 3504 to traverse to a deployed position. The locks 3510 may lock when the solar platform is in a folded position. The solar platform may have an alarm system incorporated with the solar platform so that an alarm goes off if someone tries to tamper with the solar platform, especially in the folded and locked orientation. By way of example and not limitation, the alarm system and the lock system may be activated and deactivated via the downloaded application on the user device 3516. By way of example and not limitation, the locks 3510 may be in communication with the transmitter 3508 through the processor 3502 and may send information to the user device 3516 of whether the solar platform is operational or not via the downloaded application. By way of example and not limitation, the lock 3510 may have different system status indications that may relay to the user device 3516. The lock 3510 may have an all systems okay position indicative that the solar platform is operational and a system error position indicative that the solar platform is not operational. By way of example and not limitation, the all systems okay position may correspond to the deployed position of the solar panels 3504, and the system error position may correspond to the solar panels 3504 being in a folded position or an unintended position that is neither the folded or the desired deployed position. The lock 3510 may be configured to send a signal of such statuses to an application loaded on a smartphone (i.e., user device 3516) using the transmitter and receiver 3508 for displaying the system status on the smartphone of the user. By way of example and not limitation, the lock 3510 may also be used to lock the solar panels 3504 in the deployed position, at a certain angular orientation, to prevent the external forces such as the wind to change the position of the panels.

Figure 29:
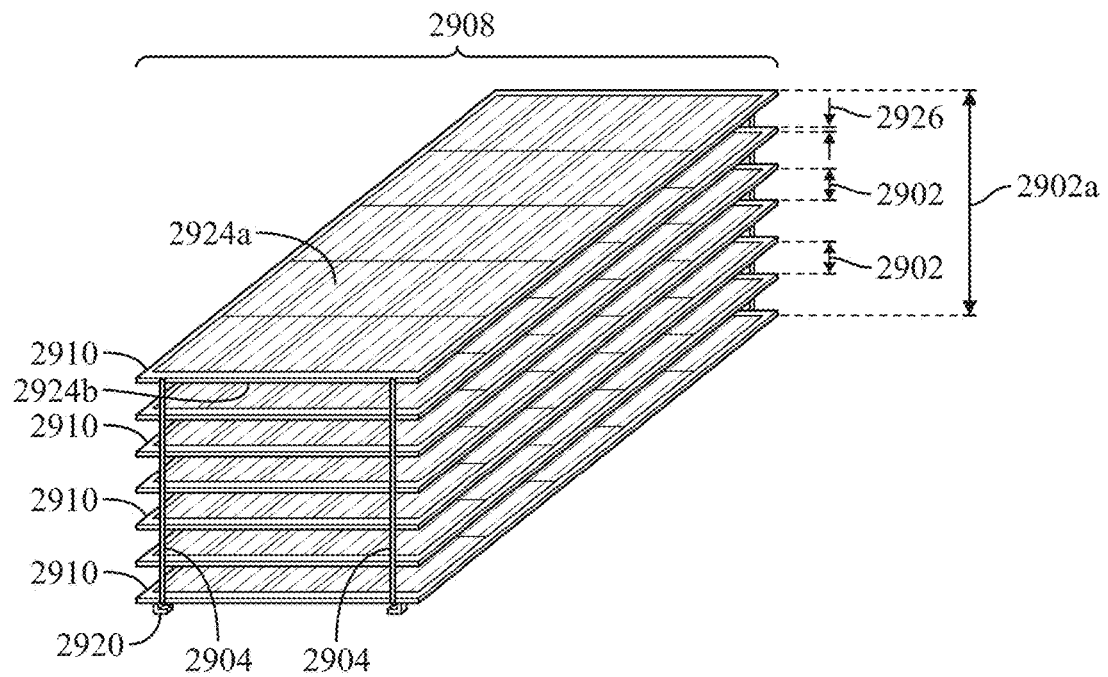
FIG. 29 shows a perspective view of a fourth embodiment of a solar platform in a deployed position.
Figure 30:
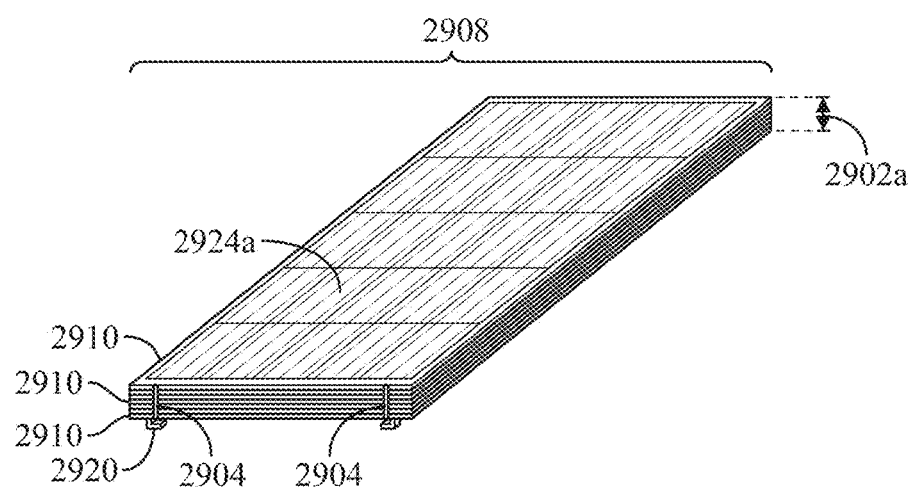
FIG. 30 shows a perspective view of the fourth embodiment of the solar platform in a folded position.

Referring to FIGS. 29-30, perspective views of a fourth embodiment of the solar platform in deployed and folded positions are shown. The fourth embodiment of the solar platform 2908 may have a plurality of stackable solar panels 2910 stacked on top of each other. By way of example and not limitation, there may be between 2 to 16 stackable solar panels 2910 stacked on top of each other, preferably 6 stackable solar panels 2910. By way of example and not limitation the very bottom stackable solar panel 2910 may mounted to a frame having a plurality of legs 2920 to be place on different surfaces, such as the roof of a house, office building, parking structure, or on the ground. In an alternative example, the solar platform 2908 may be incorporated (i.e., integrated or attached) with a vehicle structure or building structure, as described elsewhere herein with other embodiments of solar platforms.

Each stackable solar panel 2910 may have the same dimensions as the other plurality of stackable solar panels 2910. By way of example and not limitation, the thickness 2926 of each stackable solar panel 2910 may be between 0.25 to 0.75 inches thickness, preferably 0.5 inches. By way of example and not limitation, the width and/or the length of each stackable solar panel 2910 may decrease with an additional solar panel stacked on top of each other to give the solar platform a pyramid shape.

In the deployed position as shown in FIG. 29, the plurality of stackable solar panels 2910 may be spaced apart from each other vertically and still be orientated on top of each other. By way of example and not limitation, the vertical spacing 2902 dimension may range between 0.5 to 2.5 inches, preferably 1 inch, between each pair of stackable solar panel 2910. By way of example and not limitation, if there are six stackable solar panels 2910 stacked on top of each other and are vertically spaced 2902 apart from each other by 1 inch, with each of the solar panels having a thickness 2926 of 0.5 inches, then the solar platform 2908 may occupy a vertical space 2902*a* ranging between nine to ten inches. This may create a greater energy harvesting density and capability in a space where one ordinary solar panel would usually occupy. In the same example, the solar platform 2908 would occupy a second vertical space 2902*b* between three to five inches in the folded position (see FIG. 30), which would make for convenient storage of the solar platform 2908. In the folded position, each of the plurality of stackable solar panels 2910 may rest on top of each other.

By way of example and not limitation, the solar platform 2908 may transition between the deployed position (see FIG. 29) to the folded position (see FIG. 30), and vice versa, using a telescoping mechanism. One or more telescoping shafts 2904 may be coupled at the ends of the stackable solar panels 2910. For example, there may be one to two telescoping shafts 2904 on each transverse sides of the plurality of stackable solar panels 2910. The one or more telescoping shafts 2904 may be coupled to the plurality of stackable solar panels 2910 to raise and lower the panels between the deployed and folded position or to adjust the vertical spacing 2902 between each pairs of solar panels. By way of example and not limitation, the vertical spacing 2902 between each pair of the plurality of stackable solar panels 2910 may change ranging from being spaced apart from 0.5 inches to 2.5 inches using the telescoping mechanism. It is also contemplated herein that some of the stackable solar panels 2910, such as the bottom two to four solar panels, may be vertically spaced apart at a different spacing than the other stackable solar panels 2910, such as the top two to four solar panels. Alternatively, the solar platform 2908 may transition between the deployed to folded position using foldable legs between each solar panel stacked on top of each other.

By way of example and not limitation, some or all of the stackable solar panels 2910 stacked on top of each other may be bifacial having an active side both the top 2924*a* and bottom 2924*b* surfaces of the solar panels. By way of example and not limitation, the very bottom stackable solar panel 2910 may be monofacial while the rest of the stackable solar panels 2910 stacked on top of each other may be bifacial. Consequently, the solar platform 2908 may collect more solar energy, specifically solar irradiation reflected from the nearby ground and objects, since there exists more solar surfaces. In the example described herein with reference to FIGS. 29-30, where six solar panels are stacked on top of each other, there may exist up to 11-12 solar surfaces with the usage of bifacial solar panels that may collect solar energy from solar irradiation coming from all different directions. With the stackable solar panels 2910 being bifacial, it may be preferred that the vertical spacing 2902 between each solar panel to be greater rather than less with respect to the vertical spacing range described elsewhere herein. This may be because with more vertical spacing 2902 the lower surfaces 2924*b* of the stackable solar panels 2910 may collect more reflected solar irradiation from the ground and nearby objects. Additionally, using bifacial solar panels may further increase the energy harvesting density and capability of the solar platform 2908 in a space where one ordinary solar panel would usually occupy.

By way of example and not limitation, some or all of the stackable solar panels 2910 stacked on top of each other may be transparent, either fully or semi-transparent, that allow for the irradiation of the solar energy hitting the very top stackable solar panel 2910 solar surface 2924*a* to also reach the solar panels that are below the very top solar panel. By way of example and not limitation, the very bottom stackable solar panel 2910 may be monofacial while the rest of the stackable solar panels 2910 stacked on top of each other may be transparent solar panels. By way of example and not limitation, a combination of fully transparent and semi-transparent stackable solar panels 2910 may be used in the solar platform 2908. By way of example and not limitation, the first two to four stackable solar panels 2910 at the very top of the of the solar platform 2908 may be fully transparent while the rest of the two to four stackable solar panels 2910 occupying the bottom portion of the solar platform 2908 may be semi-transparent. By way of example and not limitation, the fully transparent and semi-transparent solar panels may alternate, with the very top stackable solar panel 2910 being fully transparent and the stackable solar panel 2910 right below the very top solar panel being semi-transparent, which such pattern may repeat for the rest of the solar panels all the way down to the very bottom solar panel, which may be a monofacial solar panel.

It is also contemplated herein that a combination of bifacial, transparent, and monofacial solar panels may be used with the solar platform 2908. By way of example and not limitation, the very top stackable solar panels 2910, such as the very top two to four solar panels, may be transparent while the rest of the stackable solar panels 2910 at the bottom portion of the solar platform 2908 may be bifacial, with the very bottom solar panel being monofacial.

Figure 31:
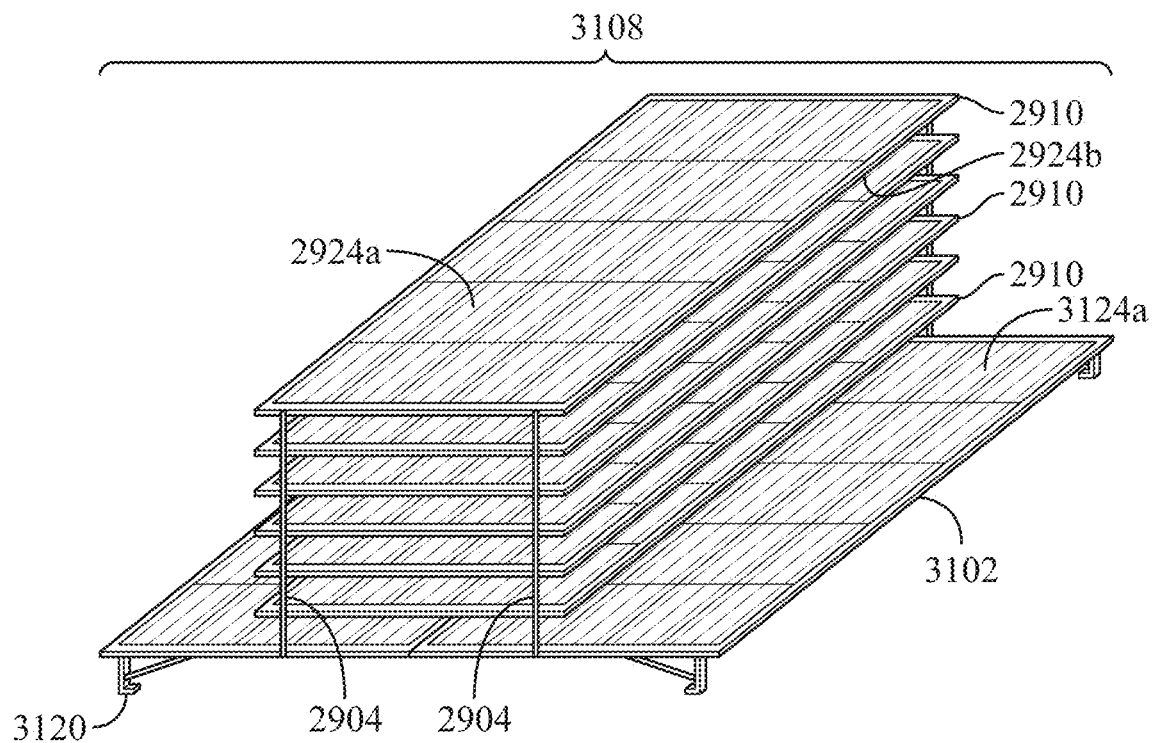
FIG. 31 shows a perspective view of the fourth embodiment of the solar platform incorporated on top of a flat solar panel and in a deployed position.
Figure 32:
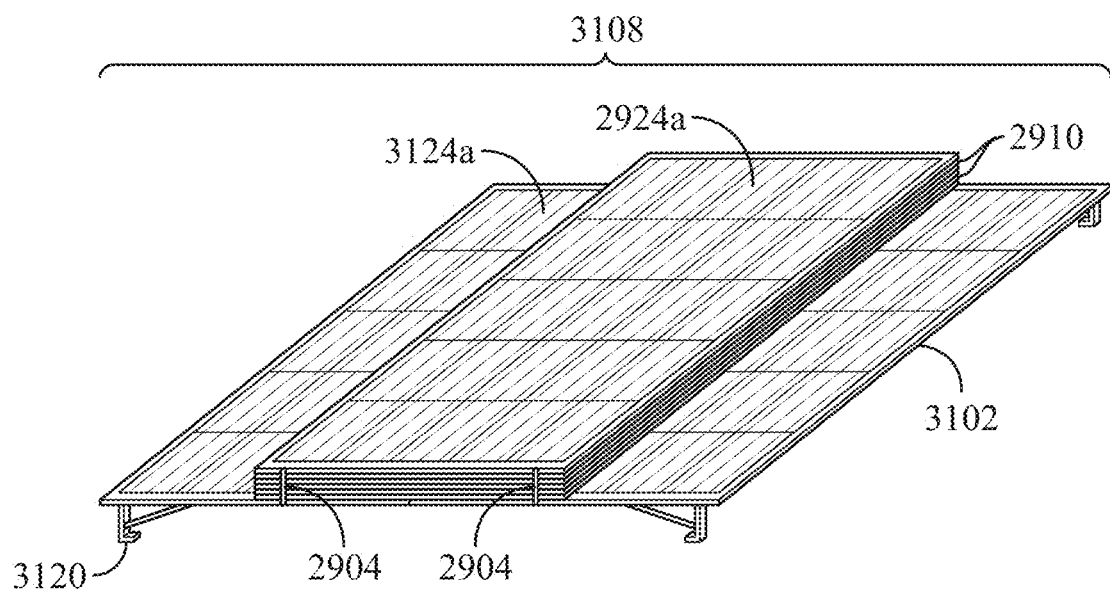
FIG. 32 shows a perspective view of the fourth embodiment of the solar platform incorporated on top of the flat solar panel and in a folded position.

Referring now to FIGS. 31-32, perspective views of the fourth embodiment of the solar platform incorporated on top of a flat solar panel and in deployed and folded positions are shown. The solar platform 3108 shown in FIGS. 31-32 may be similar to the solar platform 2908 of FIGS. 29-30 and what has been described elsewhere herein. The main difference of the solar platform 3108 may be that the stackable solar panels 2910 are placed on top of a larger base solar panel 3102. The base solar panel 3102 may lay horizontal and be wider than the stackable solar panels 2910 and have exposed solar surface 3124*a* areas to directly receive solar irradiation. The stackable solar panels 2910 may be any type and combination of solar panels described elsewhere. By way of example and not limitation, the base solar panel 3102 may be monofacial, transparent (fully or semi-transparent), or bifacial. By way of example and not limitation, the base solar panel 3102 having the stackable solar panels 2910 attached on top of it may be mounted to a frame 3102 with a plurality of legs to be placed on different surfaces, such as the roof of a house, office building, parking structure, or on the ground. By way of example and not limitation, the solar platform 3108 may be incorporated (i.e., integrated or attached) with a vehicle structure or a building structure, as described elsewhere herein with other embodiments of solar platforms.

Figure 33:
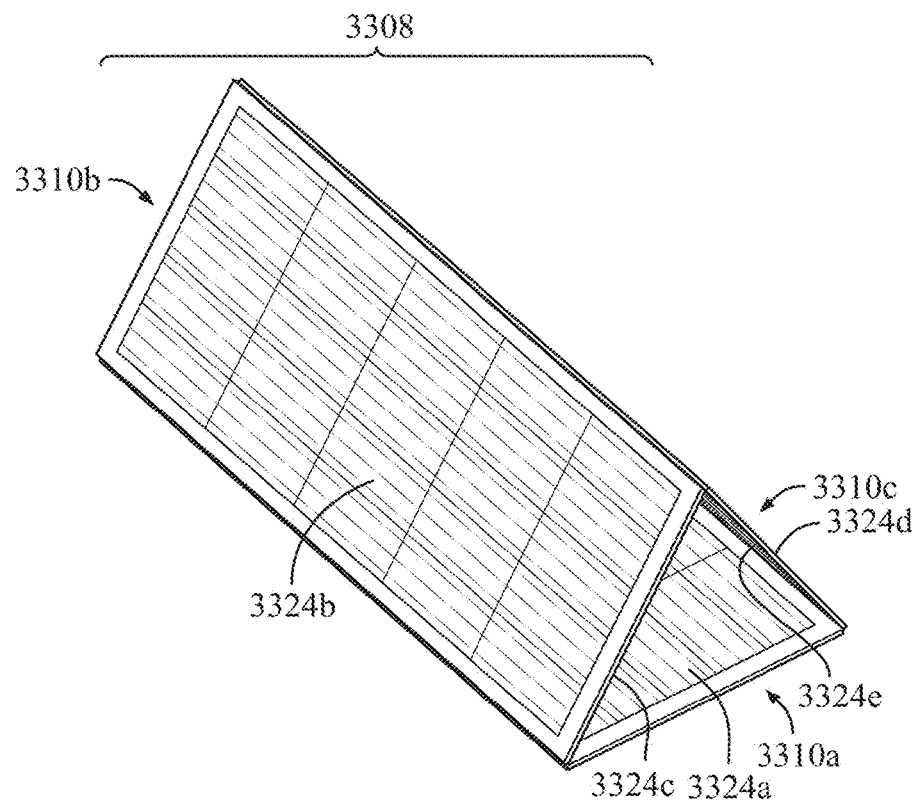
FIG. 33 shows a perspective view of a fifth embodiment of a solar platform in a deployed position.
Figure 34:
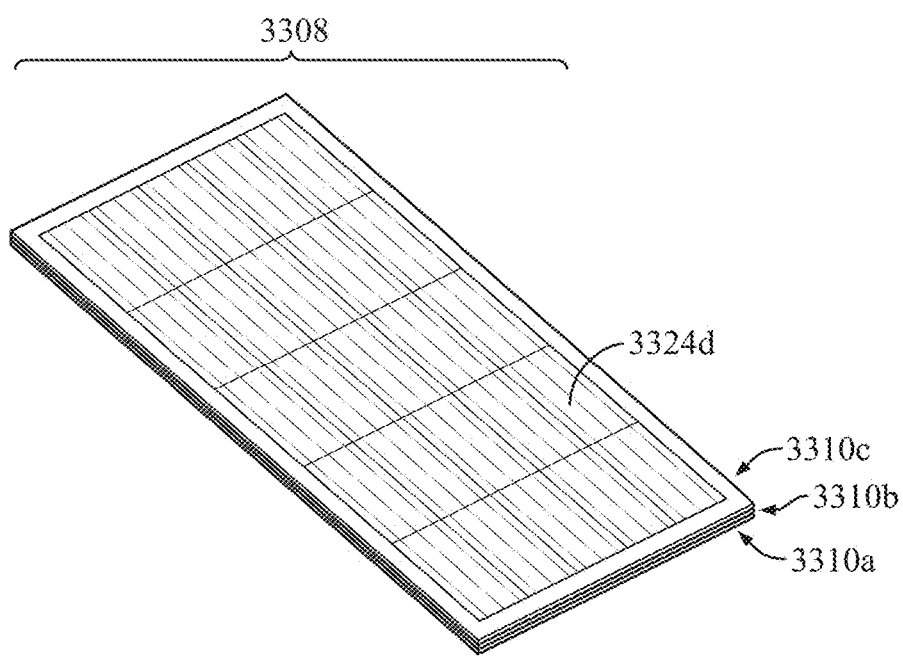
FIG. 34 shows a perspective view of the fifth embodiment of the solar platform in a folded position.

With reference to FIGS. 33-34, perspective views of a fifth embodiment of a solar platform in deployed and folded positions are shown. The fifth embodiment of the solar platform 3308 may have three solar panels 3310*a-c* that are connected with each other to make a triangular prism. Each of the three solar panels 3310*a-c* may make up a lateral face of the triangular prism.

By way of example and not limitation, a first solar panel 3310*a* may be placed flat on a horizontal surface. A second solar panel 3310*b* may have a first longitudinal side attached to a first longitudinal side of the first solar panel 3310*a* and be raised at an incline over the first solar panel 3310*a*, which such attachment may make up a first edge of the triangular prism. A third solar panel 3310*c* may have a first longitudinal side attached to a second longitudinal side of the first solar panel 3310*a* and also be raised at an incline over the first solar panel 3310*a*, which such attachment may make up a second edge of the triangular prism. The second longitudinal side of the second solar panel 3310*b* and the second longitudinal side of the third solar panel 3310*c* may be attached to each other above the first solar panel 3310*a* to make up a third edge of the triangular prism. With such attachment, the triangular prism solar platform 3308 may have a hollow triangular base and interior section. By way of example and not limitation, the solar panels 3310*a-c* may have the same dimensions such that the base of the triangular prism is an equilateral triangle.

The solar platform 3308 in the form of a triangular prism may have outer solar surfaces. The second and third solar panels 3310*b, c* may each have an outer solar surface 3324*b, d* facing the outside environment. By way of example and not limitation, the first solar panel 3310*a* may not have an outer solar surface since its outer surface is contacting a horizontal surface. Alternatively, the first solar panel 3310*a* may have an outer solar surface if mounted on top of a frame like the other embodiments described elsewhere herein. By way of example and not limitation, the first solar panel 3310*a* may have an inner solar surface 3324*a* facing inside of the triangular prism. By way of example and not limitation, the second and third solar panels 3310*b, c* may be bifacial and each may have inner solar surfaces 3324*c, e* facing the inside of the triangular prism. The inner solar surfaces 3324*a, c, e* may harvest solar irradiation that are reflected from nearby surfaces towards the inside of the triangular prism. By way of example and not limitation, one or more of the solar panels 3310*a-c* may be transparent, either fully or semi-transparent. By way of example and not limitation, the second and third solar panels 3310*b, c* may be transparent to allow light that contacts the outer surfaces of such solar panels to reach the inside of the triangular prism and hit the inner solar surface of the first solar panel 3310*a*. By way of example and not limitation, the first solar panel 3310*a* may be monofacial or may be transparent.

As shown in FIG. 34, the solar platform 3308 may be folded such that the solar panels 3310*a-c* are rested flat on top of each other. The folding may be done by detaching one or more of the longitudinal edges of the solar panels that were connected with each other in the deployed position. By way of example and not limitation, the second longitudinal edges of the second and third solar panels 3310*b, c* that are over the first solar panel 3310*a* may be detached from each other so that these solar panels can rest on the first solar panel 3310*a*. In another example, the first longitudinal edge of the third solar panel 3310*c*, opposite to its second longitudinal edge, may be detached from the second edge of the first solar panel 3310*a* and the third solar panel 3310*c* may be folded on the second solar panel 3310*b* such that the inner solar surfaces 3324*c, e* contact each other, and the second and third solar panels 3310*b, c* may be folded on top of the first solar panel 3310*a* such that the outer solar surface 3324*d* of the third solar panel 3310*c* contacts the inner surface 3324*a* of the first solar panel 3310*a*. Other types of detachment and folding steps are also contemplated herein.

As described herein, the solar panels or portions thereof (e.g., frame or border) may be transparent or semi transparent to allow the sunlight to pass through the transparent portion and be absorbed by solar panels behind such solar panels or portions thereof. Moreover, the solar panels and/or portions thereof may have a mirror finish to allow the sunlight to be reflected and ultimately absorbed by solar cells on a different solar panel. By way of example, for solar panels with solar cells on one side of the solar panel, the non activated side (i.e., side without solar cells) may have a mirror (e.g., mirror or mirror finish) to allow sunlight or rays of the sun to be reflected off of the mirror and onto the solar cells of a different panel.

Referring now to FIG. 36, a perspective view of a sixth embodiment of a solar platform 608 is shown. The base solar panel 610 that lies flat may have a plurality of riser solar panels 602 that project upwards from the base solar panel 610. By way of example and not limitation, the base solar panel 610 may be one large solar panel or be made from multiple smaller solar panels. As used herein, the base solar panel 610 may be referred as a singular term although a plurality of base solar panels 610 may be attached to create the surfaces for the riser solar panels 602 to project upward therefrom. The riser solar panels 602 take advantage of a dimension that conventional solar panels do not take into account, mainly the vertical dimension above the base solar panel 610. As such, the solar platform 608 obtains three-dimensional active sides to harvest more solar energy since the riser solar panels 602 are erected from the planar solar surface of the base solar panel 610. As such, the solar platform 608 is more than one flat active surface area by being three-dimensional and taking advantage of the available volume above the solar platform 608. Consequently, the energy density of the solar platform 608 increases since more energy can be harvested per cubic meter with the inclusion of the riser solar panels 602 that, among other things, harvest sun rays that are reflected by the active surface of the base solar panel 610. Although the active surface of the base solar panel 610 may be designed to absorb photons of the sun rays, some of the photons hitting such surface may nevertheless be reflected. The riser solar panels 602 act as a mechanism capturing the reflected photons from the base solar panel 610.

The sixth embodiment of the solar platform 608 disclosed herein may be incorporated with different types of electric, hybrid, or regular internal combustion engine vehicles. Such vehicles may include trucks, vans, minivans, SUVs, semitrucks, buses, recreational vehicles, motorhomes, trailers, station wagons, hatchbacks, crossovers, sedans, coupes, compact automobiles, and other types of vehicles and automobiles. The solar platform 608 may be attached or integrated with a top surface of such vehicles (e.g., roof of the vehicle), or any other vehicles, such as aerial vehicles. The solar platform 608 described herein may also be incorporated with buildings, such as parking structures, homes, office buildings, stadiums, and other types of building structures. The solar platform 608 described herein may also simply be on a frame and placed on the ground. Specifically with the incorporation of the solar platform 608 with the vehicle, the solar platform 608 may be attached or integrated with the roof of a vehicle or the top of a cap (e.g., a camper shell) or the tonneau cover of a truck, to name a few examples. The solar platform 608 may be connected to the electrical components and a battery of the vehicle. For example, the solar platform may be used to charge the battery of an electric vehicle, a deep cycle battery, or charge and power other electronic devices. The solar platform 608 may also be connected to a computing system of the vehicle to receive commands to deploy, fold, and operate some or all of the solar panels using an automated motorized mechanism. Alternatively, solar platform 608 may have its own computing system that operates the solar panels.

By way of example and not limitation, the solar panels described herein may be solar photovoltaic panels, where each solar panel may have a plurality of solar cells ranging between one to 120 solar cells. By way of example and not limitation, the solar panels described herein may be monocrystalline, polycrystalline, or thin-film solar panels. By way of example and not limitation, the base solar panels 610 may be monocrystalline or polycrystalline and the riser solar panels 602 may be thin-film solar panels. However, any other combination of the type of solar panels may be used with the solar platform 608, or all of the solar panels may be the same type. The solar panels of the solar platform 608 may be monofacial, having one active side, or bifacial, having two active sides. By way of example and not limitation, the solar panels of the solar platform 608 may be transparent solar panels, either fully transparent or semi-transparent. By way of example and not limitation, each solar panel may generate between 0.1 to 0.5 kWh energy depending on the location, the weather, the time of day and year, and the type of solar panel. Alternatively, each solar platform may supply from 1 kilowatt to 12 kilowatts depending on the location, the weather, the time of day and year, and the type and number of solar panels.

By way of example and not limitation, the base solar panel 610 may be rectangular and be one singular solar panel or multiple small solar panels combined with each other to make one large rectangular base solar panel 610. By way of example and not limitation, the base solar panel 610 may have an active side that is flat and parallel to the ground and facing towards the sky. Alternatively, the base solar panel 610 may be at an incline relative to the ground. By way of example and not limitation, the base solar panel 610 may be mounted to a frame 620. By way of example and not limitation, the total length 616 of the base solar panel 610 may be between six to 80 inches. By way of example and not limitation, the total length 616 of the base solar panel 610 may be between four to 45 times larger than the heights of each of the riser solar panels 602. The total length 616 of the base solar panel 610 may be important because of how many riser solar panels 602 may be installed on top of it and how packed the riser solar panels 602 may be placed next to each other. By way of example and not limitation, the total width 613 of the base solar panel 610 may be between six to 60 inches.

By way of example and not limitation, the frame 620 may have two longitudinal portions and two lateral portions defining the frame body and an opening therebetween. The frame 620 may have the same features as explained elsewhere herein. By way of example and not limitation, the frame 620 may be rectangular and have similar dimensions as the base solar panel 610 such that the base solar panel 610 is fixedly mounted therebetween. By way of example and not limitation, the frame 620 may have one or more mounting mechanisms 630, such as frame legs on each corner edges of the frame 620. The frame 620 and its mounting mechanisms 630 may be used to place the solar platform 608 on building structures or attached on top of vehicles, as described elsewhere herein.

By way of example and not limitation, a plurality of riser solar panels 602 may project upwards from the base solar panel in a 90-degrees direction or at an incline direction. By way of example and not limitation, each plurality of riser solar panels 602 may extend along the total width 613 of the base solar panel 610 from one longitudinal side to the other longitudinal side of the frame 620. Alternatively, each riser solar panel 602 may extend along a portion of the total width 613 of the base solar panel 610, such as by being centered on the base solar panel 610 and spaced apart from the longitudinal edges of the base solar panel 610 and the frame 620. By way of example and not limitation, there may exist between one to 50 riser solar panels projecting upwards from the base solar panel 610. The riser solar panels 602 may be packed closely to each other or farther from each other. By way of example and not limitation, the riser solar panels 602 may be spaced away from each other along the total length 616 of the base solar panel 610 in the range of one to 36 inches from each other. This means that adjacent riser solar panels 602 may be spaced away from each other in the range of one to 36 inches. In one example, if the base solar panel 610 is 40-inches long, then there may be 20 riser solar panels 602 on the base solar panel 610 that are each equidistantly spaced from each other by two inches. In a similar example, if the base solar panel is 40-inches long, then there may be 40 riser solar panels 602 on the base solar panel 610 that are each equidistantly spaced from other by one inch. As explained elsewhere herein, and by way of example and not limitation, the height of each riser solar panel 602 may range between one to eight inches, where the relative packing of the riser solar panels may determine such height.

By way of example and not limitation, each riser solar panel 602 may be monocrystalline, polycrystalline, or thin-film solar panels. By way of example and not limitation, each riser solar panel 602 may be bifacial by having two active solar sides on each rising surface of the solar panel to maximize solar energy harvesting. Alternatively, the riser solar panels 602 may be mono-facial for a design where the solar platform 608 rotates throughout the day to face the sun. By way of example and not limitation, each riser solar panel 602 may be made from 1 to 24 solar cells extending across the total width 613 of the base solar panel 610 from one longitudinal section to another of the frame 620. By way of example and not limitation, the riser solar panels 602 may be transparent, semi-transparent, or a combination thereof. In one example, the riser solar panels 602 at the very outer edges of the solar platform 608 may be semi-transparent and the riser solar panels therebetween being transparent, or vice versa. In another example, the riser solar panels 602 adjacent to each other may alternate between transparent and semi-transparent. Such combinations and the usage of transparent riser solar panels, in general, may allow for a better capturing of solar energy throughout the day, especially if the solar platform 608 is fixed in a stationary position. The usage of transparent and semi-transparent riser solar panels 602 may reduce the possible shadow that such solar panels may project on the base solar panel 610 and on each other.

Referring now to FIGS. 37A-F, side views of the sixth embodiment of the solar platform 608 with the riser solar panels 602*a*-*c* having different heights 615*a*-*c* is shown. As shown in FIG. 37A, and by way of example and not limitation, the solar platform 608 may have 23 riser solar panels 602*a* having small heights. By way of example and not limitation, the small-height riser solar panels 602*a* may have a height 615*a* ranging between 0.75 to 1.95 inches. As explained elsewhere herein, the number of small riser solar panels 602*a* on the solar platform 608 may range from one to 50. As shown in FIG. 37B, and by way of example and not limitation, the solar platform 608 may have 23 riser solar panels 602*b* with medium height. By way of example and not limitation, the medium-height riser solar panels 602*b* may have a height 615*b* ranging between 1.95 to 2.95 inches. As explained elsewhere herein, the number of medium riser solar panels 602*b* on the solar platform 608 may range from one to 50. As shown in FIG. 37C, and by way of example and not limitation, the solar platform 608 may have 23 riser solar panels 602*c* with a long height. By way of example and not limitation, the long-height riser solar panels 602*c* may have a height ranging between 3.0 to 6.95 inches. As explained elsewhere herein, the number of long riser solar panels 602*c* on the solar platform 608 may range from one to 50.

Although FIGS. 37A-C show the riser solar panels 602*a*-*c* of different heights being spaced apart at the same distance, FIGS. 37D-E show the spacing apart of the riser solar panels 602*b*-*c* by taking the height of such panels into consideration. Longer riser solar panels 602*a*-*c* may need to be spaced apart from each other further to possibly prevent the interference (e.g., casting of shadow) with adjacent riser solar panels and their harvesting of solar energy. For maximum solar harvesting, the riser solar panels may be closely packed with each other to a limit where the adjacent riser solar panels do not interfere (e.g., cast shadow) with the solar harvesting of each other. This reason may be why the range of heights of the riser solar panels and the range of space between them, as described elsewhere herein, may be an important design factor.

By way of example and not limitation, the medium riser solar panels 602*b* (see FIG. 37D) may be at least 1.5 times spaced apart from each other when compared to the spacing of short riser solar panels 602*a* (see FIG. 37A). By way of example and not limitation, the medium riser solar panels 602*b* may be at least 2 times spaced apart from each other when compared to the spacing of short riser solar panels 602*a*. By way of example and not limitation, the short riser solar panels 602*a* (see FIG. 37A) may each be spaced apart from each other between one to 18 inches. By way of example and not limitation, the long riser solar panels 602*c* (see FIG. 37E) may be at least 2.5 times spaced apart from each other when compared to the spacing of short riser solar panels 602*a* (see FIG. 37A), or at least 1.5 times spaced apart when compared to the medium riser solar panels. By way of example and not limitation, the long riser solar panels 602*c* may be at least 3 times spaced apart from each other when compared to the spacing of short riser solar panels 602*a* (see FIG. 37A), or at least 2 times spaced apart when compared to the medium riser solar panels. By way of example and not limitation, the short riser solar panels 602*a* (see FIG. 37A) may each be spaced apart from each other between one to 18 inches.

As shown in FIG. 37F, the solar platform 608 may have a combination of riser solar panels 602*a*-*b* with different heights and the riser solar panels 602*a*-*b* being spaced apart differently. By way of example and not limitation, the riser solar panels 602*b* at the outer edges of the solar platform 608 and the center riser solar panel 602*b* may be longer panels while the other riser solar panels may be small panels 602*a*. By way of example and not limitation, the longer riser solar panels may be medium or large while the smaller riser solar panels may be small or medium. Alternatively, a combination of all three sizes, small, medium, and large may be used. By way of example and not limitation, the riser solar panels adjacent to each other may alternate in height between longer and shorter panels. The longer panels may be medium or large while the smaller solar panels may be small or medium. Alternatively, a combination of all three sizes, small, medium, and large may be used. As shown in FIG. 37F, and by way of example and not limitation, smaller riser solar panels 602*a* may be closely spaced from each other while the longer riser solar panels 602*b* may be spaced farther apart from each other. The longer riser solar panels may be medium or long while the shorter riser solar panels may be short or medium. The different spacing apart of the riser solar panels may be as described elsewhere herein.

Referring now to FIGS. 38A-C, side views of the sixth embodiment of the solar platform 608 where the riser solar panels 602 are pivotable are shown. By way of example and not limitation, each riser solar panel 602 may have a pivoting mechanism 614. By way of example and not limitation, the pivoting mechanism 614 for each riser solar panel 602 may be one or more hinges. By way of example and not limitation, the pivoting mechanisms 614 may be embedded in recesses formed on the base solar panel 610. By way of example and not limitation, the pivoting mechanisms 614 may be embedded in recesses formed on the longitudinal sides of the frame 620. Consequently, each riser solar panel may rotate clockwise or counterclockwise and change orientation from the orthogonal direction relative to the base solar panel 610. Alternatively, the riser solar panels 602 may be attached and affixed to the base solar panel 610 in an orthogonal direction without being able to pivot. The fixedly attached design may be sturdier than the pivotable design and, as a result, the solar platform 608 may be more durable.

The pivoting mechanism 614 of each riser solar panel 602 may rotate such solar panel about an axis that extends across the width 613 (see FIG. 36) of the base solar panel 610. In other examples, the rotation axis may extend across the length 616 of the base solar panel 610 if the riser solar panels 602 extend across such length. By way of example and not limitation, each riser solar panel 602 may be free to pivot by a range of 10 to 160-degrees from its orthogonal orientation, or relative to the base solar panel 610, when the riser solar panel 602 are closely packed next to each other. By way of example and not limitation, each riser solar panel 602 may be pivotable by up to 180-degrees when they are not closely packed next to each other such that each riser solar panel 602 may pivot and lay flat on the base solar panel 610. Other pivoting ranges described elsewhere herein are also contemplated with respect to the sixth embodiment of the solar platform 608.

By way of example and not limitation, the pivoting mechanisms 614 of the riser solar panels 602 may be synchronized with each other where the riser solar panels 602 are all pivoted by the same angular displacement as each other. The synchronized pivoting may allow for a more convenient way to pivot the riser solar panels 602. Alternatively, the pivoting mechanism 614 of each riser solar panel 602 may pivot independent from each other. The independent pivoting may allow for more orientation options of the riser solar panels 602. The pivoting of the riser solar panels 602 may be necessary for the riser solar panels 602 to face the sun and its solar radiation at an optimum orientation, as described elsewhere herein. Also, the pivoting of the riser solar panels 602 may make the solar platform 608 more aerodynamic if the solar platform 608 is installed on a vehicle and it is in motion. By way of example and not limitation, the pivoting mechanisms 614 may be motorized and automated, as described elsewhere herein. By way of example and not limitation, the pivoting mechanisms 614 may be controlled by a remote controller, as described elsewhere herein. Alternatively, the pivoting mechanisms 614 may be actuated manually, as described elsewhere herein. In general, and by way of example and not limitation, the sixth embodiment of the solar platform 608 may have the same features as described elsewhere herein, including with respect to FIG. 35. The sixth embodiment of the solar platform 608 may also be controlled and monitored by a software application on a mobile device, as described elsewhere herein.

As shown in FIG. 38C, and by way of example and not limitation, the pivoting mechanisms 614 may be used to fold the riser solar panels 602 on each other. Although FIG. 38C shows the riser solar panels 602 folded on each other, in other examples the riser solar panels 602 may fold flat on the base solar panel 610 when there are either less riser solar panels 602 or more spacing between them. By way of example and not limitation, the riser solar panels 602 may pivot to the folded position by a motorized and automated mechanism, as described elsewhere herein. Alternatively, the riser solar panels 602 may pivot to the folded position by manual actuation, as described elsewhere. For example, the riser solar panels 602 may be spring biased to the deployed position. The riser solar panels 602 may be pushed down by hand and locked in place with a fastening mechanism that is traversed automatically as soon as the panels are pushed down to the stored position as shown in FIG. 38C.

Referring now to FIGS. 39A-B, side views of the sixth embodiment of the solar platform 608 where the base solar panel 610 has a shorter length is shown. By way of example and not limitation, the sixth embodiment of the solar platform 608 may also have a miniature version, as shown in FIGS. 39A-B, where the length 616a of the base solar panel 610 may range between five to eight inches. By way of example and not limitation, the riser solar panels may have the same height and be pivotable on the miniature version of the solar platform 608, as described elsewhere herein. As shown in FIG. 39B, and by way of example and not limitation, the miniature version of the solar platform 608 may have riser solar panels 602 having a height 615d of five to six inches. By way of example and not limitation, the width of the miniature version of the solar platform 608 may be between four to seven inches. The miniature version of the solar platform 608 may be mounted on smaller objects that do not have enough surface area for the regular version of the solar platform 608. Multiple miniature versions may be connected together and be used in conjunction together, such as six to 12 solar platform 608, to collect solar energy.

Figure 40:
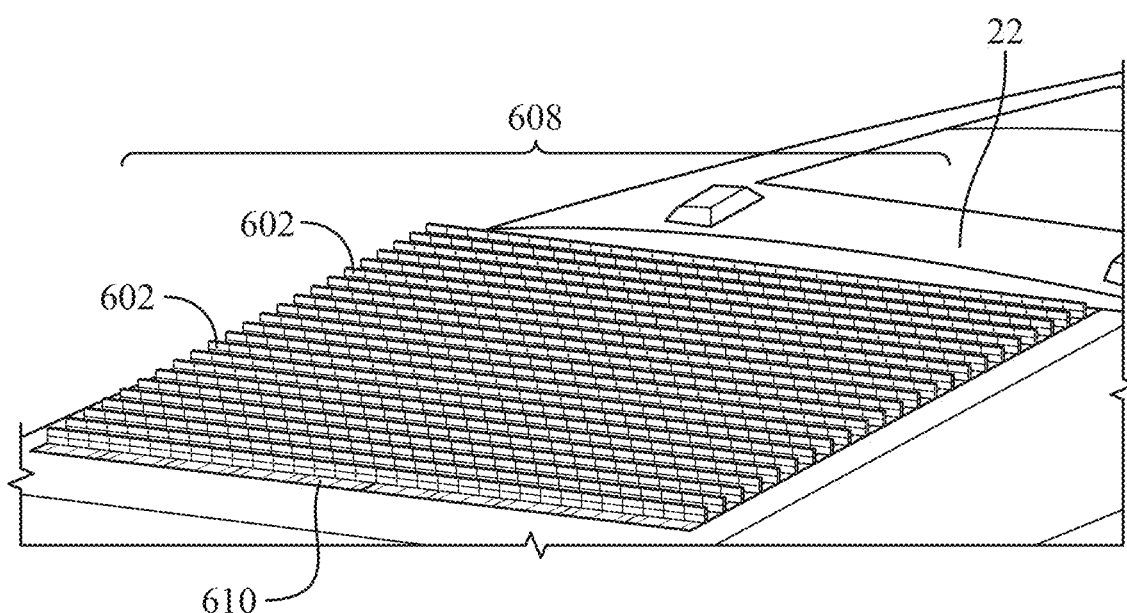
FIG. 40 shows a perspective view of the sixth embodiment of the solar platform on an automobile surface.

Referring now to FIG. 40, a perspective view of the sixth embodiment of the solar platform 608 on the top surface 22 of an automobile is shown. The solar platform 608 may be attached to the vehicle, with or without the frame, or be integrated with the vehicle. By way of example and not limitation, the solar platform 608 may be attached to the roof of the automobile or be integrated with the roof of the automobile by making up a portion of the roof, as described elsewhere herein. By way of example and not limitation, the pivoting mechanisms 614 (see FIGS. 38A-C) of the solar platform 608 may be controlled by interfaces integrated with the automobile, such as a control panel, as described elsewhere herein. By way of example and not limitation, the pivoting mechanisms 614 may be actuated while the vehicle is in motion to have the riser solar panels 602 face the sun and also become more aerodynamic to reduce drag while the vehicle is in motion. The pivoting mechanism 614 may also simply be deployed when the vehicle is at a stop.

Figure 41:
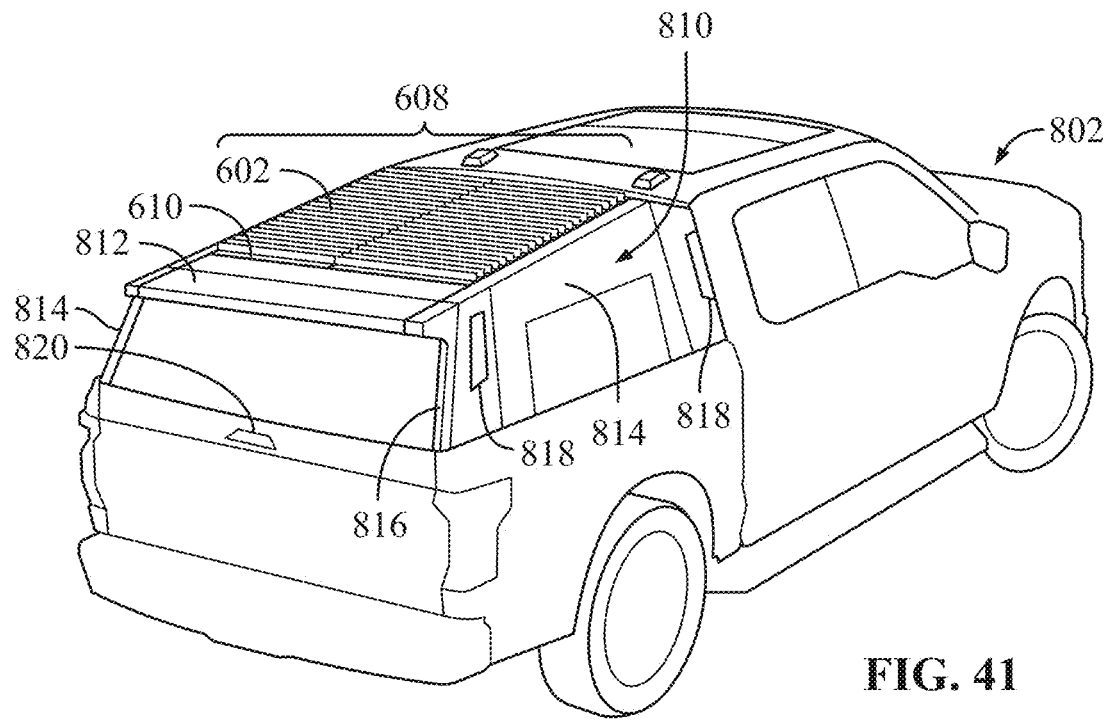
FIG. 41 shows a rear perspective view of a truck having a cap with the sixth embodiment of the solar platform.

Referring now to FIG. 41, a rear perspective view of a truck 802 having a cap 810 with the sixth embodiment of the solar platform 608 is shown. The cap 810 may have the same features as described elsewhere herein. By way of example and not limitation, the sixth embodiment of the solar platform 608 may be attached to the cap 810, with or without a frame, or be integrated with the cap 810 to form part of the top surface of the cap 810 (e.g., cap roof 812), as described elsewhere herein. By way of example and not limitation, the riser solar panels 602 may extend across the left and right side of the truck bed as attached or integrated with the cap 810. Alternatively, the riser solar panels 602 may be attached or integrated with the cap 810 such that they extend upward and downwards of the cap roof 812 and from the rear and front of the truck bed. Alternatively, a smaller version of the solar platform 608 may be integrated to the left and right the side frames 814 of the cap 810.

Figure 42:
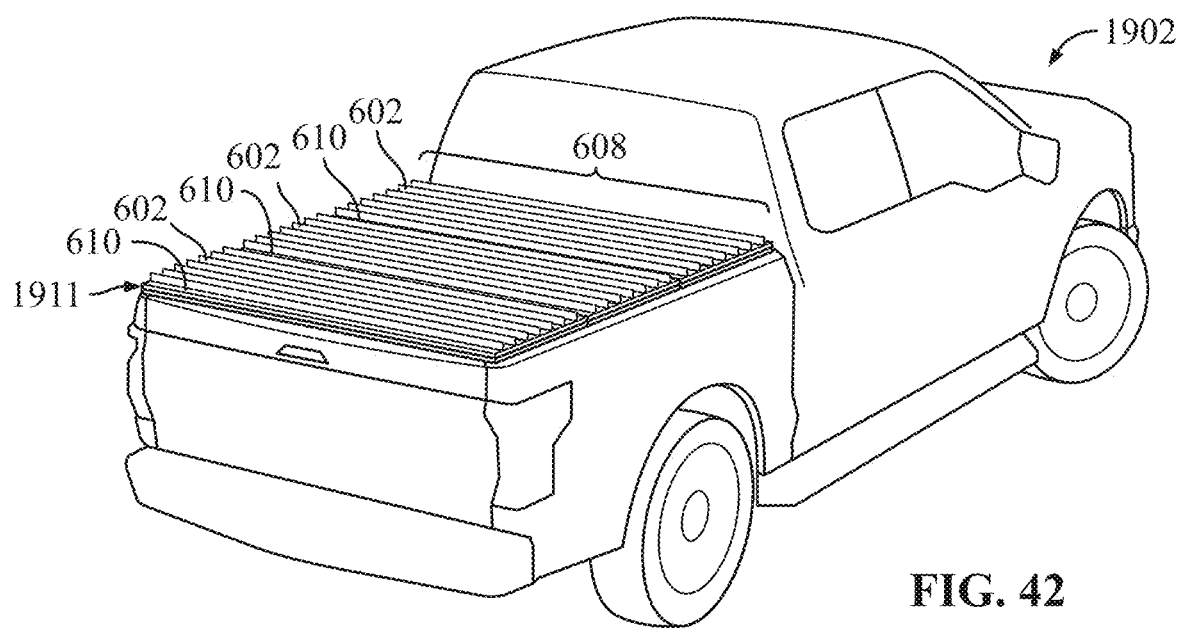
FIG. 42 shows a rear perspective view of a truck having a tonneau cover with the sixth embodiment of the solar platform.

Referring now to FIG. 42, a rear perspective view of a truck 1902 having a tonneau cover 1911 with the sixth embodiment of the solar platform 608 is shown. By way of example and not limitation, the solar platform 608 may be attached to the tonneau cover 1911 or may be integrated to form the structural panels of the tonneau cover 1911. The solar platform 608 and the tonneau cover 1911 may have the same features as described elsewhere herein. By way of example and not limitation, the riser solar panels 602 may extend across the left and right side of the truck bed as attached or integrated with the tonneau cover 1911. Alternatively, the tonneau cover 1911 having the solar platform 608 may be shifted such that the riser solar panels 602 may extend across the rear and the front of the truck bed.

Figure 43:
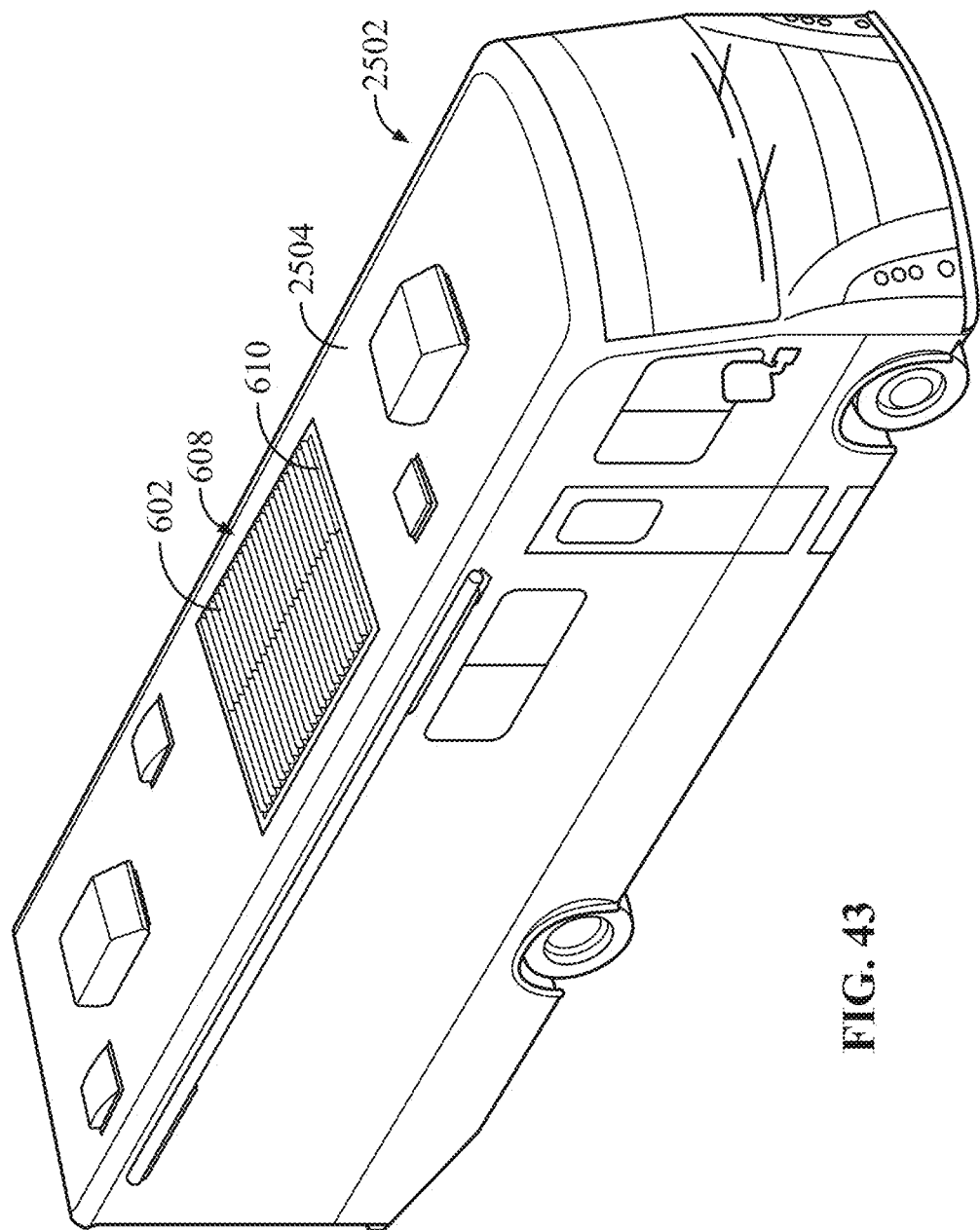
FIG. 43 shows a perspective view of a recreational vehicle with the sixth embodiment of the solar platform.

Referring now to FIG. 43, a perspective view of a recreational vehicle 2502 with the sixth embodiment of the solar platform 608 attached or integrated on the roof 2504 of the recreational vehicle 2502 is shown. The recreational vehicle 2502 may have the same parts and features as described elsewhere herein. The solar platform 608 may have the same parts and features as described elsewhere herein.

Figure 44:
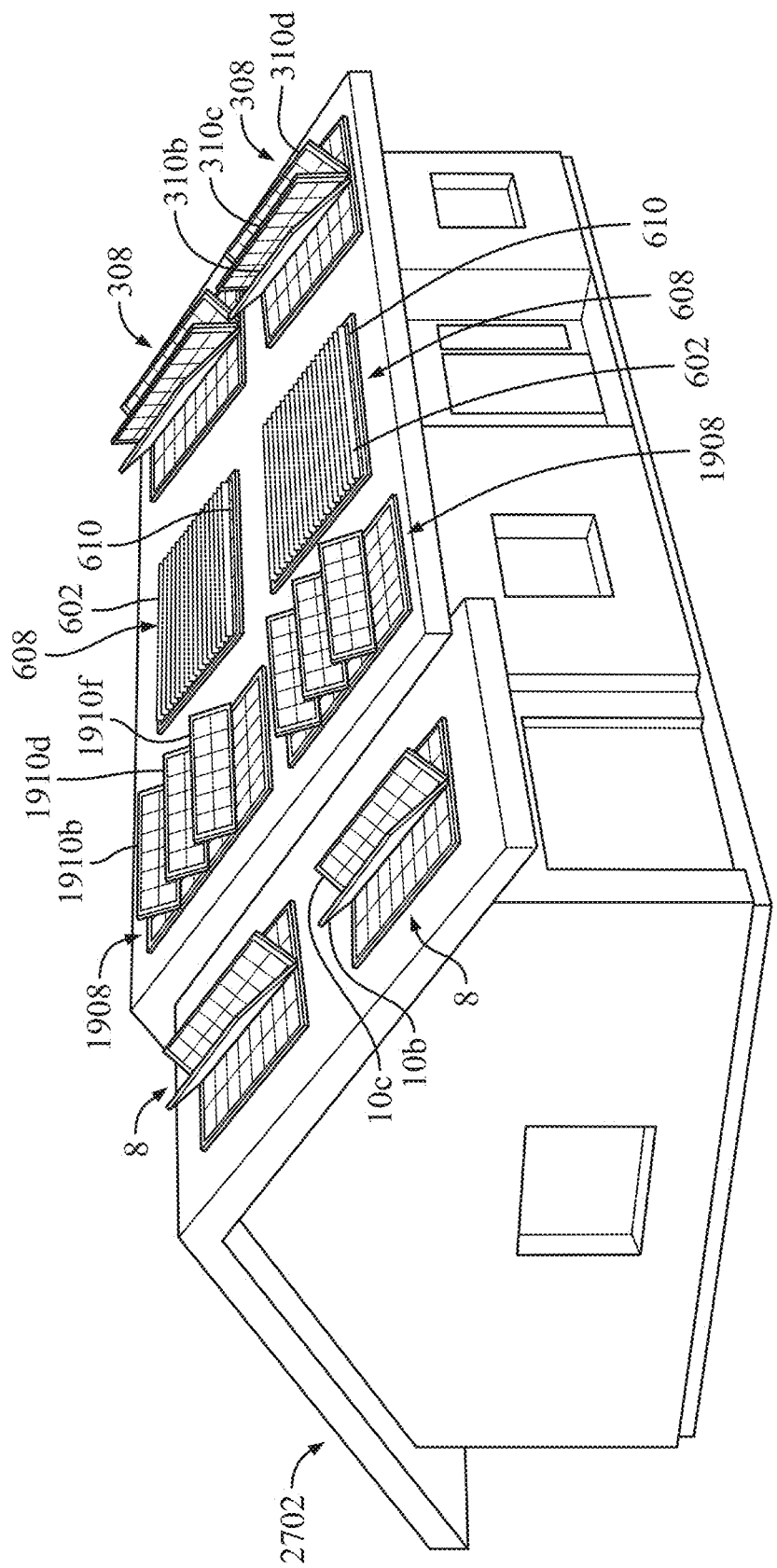
FIG. 44 shows a perspective view of a house with multiple solar platforms including the sixth embodiment of the solar platform.
Figure 45:
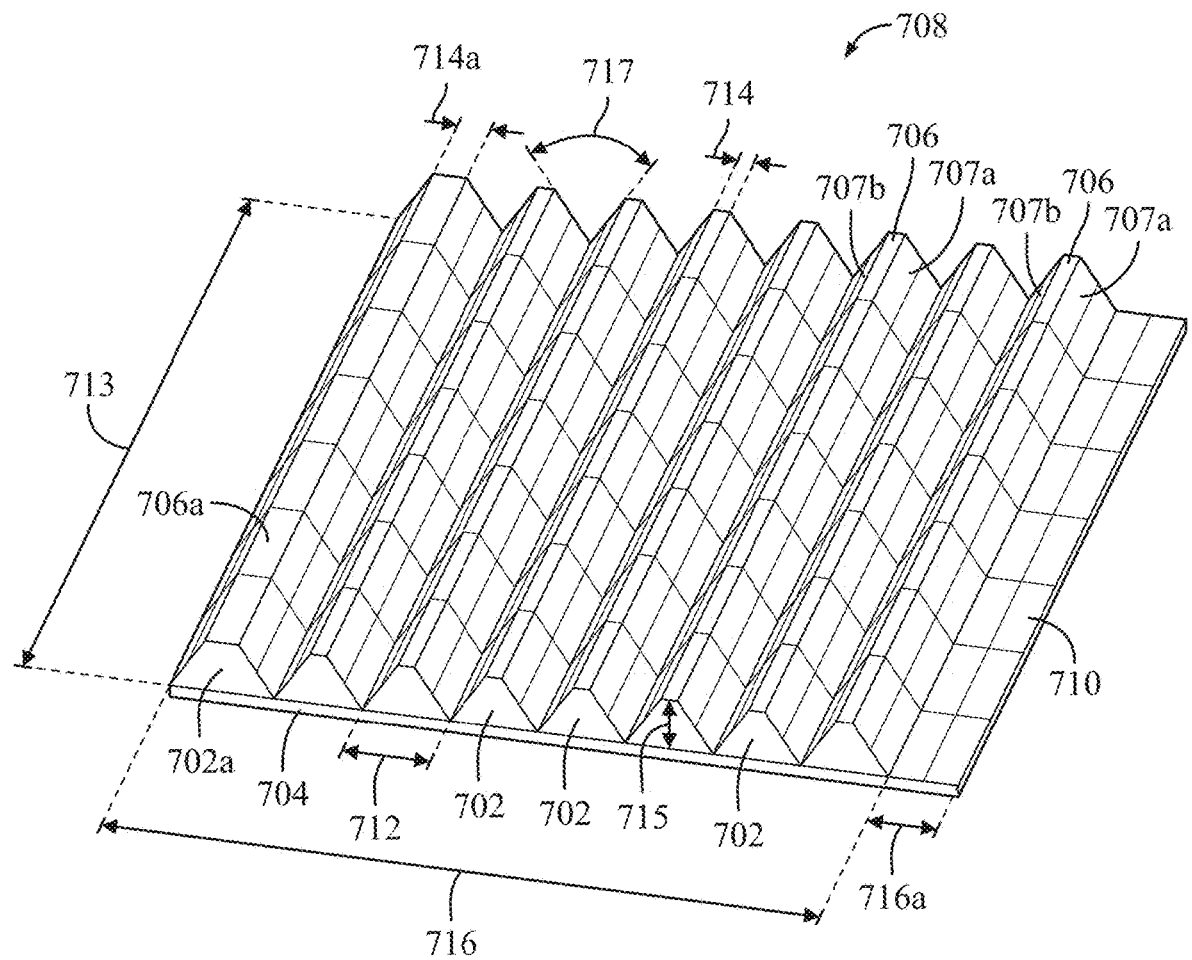
FIG. 45 shows a perspective view of a new embodiment of a solar panel.

Referring now to FIG. 44, a perspective view of a building structure, such as a house 2702, with multiple solar platforms including the sixth embodiment of the solar platform 608. The building structure may be the same as the types as described elsewhere herein. The solar platform 608 attached to the building structure may have the same parts and features as described elsewhere herein.

Referring now to FIG. 45, a perspective view of a new embodiment of a solar panel is shown. By way of example and not limitation, the new embodiment may be an embossed solar panel 708 that may have a plurality of embossed solar photovoltaic cell beams 702 that are each in the shape of a triangular or trapezoidal prism. Alternatively, planar solar cells may be attached on the lateral faces of a frame beam having a shape of a triangular or trapezoidal prism to give each beam of the embossed solar cell beam 702 the aforementioned prism shapes. Although for the sake of brevity the embossed solar cell beams 702 are described elsewhere herein as having triangular prims shapes, such embossed solar cell beams 702 may also have a trapezoidal prism shape or any other type of prism shape. The embossed solar cell beams 702 may be bonded and adjacent to each other to make up the embossed solar panel 708. By way of example and not limitation, the bonding of the embossed solar cell beams 702 may be done on top of an underlying substrate 704 holding the embossed solar panel 708 together. By way of example and not limitation, the embossed solar panel 708 may have embossed solar cell beams 702 in the range of two to 32 beams. As shown in FIG. 45, the embossed solar panel 708 has eight embossed solar cell beams 702.

By way of example and not limitation, the embossed solar panel 708 may be rectangular having a panel length 716 and a panel width 713. By way of example and not limitation, a plurality of embossed solar cell beams 702 may be attached next to each other along the panel length 716 such that the lateral faces of each embossed solar cell beam 702 extend across the panel width 713. By way of example and not limitation, the panel length 716 may be between six to 36 inches and the panel width 713, and consequently the length of the embossed solar cell beams 702, may be six to 32 inches. By way of example and not limitation, the underlying substrate 704 having the embossed solar cell beams 702 on top may have the same length and width as the panel length 716 and panel width 713. By way of example and not limitation, each embossed solar cell beam 702 may be a unitary beam or a beam made of a plurality of triangular prism solar cells, where the triangular base cross-section of the plurality of solar cells contact and are bonded to each other to make the embossed solar cell beam 702. By way of example and not limitation, the embossed solar cell beams 702 may come in a triangular prism shape having active sides 707a-b on the lateral faces that face outwards and towards the sky. By way of example and not limitation, the active solar surface sides 707a-b of adjacent embossed solar cell beams 702 may form a V-shape with each other since they are at an incline and on the lateral faces of the prism-shaped embossed solar cell beams 702. Alternatively, planar solar cells may be bonded on the lateral faces of a beam frame having the triangular prism shape.

The usage of the embossed solar cell beams 702 allows for the presence of more active solar surfaces 707a-b for harvesting solar energy since the embossed solar panel 708 takes a volumetric approach in harvesting solar energy rather than the conventional per square area approach with planar solar panels. The solar cell beams 702 have three-dimensional solar surfaces with the active sides 707a-b being two of the lateral faces of the triangular prism beam, the lateral faces inclining upwards from the underlying substrate 704 of the embossed solar panel 708. This three-dimensional approach allows to harvest solar energy per cubic meter rather than per square meter since the embossed solar panel 708 takes advantage of a third dimension (e.g. vertical dimension above solar panels) not conventionally used. Consequently, the generation of solar power may be increased since power is being generated per volume rather than per area. By way of example and not limitation, the solar photovoltaic cells used may be monocrystalline, polycrystalline, or thin-film.

The triangular prism shape of the embossed solar cell beams 702 may also provide solar surfaces that are in the optimum position relative to the sun at each time of the day. As the sun rises from the east and sets on the west, the sun may move parabolically over the embossed solar cell beams 702, for example from the flat solar panel 710 to the outer solar cell beam 702a. During such parabolic trajectory of the sun, at least some of the active sides 707a-b and the flat lateral portions 706 would be at an optimum orientation relative to the sun because of such surfaces being correspondingly inclined and flat relative to each other. Additionally the V-shape structure that is created between the embossed solar cell beams 702 due to the active sides 707a-b being inclined, and on the lateral faces of the beams, may allow such surfaces to harvest reflected photons from adjacent corresponding active sides 707a-b. Although the active sides 707a-b are designed to capture photons of the sunray irradiated on them, some of the photons may nevertheless be reflected. However, the adjacent active side 707a-b may capture such reflected photon due to the three-dimensional aspect of the embossed solar panel 708 and the V-shaped structure that the embossed solar cell beams 702 and their active sides 707a-b make relative to each other. Alternatively, instead of the active sides 707a-b inclining upwards towards the flat lateral portions 706 of the protruding embossed solar cell beams 702, the active sides 707a-b may incline and sink downwards to create debossed recesses within the solar panel. In other words, the V-shaped structure created by the solar cell beams may be debossed instead of embossed.

By way of example and not limitation, the lateral edges of each of the embossed solar cell beams 702 that may be pointing upwards towards the sky and extending across the panel width 713 may be a flat lateral portion 706 having a third active side for each embossed solar cell beam 702. Consequently, the flat lateral portions 706 may increase solar power generation by the embossed solar panel 708 since such edges provide additional solar surfaces. Due to the embossed solar cell beams 702 of FIG. 45 having the flat lateral portions 706 instead of a pointed lateral edge, the embossed solar cell beams 702 may be considered to be in a trapezoidal prism shape instead of a triangular prism shape. Consequently, the flat lateral portion 706 of each embossed solar cell beam 702 may be considered another lateral face of the trapezoidal prism.

Figure 46A:
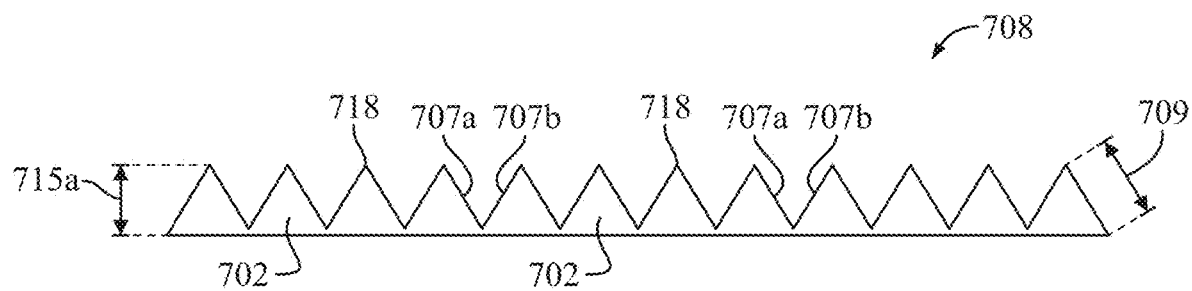
FIGS. 46A-B show side and angled views of another example of the new embodiment of the solar panel.
Figure 46B:
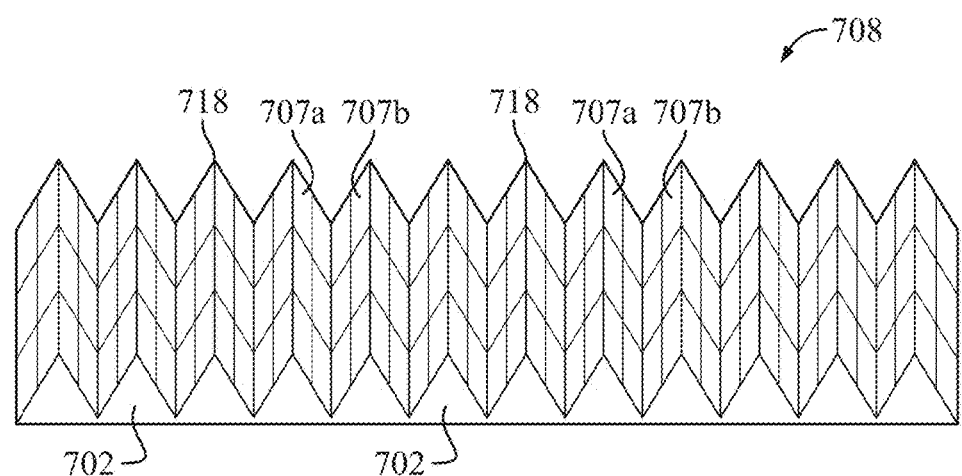

By way of example and not limitation, the triangular prism solar cell beams 702 may have an equilateral or isosceles triangular base cross section, without taking into account the flat lateral portions 706, similar to what is shown in FIGS. 46A-B. By way of example and not limitation, the sides of the triangular cross-section having the lateral faces with the active sides 707a-b may have equal dimensions. As shown in FIG. 46A, and by way of example and not limitation, the lateral faces having the active sides 707a-b may have a face width 709 of 0.5 to three inches with or without taking the flat lateral portion 706 shown in FIG. 45 into consideration. By way of example and not limitation, all of the lateral faces having active sides 707a-b for each embossed solar cell beam 702 may have the same face width 709. By way of example and not limitation, the length of the lateral faces having the active sides 707a-b, which may be the same as panel width 713, and may be six to 32 inches.

Referring back to FIG. 45, and by way of example and not limitation, the bottom side of the triangular cross-section of each embossed solar cell beam 702 having the bottom lateral face, which may be an inactive side, may have a side length 712 ranging between 0.5 to three inches. By way of example and not limitation, all of the bottom lateral faces may have the same side length 712. By way of example and not limitation, the side length 712 may be equal to the face width 709 (see FIG. 46A) if the triangular cross-section of the embossed solar cell beams 702 is an equilateral triangle. By way of example and not limitation, if there are eight embossed solar cell beams 702 and each beam has a side length 712 of one inch, then the solar panel length 716 would be eight inches.

Referring back to FIG. 45, and by way of example and not limitation, the flat lateral portion width 714 may be between 0.1 to 0.75 inches. By way of example and not limitation, all of the flat lateral portions 706 may have the same width or different ones, as described elsewhere herein. By way of example and not limitation, the triangular base height 715 of each triangular cross-section of the embossed solar cell beam 702 may be between 0.3 to 2.6 inches. By way of example and not limitation, the triangular height 715 may be the same for all of the embossed solar cell beams 702.

The dimensions may be important to optimize the volumetric solar power generation capacity of the embossed solar panel 708 by creating optimum active sides 707*a-b* having optimum active sides angles 717. By way of example and not limitation, the active side angle 717 that is made between adjacent active sides 707*a-b* of the lateral faces of different embossed solar cell beams 702 may range between 30 to 75-degrees. A larger active side angle 717 may expose the active sides 707*a-b* more to the sun and its solar energy. A smaller active side angle 717, may allow for a better capturing of reflected photons by adjacent active sides 707*a-b*. Although the active sides 707*a-b* of the embossed solar panel 708 may be designed to absorb photons of the sun rays, some of the photons hitting such surfaces may nevertheless be reflected. The inclining of such surfaces and the adjacent active sides 707*a-b* may act as a mechanism that capture the reflected photons from the active side.

By way of example and not limitation, the outer sides of the embossed solar panel 708 (e.g., one, two, or all solar panel sides) where the embossed solar cell beams 702 are in between may have flat solar cells 710. By way of example and not limitation, the flat solar cells 710 may be conventional planar solar cells. With the addition of the side flat solar cells 710, the panel length may increase by additional panel length 716*a*. The incorporation side flat solar cells 710 may be needed for the outer lateral active sides of the outer embossed solar cell beams 702 to have a surface to capture the non-absorbed photons reflected by the side flat solar cells 710.

By way of example and not limitation, the outer embossed solar cell beams 702*a* that the other solar beams are in between may have a wider flat lateral portions 706*a* than the rest of the other embossed solar cell beams 702. By way of example and not limitation, the wider flat lateral portions 706*a* may have a width 714*a* greater than 1.25 times, and possibly greater than 1.5 times, than the width 714 of the regular flat lateral portions 706. The wider flat lateral portions 706*a* may add more incremental solar surface area to increase the energy density of the embossed solar panel 708 where such wide dimension may not be implemented in the middle embossed solar cell beams 702.

Referring now to FIGS. 46A-B, side and angled views of another example of the embossed solar panel 708 is shown. The embossed solar panel 708 may be the same or similar as what has been described with respect to FIG. 45, but the flat lateral portions 706 may be replaced by pointed lateral edges 718. By way of example and not limitation, the pointed lateral edges 718 may be the outer tip on the top of the triangular cross-section of the embossed solar cell beam 702 that is pointing upwards towards the sky. The pointed lateral edges 718 may extend along the length of the embossed solar cell beams 702. By way of example and not limitation, the pointed lateral edge 718 may increase the triangular height to 715*a*.

Figure 47A:
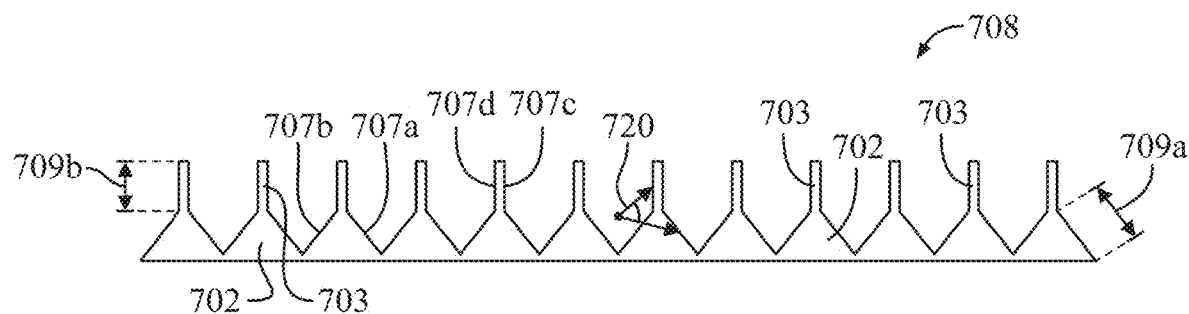
FIGS. 47A-B show side and angled views of another example of the new embodiment of the solar panel.
Figure 47B:
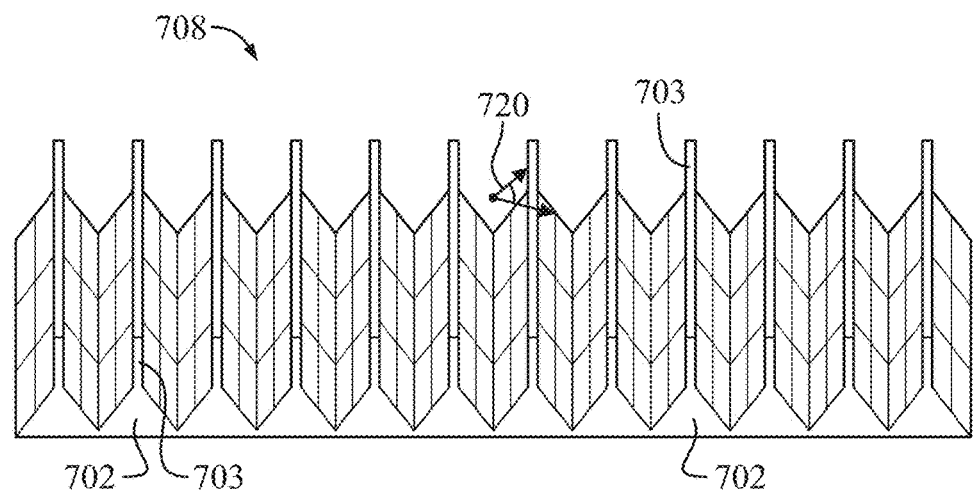

Referring now to FIGS. 47A-B, side and angled views of another example of the embossed solar panel 708 is shown. The embossed solar panel 708 of FIGS. 47A-B may be the same or similar as what has been described with respect to FIG. 45, but the flat lateral portions 706 may be replaced by extended lateral portions 703. By way of example and not limitation, the extended lateral portions 703 may protrude upward from the top lateral edge of the triangular prism of the embossed solar cell beams 702 to create planar vertical solar surfaces sufficient enough to create additional active sides 707*c-d* on each side of the extended lateral portions 703. By way of example and not limitation, the planar vertical solar surfaces of the extended lateral portions 703 protruding from the embossed solar cell beams 702 may have a height 709*b* between 0.1 to 3.6 inches. By way of example and not limitation, the extended lateral portion 703 may be unitarily formed with the rest of the embossed solar cell beam 702 or be modular and a separate piece than the embossed solar cell beam 702. FIGS. 47A-B also show a photon 720 reflected from one of the active sides 707*a-d* and trapped between the embossed solar cell beams 702, and also the extended lateral portions 703, in order to be absorbed by one of the active sides 707*a-d* and increase power generation per cubic meter of the embossed solar panel 708.

By way of example and not limitation, the embossed solar panel 708 may have the same features as the other embodiments of solar platforms described elsewhere herein. By way of example and not limitation, the embossed solar panel 708 may be incorporated with different types of electric, hybrid, or regular internal combustion engine vehicles. Such vehicles may include trucks, vans, minivans, SUVs, semitrucks, buses, recreational vehicles, motorhomes, trailers, station wagons, hatchbacks, crossovers, sedans, coupes, compact automobiles, and other types of vehicles and automobiles. The embossed solar panel 708 may also be incorporated with buildings, such as parking structures, homes, office buildings, stadiums, and other types of building structures. The embossed solar panel 708 may also simply be on a frame and placed on the ground. Specifically with the incorporation of the embossed solar panel 708 with the vehicle, the embossed solar panel 708 may be attached or integrated with the roof of a vehicle or the top of a cap (e.g., a camper shell) or the tonneau cover of a truck, to name a few examples. The embossed solar panel 708 may be connected to the electrical components and a battery of the vehicle. For example, the embossed solar panel 708 may be used to charge the battery of an electric vehicle, a deep cycle battery, or charge and power other electronic devices. The embossed solar panel 708 may also be connected to a computing system of the vehicle to receive commands to deploy, fold, and operate some or all of the solar panels using an automated motorized mechanism, as described elsewhere herein. Alternatively, embossed solar panel 708 may have its own computing system that operates the solar panels. The embossed solar panel 708 may also be controlled and monitored by a software application on a mobile device, as described elsewhere herein.

Figure 48:
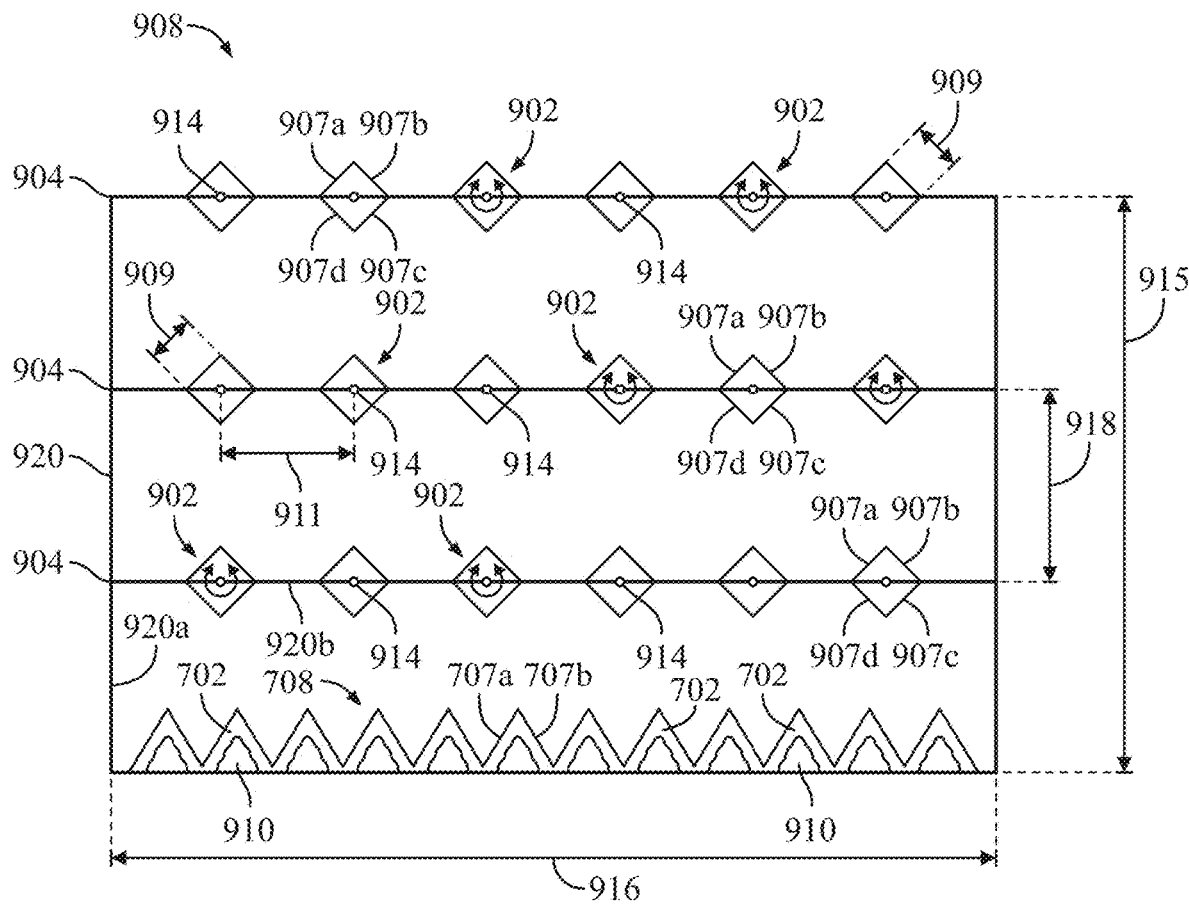
FIG. 48 shows a side view of one example of a stacker solar platform.

Referring now to FIG. 48, another embodiment is shown of a stacker solar platform 908 having vertically stacked rows 904 of horizontal solar cell beams 902 each having three-dimensional solar surfaces 907*a-d*. The stacked rows 904 may be above a planar or embossed solar panel 708 such that the stacked rows 904 add more solar energy harvesting mechanisms per unit volume. Each solar cell beam 902 of the stacked rows 904 may be spaced apart from each other to allow solar light from the sun to reach the lower stacked rows 904 and the very bottom planar or embossed solar panel 708. The addition of the stacked rows 904 of the solar cell beams 902 above the bottom solar panel 708 may increase the generation of solar power per unit volume, as described elsewhere. The stacker solar platform 908 takes advantage of the volume of free space above the bottom solar panel 708. The solar cell beams 902 above the bottom solar panel 708 may also capture scattered photons reflected by the active sides 707*a-b* of the bottom solar panel 708 or the scattered photons reflected by the other nearby solar cell beams 902. Each solar cell beam 902 may be rotated to not only face an optimum orientation relative to the sun, but to also be at an optimum orientation to capture scattered photons reflected from adjacent solar surfaces.

By way of example and not limitation, the solar cell beams 902 may be assembled next to each other using a stacker frame 920. The stacker frame 920 may have vertical support structures 920*a*, such as columns or pillars, and horizontal support structures 920*b*, such as horizontal boards or bars. The stacker frame 920 alone may be for the most part empty space other than the outer edges making up the structure of the stacker frame 920. The minimally designed structural components of the stacker frame 920 may be necessary to allow maximum sunlight to reach the inside of the frame and to the solar cell beams 902 and the bottom solar panel 708. The vertical and horizontal support structures 920*a-b* may make up the outer edges of the frame, where the stacker frame 920 may have a cubic, rectangular, or trapezoidal shape.

By way of example and not limitation, some of the horizontal structures 920*b* may be support structures for the stacked rows 904 to hold the solar cell beams 902. By way of example and not limitation, such horizontal structures 920*b* may extend across two of the opposite side-edges of the stacker frame 908. Such horizontal structures 920*b* making up the stacked rows 904 may need to be minimally dimensioned and only extend across the faces of the stacker frame 920 to allow for maximum empty space for sunlight to reach the solar cell beams 902.

By way of example and not limitation, the stacker frame length 916 may be between 2.5 to 13.12 feet (i.e., 4 meters). By way of example and not limitation, the stacker frame height 915 may be between 2.5 to 13.12 feet. By way of example and not limitation, the stacker frame width 913 (see FIGS. 51A-B) may be 2.5 feet to 13.12 feet. In examples describing energy density and power per unit volume of the stacker solar platform 908, the stacker frame 920 may have a length, height, and width each equaling 3.28 feet, which such dimensions are equivalent to covering 1 cubic meter of space. By way of example and not limitation, the wiring of the solar cell beams 902 may be integrated with the stacker frame 920.

Figure 51A:
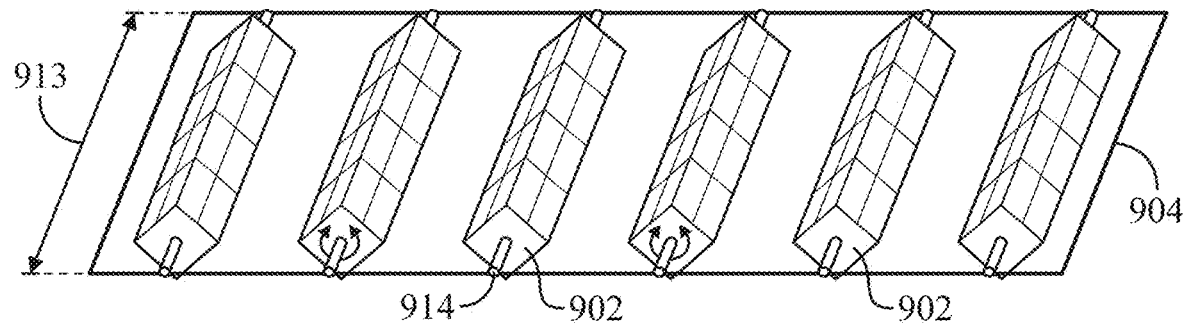
FIGS. 51A-B show perspective and top view of a stacked row of the stacker solar platform of FIG. 48.
Figure 51B:
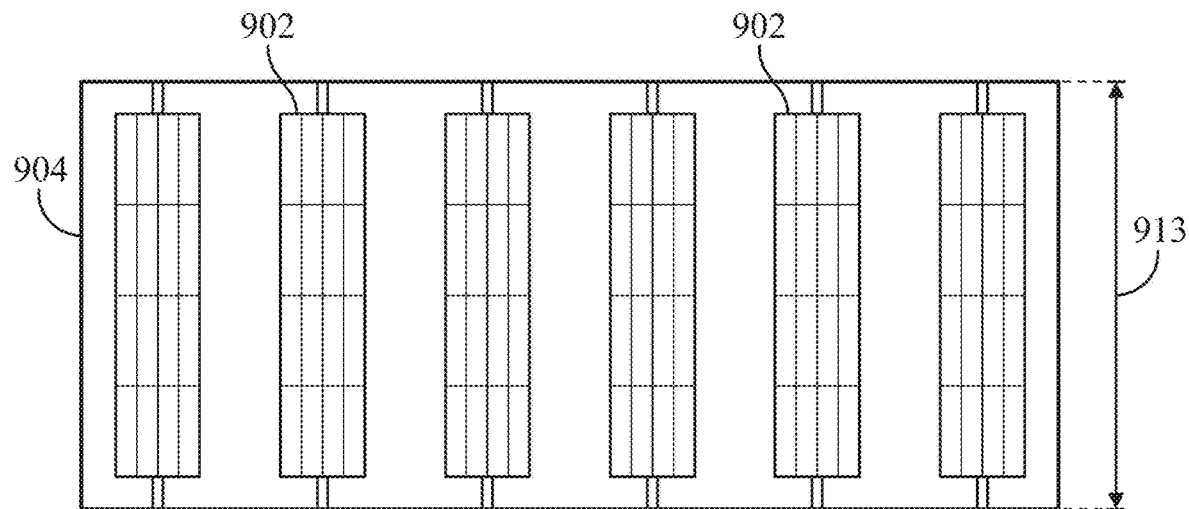

By way of example and not limitation, the stacked rows 904 may each have a plurality solar cell beams 902 ranging from two to 16 solar beams positioned next to each other along the length 916 of the beam frame 920. As shown in FIG. 48, each stacked row 904 may have six solar cell beams 902. By way of example and not limitation, each solar cell beam 902 may have its lateral faces, which are longitudinal and have active sides 907*a-d*, extend across the width 913 of the stacker frame, as shown in FIGS. 51A-B. By way of example and not limitation, each solar cell beam 902 may be spaced apart from other adjacent solar cell beams 902 in the same stacked row 904 by a separation distance 911 of three to 30 inches along the length 916 of the stacker frame 920, and such distance may be measured from the centers and central axes of the cross-sectional bases of the adjacent solar cell beams 902, as shown in FIG. 48.

By way of example and not limitation, there may exist between one to 10 stacked rows 904 on top of the bottom solar panel 708. FIG. 48 shows three stacked rows 904 on top of the bottom solar panel 708. By way of example and not limitation, the solar cell beams 902 of each stacked rows 904 may have a separation height 918 from their above solar cell beam 902 and stacked row 904 by three to 30 inches measured from the centers and central axes of the cross-sectional bases of the solar cell beams 902 right above each other, as shown in FIG. 48. By way of example and not limitation, the stacked row 904 right above the bottom solar panel 708 may also have a separation height of three to 30 inches from the bottom solar panel 708 measured from the central axes of the bases of the solar cell beams 902 and the top points or surfaces of the active sides 707*a-b* of the bottom solar panel 708.

By way of example and not limitation, each solar cell beam 902 may have a square prism shape with each of the lateral faces of the prism having the active sides 907*a-d* extending along the width 913 (see FIG. 51A-B) of the beam frame 920. The solar cell beams 902 may have other shapes for a base, such as triangular or trapezoidal, as described elsewhere herein. Consequently, the solar cell beams 902 may have more or less active sides. As described with respect to FIGS. 49 and 52A, some of the lateral edges of the prism-shaped solar cell beams 902, particularly opposite lateral edges, may have extended lateral portions 903 protruding outwards. The extended lateral portions 903 may give a fin-type structure to the solar cell beams 902, which such fin may create additional solar energy harvesting active sides 907*e-h*, as described elsewhere herein.

By way of example and not limitation, the solar cell beams 902 may have the same amount and type of solar cells, as described elsewhere herein. By way of example and not limitation, the solar cell beams 902 may originally be designed and manufactured in such a prism shape, as described elsewhere. By way of example and not limitation, the solar cell beams 902 may have the prism shape by having planar solar cells attached to a prism frame, as described elsewhere herein. By way of example and not limitation, each of the solar cell beams 902 may have a unitarily formed body or be made of separate modular pieces, as described elsewhere herein.

As shown in FIG. 48, and by way of example and not limitation, the square-prism solar cell beams 902 may each have four active sides 907*a-d* for harvesting solar energy, each active side 907*a-d* being on a lateral face of the square prism. By way of example and not limitation, lateral faces having the active sides 907*a-d* may have a face width 909 between 0.5 to three inches. With the solar cell beams 902 having four active sides 907*a-d* all in a space where one active side of a planar solar panel would normally occupy, the solar power harvesting of the stacker solar platform 908 may improve. By way of example and not limitation, if each square-prism solar cell beam 902 has a face width 909 of one-inch, then the solar harvesting capacity in the space that such solar cell beam 902 occupies may quadruple when compared to a planar solar panel of the same dimension occupying such space. This may be because the solar cell beam 902 has four one-inch wide active sides when compared to the single one-inch wide conventional planar solar panel occupying the same space.

By way of example and not limitation, each solar cell beam 902 of each stacked row 904 may rotate clockwise and counterclockwise between 0 to 360-degrees about a central axis in the center of the cross-sectional base of the solar cell beam 902, the central axis extending along the width 913 of the stacker frame 920, as shown in FIG. 51A. By way of example and not limitation, such rotation may be done by a pivoting mechanism 914 about the central axis of the solar cell beam 902. By way of example and not limitation, the pivoting mechanism 914 may be connection or rotation pins pivotably coupled to the center of the cross-sectional base of the solar cell beam 902 and attached to the horizontal support structures 920*b* of the stacker frame 920. By way of example and not limitation, the pivoting mechanism 914 may be as described elsewhere herein.

By way of example and not limitation, the rotation of the solar cell beams 902 in each stacked row 904 may be automated, as described elsewhere herein. By way of example and not limitation, the automated rotation may be based on the weather and the position of the sun that are dependent on the time of the day and year (e.g. months or seasons) and location of the stacker solar platform 908. By way of example and not limitation, such automation may also take into consideration a rotational position of the solar cell beams 902 that takes into account one or more of the active sides 907*a-d* receiving scattered photons reflected from adjacent solar surfaces, such as the bottom solar panel 708. By way of example and not limitation, the rotation of the solar cell beams 902 may be controlled by a software on a mobile device, as described elsewhere herein. By way of example and not limitation, the rotation of all of the solar cell beams 902 of all of the stacked rows 904 may be synchronized with each other, or each stacked row 904 and its solar cell beams 902 may rotate independent to the other stacked rows 904.

As shown in FIG. 48, and by way of example and not limitation, the embossed solar cell beams 702 of the embossed solar panel 708 may have a heating and cooling system 910 implemented within the base of the solar cell beams 702. By way of example and not limitation, the heating and cooling system 910 may extend along the length of the of the embossed solar cell beams 702 and heat and cool the active sides 707*a-b* through conduction, convection, radiation, or all three methods. By way of example and not limitation, the heating and cooling system 910 may be one or more conduits allowing hot or cold fluid to travel through the length of the embossed solar beam 702 to heat or cool the active sides 707*a-b* from within the embossed solar cell beams 702. By way of example and not limitation, the heating and cooling system 910 may also be implemented with the solar cell beams 902 of the stacker solar platform 908 similarly as to how the system is implemented with the embossed solar panel 708.

The heating and cooling may be needed if the embossed solar panel 708 and the stacker solar platform 908 are installed in an environment with weather conditions that would cause ice to form on the solar panels or a place that is so warm as to overheat the solar panels. Alternatively, the heating and cooling system 910 may either be a heating system or a cooling system. By way of example and not limitation, a fanning system may be implemented near and facing the embossed solar panel 708 and solar cell beams 902, such as being attached to the stacker frame 920, to cool the stacker solar platform 908 instead, or in conjunction, of the heating and cooling system 910.

Figure 49:
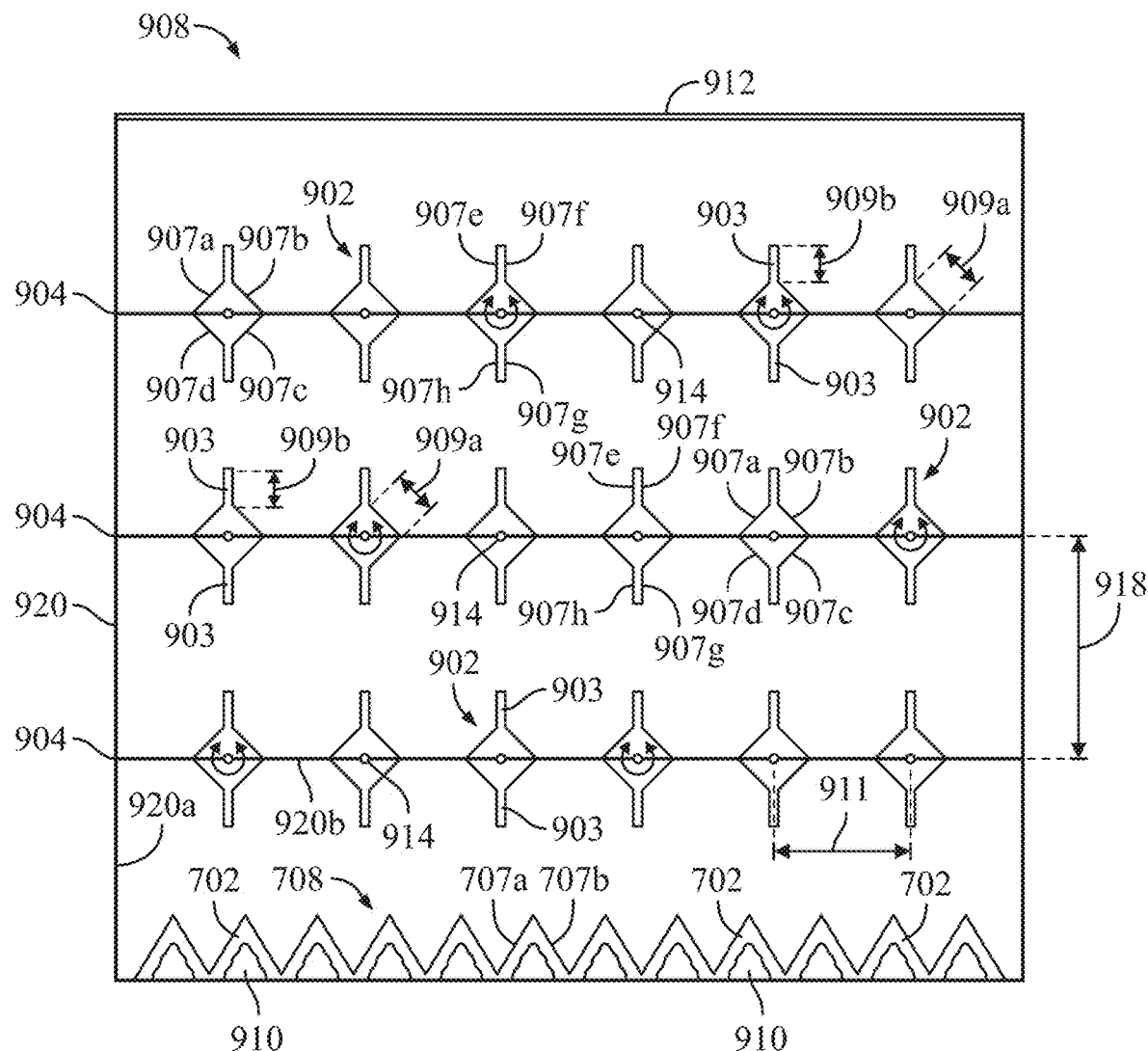
FIG. 49 shows a side view of another example of a stacker solar platform.

Referring now to FIG. 49, another example of the stacker solar platform 908 is shown. By way of example and not limitation, the stacker solar platform 908 of FIG. 49 may be the same as FIG. 48 but the solar cell beams 902 of the stacked rows 904 may have additional active sides 907*c-h* (e.g., one to eight additional active sides). This may be because some of the lateral edges of the prism-shaped solar cell beams 902, particularly opposite lateral edges, may have extended lateral portions 903 protruding outwards as planar bars, as described elsewhere herein. The extended lateral portions 903 may give a fin-type structure to the solar cell beams 902, which such fins may create additional active sides 907*c-h*. By way of example and not limitation, the extended later portions 903 may have active sides 907*e-h* with lateral face width 909*b* between 0.5 to three inches similar to the face width 909*a* of the other active sides 907*a-d*. As the solar cell beams 902 rotate, the extended lateral portions 903 may rotate and move upwards and downwards to face the sun at optimum orientations. Such rotations of the extended lateral portions 903 may also allow the active sides 907*e-h* on such structures to capture scattered photons reflected from adjacent solar panel surfaces, such as from the solar surfaces of the bottom solar panel 708.

By way of example and not limitation, if each of the active sides 907*a-h* of a solar cell beam 902, including the extended lateral portions 903, have face widths 909*a-b* of one-inches, then the solar harvesting capacity in the space that such solar cell beam 902 occupies may increase by eight times when compared to a planar solar panel of the same dimension occupying such space. This may be because the solar cell beam 902 has eight one-inch wide active sides 907*a-h* when compared to the single one-inch wide planar solar panel occupying the same space. By way of example and not limitation, the stacker solar platform 908 may have a planar transparent solar panel 912 on the very top row of the stacker frame 920, which the stacked rows 904 of solar cell beams 902 are under the transparent solar panel 912. The planar transparent solar panel 912 may provide another layer of solar power harvesting while allowing the solar rays to reach the rest of the solar cell beams 902 and bottom solar panel 708.

Figure 50:
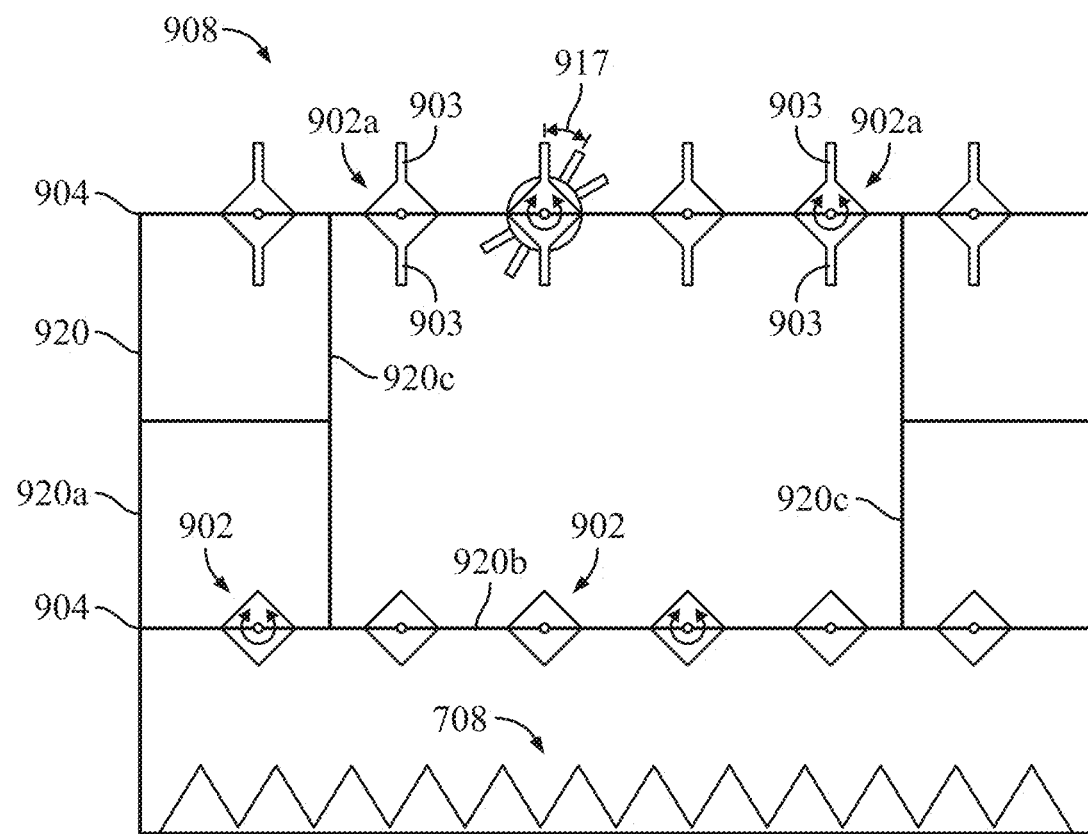
FIG. 50 shows a side view of another example of a stacker solar platform.

Referring now to FIG. 50, the stacker solar platform 908 having stacked rows 904 with different types of solar cell beams 902 is shown. By way of example and not limitation, the top stacked row 904 may have solar cell beams 902*a* with a cross-sectional base having a square or diamond shape, where extended lateral portions 903 protrude outwards from some of the lateral edges of the solar cell beams 902*a*. By way of example and not limitation, the bottom stacked row 904 may have solar cell beams 902 with a cross-sectional base having a regular square shape and no extended lateral portions 903. FIG. 50 also shows a solar cell beam 902*a* having the extended lateral portion 903 rotating at an angle 917 relative to the upright and orthogonal orientation of the extended lateral portion 903. By way of example and not limitation, the rotation angle 917 may be 10 to 180 degrees, clockwise or counterclockwise, relative to the upright orientation of the extended lateral portion 903. By way of example and not limitation, additional support structures 920*c* between the adjacent solar cell beams 902 of a stacked row 904 and the stacked row 904 themselves is shown.

Figure 52A:
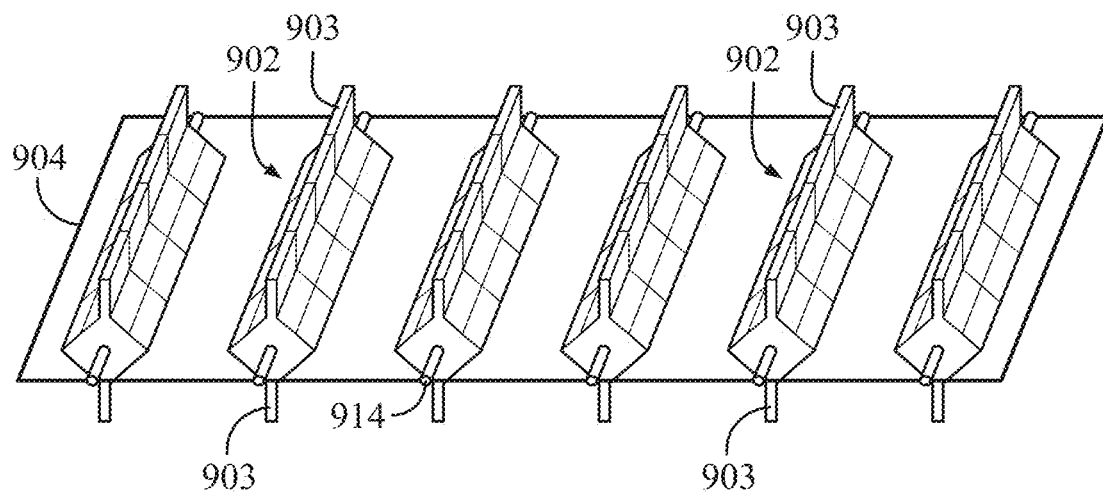
FIGS. 52A-B show perspective and top view of a stacked row of the stacker solar platform of FIG. 49.
Figure 52B:
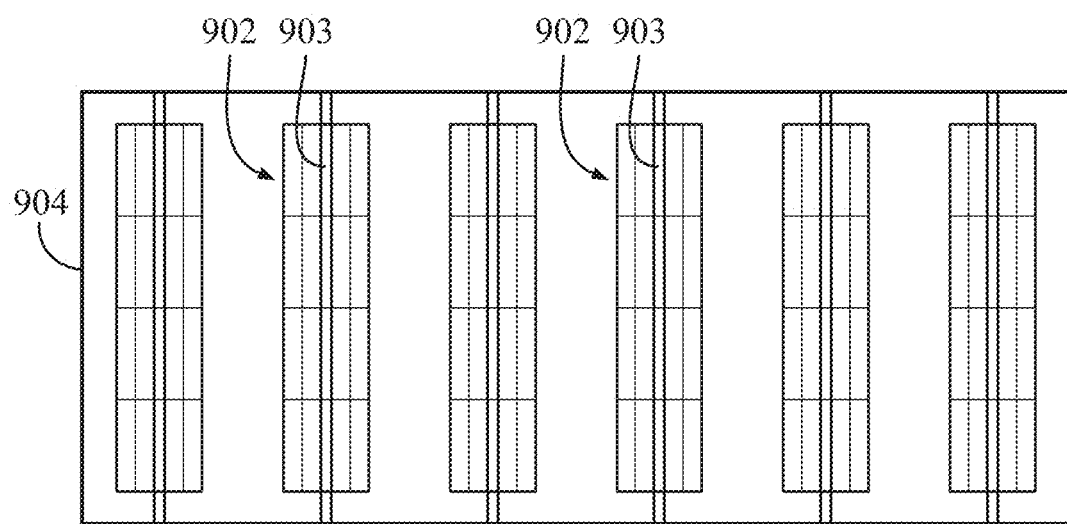

FIGS. 51A-B show perspective and top views of one stacked row 904 shown in FIG. 48. Similarly, FIGS. 52A-B show perspective and top views of one stacked row 904 shown in FIG. 49.

By way of example and not limitation, the stacker solar platform 908 may have the same features as the other embodiments of solar platforms described elsewhere herein. By way of example and not limitation, the stacker solar platform 908 may be incorporated with different types of electric, hybrid, or regular internal combustion engine vehicles. Such vehicles may include trucks, vans, minivans, SUVs, semitrucks, buses, recreational vehicles, motorhomes, trailers, station wagons, hatchbacks, crossovers, sedans, coupes, compact automobiles, and other types of vehicles and automobiles. The stacker solar platform 908 may also be incorporated with buildings, such as parking structures, homes, office buildings, stadiums, and other types of building structures. The stacker solar platform 908 may also simply be on a frame and placed on the ground. Specifically with the incorporation of the stacker solar platform 908 with the vehicle, the stacker solar platform 908 may be attached or integrated with the roof of a vehicle or the top of a cap (e.g., a camper shell) or the tonneau cover of a truck, to name a few examples. The stacker solar platform 908 may be connected to the electrical components and a battery of the vehicle. For example, the stacker solar platform 908 may be used to charge the battery of an electric vehicle, a deep cycle battery, or charge and power other electronic devices. The stacker solar platform 908 may also be connected to a computing system of the vehicle to receive commands to deploy, fold, rotate, and operate some or all of the solar panels using an automated motorized mechanism, as described elsewhere herein. Alternatively, stacker solar platform 908 may have its own computing system that operates the solar panels. The stacker solar platform 908 may also be controlled and monitored by a software application on a mobile device, as described elsewhere herein.

Figure 53A:
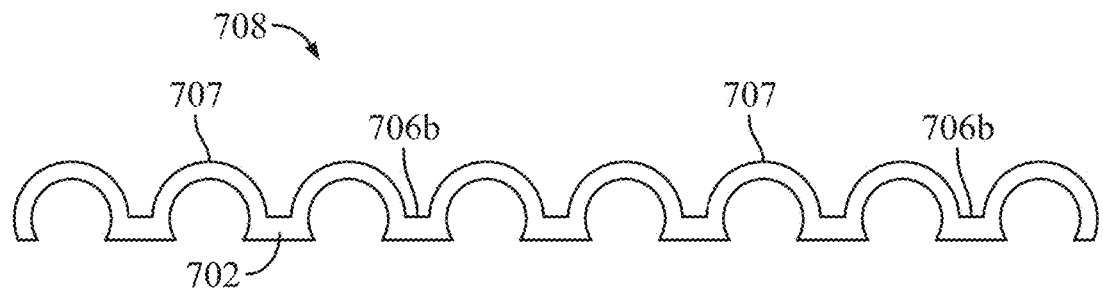
FIGS. 53A-B show side and perspective view of another example of an embossed solar panel.
Figure 53B:
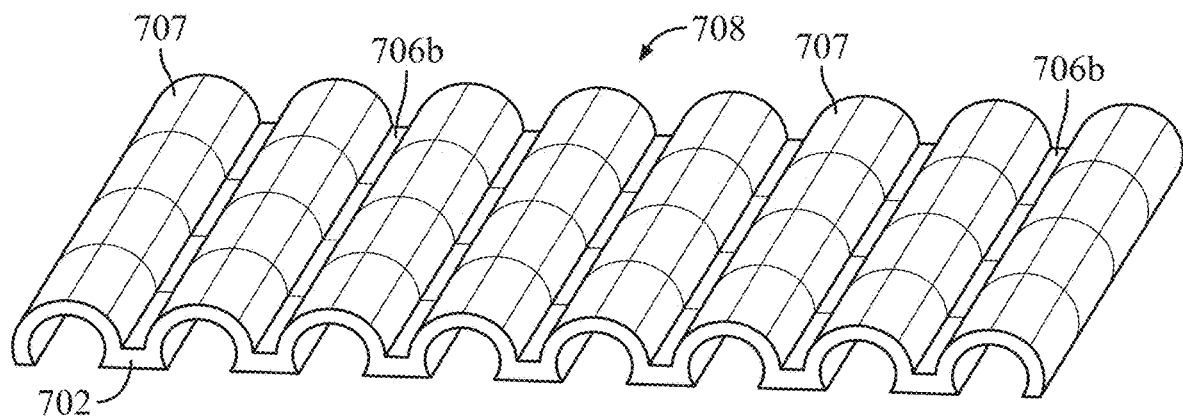

FIGS. 53A-B show another example of an embossed solar panel 708 which may be similar to the other embossed solar panels, described elsewhere herein. In this example, the embossed solar panel 708 may have embossed solar cell beams 702 having semi-cylindrical shapes, where each beam has a round active side 707 that is convex. By way of example and not limitation, the active sides 707 that are convex may each be reversed upside-down U-shape. The round active sides 707 that are convex may allow for more of the surface area of the embossed solar cell beam 702 to be exposed to the solar radiation of the sun at more durations of times during the day since the round active side 707 may be more continuous in its contours. By way of example and not limitation, there may exist flat planar portions 706*b* having their own solar surfaces between adjacent embossed solar cell beams 702. The flat planar portions 706*b* may allow for more of the arc-surface of the embossed solar cell beams 702 that are semi-cylindrical to be exposed to solar rays of the sun. By way of example and not limitation, the embossed solar cell beams 702 that are semi-cylindrical may be filled or partially hollow at their center. By way of example and not limitation, if the semi-cylindrical embossed solar cell beams 702 are hollow at their center, at least one or two of such solar cell beams may also be used to cover the outer surface area of a cylindrical pole, such as a telephone or electric pole. Consequently, utility poles may have active solar harvesting sides around the majority, if not the whole, of their surface areas. By way of example and not limitation, the solar cell beams 702 may be manufactured as semi-cylindrical or, alternatively, thin-film solar panels may be attached on top of the surface area of a semi-cylindrical beam frames.

Figure 54A:
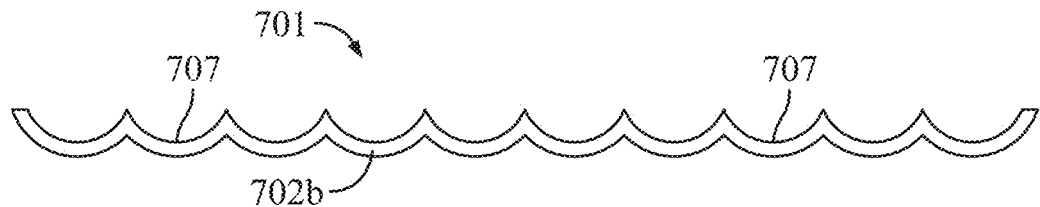
FIGS. 54A-B show side and perspective view an example of a debossed solar panel.
Figure 54B:
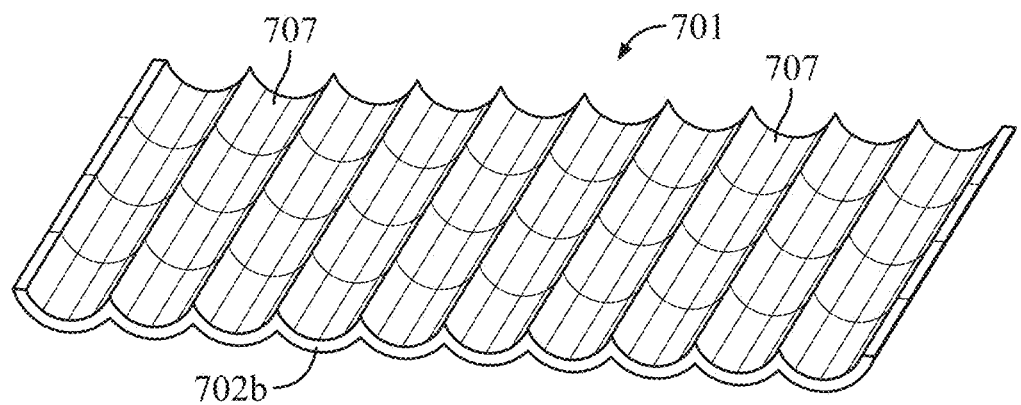

FIGS. 54A-B show an example of a debossed solar panel 701 which may be similar to the embossed solar panels, described elsewhere herein. In this example, the debossed solar panel 701 may have round active sides 707 that are concave and designed for solar energy harvesting, where such round active sides 707 extend downwards to make U-shaped solar surfaces. The round active sides 707 that are concave may allow for more of the surface area of the debossed solar cell beam 702*b* to be exposed to the solar rays of the sun at more durations of times during the day since the round active side 707 is more continuous in its contours. The round active sides may be able to capture more scattered photons that get reflected from adjacent solar surfaces since such active sides are concave. By way of example and not limitation, the debossed solar cell beams 702*b* may be manufactured as concave or thin-film solar panels may be attached on top of concave beam frames.

Figure 55A:
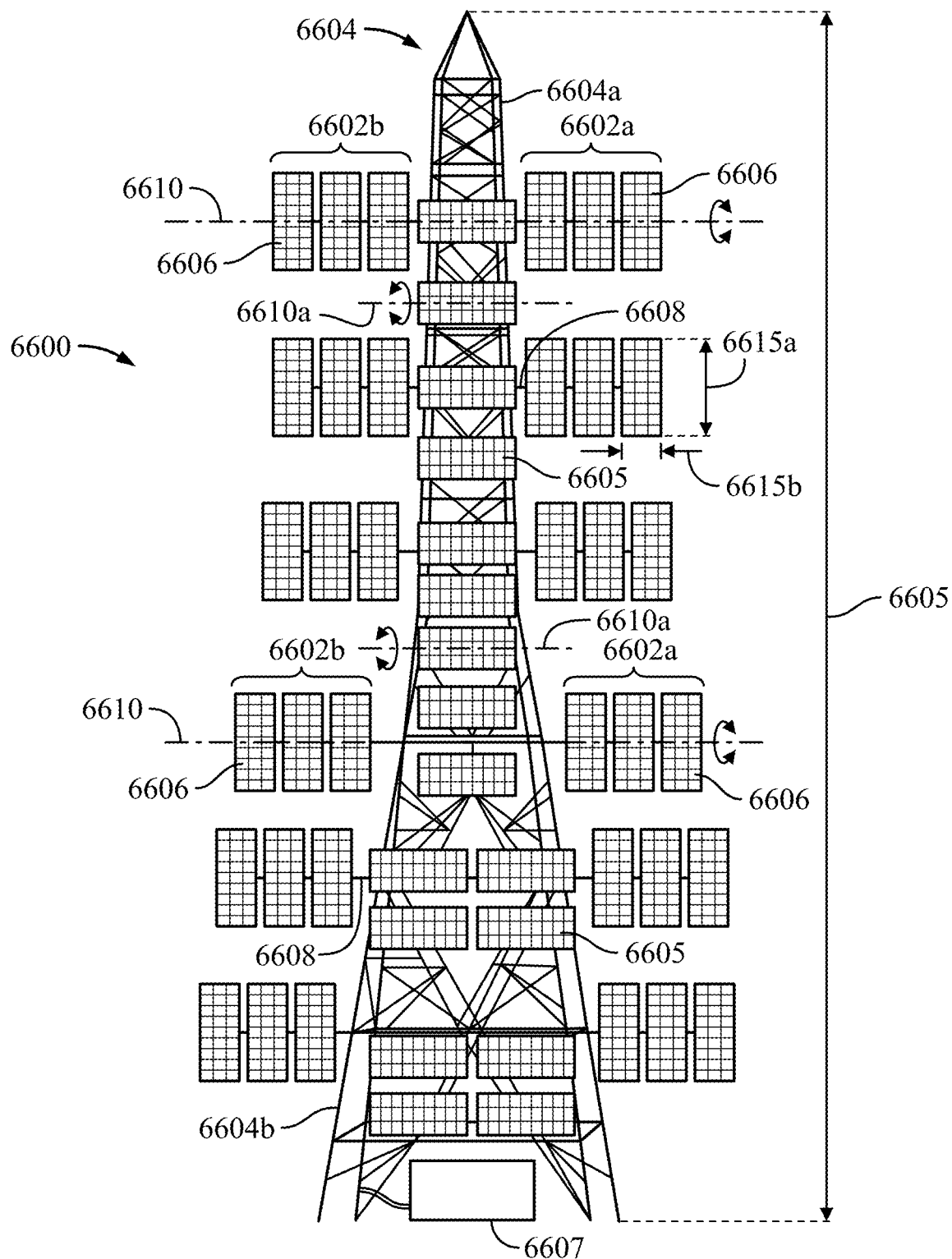
FIG. 55A-C show different views of an example of a solar tower.
Figure 55B:
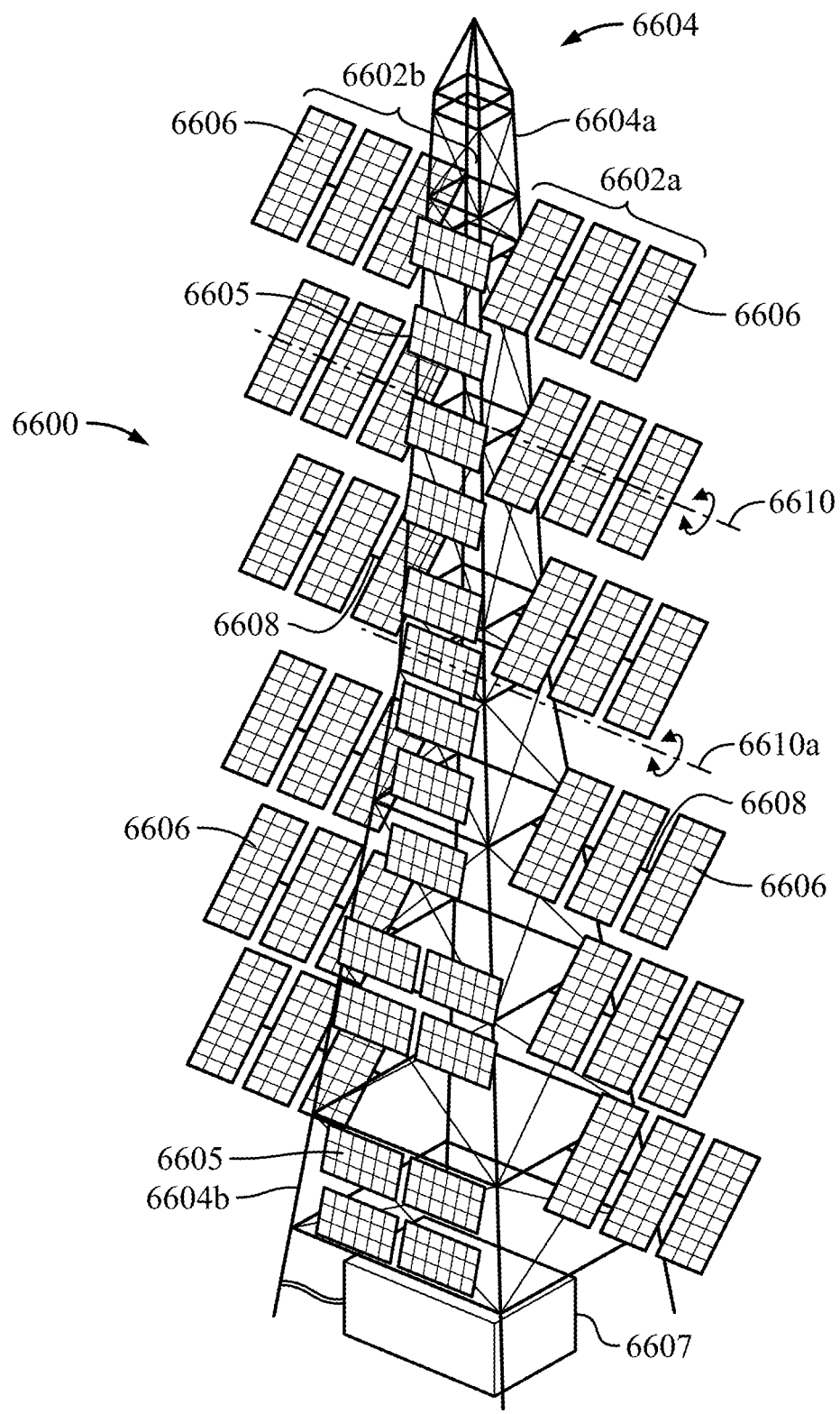

Referring now to FIG. 55A, a solar panel tower 6600 is shown. The solar panel tower 6600 may have a tower structure 6604 with a plurality of flipper solar panels 6605, which may be considered proximal solar panels 6605, and rotator solar panels 6602*a-b*, which may be considered solar panel extensions 6602*a-b*. The tower structure 6604 may have a top section 6604*a* and a base section 6604*b*. The base section 6604*b* may be wider than the top section 6604*a* and the tower structure 6604 may narrow towards the top section 6604*a* from the base section 6604*b*. Each of the top and base sections 6604*a-b* may have a plurality of support beams 6613*a-b* (see FIG. 55C) reinforcing the tower structure 6604. In some examples, primary support beams 6613*a* may outline the tower structure 6604 while secondary support beams 6613*b* may cross each other and be between the primary support beams 6613*a* to provide additional support. In some examples, the tower structure 6604 may be an electric transmission tower 6601 (see FIG. 55D) carrying electric wiring 6603, where solar panels may be attached to such transmission tower. The tower structure 6604 may have a height 6605 between 24 to 160 feet measured from the bottom edges (e.g., frame legs) of the base section 6604*b* to the top edges (e.g., frame tip) of the top section 6604*a*. In some examples, the height 6605 may be greater than 160 feet.

The flipper solar panels 6605 (i.e., proximal solar panels) may be on the tower structure 6604, specially along the side-to-side width of the tower structure 6604. The flipper solar panels 6605 may be on both the top and the base sections 6604*a-b* of the tower structure 6604. The flipper solar panels 6605 may have horizontal longitudinal sides. Alternatively, the flipper solar panels 6605 may have vertical longitudinal sides. There may exist between two to 48 flipper solar panels 6605 on the tower structure 6604. In some examples, there may exist greater than 48 flipper solar panels 6605 on the tower structure 6604. Since the base section 6604*b* is wider than the top section 6604*a*, multiple flipper solar panels 6605 may be orientated horizontally in-line with each other along the width of the base section 6604*b*.

Figure 55C:
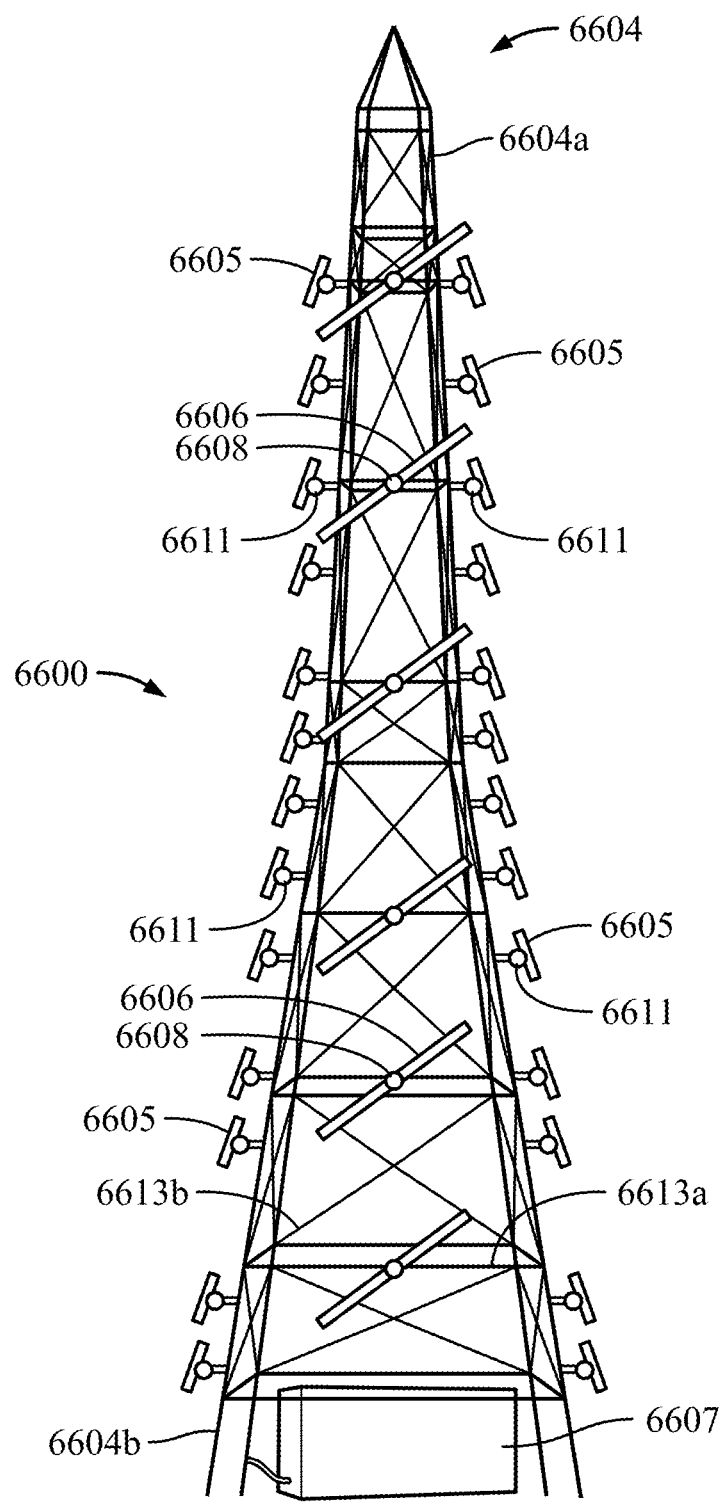
Figure 55D:
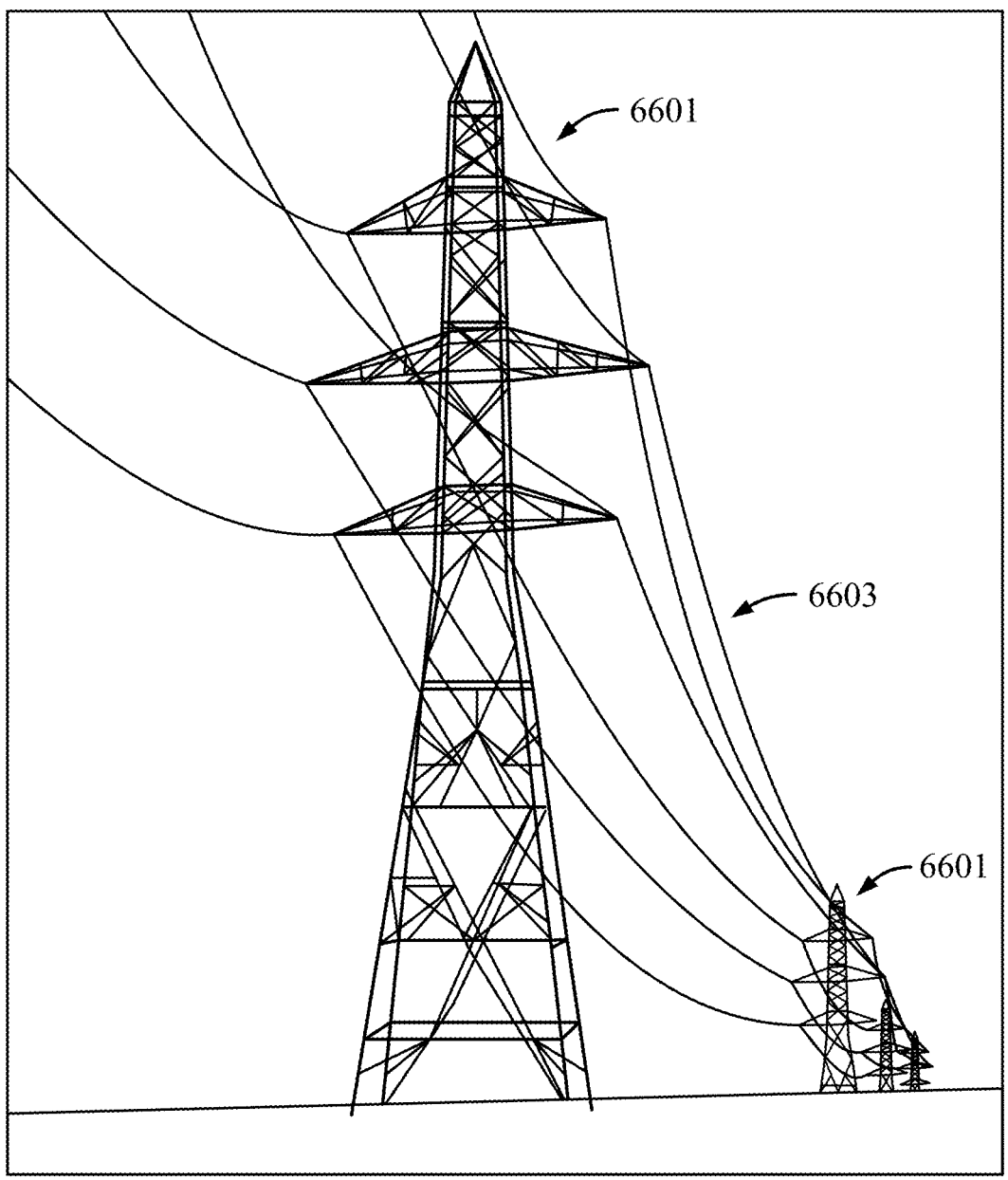
FIG. 55D shows a plurality of electric transmission towers that may be converted to solar towers.
Figure 56A:
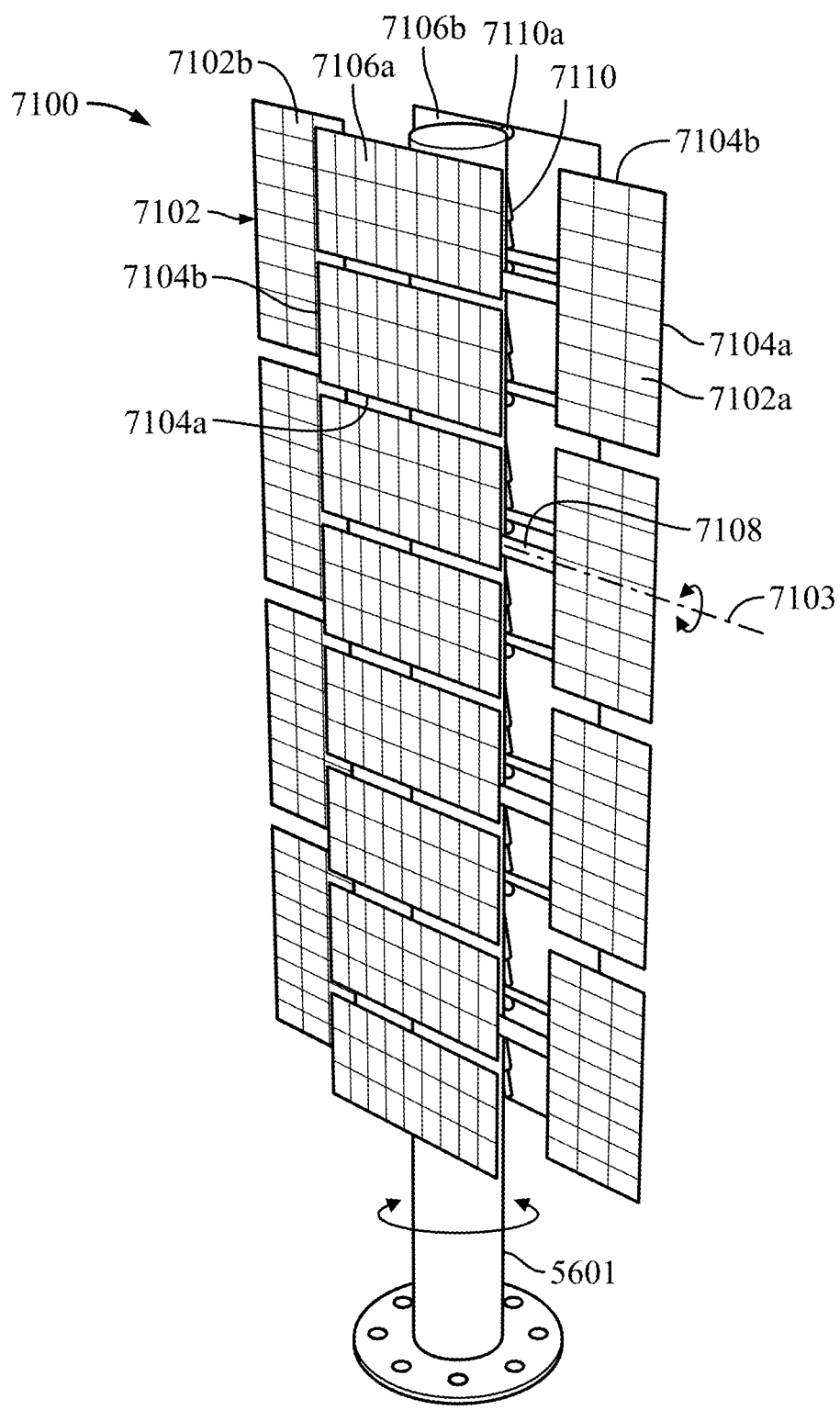
FIGS. 56A-D show a solar panel pillar having its solar panels rotated to follow the movement of the sun.
Figure 56B:
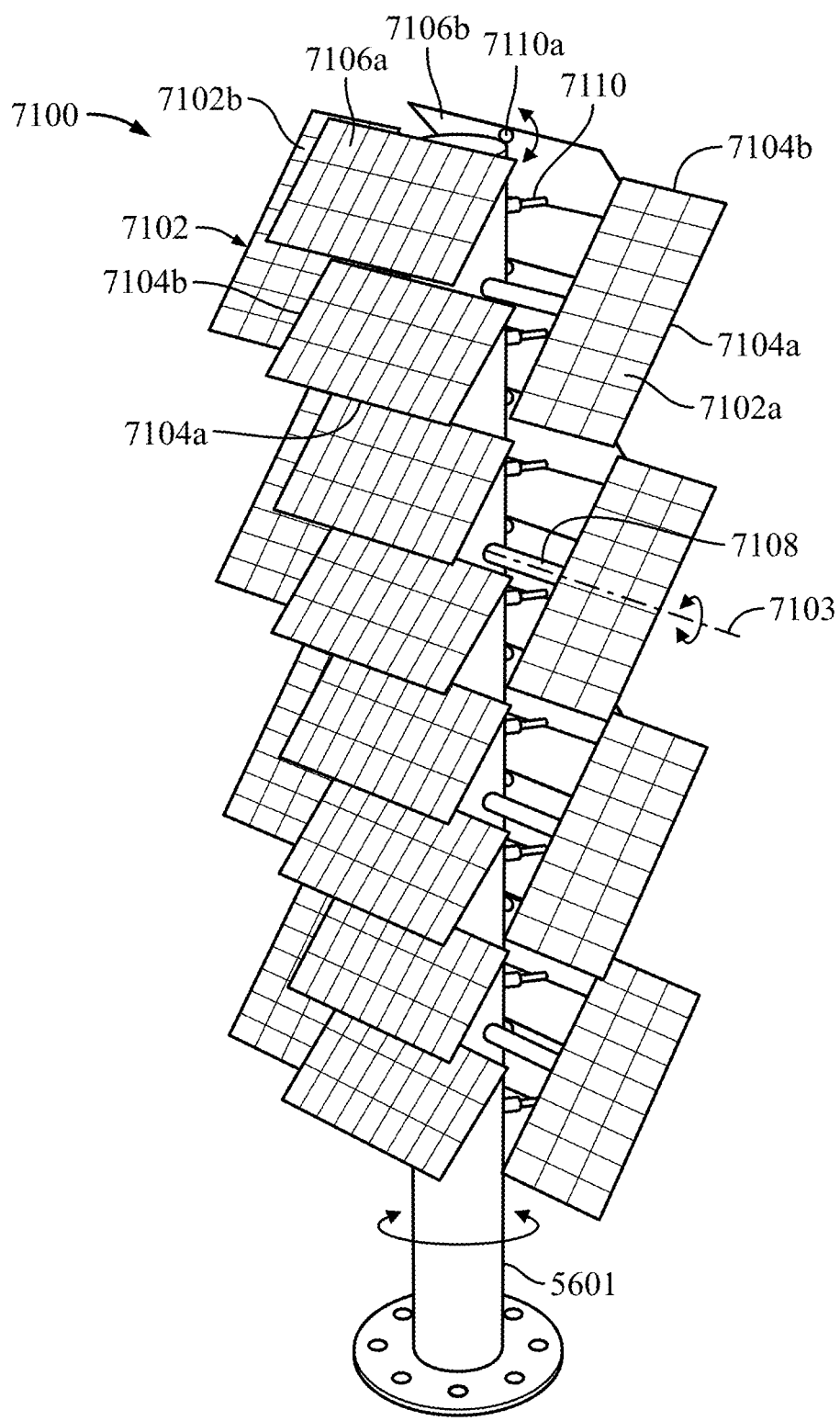
Figure 56C:
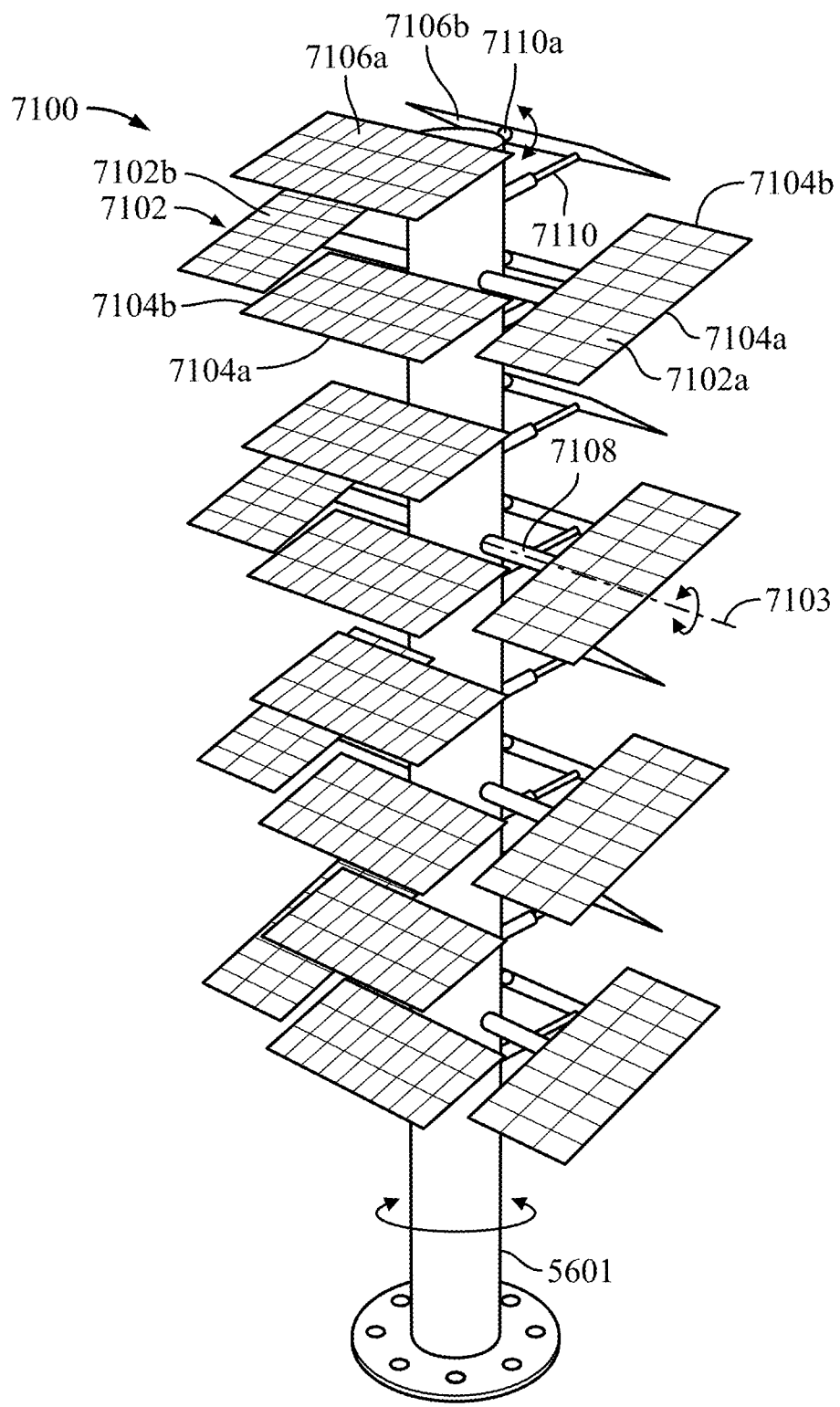
Figure 56D:
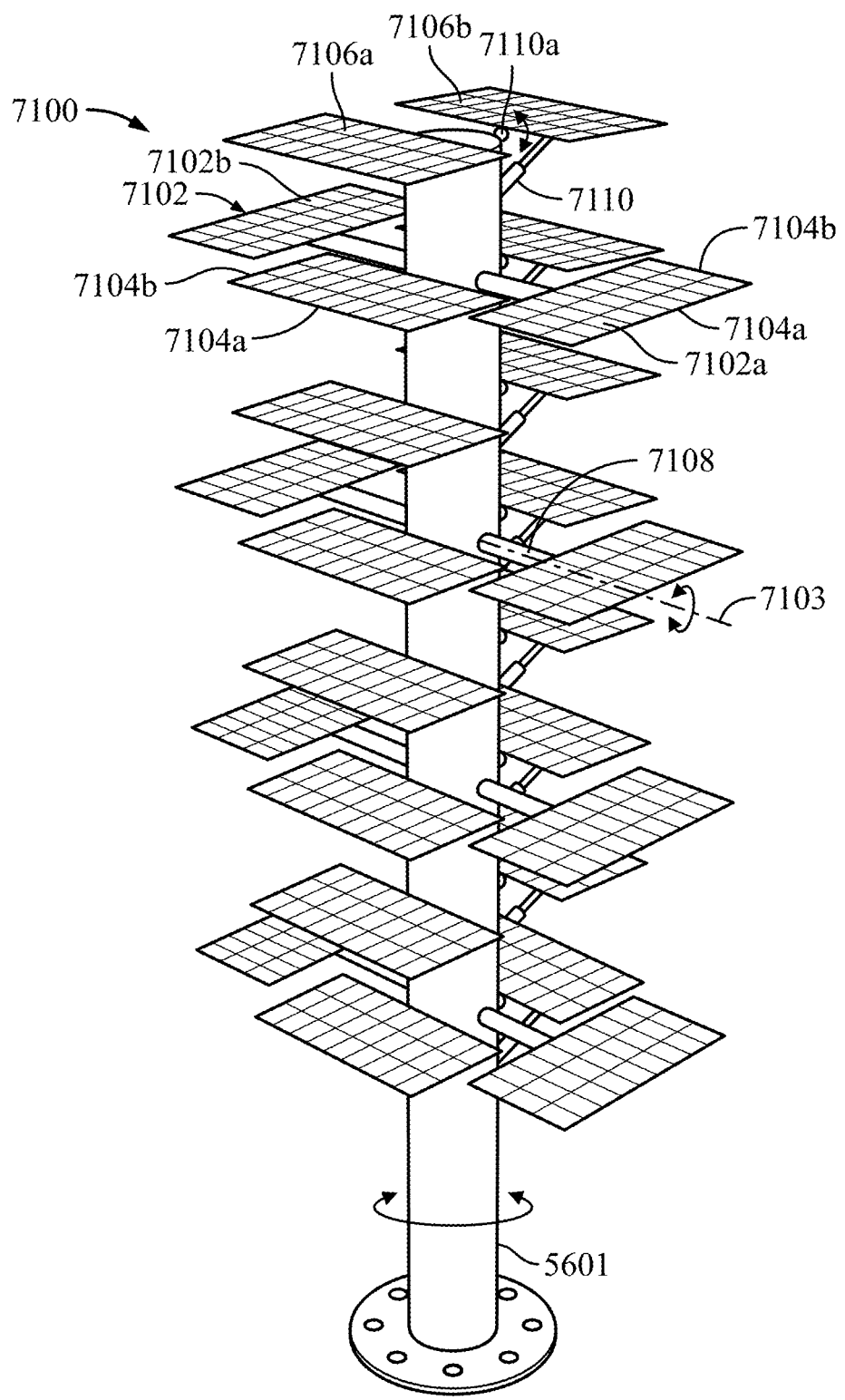

In some examples, the flipper solar panels 6605 may each be rotatable along a central axis 6610*a* extending along the horizontal length of the flipper solar panels 6605. The flipper solar panels 6605 may rotate between 0 to 90-degrees. Consequently, the active solar surfaces of the flipper solar panels 6605 may be inclined upwards towards the sky by up to 90-degrees relative to the initial orientation of the flipper solar panels 6605 having their active solar surfaces vertically positioned (i.e., flat and vertical as shown in FIG. 55A). The central axis 6610*a* may extend along the side-to-side width of the tower structure 6604. As shown in FIG. 55C, the central axis 6610*a* may be defined by one or more pivot joints 6611 that may be in the middle of the vertical dimension of the flipper solar panels 6605. By way of example and not limitation, the flipper solar panels 6605 may be configured to follow the movement of the sun throughout the day. By way of example and not limitation, the solar panel tower 6600 may be connected to a processor 7002 (see FIG. 71) that actuates the flipper solar panels 6605 to pivot throughout the daylight hours (e.g., for 8 to 14 hours) to orientate their active surfaces at an optimum angle relative to the sun. The optimum angle relative to the sun may be an angle that the solar panels receive maximum solar irradiation and power at that time of day from the sun. Such optimum angle of the flipper solar panels may be such that the active solar surfaces face orthogonally (i.e., 90-degrees) to the solar rays radiated by the sun. By way of example and not limitation, the processor 7002 may execute artificial intelligence and machine learning software to pivot the flipper solar panels 6605 accordingly. The solar panel tower 6600 may be orientated such that the flipper solar panels 6605, on opposing sides of the tower structure 6604, face east and west. Alternatively, the flipper solar panels 6605 may face north and south, or somewhere between the major cardinal directions (i.e., north, south, east, west). In some examples, the flipper solar panels 6605 may be bifacial and have two active solar surfaces on opposing planar sides of the solar panel.

The tower structure 6604 may have a plurality of rotator solar panels 6602*a-b* (i.e., solar panel extensions 6602*a-b*), each having one or more extending solar panels 6606, which horizontally extend outwards from the tower structure 6604. The tower structure 6604 may have a set of first rotator solar panels 6602*a* extending from a first side of the tower structure 6604 and a set of second rotator solar panels 6602*b* extending from a second side of the tower structure 6604. The rotator solar panels 6602*a-b* may be on the base and top sections 6604*a-b* and be vertically spaced apart along the height of the of the tower structure 6604. The solar panel tower 6600 may have between two to 24 sets of rotator solar panels 6602*a-b*. In some examples, the solar panel tower 6600 may have greater than 24 sets of rotator solar panels 6602*a-b*.

Each set of rotator solar panels 6602*a-b* may have between one to six extending solar panels 6606 extending away from the tower structure 6604 and horizontally spaced apart from each other. In some examples, each set of rotator solar panel 6602*a-b* may have greater than six extending solar panels 6606. The extending solar panels 6606 of the sets of rotator solar panels 6602*a-b* may have vertical longitudinal sides. In other examples, the extending solar panels 6606 of the rotator solar panels 6602*a-b* may have horizontal longitudinal sides. In some examples, the extending solar panels 6606 may be bifacial and have two active solar surfaces on opposing planar sides of the solar panel. By way of example and not limitation, the length 6615*a* of the extending solar panels 6606 may be between two to six feet. In other examples, the length 6615*a* of the extending solar panels 6606 may be greater than six feet. By way of example and not limitation, the width 6615*b* of the extending solar panels 6606 may be between one to five feet. In other examples, the width 6615*b* of the extending solar panels 6606 may be greater than five feet. The flipper solar panels 6605, described elsewhere herein, may have dimensions in the same range as described with respect to extending solar panels 6606.

doc The extending solar panels 6606 of each rotator solar panels 6602*a-b* may be coupled to an extension pole 6608. The extension pole 6608 may extend along the horizontal widths of the extending solar panels 6606, as shown in FIG. 55A. In other examples, the extension pole 6608 may extend along the horizontal lengths of the extending solar panels 6606 if their longitudinal sides are horizontal. The extension pole 6608 may be configured to rotate the extending solar panels 6606 about a central axis of rotation 6610 extending along the horizontal width of the extending solar panels 6606. The central axis of rotation 6610 may be parallel to the length of the extension pole 6608 and also extend along the width of the tower structure 6604. Consequently, all of the extending solar panels 6606 of a rotator solar panel 6602*a-b* may rotate together between 0 to 180-degrees. The active solar surfaces of the extending solar panels 6606 may incline towards the sky and rotate by up to 180-degrees relative to the initial orientation of the extending solar panels 6606 having their active solar surfaces vertically positioned (i.e., flat and vertical as shown in FIG. 55A). In some examples, opposing rotator solar panels 6602*a-b* on the same height along the tower structure 6604 may share an extension pole 6608 that extends through the opposing sides of the tower structure 6604 having the extensions. By way of example and not limitation, the extension poles 6608 may go through the extending solar panels 6606 (see FIG. 55C) about the center of their vertical dimension. In some examples, the extension pole 6608 may be coupled to the flipper solar panels 6605, which are on the same height level as the rotator solar panels 6602*a-b*, and rotate such solar panels also. Consequently, the axis of rotation 6610 of the rotator solar panels 6602*a-b* may be parallel to the axis of rotation 6610*a* of the flipper solar panels 6605.

By way of example and not limitation, the rotator solar panels 6602*a-b* may be configured to follow the movement of the sun throughout the day. By way of example and not limitation, the solar panel tower 6600 may be connected to a processor 7002 (see FIG. 71) that actuates the extending solar panels 6606 of the rotator solar panels 6602*a-b* to pivot throughout the daylight hours (e.g., for 8 to 14 hours) to orientate their active surfaces at an optimum angle relative to the sun. The optimum angle relative to the sun may be an angle that the solar panels receive maximum solar irradiation and power at that time of day from the sun. Such optimum angle of the extending solar panels may be such that the active solar surfaces face orthogonally (i.e., 90-degrees) to the solar rays radiated by the sun. By way of example and not limitation, the processor 7002 may execute artificial intelligence and machine learning software to pivot the rotator solar panels 6602*a-b* accordingly, using the extension poles 6608. The solar panel tower 6600 may be orientated such that the extending solar panels 6606 of the rotator solar panels 6602*a*-b face east and west. Alternatively, the extending solar panels 6606 may face north and south, or somewhere between the major cardinal directions (i.e., north, south, east, west).

The solar panel tower 6600 and its flipper and rotator solar panels may be electrically connected to a battery storage unit 6607 that may be at the bottom and within the tower structure 6604 (see FIG. 55C). The battery storage unit 6607 may be rechargeable and configured to store electric energy generated by the solar panel tower 6600. By way of example and not limitation, the battery storage unit 6607 may be configured to store between 0.5 to 10 megawatts of power. In other examples, the battery storage unit 6607 may be configured to storage greater than 10 megawatts of power.

Referring now to FIGS. 56A-D, a solar panel pillar 7100 is shown having its solar panels rotated to face the sun at an optimum orientation for receiving maximum solar irradiation and power. Such optimum angle of the solar panels may be such that the active solar surfaces face orthogonally (i.e., 90-degrees) to the solar rays radiated by the sun. The solar panel pillar 7100 may be similar to the solar panel tower 6604 of FIGS. 55A-C. The main difference between the two examples may be that the solar panel pillar 7100 may be more compact and smaller and the mounting pole 5601 that the solar panels are attached thereto may rotate about its central axis to further adjust the positioning of the solar panels. The solar panel pillar 7100 may also be electrically connected to a storage battery. The solar panels of the solar panel pillar 7100 may face east and west or other compass directions by rotating the mounting pole 5601 about a vertical axis at the center of the pole, as described elsewhere herein.

The solar panel pillar 7100 may have a plurality of rotator solar panels 7102*a-b*, which may be considered extending solar panels 7102*a-d*, pivotably connected and extending from a mounting pole 5601. The rotator solar panels 7102*a-b* may be the same as the extending solar panels 6606 of the solar panel tower 6600, described elsewhere herein. A first set of rotator solar panels 7102*a* may extend from a right side of the mounting pole 5601, and a second set of rotator solar panels 7102*b* may extend from a left side of the mounting pole 5601. The rotator solar panels 7102*a-b* may have vertical longitudinal sides 7104*a* and horizontal lateral sides 7104*b*, or vice versa. The solar panel pillar 7100 may have between two to 14 rotator solar panels 7102*a-b*. In some examples, the solar panel pillar 7100 may have greater than 14 rotator solar panels 7102*a-b*.

The rotator solar panels 7102*a-b* may be pivotably connected to the mounting pole 5601 by one or more extension poles 7108. The one or more extension poles 7108 may be the same as the extension poles 6608 of the solar panel tower 6600, described elsewhere herein. By way of example, the extension pole 7108 may rotatably couple two rotator solar panels 7102*a-b* on opposing sides of the mounting pole 5601. The extension pole 7108 may define an axis of rotation 7103 extending horizontally along the length of the extension pole 7108. The rotator solar panels 7102*a-b* may rotate about the axis of rotation 7103 between 0 and 180-degrees from a vertical flat position such that their active solar surfaces incline upwards towards the sky, as described elsewhere herein and with respect to the solar panel tower 6600. The rotator solar panels 7102*a-b* may automatically rotate via executed commands by a processor 7002 connected to the solar panel pillar 7100, as described elsewhere herein and with respect to the solar panel tower 6600. The rotator solar panels 7102*a-b* may also revert back to their original vertical and flat positions.

The solar panel pillar 7100 may have a plurality of flipper solar panels 7106*a-b*, which may be considered proximal solar panels 7106*a-b*, pivotably connected on the mounting pole 5601. The flipper solar panels 7106*a-b* may be the same as the flipper solar panels 6605 of the solar panel tower 6600, described elsewhere herein. The flipper solar panels 7106*a-b* may have horizontal longitudinal sides 7104*a* and vertical lateral sides 7104*b*, or vice versa. A first set of flipper solar panels 7106*a* may be mounted on a front portion of the mounting pole 5601, and a second set of flipper solar panels 7106*b* may be on back portion of the mounting pole 5601 that is opposite to the front portion. The solar panel pillar 7100 may have between two to 24 flipper solar panels 7106*a-b*. In some examples, the solar panel pillar 7100 may have greater than 24 flipper solar panels 7106*a-b*.

The flipper solar panels 7106*a-b* may be pivotably connected on a front and back portion of the mounting pole 5601 by pivoting shafts 7110 and pivot joint 7110*a*. The pivoting shaft 7110 may have one end pivotably connected to the mounting pole 5601, and the pivoting shaft 7110 may have a second end pivotably connected to the back of the flipper solar panel 7106*a-b*. The top edge of the flipper solar panels 7106*a-b* may also be pivotably connected to the mounting pole 5601 by a pivot joint 7110*a*. As such, the pivoting shafts 7110 may move upwards and downwards to incline the flipper solar panels 7106*a-b* upwards and downwards. The pivoting shafts 7110 may also expand and retract in length when inclining the flipper solar panels 7106*a-b* upwards and downwards, respectively. By way of example and not limitation, the pivoting shaft 7110 may be an air spring the is pivotably coupled to the mounting pole 5601 and having the expanding and retracting shaft coupled to the flipper solar panel 7106*a-b*. The flipper solar panels 7106*a-b* may rotate between 0 and 90-degrees from a vertical flat position such that their active solar surfaces incline upwards towards the sky, as described elsewhere herein and with respect to the solar panel tower 6600. The flipper solar panels 7106*a-b* may automatically rotate via executed commands by a processor 7002 connected to the solar panel pillar 7100, as described elsewhere herein and with respect to the solar panel tower 6600. The flipper solar panels 7106*a-b* may also revert back to their original vertical and flat positions.

As the months and seasons of the year change, the positioning of the sun relative to the earth may change such that the sun does not exactly rise and set in the same compass directions throughout the whole year. By way of example and not limitation, the sun may rise and set closer to southeast and southwest, respectively, in the winter time, and the sun may rise and set close to east and west, respectively, in the spring time. Consequently, the mounting pole 5601 of the solar panel pillar 7100 may be configured to rotate to compensate for such change in the movement of the sun throughout the year. The mounting pole 5601 may rotate about its vertical central axis to rotate the active solar surfaces of the solar panels in a compass direction that the sun rises and sets at that specific season and time of the year (e.g., month or week). By way of example and not limitation, the solar panel pillar 7100 may be connected to a processor 7002 (see FIG. 71) that actuates and rotates the mounting pole 5601 to face the solar panels at the desired compass direction. Based on the specific location of the solar panel pillar 7100 (e.g., city and state), the processor 7002 may execute machine learning and artificial intelligence software that calculates the desired compass direction, which may be the compass direction the solar panels receive maximum solar irradiation and power at that time of year. The processor 7002 may then execute commands to rotate the mounting pole 5601 and the solar panels accordingly.

Referring specifically to FIG. 57, a system of solar pillars 5500 is shown that harvests solar energy at a higher rate when compared to conventional solar panels since each solar pillar has a plurality of solar panels stacked vertically on top of each other. The solar pillars making up the system of solar pillars 5500 may include the solar pillars and towers shown in the other figures and described elsewhere herein. All of the solar pillars and towers making up the system 5500 may all have the same structural features and be the same. Alternatively, the system of solar pillars 5500 may have a combination of solar pillars and towers shown in the other figures and described elsewhere herein. The usage of different combination of solar pillars and towers in the system 5500 may be needed to harvest solar energy optimally while the solar pillars are adjacent together.

The system of solar pillars 5500 may have one or more solar pillars (e.g., between two to 36 solar pillars). In some examples, the system of solar pillars 5500 may have greater than 36 solar pillars. The solar pillars of the system 5500 may all be in-line with each other and have the active sides of the solar panels of each solar pillar facing the same direction. The solar pillars of the system 5500 may create an L-shape where the active sides of the solar panels of each leg of the L-shape face the same direction. In another example, the solar pillars of the system 5500 may be arranged in a plurality of rows adjacent and behind each other. Such orientation of the active sides of the solar panels may be needed to prevent shadow of the adjacent solar pillars from casting on the active sides of each other. As explained elsewhere herein, each solar pillar of the system 5500 may have solar panels having active sides stacked on top of each other vertically. The vertical height of the active sides of the solar panels stacked on top of each other to make the solar pillar may range between six to 80 feet, as shown in the other figures and described elsewhere herein. In another example, the vertical height of the active sides of the solar panels stacked on top of each other to make the solar pillar may be greater than or equal to 10 feet. The vertical height of the active sides of the solar panels stacked on top of each other to make the solar pillar may be less than or equal to 100 feet.

The solar pillars having solar panels stacked vertically on top of each other may allow for a higher rate of harvesting solar energy per unit area of land. Instead of placing solar panels horizontally next to each other, the solar panels may be stacked above each other to take up less real estate. Consequently, the solar pillars may have a greater energy harvesting density per unit area of land than conventional solar panels that are juxtaposed next to each other horizontally and take up a lot more land and generate less energy and electricity. Each solar pillar in the system 5500 may have a maximum electric power generation capacity of greater than or equal to 4 kW. Each solar pillar in the system 5500 may have a maximum electric power generation capacity of less than or equal to 80 KW of electric power. Each solar pillar in the system 5500 may have a maximum electric power generation capacity between 4 kW and 80 KW. The electric power generation of each solar pillar may depend on the weather, time of year, and the location of the system 5500, and the solar pillars may use artificial intelligence and machine learning to optimize power generation at a given time, as described elsewhere herein. The power generation optimization may be done by moving and orientating the solar panels of each solar pillar to face the sun at an orientation to maximize solar harvesting, which such orientation may be done using artificial intelligence and machine learning controlling an actuator attached to the solar panels and the solar pillars and move and rotating them as needed.

The usage of the solar pillars and the system 5500 may allow for the same amount of solar harvesting and power generation but in a fraction of space taken by conventional single solar panels positioned next to each other. Consequently, a user may use less space for the same electric power generation or use the same space taken by conventional solar panels to generate more power using the solar pillars and the system 5500. In one example, a dozen or more solar pillars (e.g., two to three dozen) making up the system 5500 (see FIG. 57) may be used in a rural environment where flat land may be abundant to generate more power when compared to using conventional single solar panels in the same area of land. In another example, one or more solar pillars making up the system may be used in an urban environment to generate electric power where conventional solar panels may not be able to generate the same power due to the limited space in such urban environment. In both examples, power generation per unit area of land may be maximized.

The power generated by the solar pillars of the system 5500 may be linked to the electric grid to supply electricity to houses, office buildings, and other buildings. As shown in FIG. 57, the power generated by the solar pillars of the system 5500 may be directly linked to EV charging stations 5502 for electric vehicles 5504 to recharge their batteries on-site of the system. The power generated by the solar pillars of the system 5500 may be routed to the electric grid and also be routed to the EV charging stations 5502 on-site.

The solar panels making up the solar pillars may have the same features as described elsewhere herein with other embodiments and examples. The solar panels making up the solar pillars, described elsewhere herein, may be solar photovoltaic panels. Each solar panel of the solar pillars may have one or more active surface sides with a plurality of solar cells. Each active surface side of the solar panel may have solar cells ranging between 20 to 120 solar cells. In some examples, each active surface side of the solar panel may have solar cells greater than 120 solar cells. The solar panels of the solar pillars, described elsewhere herein, may be monocrystalline, polycrystalline, or thin-film solar panels. The solar panels of the solar pillars may be monofacial, having one active surface side, or bifacial, having two active surface sides. The solar panels of the solar pillars may be transparent solar panels, either fully transparent or semi-transparent. The monofacial and bifacial solar panels may be transparent or non-transparent. The solar panels of the solar pillars may be a combination of transparent solar panels, monofacial, and bifacial solar panels. By way of example and not limitation, if the system 5500 of solar pillars shown in FIG. 57 has more than one row that are in front and behind each other, then the solar pillars of the front row may have transparent solar panels and the solar pillars of the behind row may have non-transparent solar panels.

Each solar panel of the solar pillars may generate power in the range of 250 to 650 Watts. In other examples, each solar panel of the solar pillars may generate power greater than 650 Watts.

Referring now to FIG. 58A, a solar panel pillar 5600 is shown having three-dimensional active surfaces. The active surfaces of the solar panels 5604, 5606 may be inclined downwards and upwards in a zigzag shape while hanging along the length of the mounting pole 5601. The zigzag shape may be created along the lateral sides 5608*c-d* of the solar panels 5604, 5606, where the lateral sides 5608*c-d* of a first solar panel 5604 and a second solar panel 5606 make a V-shape. Consequently, the active surfaces of the solar panels 5604, 5606 may occupy an additional dimension (i.e., creating depth) to allow for more active surface to be packed per unit length along the mounting pole 5601.

The zigzag shape of the solar panel pillar 5600 may be a continuous repeating of a V-shape created by a first solar panel 5604 and a second solar panel 5606. The first and second solar panels 5604, 5606 may be rectangular. The first and second solar panels 5604, 5606 may each have a first longitudinal side 5608*a* and a second longitudinal side 5608*b* and a first lateral side 5608*c* and a second lateral side 5608*d*. The first and second longitudinal sides 5608*a-b* of the first and second solar panels 5604, 5606 may be orientated horizontally along the solar panel pillar 5600 while the first and second lateral sides 5608*c-d* are orientated vertically.

To make the V-shape, the first and second solar panels 5604, 5606 may each be inclined downwards from the first longitudinal side 5608a to the second longitudinal side 5608b, where the second longitudinal sides 5608b of the first and second solar panels 5604, 5606 are coupled together to form a lower vertex 5610 of the V-shape. The V-shape may turn into the zigzag shape of the solar panel pillar 5600 by coupling at least two of the V-shaped first and second solar panels 5604, 5606 together. The inclined upwards first longitudinal side 5608a of the first solar panel 5604 may be coupled to the inclined upwards first longitudinal side 5608a of the second solar panel 5606 to make an upper vertex 5612. The upper vertices 5612 may correspond and be opposite to the lower vertices 5610 of the zigzag shaped solar panel pillar 5600. The active solar surfaces of the first and second solar panels 5604, 5606 may be between the lower and upper vertices 5610, 5612. There may be between two to 12 V-shapes created by the first and second solar panels 5604, 5606 to define a solar panel pillar 5600. The solar panel pillar 5600 may have a maximum electric power generation capacity between 4 kW to 15 kW of electricity.

The second longitudinal sides 5608b of the first and second solar panels 5604, 5606 may be pivotably coupled together to form the lower vertices 5610 of the solar panel pillar 5600. Similarly, the first longitudinal sides 5608a of the first and second solar panels 5604, 5606 may be pivotably coupled together to form the upper vertices 5612 of the solar panel pillar 5600. The aforementioned pivotable couplings may be done by one or more pivoting joints 5614 at each of the lower and upper vertices 5610, 5612.

The pivoting joints 5614 may allow the first and second solar panels 5604, 5606 to vertically fold towards each other or vertically unfold away from each other to alter an angle 5615 between the first and second solar panels 5604, 5606 at the lower vertices 5610. The angle 5615 between the first and second solar panels 5604, 5606 at the lower vertex 5610 may range from 0 to 180-degrees, where at 0-degrees the solar panels are completely folded upon each other (e.g., active surface of the solar panels contacting each other) and at 180-degrees the zigzag shape has transitioned to a conventional flat solar surface for the solar panel pillar 5600. As such, the angle 5615 between the first and second solar panels 5604, 5606 may be adjusted for the active surfaces of the solar panels to face the sun at an optimum direction, such as the angle 5615 being between 30 to 80 degrees. The expanding and contracting of the angle 5615 between the first and second solar panels 5604, 5606 may be done by an orientation adjustment system of the solar panel pillar 5600, which is described in detail elsewhere herein. Alternatively, the pivoting joints 5614 of the lower vertices 5610 may move vertically within a sliding slot of the mounting pole 5601 to expand and contract the first and second solar panels 5604, 5606 and alter the angle 5615 between the panels. The sliding slot of the mounting pole 5601 may have a length less than or equal to the maximum height of the solar panel pillar 5600 when the solar panels 5604, 5606 are expanded to be completely flat. Such expansion and contraction may vary throughout the day, depending on the direction of sunlight, and be controlled by artificial intelligence and be calibrated by machine learning.

The solar panel pillar 5600 may also be rotatable around the mounting pole 5601 between 0 to 360-degrees. The rotational mechanism may also be part of the orientation adjustment system of the solar panel pillar 5600, described elsewhere herein. Consequently, the solar panel pillar 5600 may be rotated around the mounting pole 5601 to face the sun at different times of the day. Alternatively, the solar panel pillar 5600 may be rationally fixed to the mounting pole 5601, and the mounting pole 5601 may be configured to rotate between 0 to a full 360-degrees to change the orientation of the solar panel pillar 5600. The rotation of the solar panel pillar 5600 and the pivoting of the first and second solar panels 5604, 5606 may be optional; the solar panel pillar 5600 may have a rigid shape and be securely fastened to the mounting pole 5601.

Referring now to FIG. 58B, another example of the solar panel pillar 5602 is shown where some of the solar panels 5603 are not inclined and are completely vertical. Between the zigzagging pairs of first and second solar panels 5604, 5606, there may exist flat solar panels 5603. The lateral sides 5605c-d of the flat solar panel 5603 may be vertical and parallel to the length of the mounting pole 5601. The longitudinal sides 5605a-b of the flat solar panel 5603 may be coupled to the second longitudinal sides 5608b of the first and second solar panels 5604, 5606. An angle 5617 may be created at each connection point of the longitudinal sides 5605a-b of the flat solar panel 5603 and the second longitudinal sides 5608b of the first solar panels 5604 that have the flat solar panel 5603 therebetween. The angle 5617 between the flat solar panel 5603 and the first solar panels 5604 may be changed using the pivot joints 5614 at the coupling section between the longitudinal sides 5605a-b of the flat solar panel 5603 and the longitudinal sides 5608b of the first solar panels 5604. The angle 5617 proximate to the flat solar panel 5603 may be changed by the orientation adjustment system, described elsewhere herein, and may vary between 90 to 180-degrees. Alternatively, the angle 5617 proximate to the flat solar panel 5603 may be changed by the pivot joints 5614 of the lower vertices 5610 moving vertically within the sliding slot of the mounting pole 5601, described elsewhere herein.

The flat solar panel 5603 and the second angles 5617 may give the solar panel pillar 5602 additional variety of different directions the solar panels may be facing the sun. The flat solar panel 5603 not being pivotable, but flat, may also simplify the operation and orientation of the solar panel pillar 5602. The solar panel pillar 5602 of FIG. 58B may also be rotatable around the mounting pole 5601 and have the first and second solar panels 5604, 5606 pivotable by an orientation adjustment system, described elsewhere herein. The solar panel pillar 5602 may be rotationally fixed to the mounting pole 5601, and the mounting pole 5601 may be configured to rotate, as described elsewhere herein. The solar panel pillar 5602 may have a maximum electric power generation capacity between 4 kW to 15 kW of electricity.

Figure 58C:
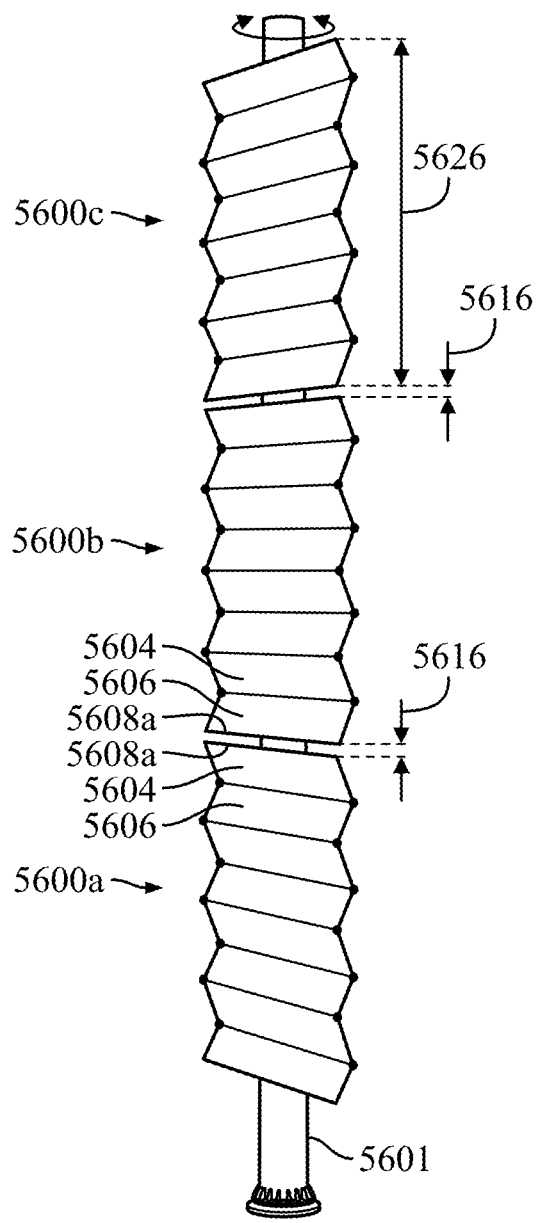
FIG. 58C shows multiple solar pillars of FIG. 58A mounted above each other.

Referring now to FIG. 58C, a plurality of solar panel pillars 5600a-c of FIG. 58A is shown mounted above each other on the mounting pole 5601. As shown in FIG. 58C, three solar panel pillars 5600a-c may be mounted above each other on the mounting pole 5601 and have vertical spacing 5616 between each other. Each solar panel pillar 5600a-c may have a maximum electric power generation capacity between 4 kW to 15 kW. Between two to 12 solar panel pillars 5600a-c may be mounted above each other. Consequently, the combination of solar pillars 5600a-c may generate between 8 kW to 180 KW of maximum power, depending on how many solar panels pillars 5600a-c are installed above each other. In some examples, more than 12 solar panel pillars 5600a-c may be mounted above each other on the mounting pole 5601. In some examples, the solar panel pillars 5600a-c may generate more than 180 KW of power, especially if more than 12 solar panel pillars are mounted vertically upon the mounting pole 5601. The vertical spacing 5616 between the solar panel pillars 5600a-c may be necessary for mitigating interference between the pillars since the solar panels 5604, 5606 of the plurality of solar panel pillars 5600a-c may be designed to pivot inward and outward, as described elsewhere herein. The vertical spacing 5608 may be measured from the longitudinal sides 5608a of the outer first and second solar panels 5604, 5606 of each solar panel pillar 5600a-c.

The plurality of solar panel pillars 5600a-c may be electrically connected to each other. The plurality of solar panel pillars 5600a-c may rotate around the mounting pole 5601 in synch with each other or independent with each other, where the rotation may be between 0 to 360-degrees, as described elsewhere herein. The solar panels 5604, 5606 of the plurality of solar panels 5600a-c may pivot and vertically expand and contract in synch with each other or independent from each other. As a consequence of the solar panels 5604, 5606, and the solar panel pillars in general, expanding and contracting, the vertical spacing 5608 between the pillars may increase and decrease. The plurality of solar panel pillars 5600a-c may fully expand to make the solar panels 5604, 5606 vertically flat and not in a zigzag shape. At the fully expanded position, the vertical spacing 5608 may be zero, or alternatively there may be some vertical spacing 5608 between the pillars.

Each solar panel pillar 5600a-c may have a height 5616 measured from the first longitudinal sides 5608a (i.e., outer longitudinal sides) of the outer solar panels 5604, 5606 of the solar pillar. The pillar height 5616 may vary depending on the pivoting, expansion, and contraction of the solar panels 5604, 5606. In the fully extended position of the solar panel pillars 5600a-c, where the solar panels 5604, 5606 are vertically flat, the pillar height 5616 may be between five to 12 feet. In some examples, the pillar height 5616 may be greater than 12 feet when the solar panel pillars 5600a-c are fully extended. When the solar panels 5604, 5606 are contracted, the pillar height 5616 may become a fraction of the fully extended value, such as ¾, ⅔, ½, ⅓, or ¼ the fully extended pillar height 5616. As described elsewhere herein, the solar panels 5604, 5606 may also fold upon each other.

Figure 58D:
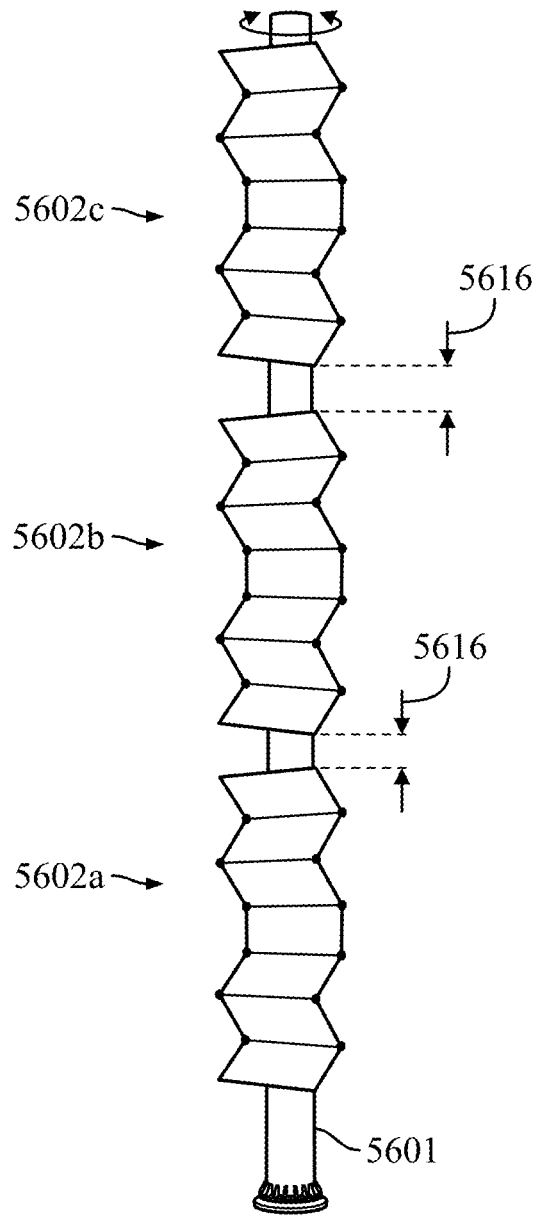
FIG. 58D shows multiple solar pillars of FIG. 58B mounted above each other.

Referring now to FIG. 58D, a plurality of solar panel pillars 5602a-c of FIG. 58B is shown mounted above each other on the mounting pole 5601. The solar panel pillars 5602a-c stacked on top of each other may have the same features as described with respect to FIG. 58C, except the solar panel pillars 5602a-c of FIG. 58B are used instead of FIG. 58A. It is contemplated herein that a combination of solar panel pillars 5600 of FIG. 58A and solar panel pillars 5602 of FIG. 58B may be used in conjunction and stacked above each other.

Figure 59B:
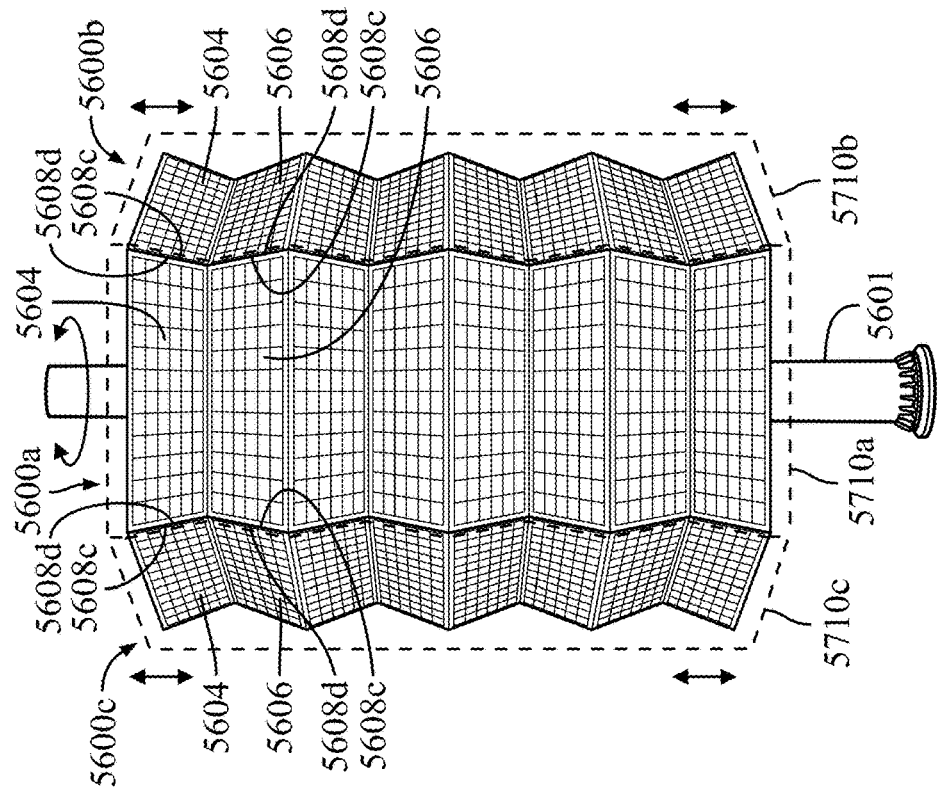
FIG. 59B shows multiple solar pillars of FIG. 58A mounted horizontally next to each other with no horizontal spacing therebetween.
Figure 59A:
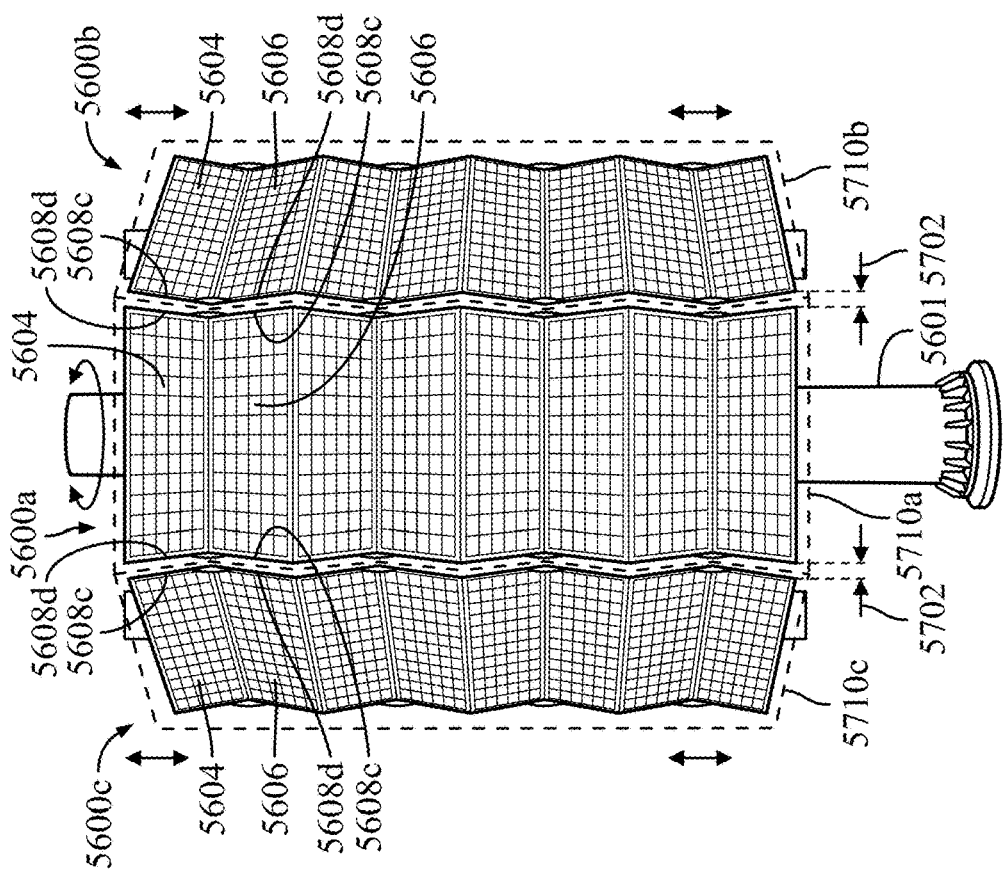
FIG. 59A shows multiple solar pillars of FIG. 58A mounted horizontally next to each other.

Referring now to FIG. 59A, a plurality of solar pillars 5600a-c are shown stacked horizontally next to each other and surrounding the mounting pole 5601. Instead of being stacked above each other, the solar pillars 5600a-c may be stack horizontally side-to-side to each other. The solar panel pillars 5600a-c may each be of the same kind as shown in FIG. 58A and having the same structural features and functions. The vertical stacking of FIG. 58A may also be combined with the horizontal stacking of FIG. 59A to utilize the spacing along and around the mounting pole 5601 to generate electricity from solar energy harvest by the solar panels 5604, 5606 as much as possible.

The three solar panel pillars 5600a-c may form a trapezoidal shape, such as a semi-hexagon, around the mounting pole 5601 and surround the pole by 180-degrees or greater. The semi-hexagon shape that the three solar panel pillars 5600a-c make around the mounting pole 5601 may also be considered as a C-shape. The active solar surface of the solar panels 5604, 5606 of each solar panel pillar 5600a-c may be on the outside surface of the semi-hexagon shape and opposite to the mounting pole 5601. Alternatively, six solar panel pillars 5600a-c may be used around the mounting pole 5601 to make a hexagon shape around such pole.

The semi-hexagon shape of the solar panel pillars 5600a-c may be defined by three planes 5710a-c facing the mounting pole 5601 and extending upwards along the length of the mounting pole 5601. A right plane 5710b and a left plane 5710c may incline and pivot towards the mounting pole 5601 from a center plane 5710a to make a C-shape around the pole. The active surfaces of the solar panels 5604, 5606 of the center solar pillar 5600a may face the center plane 5710a and away from the mounting pole 5601. Similarly, the active surfaces of the solar panels 5604, 5606 of the right solar pillar 5600b may face the right plane 5710b and away from the mounting pole 5601. Similarly, the active surfaces of the solar panels 5604, 5606 of the left solar pillar 5600c may face the left plane 5710c and away from the mounting pole 5601.

Each solar panel pillar 5600a-c shown in FIG. 59A may expand and contract vertically and rotate around the mounting pole 5601, as described elsewhere herein, for example by one or more orientation adjustment systems. Each solar panel pillar 5600a-c may have an orientation adjustment system, or all three solar panel pillars 5600a-c may share one orientation adjustment system. The solar panel pillars 5600a-c may rotate and fold and unfold in synch with each other or independent from each other. The rotations of the solar panel pillars 5600a-c around the mounting pole 5601 and the vertical upward and downward folding and unfolding may be necessary to situate the solar panels 5604, 5606 of the solar pillars at an optimum orientation relative to the sun. There may exist horizontal spacing 5702 between the vertical lateral sides 5608c-d of the solar panels 5604, 5606 of the solar panel pillars 5600a-c in FIG. 59A to allow for the vertical expansion and contraction of the solar panels and, optionally, independent rotation of the solar pillars 5600a-c from each other.

Referring now to FIG. 59B, another example is shown where the solar pillars 5600a-c are stacked adjacent to each other to make a semi-hexagon shape around the mounting pole 5601. In this example, the vertical lateral sides 5608c-d of the solar panels 5604, 5606 of the solar panel pillars 5600a-c contact each other and have no horizontal spacing therebetween. The lateral sides 5608c-d of the different solar panel pillars 5600a-c may be coupled to each other, or alternatively may be rotated towards each other to eliminate the horizontal spacing 5702 in FIG. 59A. The solar panel pillars 5600a-c of FIG. 59B may rotate and vertically expand and contract with each other either in synch or independent with each other, as described elsewhere herein. The close packing of the solar panel pillars 5600a-c shown in FIG. 59B may increase the energy harvesting density per unit area of the solar panels attached around the mounting pole 5601. In another example, there may exist six solar panel pillars 5600a-c horizontally stacked next to each other to make a 360-degree hexagon shape around the mounting pole 5601.

Each solar panel pillar 5600a-c in FIGS. 59A-B may have a maximum electric power generation capacity between 4 kW to 15 kW. The horizontal stacking of the pillars around the mounting pole 5601 may optimize the power generation per unit area of land, especially considering the vertical stacking of solar panels 5604, 5606 in each solar panel pillar 5600a-c. As described elsewhere herein, the multiple rows of solar panel pillars 5600a-c may be stacked above each other along the mounting pole 5601 to further optimize power generation.

Referring now to FIGS. 60A-B, another example of the solar panel pillar 5800 is shown having solar panel columns 5802a-c and sub-columns 5804. Each solar panel column 5802a-c may be made from a plurality of sub-columns 5804 having flat solar panels 5812 with their longitudinal sides 5814a in the vertical direction. The longitudinal sides 5814a of the flat solar panels 5812 of the sub-columns 5804 may adjoin and connect with the flat solar panels 5812 of the other sub-columns 5804 in the solar panel column 5802a-c. Alternatively, there may exist horizontal spacing between the sub-columns 5804 in each solar panel column 5802a-c. Each solar panel column 5802a-c may have between two to six sub-columns 5804. In some examples, each solar panel column 5802a-c may have greater than six sub-columns.

The solar panel columns 5802a-c may also be seen as having a plurality of rows 5806 of flat solar panels 5812. The horizontal lateral sides 5814b of the flat solar panels 5812 in each row 5806 may adjoin and connect with the lateral sides 5814b of the solar panels 5812 in other rows 5806 of the solar panel columns 5802a-c. Alternatively, there may exist vertical spacing between the rows 5806 in each solar panel column 5802a-c. Each solar panel column 5802a-c may have between two to 24 rows 5806 of flat solar panels 5812. In some examples, each solar panel column 5802a-c may have greater than 24 rows 5806 of flat solar panels 5812.

There may exist one to six solar panel columns 5802a-c coupled around the mounting pole 5601. As shown in FIG. 60A, there may exist three solar panel columns 5802a-c forming a trapezoidal shape, such as a semi-hexagon, around the mounting pole 5601 and surround the pole by 180-degrees or greater. The semi-hexagon shape that the three solar panel columns 5802a-c make around the mounting pole 5601 may also be considered as a C-shape. The active surface of the solar panels 5812 of each solar panel column 5802a-c may be on the outside surface of the semi-hexagon shape and opposite to the mounting pole 5601. Alternatively, six solar panel columns 5802a-c may surround the mounting pole 5601 to make a 360-degree hexagon shape around such pole.

The semi-hexagon shape formed by the solar panel columns 5802a-c may be defined by three planes 5810a-c facing the mounting pole 5601 and extending upwards along the length of the mounting pole 5601. A right plane 5810b and a left plane 5810c may incline and pivot towards the mounting pole 5601 from a center plane 5810a to make a C-shape around the pole. The active surfaces of the solar panels 5812 of the center solar column 5802a may face the center plane 5810a and away from the mounting pole 5601. Similarly, the active surfaces of the solar panels 5812 of the right solar column 5802b may face the right plane 5810b and away from the mounting pole 5601. Similarly, the active surfaces of the solar panels 5812 of the left solar pillar 5802c may face the left plane 5810c and away from the mounting pole 5601.

There may exist horizontal spacing 5811 between the solar panel columns 5802a-c. Specifically, there may exist horizontal spacing 5811 between the center solar column 5802a and the right solar column 5802b and horizontal spacing 5811 between the center solar column 5802a and the left solar column 5802c. The horizontal spacing 5811 may be between the outer longitudinal sides 5814a of the flat solar panels 5812 of the outer sub-columns 5804 of the center solar column 5802a and the right and left solar columns 5802b-c. Alternatively, there may be no horizontal spacing 5811 between the solar panel columns 5802a-c. The solar panel columns 5802a-c may be coupled with each other by a plurality of railings 5808. The railings 5808 may be used to retract and expand (i.e., fold and unfold) the solar panel columns 5802a-c together, including folding and unfolding the sub-columns 5804 of each column together, as described with reference to FIGS. 65A-B. The railings 5808 may also provide reinforcement and stability for the solar panel columns 5802a-c by coupling the rows 5806 of flat solar panels 5812 of each column together.

Figure 65A:
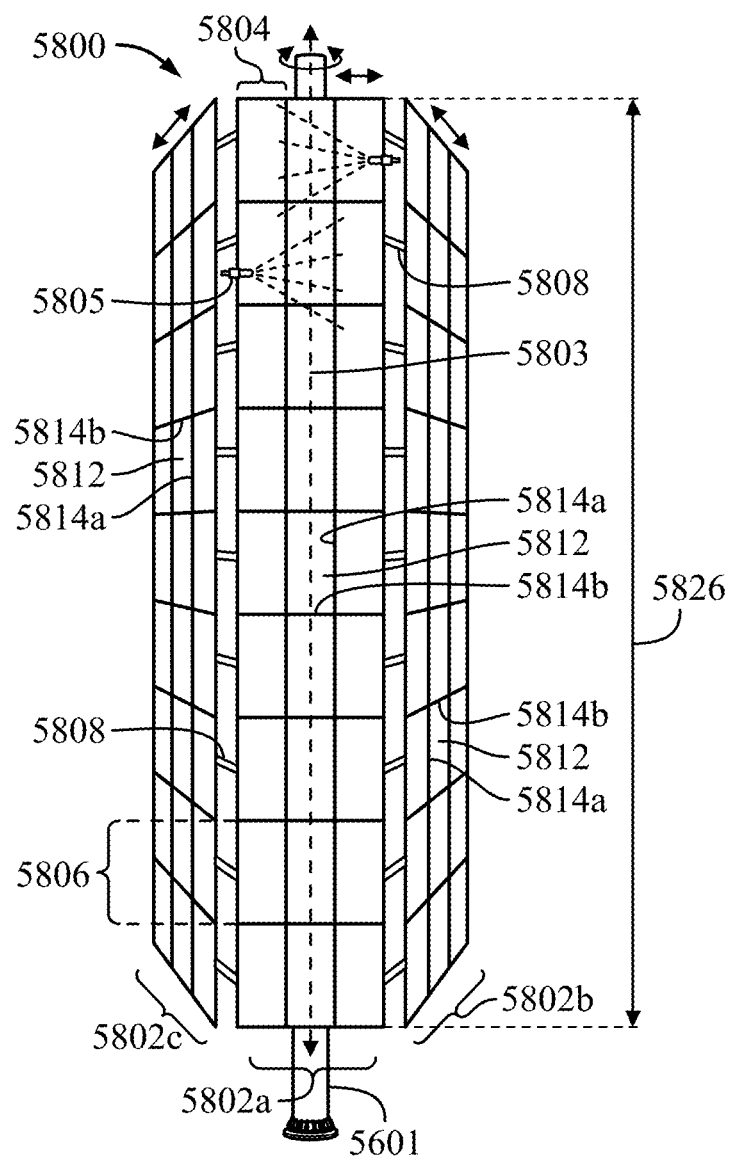
FIGS. 65A-B show the solar pillar of FIG. 60A in an unfolded and folded orientation.

As shown in FIG. 65A, each solar panel column 5802a-c may have a height 5826 between six to 80 feet. In some examples, the height 5826 of the solar panel columns 5802a-c may be greater than 80 feet. The height 5826 of the solar panel columns 5802a-c may be measured from the lower lateral side 5814b of the lowest flat solar panel 5812 in the column to the upper lateral side 5814b of the highest flat solar panel 5812 in the column. The solar panel columns 5802a-c may also be elevated off the ground by three to eight feet. In some examples, the solar panel columns 5802a-c may be elevated off the ground by more than eight feet. As such, a user may walk under the solar panel columns 5802a-c and use the spacing thereunder.

As shown in FIG. 60B, a protective cover 5820 may roll down and cover the solar panel column 5802a-c when the solar column is not in use. Each solar panel column 5802a-c may have a protective cover 5820 rolled above the column and to be unrolled and slide down the entire height 5826 of the solar panel column 5802a-c to cover the solar panels 5812. The protective cover 5820 may be made from a flexible material, such as a fabric. The rolling and unrolling of the protective cover 5820 may be done by a motor 5818, such as a motorized roller, which may be orientated above the solar panel column 5802a-c. The protective cover 5820 may protect the flat solar panels 5812 from natural elements, such as rain, snow, or dirt and dust.

As shown in FIG. 60B, the solar panel columns 5802a-c may be rotatable around the mounting pole 5601 either in synch with each other or independent from each other, if the columns are not coupled by the railings 5808. The rotational range of the solar panel columns 5802a-c may be as described elsewhere herein. The solar panel columns 5802a-c may be rotatable via an orientation adjustment system, described elsewhere herein. Alternatively, the solar panel columns 5802a-c may be rotationally fixed to the mounting pole 5601, and the mounting pole 5601 may rotate about its center, as describe elsewhere herein. The solar pillar 5800 in FIG. 60A may have a maximum electric power generation capacity in the range of 4 kW and 80 KW. In some examples, the solar pillar 5800 may have a maximum electric power generation capacity greater than 80 kW.

Referring now to FIG. 60C, the protective cover 5820 is shown rolling open sideways instead of vertically. Flat rectangular solar panels 5832 may be placed in rows and above each other, as shown in FIG. 60C. The protective cover 5820 may unroll sideways to cover the solar panels 5832 when they are not in use to protect them from natural elements, as described elsewhere herein. The protective cover 5820 may reroll and contract to expose the active surfaces of the solar panels 5832 when the panels are in operation for solar harvesting. The protective cover 5820 may be made from a rigidly flexible material that allows the cover to move horizontally and cover the solar panel 5832 rows. In another example, the protective cover 5820 may come in rigid module pieces, such as slats, that are stacked on each other in the folded position and unfold and move sideways in the unrolled position of the protective cover

5820. The protective cover 5820 may unroll to the entire length of the solar panel rows. The protective cover 5820 may unroll and move sideways via a motor, such as a motorized roller.

Spray bars 5822 (optional) above the columns of solar panels 5832 may provide water for washing dust and dirt off the solar panels 5832. Each column of solar panels 5834 may have a spray bar 5822 above thereof to spray water down the column. Alternatively, the spray bars 5822 may be at the bottom of the column of solar panels 5832 and spray water upwards. The spray bars 5822 may also be in-between the solar panel 5832 columns and rotate sideways to spray multiple solar panel columns.

Referring now to FIG. 61A, another example of a solar panel pillar 5900 is shown. The solar panel pillar 5900 may have a plurality of columns 5902*a*-*c* of solar panels 5904 orientated in a trapezoidal shape and covering at least a portion of the mounting pole 5601. Each solar panel column 5902*a*-*c* may have a plurality of solar panels 5904 stacked on top of each other. The solar panels 5904 may be stacked on their longitudinal sides 5914*a* that are horizontal and where the longitudinal sides 5914*a* contact and connect with each other. The longitudinal sides 5914*a* of the solar panels 5904 being horizontal may allow for more solar panels to be stacked in the solar panel columns 5902*a*-*c* when compared to the longitudinal sides being vertical instead. Each solar panel column 5902*a*-*c* may have between two to 48 flat solar panels 5904 stacked on top of each other. In some examples, each solar panel column 5902*a*-*c* may have greater than 48 flat solar panels 5904 stacked on top of each other.

There may exist one to six solar panel columns 5902*a*-*c* coupled around the mounting pole 5601. As shown in FIG. 61A, there may exist three solar panel columns 5902*a*-*c* forming a trapezoidal shape, such as a semi-hexagon, around the mounting pole 5601 and surround the pole by 180-degrees or greater. The relative orientation of the solar panel columns 5902*a*-*c* may be as described elsewhere herein. Mainly, the semi-hexagon shape of the solar panel columns 5902*a*-*c* may be defined by three planes 5910*a*-*c* facing the mounting pole 5601 and extending upwards along the length of the mounting pole 5601. A right plane 5910*b* and a left plane 5910*c* may incline and pivot towards the mounting pole 5601 from a center plane 5910*a* to make a C-shape around the pole. The solar panel columns 5902*a*-*c* of the solar panel pillar 5900 may also be rotatable around the mounting pole 5601, as described elsewhere herein. Alternatively, the mounting pole 5601 may rotate the solar panel columns 5902*a*-*c*, as described elsewhere herein.

Horizontal spacing 5908 may exist between the solar panel columns 5902*a*-*c*, as described elsewhere herein. Specifically, horizontal spacing 5908 may exist between the center solar column 5902*a* and the right solar column 5902*b* and horizontal spacing 5908 between the center solar column 5902*a* and the left solar column 5902*c*. The horizontal spacing 5908 may be between the inner lateral sides 5914*b* of the solar panels 5904 of the right and left solar columns 5902*b*-*c* and the lateral sides 5914*b* of the solar panels 5904 of the center solar column 5902*a*. Alternatively, there may be no horizontal spacing 5908 between the solar panel columns 5902*a*-*c*.

As shown in FIG. 61A, each solar panel column 5902*a*-*c* may have a height 5927 between four to 80 feet. In some examples, the height 527 of the solar panel columns 5902*a*-*c* may be greater than 80 feet. The height 527 of the solar panel columns 5902*a*-*c* may be measured from the lower longitudinal side 5914*a* of the lowest flat solar panel 5904 in the column to the upper longitudinal side 5914*a* of the highest flat solar panel 5904 in the column. The solar panel columns 5902*a*-*c* may also be elevated off the ground, as explained elsewhere herein.

Referring to FIG. 61B, another example of a solar panel pillar 5903 is shown. In this example, the solar panel pillar 5903 may also have a plurality of solar panel columns 5902*a*-*c*. The solar panel columns 5902*c* of the solar panel pillar 5903 may include columns in the number range that is described elsewhere herein. The three solar panel columns 5902*a*-*c* of the solar panel pillar 5903 may form the semi-hexagon shape around at least a portion of the mounting pole 5601 as similarly described elsewhere herein. Mainly, a right plane 5910*b* and a left plane 5910*c* may incline and pivot towards the mounting pole 5601 from a center plane 5910*a* to make a C-shape around the pole. The active surfaces of the center solar column 5902*a* may face the center plane 5910*a* and away from the mounting pole 5601. Similarly, the active surfaces of the right and left solar columns 5902*b*-*c* may also face their respective planes 5910*b*-*c* and away from the mounting pole 5601. The solar panel columns 5902*a*-*c* of the solar panel pillar 5903 may also be rotatable around the mounting pole 5601, as described elsewhere herein. Alternatively, the mounting pole 5601 may rotate the solar panel columns 5902*a*-*c* of the solar panel pillar 5903, as described elsewhere herein.

Each solar panel column 5902*a*-*c* of the solar panel pillar 5903 may have between two to 24 solar panels 5906 having their longitudinal sides 5914*a* in the vertical orientation. In some examples, each solar panel column 5902*a*-*c* may have greater than 24 solar panels 5812. As shown in FIG. 61B, each solar panel column 5902*a*-*c* may have solar panels 5906 that are vertically above each other and have longitudinal sides 5914*a* in the vertical position. As such, each solar panel column 5902*a*-*c* may have a more compact width and take up less land horizontal space since the lateral sides 5914*b* of the solar panels 5906 are horizontal rather than the longitudinal sides 5914*a*. As shown in FIG. 61B, each solar panel column 5902*a*-*c* of the solar panel pillar 5903 may have a height 528 between six to 80 feet. In some examples, the height 5928 of the solar panel columns 5902*a*-*c* of the solar panel pillar 5903 may be greater than 80 feet. The height 5928 of the solar panel columns 5902*a*-*c* of the solar panel pillar 5903 may be measured from the lower lateral side 5914*b* of the lowest solar panel 5906 in the column to the upper lateral side 5914*b* of the highest flat solar panel 5906 in the column. The solar panel columns 5902*a*-*c* in FIG. 61B may also be elevated off the ground, as described elsewhere herein.

There may exist horizontal spacing 5908 between the solar panel columns 5902*a*-*c* of the solar panel pillar 5903, as described elsewhere herein. Alternatively, there may be no horizontal spacing 5908 between the solar panel columns 5902*a*-*c*. There may also exist vertical spacing 5907 between the solar panels 5906 in each solar panel column 5902*a*-*c* of the solar panel pillar 5903. Alternatively, there may be no vertical spacing 5907 between the solar panels 5906 in each solar panel column 5902*a*-*c*.

Referring now to FIG. 61C, another example of the solar panel pillar 5905 is shown where three solar panel columns 5902*a*-*c* completely surround the mounting pole 5601. The solar panel columns 5902*a*-*c* and the solar panels 5906 may be similar, or the same, as what has been described with respect to FIG. 61B and elsewhere herein. The main difference between the solar panel pillar 5903 of FIG. 61B and the solar panel pillar 5905 of FIG. 61C may be that the three solar panel columns 5902*a*-*c* surround the mounting pole 5601 by 360-degrees. The solar panel columns 5902*a*-*c* of the solar panel pillar 5905 may form a triangular prism around the mounting pole 5601 where the pole extends through the hollow base of the triangular prism and along the length of the prism shape. The active surfaces of the solar panels 5914 of the solar panel columns 5902*a-c* may make up the external lateral surfaces of the triangular prism. There may exist horizontal spacings 5908*a* along the lateral edges of the triangular prism shape formed by the three solar panel columns 5902*a-c* of the solar panel pillar 5905, and as described elsewhere herein. Alternatively, there may be no horizontal spacing 5908*a* and the longitudinal sides 5914*a* of the solar panels 5906 of the solar panel columns 5902*a-c* may connect to each other. There may exist vertical spacing between the solar panels 5906 in each column, as described with respect to FIG. 61B and elsewhere herein. The height of the solar panel columns 5902*a-c* of the solar panel pillar 5905 may be similar, or the same, as what has been described with the solar panel pillar 5903 of FIG. 61B and described elsewhere herein.

The solar panel pillars 5900, 5903, and 5905 in FIGS. 61A-C may each generate maximum electric power in the range of 4 kW and 80 kW. In some examples, the solar panel pillars 5900, 5903, and 5905 may each generate maximum electric power greater than 80 kW.

Referring now to FIG. 62A, another example of the solar panel pillar 6000 is shown that has a plurality of solar panel sub-pillars 6002*a-c*. Each solar panel sub-pillar 6002*a-c* may have a plurality of solar panel rows 6004. The solar panels 6008 in the solar panel rows 6004 may be paired up and protrude outward to have three-dimensional active surfaces.

The solar panel sub-pillars 6002*a-c* of the solar panel pillar 6000 may be attached to the mounting pole 5601 and positioned above each other. There may exist between one to 12 solar panel sub-pillars 6002*a-c* of the solar panel pillar 6000. In some examples, there may exist greater than 12 solar panel sub-pillars 6002*a-c* of the solar panel pillar 6000. There may exist vertical spacing 6016 between the sub-pillars 6002*a-c*. By way of example and not limitation, the vertical spacing 6016 may be defined as the distance between the lower lateral side 6014*b* of the lowest solar panel 6008 in the upper sub-pillar 6002*c* and the upper lateral side 6014*b* of the highest solar panel 6008 in the middle sub-pillar 6002*b*.

As shown in FIG. 62A, the plurality of solar panel rows 6004 of the solar panel sub-pillars 6002*a-c* may extend around the mounting pole 5601 in a rectangular/square shape. By way of example and not limitation, and as shown in FIG. 62A, the rectangular/square outline of the solar panel rows 6004 may have a front side, right side, and left side around the mounting pole 5601. In some examples, the rectangular/square outline may also have a rear side. The active surfaces of the solar panels 6008 in the solar panel rows 6004 may face away from the mounting pole 5601. Each solar panel sub-pillar 6002*a-c* of the solar panel pillar 6000 may have between two to 12 solar panel rows 6004. In some examples, each solar panel sub-pillar 6002*a-c* of the solar panel pillar 6000 may have greater than 12 solar panel rows 6004. There may exist vertical spacing 6012 between the solar panel rows 6004 of the solar panel sub-pillars 6002*a-c*. The vertical spacing 6012 between the solar panel rows 6004 may be measured from the upper lateral sides 6014*b* of the solar panels 6008 of the lower solar panel row 6004 and the lower lateral sides 6014*b* of the solar panels of the upper solar panel row 6004. The vertical spacing 6012 between the solar panel rows 6004 of the solar panel sub-pillars 6002*a-c* may be less than the vertical spacing 6016 between the solar panel sub-pillars 6002*a-c*. Alternatively, there may be no vertical spacing 6012 between the solar panel rows 6004.

The solar panels 6008 in the solar panel rows 6004 may be paired up and protrude outward in a V-shape to have three-dimensional active surfaces. The solar panels 6008 in the solar panel rows 6004 may have longitudinal sides 6014*a* that are oriented vertically and lateral sides 6014*b* that are oriented horizontally. The triangular V-shape may be created by connecting and attaching the longitudinal sides 6014*a* of the solar panels 6008 diagonally such that the solar panels are protruding outward and away from the mounting pole 5601 and are not laying flush relative to each other. The connected longitudinal sides 6014*a* of the solar panels 6008 may make up the vertex of the triangular V-shape created by the solar panels. Each solar panel row 6004 may have between two to 24 pairs of solar panels 6008 that make triangular V-shapes for the for the formation of three-dimensional active surfaces. In some examples, each solar panel row 6004 may have greater than 24 pairs of solar panels 6008.

Referring now to FIG. 62B, another example of a solar panel pillar 6003 is shown with solar panel rows 6006 of the solar panel sub-pillars 6002*a-b* making a cylindrical outline around the mounting pole 5601. Each solar panel sub-pillar 6002*a-b* of the solar panel pillar 6003 may have a plurality of solar panel rows 6006. The solar panel rows 6006 may have solar panels 6011 having vertical longitudinal edges 6014*a* and horizontal lateral edges 6014*b* and having active solar surfaces facing away from the mounting pole 5601. Such orientation of the solar panels 6006 may be of importance, as explained elsewhere herein. The solar panels 6011 may be positioned relative to each other in the solar panel row 6006 to encircle the mounting pole 5601 that the solar panels 6011 are attached thereto by 360-degrees. The cylindrical outline made by the solar panels 6011 may ensure that solar energy is harvested by the solar panel pillar 6003 at all times throughout the day since the solar panel pillar 6003 have active solar surfaces at all 360-degrees.

Each solar panel sub-pillar 6002*a-b* of the solar panel pillar 6003 may have between two to 12 solar panel rows 6006. In some examples, each solar panel sub-pillar 6002*a-b* of the solar panel pillar 6003 may have greater than 12 solar panel rows 6006. The more solar panel rows 6006 stacked vertically above each other, the more solar energy may be harvested per unit area of land that the solar panel pillar 6003 occupies. Each solar panel row 6006 of the solar panel pillar 6003 may have between four to 24 solar panels 6011 mounted and encircling around the mounting pole 5601. The more solar panels 6011 encircling the mounting pole 5601, the more solar energy may be harvested per unit area of land that the solar panel pillar 6003 occupies.

There may exist vertical spacing 6016 between the solar sub-pillars 6002*a-b* of the solar panel pillar 6003 similar to what has been explained with reference to FIG. 62A and described elsewhere herein. There may exist vertical spacing 6012 between the solar panel rows 6006 of the solar panel pillar 6003 similar to what has been explained with reference to FIG. 62A and described elsewhere herein. There may exist horizontal spacing 6018 between the solar panels 6011 in the cylindrical-shaped solar panel rows 6006. The horizontal spacing 6018 may be measured from one longitudinal side 6014*a* of one solar panel 6011 and the adjacent longitudinal side 6014*a* of the adjacent solar panel 6011 having the horizontal spacing 6018 therebetween. Alternatively, there may be no horizontal spacing 6018 between the solar panels 6011 in the cylindrical-shaped solar panel rows 6006.

The distance of the horizontal spacing 6018 may be less than or equal to the vertical spacing 6016 between the solar sub-pillars 6002a-b.

Referring now to FIG. 62C, another example of the solar panel pillar 6005 is shown. In this example, the solar panel pillar 6005 may be made from solar panel pillars 5600a-c shown in FIG. 59B, which may now be considered as sub-pillars. The solar panel pillar 6005 of FIG. 62C may be a longer version of what is shown in FIG. 59B. The solar panel sub-pillars 200a-c of the solar panel pillar 6005 may have a height 6020 between four to 80 feet. Consequently, the solar panel pillar 6005 may have a height 6020 between four to 80 feet. In some examples, the height 6020 of the solar panel sub-pillars 200a-c of the solar panel pillar 6005 may be greater than 80 feet. The height 6020 of the solar panel sub-pillars 5600a-c may be measured from the lower longitudinal side of the lowest solar panel in the column to the upper longitudinal side of the highest solar panel in the column. Each solar panel sub-pillars 5600a-c of the solar pillar 6005 may have between 12 to 36 pairs of solar panels 5604, 5606, where each pair makes a V-shape protruding outwards, as described elsewhere herein. In some examples, each solar panel column 6024a-c may have greater than 36 pairs of solar panels 5604, 5606. The solar panel sub-pillars 5600a-c may also be elevated off the ground, as explained elsewhere herein. As shown in FIGS. 10A-B, and described elsewhere herein, the solar panel pillar 6005 may vertically contract and have the solar panels 5604, 5606 all stacked on top of each other in a folded orientation.

The solar panel pillars 6000, 6003, and 6005 in FIGS. 62A-C may each generate maximum electric power in the range between 4 kW and 80 KW. In some examples, the solar panel pillars 6000, 6003, and 6005 may each generate maximum electric power greater than 80 kW.

Figure 63A:
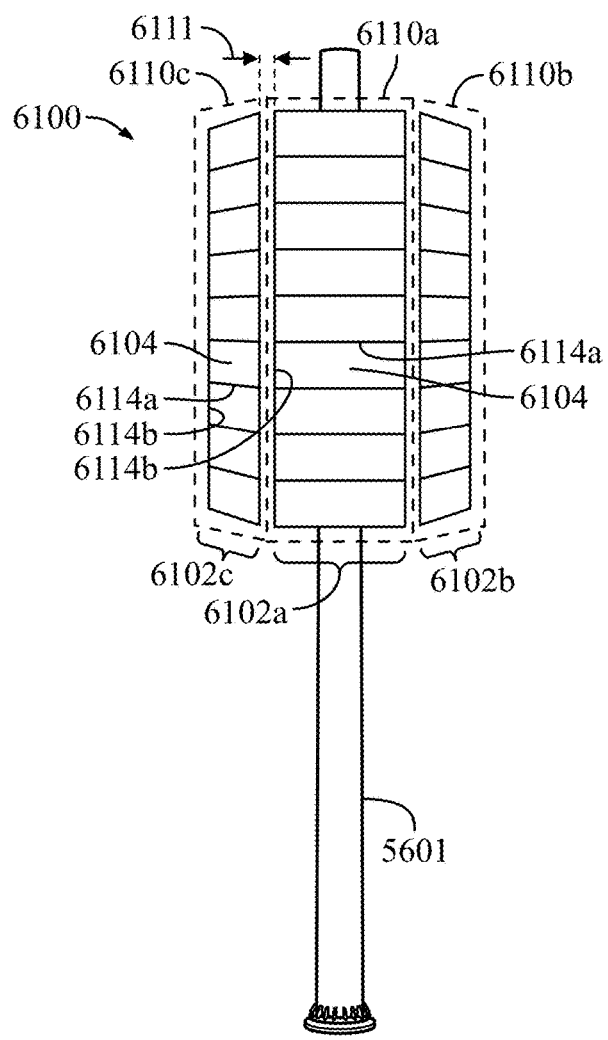
FIGS. 63A-B show different examples of solar panel pillars.

Referring now to FIG. 63A, another example of the solar pillar 6100 is shown. In this example, the solar panels 6104 in each solar panel column 6102a-c may vertically stack on their longitudinal sides 6114a and lay flush with each other. The longitudinal sides 6114a of the solar panels 6104 may be horizontal and the lateral sides 6114b may be vertical. Each solar panel column 6102a-c may have between two to 36 solar panels 6104. In some examples, each solar panel column 6102a-c may have greater than 36 solar panels 6104. The plurality of solar panel columns 6102a-c may have the same orientation and features, described elsewhere herein. Mainly the plurality of solar panel columns 6102a-c may form a semi-hexagon around at least a portion of the mounting pole 5601. The semi-hexagon shape of the solar panel columns 6102a-c may be defined by three planes 6110a-c facing the mounting pole 5601 and extending upwards along the length of the mounting pole 5601, as described elsewhere herein. A right plane 6110b and a left plane 6110c may incline and pivot towards the mounting pole 5601 from a center plane 6110a to make a C-shape around the pole, as described elsewhere herein. The active surface of the solar panels 6104 in each column 6102a-c may face their respective plane 6110a-c and away from the mounting pole 5601. The solar panel columns 6102a-c may be rotatable around the mounting pole 5601, as described elsewhere herein.

Figure 63B:
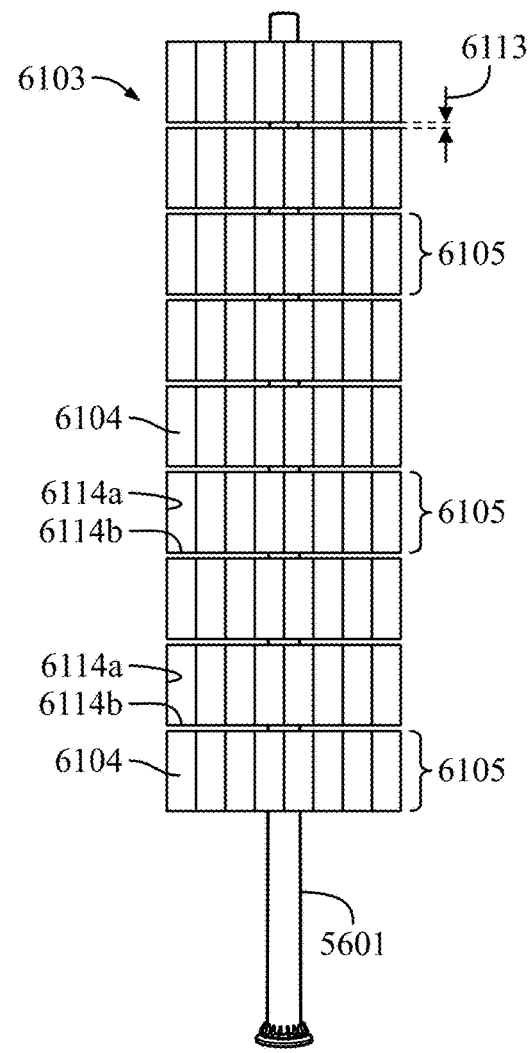

Referring now to FIG. 63B, another example of the solar panel pillar 6103 is shown. In this example, the solar panels 6104 may be in solar panel rows 6105 where the longitudinal sides 6114a of the solar panels 6104 may be vertical and the lateral sides 6114b horizontal. The solar panels 6104 may be closely packed where the longitudinal sides 6114a of the solar panels 6104 that are in the same row 6105 may contact and be attached to each other. The active solar surfaces of the solar panels 6104 in the solar panel rows 6105 may lay flush with each other. The solar panel pillar 6103 may have between two to 24 solar panel rows 6105. In some examples, the solar panel pillar 6103 may have greater than 24 solar panel rows 6105. There may exist vertical spacing 6113 between the solar panel rows 6105. The vertical spacing 6113 may be defined as explained elsewhere with other examples of the solar panel pillar. Each solar panel row 6105 may have between two to 24 solar panels having longitudinal sides 6114a in the vertical orientation. In some examples, each solar panel row 6105 may have greater than 24 solar panels.

The solar panel pillars 6100, 6103 in FIGS. 63A-B may each generate maximum electric power in the range of 4 kW and 80 KW. In some examples, the solar panel pillars 6100, 6103 may each generate maximum electric power greater than 80 kW.

Figure 64C:
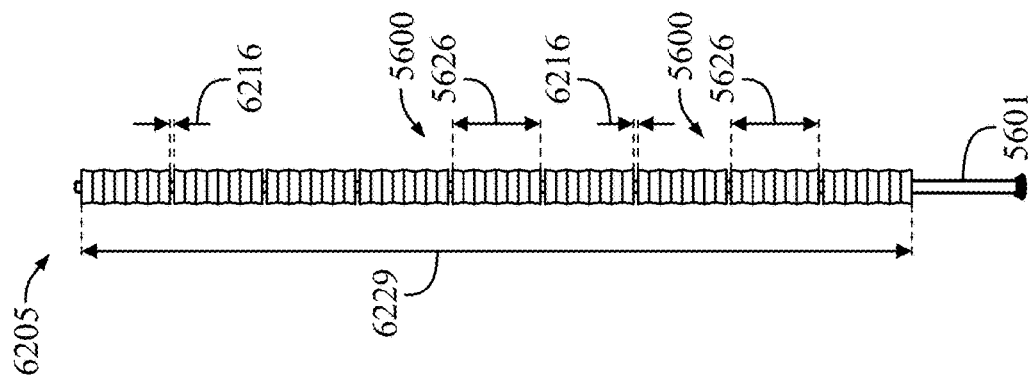
FIGS. 64A-C show different examples of solar panel pillars.
Figure 64B:
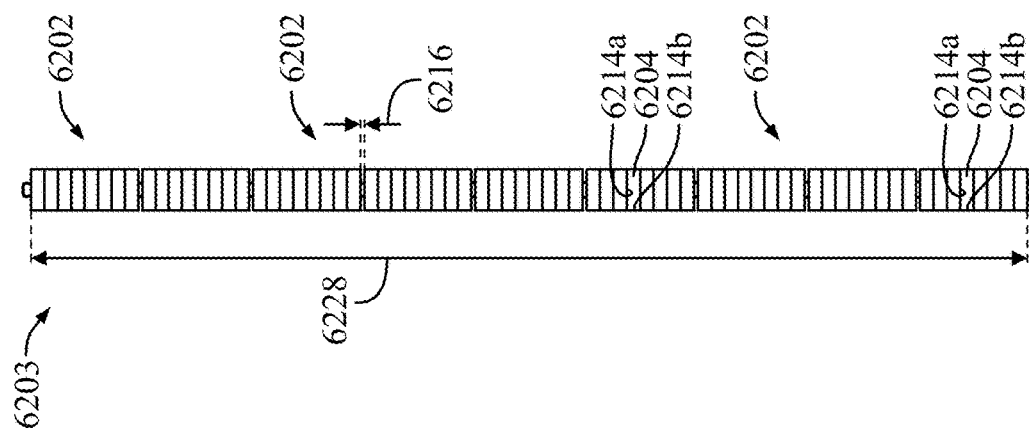
Figure 64A:
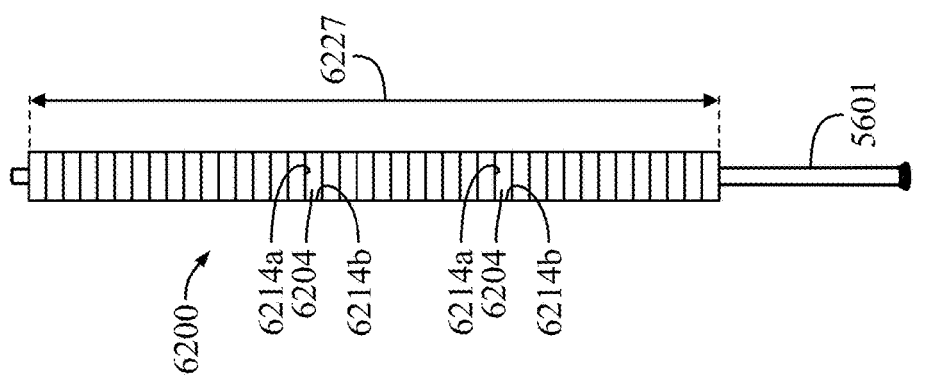

Referring now to FIG. 64A, another example of a solar pillar 6200 is shown where the solar panels 6204 are stacked on top of each other on their longitudinal sides 6214a that are in a horizontal orientation. The active solar surfaces of the solar panels 6204 may lay flush with each other. More solar panels 6204 may be stacked on top of each other at a shorter height since the solar panels 6204 are stacked on their horizontal longitudinal sides 6214a, when compared to the solar panels 6204 being stacked on their lateral sides 6214b. The total height 6227 of the solar pillar may be between four to 80 feet. The total height 6227 may be measured from the lower longitudinal side 6214a of the lowest solar panel 6204 to the upper longitudinal side 6214a of the highest solar panel 6204. The solar pillar 6200 may also be elevated off the ground, as described elsewhere herein.

Referring now to FIG. 64B, another example of the solar pillar 6203 is shown. The solar pillar 6203 of FIG. 64B may be the similar to the solar pillar 6200 of FIG. 64A. The solar panels 6204 may be compartmentalized into solar panel modules 6202 that have vertical spacing 6216 between them, which the vertical spacing 6216 may be defined as explained elsewhere herein. There may be between one to 18 solar panel modules 6202 orientated above each other. In some examples, greater than 18 solar panel modules 6202 may be orientated above each other. The total height 6228 of the solar pillar 6203, which may include the vertical spacing 6216 between the solar panel modules 6202, may be between four to 100 feet. In some examples, the total height 6228 may be greater than 100 feet.

Referring now to FIG. 64C, another example of a solar pillar 6205 is shown. In this example, multiple solar pillars 5600 shown in FIG. 58A may be stacked vertically on top of each other, which such pillars may be considered sub-pillars 5600 of the solar pillar 6205. There may exist vertical spacing between the vertically stacked solar sub-pillars 5600. Alternatively, there may be no vertical spacing between the solar pillars 5600 stacked on top of each other. The total height 6229 of the solar pillar 6205, which may include the vertical spacing 6216 between the solar sub-pillars 5600, may be between four to 90 feet. In some examples, the total height 6229 may be greater than 90 feet.

Figure 65B:
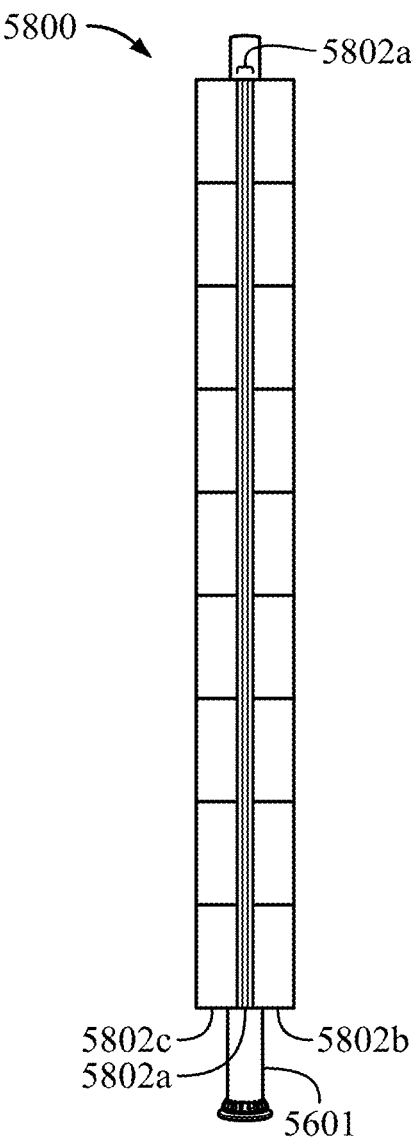

Referring now to FIGS. 65A-B, the solar panel pillar 5800 of FIG. 60A is shown between an unfolded position and a folded position. The unfolded position of the solar panel pillar 5800 of FIG. 65A may be the same as what is shown in FIG. 60A. The folded position of the solar panel pillar 5800 of FIG. 65B may be an alternate way to protect the solar panels 5812 from the natural elements (when not in use) than a protective cover 5820 shown in FIG. 60B. Another way to protect the solar panels is by pivoting the solar panels so that the angle 5615 is zero. The face of the solar panels are not exposed directly to the dust, wind, rocks and other environmental elements that might damage or cause the solar panels to work less efficiently.

The railings 5808 may transition the solar panel columns 5802*a-c* between the unfolded and folded positions shown in FIGS. 65A-B. The railings 5808 may be horizontally coupled along each solar panel rows 5806 of the right and left solar panel columns 5802*b-c*, and even along the solar panel rows 5806 of the middle solar panel column 5802*a*. The railings 5808 may connect the right and left solar panel columns 5802*b-c* to the center solar panel column 5802*a* such that the solar panel sub-columns 5804 of the right and left solar panel columns 5802*b-c* may traverse and fold on top of each other towards the center solar panel column 5802*a*.

The solar sub-columns 5804 of the right and left solar panel columns 5802*b-c* may slide along/with the railings 5808 and on top of each other toward the middle solar panel column 5802*a* to fold, as shown in FIG. 65B. In the folded position, the right and left solar panel columns 5802*b-c* may each retract to have all of the solar sub-columns 5804 stacked on top of each other in one column on each side of the center solar panel column 5802*a*. The right and left solar panel columns 5802*b-c* may unfold by the solar sub-columns 5804 separating from each other and expanding away from the center solar panel column 5802*a* using the railings 5808.

The solar sub-columns 5804 of the center solar panel column 5802*a* may also slide and fold on top of each other similar to what has been described with respect to the right and left solar panel columns 5802*b-c*. When the solar sub-columns 5804 of the center solar panel column 5802*a* retract and stack on top of each other, the center solar panel column 5802*a* may further rotate about a vertical axis 5803 parallel to the mounting pole 5601 by 90-degrees, as shown in FIG. 65B. As such, the solar pillar 5800 may be more compact and take up less space in the folded position. In the folded position, the solar panels 5812 of the solar pillar 5800 may be protected from natural elements, such as dust, dirt, rain, or snow.

In the unfolded position, as shown in FIG. 65A, the solar panel columns 5802*a-c* may each have a plurality of spray bar 5805 to wash and rinse the active solar surfaces of the solar panels 5812. The spray bars 5805 may be attached to the side of the solar panels 5812 (e.g., longitudinal sides 5814*a*) proximate to the horizontal spacing between the solar panel columns 5802*a-c*. Each spray bar 5805 may be configured to rotate between 0 to 360-degrees to be able to wash more solar panels 5812 at different angular directions relative to the spray bar 5805.

Figure 66A:
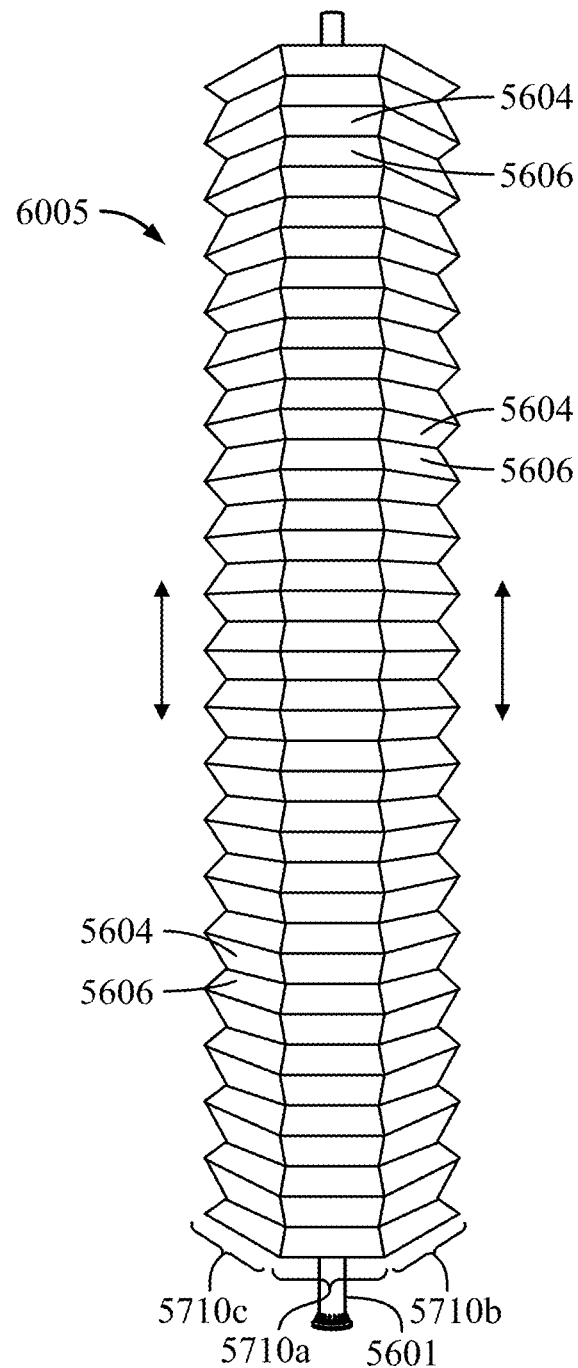
FIGS. 66A-B show the solar pillar of FIG. 62C in an unfolded and folded orientation.
Figure 66B:
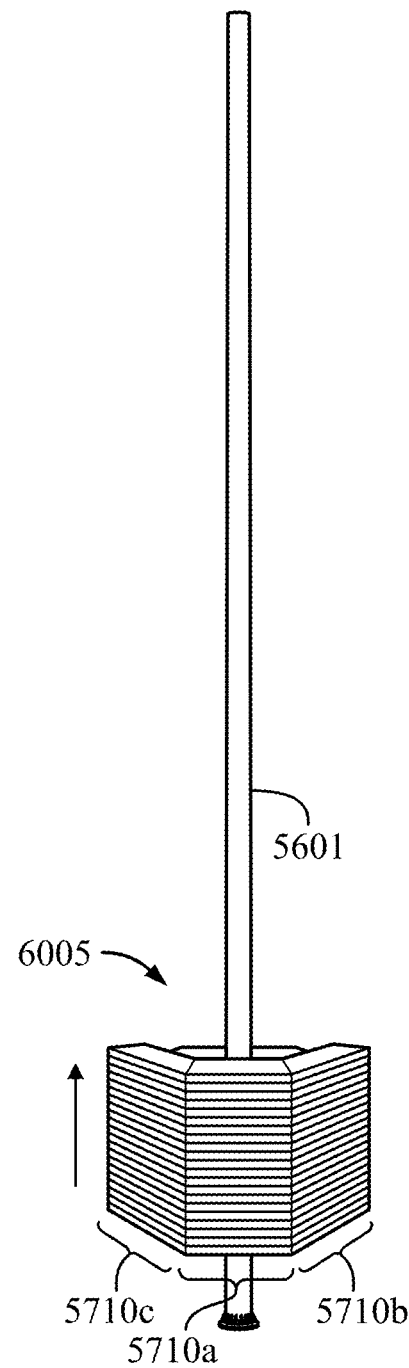

Referring now to FIGS. 66A-B, an example of the solar panel pillar 6005 of FIG. 62C that is folding is shown. In the unfolded orientation, as shown in FIG. 66A, the solar panel pillar 6005 may have the zigzag shape formed by the repeated V-shape of the pair of solar panels 5604, 5606, as described elsewhere herein. As shown in FIG. 66B, the plurality of pairs of solar panels 5604, 5606 making up the columns 5620*a-c* of the solar pillar 6005 may fold downward along the mounting pole 5601 and on top of each other. The solar panel sub-pillars 5600*a-c*, either in-synch or independent from each other, may traverse downward along the mounting pole 5601 and have the solar panels 5604, 5606 making up columns fold on top of each other. The angle between each pair of solar panels 5604, 5606 may be zero-degrees in the folded position shown in FIG. 66B. The solar panel sub-pillars 5600*a-c*, either in-synch or independent from each other, may also traverse upwards to the unfolded position of FIG. 66A.

Figure 67:
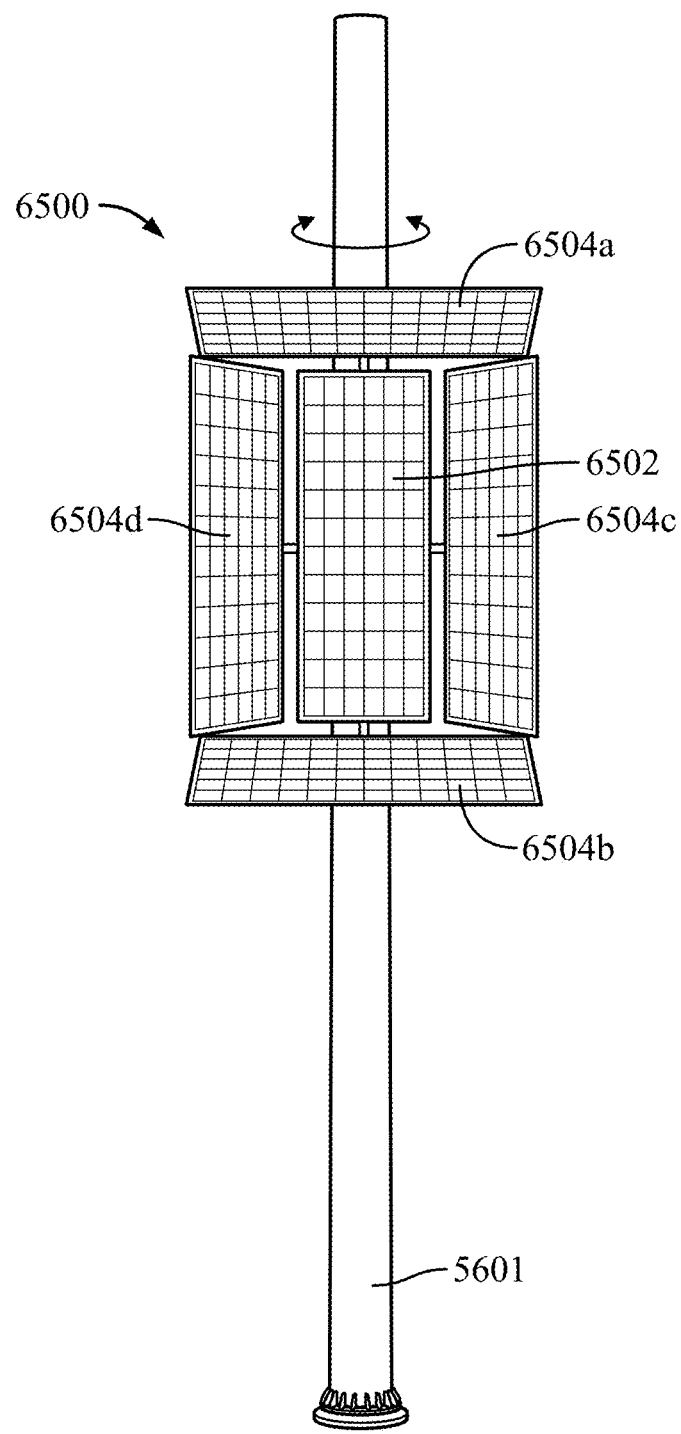
FIG. 67 shows another example of a solar pillar.

Referring now to FIG. 67, a solar panel assembly 6500 having a plurality of side solar panels 6504*a-d* angled towards a flat center solar panel 6502 is shown. The active solar surfaces of the side solar panels 6504*a-d* may surround around the flat center solar panel 6502. The center solar panel 6502 may be flat along the mounting pole 5601 and be at the center of the side solar panels 6504*a-d*. The longitudinal sides of the flat solar panel 6502 may be vertical and its lateral sides horizontal.

The right and left solar panels 6504*c-d* may have vertical longitudinal sides. Each right and left solar panel 6504*c-d* may be angled along its lateral sides and extend away from the mounting pole 5601. The active solar surfaces of the right and left solar panels 6504*c-d* may face towards the center solar panel 6502, where the three panels may make a horizontal U-shape.

The top and bottom solar panels 6504*a-b* may have horizontal longitudinal sides. The top and bottom solar panel 6504*a-b* and the center solar panel 6502 may make a vertical U-shape. The top solar panel 6504*a* may incline upwards along its lateral sides and away from the mounting pole 5601. The active solar surface of the top solar panel 6504*a* may face downwards and towards the center solar panel 6502. The top solar panel 6504*a* may also be bifacial and have a second active surface opposite to the downward facing active surface. The bottom solar panel 6504*b* may incline downwards along its lateral sides and away from the mounting pole 5601. The active solar surface of the bottom solar panel 6504*b* may face upwards and towards the center solar panel 6502.

The solar panel assembly 6500 may rotate around the mounting pole 5601 between 0 to 360-degrees. As such, the solar panel assembly 6500 may face the optimal direction for receiving solar energy from the sun. Alternatively, the mounting pole 5601 may rotate about its center to rotate the solar panel assembly 6500. The side solar panels 6504*a-d* and the center solar panel 6502 may be bifacial or transparent, as described elsewhere herein.

Figure 68:
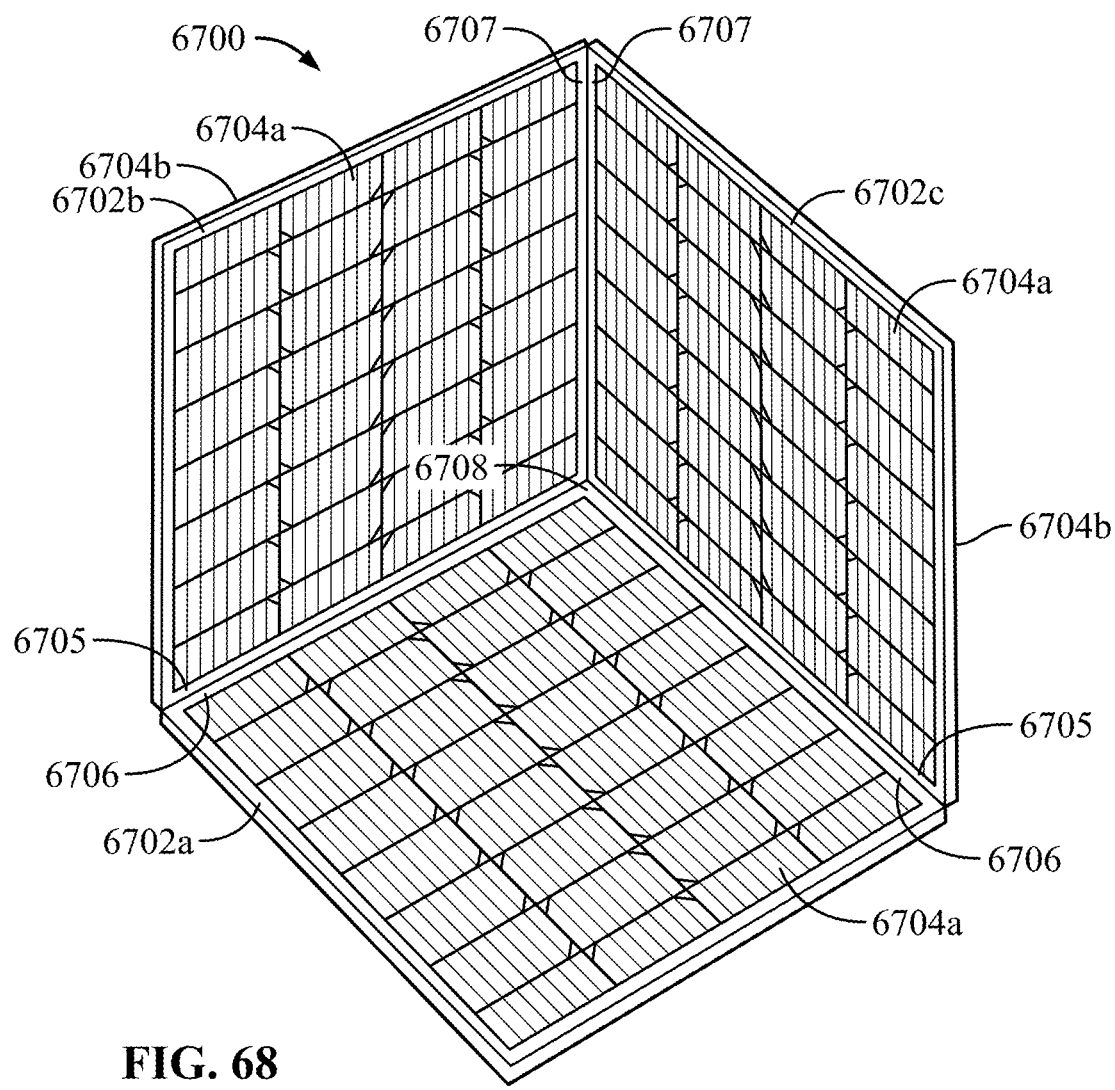
FIG. 68 shows a semi-cube shaped solar panel assembly 6700.

Referring now to FIG. 68, a semi-cube shaped solar panel assembly 6700 is shown. The solar panel assembly 6700 may have a first, second, and third solar panels 6702*a-c* that are square and attached together to form a vertex 6708 of the semi-cube shape. The base solar panel 6702*a* may be square and lay flat on the ground. The base solar panel 6702*a* may have an active solar surface 6704*a* facing upwards.

A first vertical solar panel 6702*b* may be square shaped and have a lower side 6705 attached to a horizontal side 6706 of the base solar panel 6702*a*. The first vertical solar panel 6702*b* may form an orthogonal angle with the base solar panel 6702*a*. The first vertical solar panel 6702*b* may have an active solar surface 6704*a* on the same side as the base solar panel 6702*a*. In some examples, the first vertical solar panel 6702*b* may have a second active solar surface 6704*b* on the opposite side as the base solar panel 6702*a*.

A second vertical solar panel 6702*c* may be square shaped and have a lower side 6705 attached to a horizontal side 6706 of the base solar panel 6702*a*. The second vertical solar panel 6702*c* may form an orthogonal angle with the base solar panel 6702*a*. The second vertical solar panel 6702*c* may have a vertical side 6707 attached to a vertical side 6707 of the first vertical square solar panel 6702*b*. The second vertical solar panel 6702*c* may form an orthogonal angle with the first vertical panel 6702*b*. The second vertical solar panel 6702c may have an active solar surface 6704a on the same side as the base solar panel 6702a. In some examples, the first vertical solar panel 6702b may have a second active solar surface 6704b on the opposite side as the base solar panel 6702a.

Referring now to FIGS. 69A-E, an example of the orientation adjustment system 5607 is shown that may be responsible for changing the rotational position of the solar pillar 5600 of FIG. 58A, and the angle 5615 between the first and second solar panels 5604, 5606. The rotational position of the solar pillar 5600 around the mounting pole 5601 may be changed using one or more rotational rings 5618a-c. The rotational rings 5618a-c may be bearing structures attached on the mounting pole 5601 and designed to rotate the solar pillar 5600 around such pole. By way of example and not limitation, the rotational rings 5618a-c may be in the form of a roller or ball bearing structures. The middle rotational ring 5618a may be motorized to provide the rotational force to the bottom and top 5618b-c rotational rings and rotate the solar pillar 5600. Alternatively, all of the rotational rings 5618a-c may be motorized.

Figure 69E:
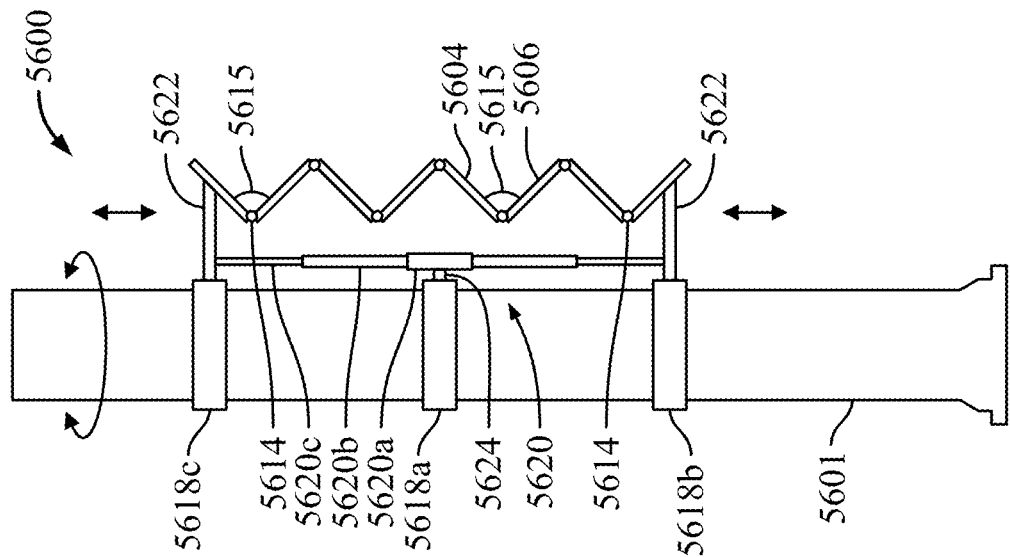
Figure 69D:
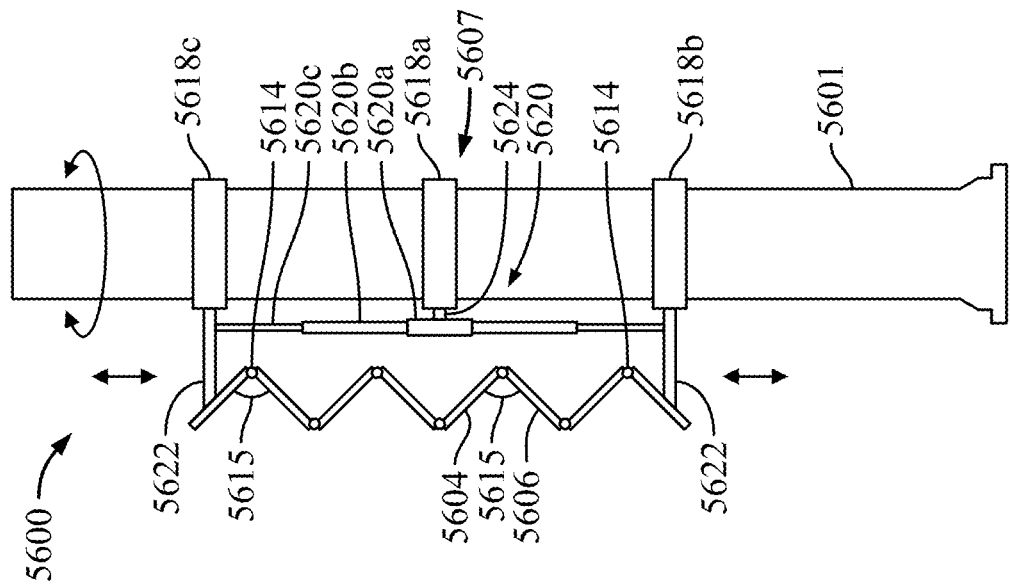

The rotational rings 5618a-c may rotate the solar pillar 5600 around the mounting pole 5601 between 0 to 360-degrees. As shown in FIGS. 69D-E, the solar pillar 5600 may be rotated by 180-degrees around the mounting pole 5601 using the rotational rings 5618a-c. The middle rotational ring 5618a may be snug fit to the mounting pole 5601 such that the middle rotational ring 5618a may not translationally (e.g., vertically) move along the pole. The lower and top rotational rings 5618b-c may have a clearance fit with the mounting pole 5601 such that such rotational rings may move vertically upward and downwards along the pole to change the angle 5615 between the first and second solar panels 5604, 5606, as described elsewhere herein.

The lower and upper rotational rings 5618b-c may be coupled to the rear side of the outer solar panels 5604 of the solar pillar 5600 by attachment brackets 5622. The middle rotational ring 218a may be coupled to the center section 5620a of a telescoping mechanism 5620 by a second attachment bracket 5624. The outer shafts 5620c of the telescoping mechanism 5620 may be attached to the attachment brackets 5622, which extend from the lower and upper rotational rings 5618b-c and towards the rear side of the solar panels. The outer shafts 5620c of the telescoping mechanism 5620 may be designed to retract towards and expand away from the center telescoping section 5620a of the telescoping mechanism 5620 to change the angle 5615 between the first and second solar panels 5604, 5606. As shown in FIGS. 69A-B, the outer shafts 5620c may be retracted towards the center section 5620a of the telescoping mechanism 5620 to reduce the angle 5615 between the first and second solar panels 5604, 5606 to a second more acute angle 5615a. The changing of the angle 5615 between the first and second solar panels 5604, 5606 may be possible because of the pivot joints 5614 between the panels. The telescoping mechanism 5620 may also have middle shafts 5620b between the center section 5620a and the outer shafts 5620c. As shown in FIGS. 69B-C, the middle shafts 5620b may also retract towards the center section 5620a of the telescoping mechanism 5620 to fold the first and second solar panels 5604, 5606 of the solar pillar 5600 on top of each other. In the folded position, the active solar surfaces of the first and second solar panels 5604, 5606 may lay on top of each other. The angle 5615 between the first and second solar panels 5604, 5606 may range between 0 to 180-degrees, as described elsewhere herein.

Figure 70E:
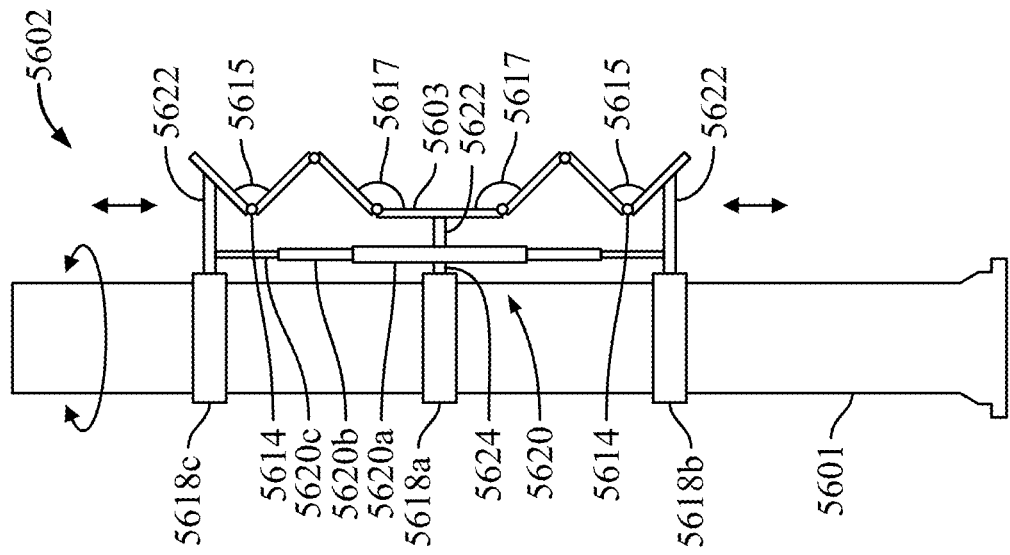
Figure 70D:
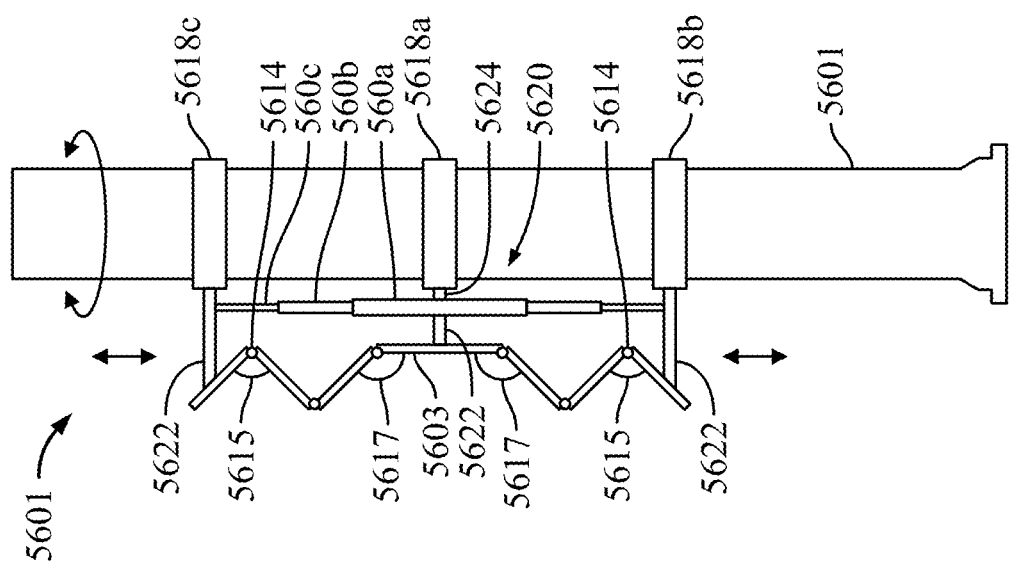

Referring now to FIGS. 70A-E, the orientation adjustment system 5607 is shown used with the solar pillar 5602 of FIG. 58B. The orientation adjustment system 5607 may have the same features and functions as described elsewhere herein. The orientation adjustment system 5607 may also alter the angle 5617 between the flat solar panel 5603 and the adjacent solar panels using the telescoping mechanism 5620. As shown in FIGS. 70A-B, the outer shafts 5620c of the telescoping mechanism 5620 may retract towards its center section 5620a to reduce the obtuse angle 5617 between the flat solar panel 5603 and the adjacent solar panels to a second obtuse angle 5617a of the flat solar panel 5603. As shown in FIGS. 15B-C, the middle shafts 5620b of the telescoping mechanism 5620 may also retract towards the center section 5620a of the mechanism to fold the solar pillar 5602. In the folded position of the solar pillar 5602, as shown in FIG. 15C, the angle 5617b between the flat solar panel 5603 and the adjacent solar panels may be 90-degrees.

Figure 71:
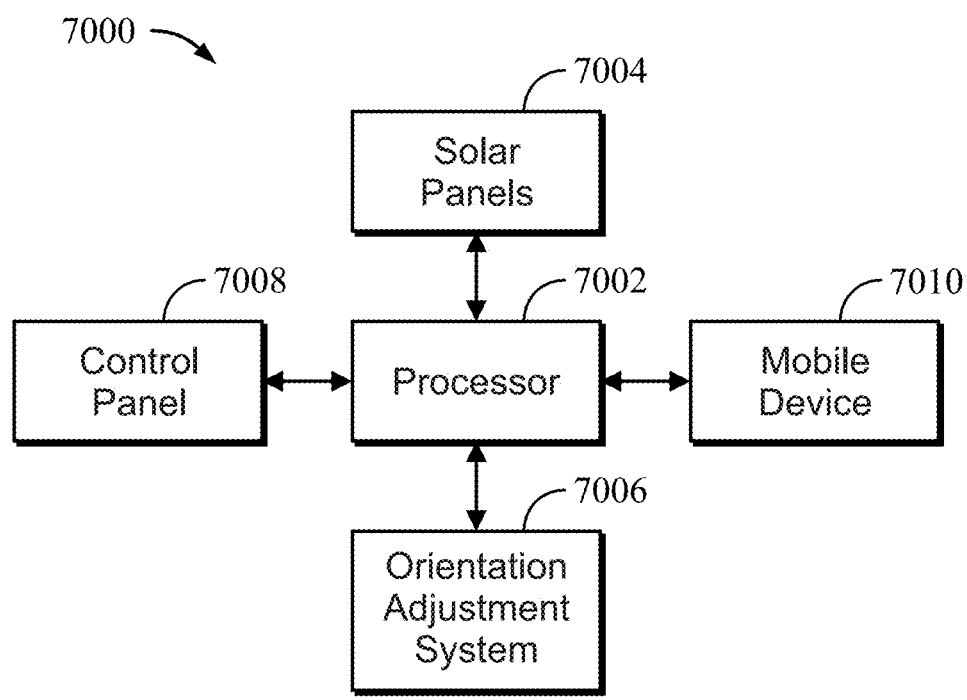
FIG. 71 shows a block diagram of the electric and electromechanical components of the solar pillars, towers, and devices.

Referring now to FIG. 71, a block diagram of a system 7000 of electrical and electromechanical components that operate the solar devices and systems, described elsewhere herein, is shown. The system 7000 may embody the components of one solar device (e.g., one solar pillar) or for a plurality of solar devices (e.g., multiple solar pillars), described elsewhere herein. The solar devices and systems may have a processing unit 7002 (e.g., microcontroller or central processing unit) for operating the devices. The processing unit 7002 may execute artificial intelligence and machine learning to analyze and interpret weather patterns to operate and orientate the solar devices and systems optimally. By way of example, artificial intelligence and machine learning may be used to more and orientate the solar panels at an optimum direction facing the sun by using, for example, the orientation adjustment system 7006. The artificial intelligence and machine learning executed by the processor 7002 may also use data pertaining to the time of year (e.g., season, month, or week of the year) and the physical location of the solar devices and systems to operate such devices optimally. For example, the time of the year and the location of the solar devices may be used by the processor 7002 to determine at what times during the day (e.g., when the sun is out and shining) the solar devices should operate and stay active.

A control panel 7008 or a mobile device 7010 may control the operation of the solar devices and systems. The control panel 7008 and mobile device 7010 may be digitally connected to the processor 7002 and may command the processor to operate the solar devices and systems, such as by activating and deactivating them or changing the orientation of the solar panels making up the devices. The control panel 7002 may be part of the solar devices and systems and be hardwired to such devices. The mobile device 7010 (e.g., smartphone or tablet) may be remotely connected to the solar devices and systems using WIFI or Bluetooth. The mobile device 7010 may have a software application designed to communicate with the processor 7002 and execute operation commands.

The solar panels 7004 of the system 7000 in FIG. 71 may be the same as the solar panels described elsewhere herein with respect to different solar devices and systems (e.g., solar pillars, columns, or towers). The solar panels 7004 may be digitally connected to the processor 6502 to receive signals and commands to when to activate and to also change positioning (e.g., folding or unfolding) and orientation (e.g., rotation around the mounting pole), described elsewhere herein. The orientation adjustment system 7006, described elsewhere herein, may move the solar panels 6504 at the optimal direction and position relative to the sun.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A solar panel pillar, comprising:
   a first pair of solar panels having a first solar panel and a second solar panel pivotably coupled together at a first lower vertex of the first pair of solar panels;
   the first solar panel having a first longitudinal side and a second longitudinal side that are horizontal and a first lateral side and a second lateral side that incline downward from the first longitudinal side to the second longitudinal side of the first solar panel;
   the second solar panel having a first longitudinal side and a second longitudinal side that are horizontal and a first lateral side and a second lateral side that incline downward from the first longitudinal side to the second longitudinal side of the second solar panel and towards the second longitudinal side of the first solar panel;
   the first lower vertex being defined by the second longitudinal side of the first solar panel being pivotably coupled with the second longitudinal side of the second solar panel, the first lower vertex being between a first angle defined by the first solar panel and the second solar panel inclining downwards towards each other;
   a second pair of solar panels having a third solar panel and a fourth solar panel pivotably coupled together at a second lower vertex of the second pair of solar panels, the third solar panel being pivotably coupled to the second solar panel of the first pair of solar panels to form a first upper vertex;
   the third solar panel having a first longitudinal side and a second longitudinal side that are horizontal and a first lateral side and a second lateral side that incline downward from the first longitudinal side to the second longitudinal side of the third solar panel, the first longitudinal side of the third solar panel being pivotably coupled to the first longitudinal side of the second solar panel of the first pair of solar panels to form the first upper vertex;
   the fourth solar panel having a first longitudinal side and a second longitudinal side that are horizontal and a first lateral side and a second lateral side that incline downward from the first longitudinal side to the second longitudinal side of the fourth solar panel and towards the second longitudinal side of the third solar panel; and
   the second lower vertex being defined by the second longitudinal side of the third solar panel being pivotably coupled with the second longitudinal side of the fourth solar panel, the second lower vertex being between a second angle defined by the third solar panel and the fourth solar panel inclining downwards towards each other;
   wherein the first angle defined by the first solar panel and the second solar panel and the second angle defined by the third solar panel and the fourth solar panel are adjustable to increase and decrease in value.

2. The solar panel pillar of claim 1, wherein the first angle and the second angle are configured to increase in value up to 180-degrees.

3. The solar panel pillar of claim 2, wherein the first angle and the second angle are configured to decrease in value down to 0-degrees.

4. The solar panel pillar of claim 1, wherein the first and second pairs of solar panels are configured to be attached to a mounting pole.

5. The solar panel pillar of claim 4, wherein the first and second pairs of solar panels are rotatable around the mounting pole.

6. The solar panel pillar of claim 4, wherein the mounting pole is configured to rotate about an axis along a length of the mounting pole.

7. The solar panel pillar of claim 1, wherein the first and second pairs of solar panels are configured to be completely flattened.

8. A solar panel pillar, comprising:
   a mounting pole vertically attachable to a flat surface;
   a center solar panel column attached to the mounting pole and having a left side and a right side, the center solar panel also having a first plurality of solar panels on top of each other;
   a right-side solar panel column proximate to the right side of the center solar panel column, the right-side solar panel column having a second plurality of solar panels on top of each other and pivoting towards the mounting pole from the right side of the center solar panel column; and
   a left-side solar panel column proximate to the left side of the center solar panel column, the left-side solar panel column having a third plurality of solar panels on top of each other and pivoting towards the mounting pole from the left side of the center solar panel column;
   wherein the center solar panel column, the right-side solar panel column, and the left-side solar panel column from a semi-hexagon shape around the mounting pole.

9. The solar panel pillar of claim 8, wherein the center solar panel column has a first height measured from an upper edge of an upper solar panel of the first plurality of solar panels to a lower edge of a lower solar panel of the first plurality of solar panels.

10. The solar panel pillar of claim 9, wherein the first height is between 30 to 80 feet long.

11. The solar panel pillar of claim 10, wherein the right-side solar panel column has a second height equaling the first height and the left-side solar panel column has a third height equaling the first height.

12. The solar panel pillar of claim 8, wherein the center solar panel column has an additional plurality of solar panels adjacent to the first plurality of solar panels.

13. The solar panel pillar of claim 8, wherein there exists a first horizontal spacing between the center solar panel column and the right-side solar panel column and also a second horizontal spacing between the center solar panel column and the left solar panel column.

* * * * *